(12) United States Patent
Goodrich

(10) Patent No.: US 12,378,025 B2
(45) Date of Patent: *Aug. 5, 2025

(54) EXPANDED SLIT SHEET VOID FILL DISPENSING SYSTEMS AND METHODS

(71) Applicant: David Paul Goodrich, Sedona, AZ (US)

(72) Inventor: David Paul Goodrich, Sedona, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,587

(22) Filed: Nov. 7, 2023

(65) Prior Publication Data

US 2024/0190601 A1  Jun. 13, 2024

Related U.S. Application Data

(63) Continuation of application No. 17/175,148, filed on Feb. 12, 2021, now Pat. No. 12,060,180.

(60) Provisional application No. 62/975,678, filed on Feb. 12, 2020, provisional application No. 62/976,930, filed on Feb. 14, 2020, provisional application No.
(Continued)

(51) Int. Cl.
*B32B 3/24* (2006.01)
*B31D 5/00* (2017.01)
*B65B 41/12* (2006.01)
*B65D 83/08* (2006.01)
(Continued)

(52) U.S. Cl.
CPC ............ *B65B 41/12* (2013.01); *B31D 5/0052* (2013.01); *B31D 5/0065* (2013.01); *B65D 83/0835* (2013.01); *B65H 49/322* (2013.01); *B31D 2205/0029* (2013.01); *B31D 2205/0047* (2013.01); *B31D 2205/0088* (2013.01); *B32B 3/266* (2013.01); *B65H 2801/63* (2013.01); *B65H 2801/81* (2013.01); *Y10T 428/24314* (2015.01)

(58) Field of Classification Search
CPC .............................. B32B 3/266; B31D 5/0065
See application file for complete search history.

(56) References Cited

U.S. PATENT DOCUMENTS 5,538,778 A   7/1996   Hurwitz et al.
5,560,514 A   10/1996  Frazier
(Continued)

OTHER PUBLICATIONS

The extended European search report issued by the European Patent Office on Feb. 15, 2024, which corresponds to EP 21754159.8-1014 and is related to U.S. Appl. No. 18/387,587.
(Continued)

*Primary Examiner* — William P Watkins, III
(74) *Attorney, Agent, or Firm* — Studebaker Brackett PC

(57) ABSTRACT

The present invention provides void fill dispenser systems and methods that highly effectively enable the easy and usable creation of void fill with expanded slit sheet paper in a manner unattainable in the existing art. According to some illustrative embodiments, a void fill dispenser is provided that advantageously dispenses unique void fill in a manner not previously possible. In some embodiments, the void fill dispenser is made with a recyclable material, such as, e.g., a corrugated box made from paper. In some embodiments, the void fill dispenser is made with metal and/or other rigid and/or non-recyclable materials. In some embodiments, the void fill dispenser can comprise an automated metal dispensing system that dispenses expanded slit sheet paper particularly for void fill in an automated manner.

39 Claims, 67 Drawing Sheets

Related U.S. Application Data

62/980,122, filed on Feb. 21, 2020, provisional application No. 62/983,601, filed on Feb. 29, 2020, provisional application No. 63/000,390, filed on Mar. 26, 2020, provisional application No. 63/020,016, filed on May 5, 2020, provisional application No. 63/064,393, filed on Aug. 11, 2020.

(51) Int. Cl.
*B65H 49/32* (2006.01)
*B32B 3/26* (2006.01)

(56) References Cited

U.S. PATENT DOCUMENTS

| | | |
|---|---|---|
| 5,667,871 A | 9/1997 | Goodrich et al. |
| 5,688,578 A | 11/1997 | Goodrich |
| 5,782,735 A | 7/1998 | Goodrich et al. |
| 6,632,165 B1 | 10/2003 | Letourneau et al. |
| 6,871,480 B1 | 3/2005 | Goodrich |
| 7,794,382 B2 | 9/2010 | Cheich |
| 8,016,735 B2 | 9/2011 | Wetsch et al. |
| 8,360,949 B2 | 1/2013 | Wetsch et al. |
| 8,550,971 B2 | 10/2013 | Chan et al. |
| 8,641,591 B2 | 2/2014 | Wetsch et al. |
| 8,845,504 B2 | 9/2014 | Wetsch et al. |
| 8,900,111 B2 | 12/2014 | Wetsch et al. |
| 9,254,578 B2 | 2/2016 | Wetsch et al. |
| 9,427,930 B2 | 8/2016 | Wetsch et al. |
| 9,457,982 B2 | 10/2016 | Wetsch et al. |
| 9,694,555 B2 | 7/2017 | Wetsch et al. |
| 9,840,056 B2 | 12/2017 | Wetsch et al. |
| 10,035,320 B2 | 7/2018 | Wetsch et al. |
| 10,220,589 B2 | 3/2019 | Wetsch et al. |
| 10,226,907 B2 | 3/2019 | Goodrich |
| 10,300,672 B2 | 5/2019 | Wetsch et al. |
| 10,618,239 B2 | 4/2020 | Wetsch et al. |
| 10,661,523 B2 | 5/2020 | Wetsch et al. |
| 10,669,086 B2 | 6/2020 | Goodrich |
| 10,766,690 B2 | 9/2020 | Goodrich |
| 10,792,882 B2 | 10/2020 | Wetsch et al. |
| 10,981,712 B2 | 4/2021 | Goodrich |
| 11,034,120 B1 | 6/2021 | Goodrich |
| 11,220,395 B2 | 1/2022 | Goodrich |
| 11,235,548 B2 | 2/2022 | Wetsch et al. |
| 11,261,016 B2 | 3/2022 | Goodrich |
| 11,383,906 B2 | 7/2022 | Goodrich |
| 11,401,090 B2 | 8/2022 | Goodrich |
| 11,440,305 B2 | 9/2022 | Goodrich |
| 11,479,009 B2 | 10/2022 | Goodrich |
| 2007/0117703 A1 | 5/2007 | Cavaliere, Jr. et al. |
| 2008/0125300 A1 | 5/2008 | Cheich et al. |
| 2009/0081416 A1 | 3/2009 | Goodrich |
| 2009/0233023 A1 | 9/2009 | Goodrich |
| 2010/0314485 A1 | 12/2010 | Anderson |
| 2012/0283084 A1 | 11/2012 | Cheich et al. |
| 2014/0027553 A1 | 1/2014 | Page et al. |
| 2016/0067938 A1 | 3/2016 | Goodrich |
| 2017/0203866 A1 | 7/2017 | Goodrich |
| 2018/0222665 A1 | 8/2018 | Goodrich |
| 2018/0281336 A1 | 10/2018 | Cheich et al. |
| 2019/0134935 A9 | 5/2019 | Wetsch et al. |
| 2020/0270048 A1 | 8/2020 | Goodrich |
| 2021/0031996 A1 | 2/2021 | Goodrich |
| 2021/0031997 A1 | 2/2021 | Goodrich |
| 2021/0245908 A1 | 8/2021 | Goodrich |

OTHER PUBLICATIONS

Notification of Transmittal of the International Search Report and the Written Opinion of the International Searching Authority, or the Declaration (Form PCT/ISA/220) issued in counterpart International Application No. PCT/US2021/017820 mailed Apr. 22, 2021 with forms PCT/ISA/210, and PCT/ISA/237. (18 pages)(Cited in parent U.S. Appl. No. 17/175,148).

Overlap + Rotation
FIG. 43A 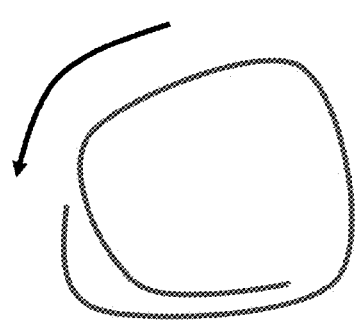 FIG. 43B 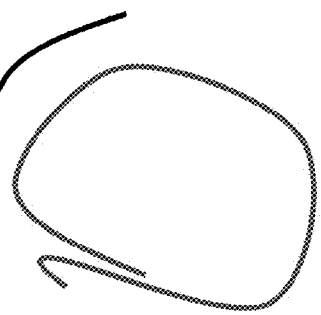

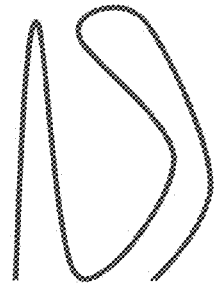 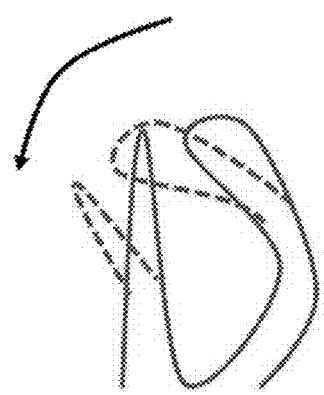
FIG. 43D  FIG. 43E

EXPANDED SLIT SHEET VOID FILL DISPENSING SYSTEMS AND METHODS

CROSS-REFERENCES TO PRIORITY APPLICATIONS

The present application is a continuation of U.S. Ser. No. 17/175,148, filed Feb. 12, 2021, the entire disclosure of which is incorporated herein by reference, which Ser. No. 17/175,148 application is a non-provisional of each of the following prior provisional applications, the entire disclosures of which are also all incorporated herein by reference:
  (1) U.S. Provisional Application No. 62/975,678, filed Feb. 12, 2020;
  (2) U.S. Provisional Application No. 62/976,930, filed Feb. 14, 2020;
  (3) U.S. Provisional Application No. 62/980,122, filed Feb. 21, 2020;
  (4) U.S. Provisional Application No. 62/983,601, filed Feb. 29, 2020;
  (5) U.S. Provisional Application No. 63/000,390, filed Mar. 26, 2020;
  (6) U.S. Provisional Application No. 63/020,016, filed May 5, 2020;
  (7) U.S. Provisional Application No. 63/064,393, filed Aug. 11, 2020.

CROSS-REFERENCES TO PATENTS AND PATENT APPLICATIONS INCORPORATED BY REFERENCE

The entire disclosures of a) U.S. Pat. No. 10,669,086, issued Jun. 2, 2020, b), c) U.S. Pat. No. 10,226,907, issued on Mar. 12, 2019, d) U.S. application Ser. No. 16/274,028, filed Feb. 12, 2019, as a divisional of U.S. Pat. No. 10,226,907, and e) Ser. No. 16/870,195, filed May 8, 2020, entitled "Extensible Paper and its Use in the Production of Expanded Slit Packaging Wrap and Void Fill Products" are each incorporated by reference herein in their entireties, as though recited in full herein.

FIELD OF THE INVENTION

The preferred embodiments of the present invention relate to the use of expanded slit sheet paper for cushioning properties, and the most preferred embodiments provide novel and advantages systems and methods of employing expanded slit sheet paper as a void fill product in a manner that was previously unknown and not possible within the art of cushioning products.

According to some illustrative embodiments, a void fill dispenser is provided that advantageously dispenses unique void fill in a manner not previously possible. In some embodiments, the void fill dispenser is made with a recyclable material, such as, e.g., a corrugated box made from paper. In some embodiments, the void fill dispenser is made with metal and/or other rigid and/or non-recyclable materials. In some embodiments, the void fill dispenser can comprise an automated metal dispensing system that dispenses expanded slit sheet paper particularly for void fill in an automated manner.

Description of Problems Identified By the Inventor Related to the Background Art This section describes the present inventor's identification of problems in the background art and does not suggest any knowledge of such problems in the background art or other knowledge in the background art.

The present inventor pioneered the use of expanded slit sheet paper for cushioning products. Since the present inventor's introduction of expanded slit sheet paper as a cushioning product, dispensing systems have been used that expand the slit sheet paper in a manner to enable the expanded slit sheet paper to be wrapped around a product. Towards that end, prior expansion devices of expanded slit sheet paper feed the slit sheet paper in a uniform and flat manner so that the cells of the paper are substantially uniformly opened upon expansion. Then, the expanded paper, while in this flat state, is wrapped around an item to protect that item.

Rather than wrapping an item, a prior expansion device could have theoretically been used to expand the paper (i.e., in its flat state) and then the expanded paper could have theoretically been rolled upon itself in a manner not to surround a product, but to create a void fill for cushioning. However, it was not previously possible to create a viable and useful void fill product using such prior expansion devices.

For example, when paper is expanded with such prior expansion devices, after expansion, the paper has a tendency to retract. That is, the expanded paper needs to remain under tension to remain expanded. Accordingly, such prior expansion devices are useful when wrapped around an item because the act of wrapping the item maintains the expanded state of the expanded slit sheet paper, and once the item is wrapped a few times by the expanded slit sheet paper, the layers of the wrapped expanded paper can interlock around the item and, hence, remain in an expanded state around the item.

However, if the expanded paper was not wrapped around an item and attempted to be used as a void fill, there would be a problem in that the expanded paper would have a tendency to retract and lose its expanded state (which expanded state is necessary for cushioning capabilities).

Moreover, as the expanded slit sheet paper is, by itself, thin (even in an expanded state), it would be difficult to wrap the paper around itself to form a void fill product.

Moreover, in order to form a void fill product with such prior expansion devices, the paper would *first* need to be expanded and *second* would need to be wrapped around itself to avoid contraction. Thus, such prior expansion devices do not lend themselves to the creation of a viable void fill product.

SUMMARY

The preferred embodiments of the present invention overcome and improve upon various problems and limitations in the background art.

In contrast to the background art, the present invention provides void fill dispenser systems and methods that highly effectively enable the easy and usable creation of void fill with expanded slit sheet paper in a manner unattainable in the existing art.

According to some illustrative embodiments, a void fill dispenser is provided that advantageously dispenses unique void fill in a manner not previously possible. In some embodiments, the void fill dispenser is made with a recyclable material, such as, e.g., a corrugated box made from paper. In some embodiments, the void fill dispenser is made with metal and/or other rigid and/or non-recyclable materials. In some embodiments, the void fill dispenser can comprise an automated metal dispensing system that dispenses expanded slit sheet paper particularly for void fill in an automated manner.

According to some preferred embodiments, the instant art of the void fill system is made from a roll of unexpanded extensible slit sheet material, such as, e.g., employing extensible papers as described herein and as described in U.S. Pat. No. 10,669,086. In preferred embodiments, this roll is placed into a box and oriented such that the dispensing of the expanded slit sheet material is done from center of the wound roll. In order to stabilize the roll and hold it in position, the dispensing system encapsulates or otherwise stabilizes the roll to provide ease of use and an opening to allow the material to exit continuously. In the preferred embodiments, the opening is also specially designed to provide frictional resistance to effect expansion of the slit sheet material.

The preferred embodiments of the present invention provide a very unique and novel structure that enables a highly useful void fill product to be created in a manner that was wholly impossible with the background art.

In some of the preferred embodiments, of the invention, a void fill dispensing system and method is provided that can—highly advantageously—create a viable void fill product from expandable slit sheet paper despite the fact that such was previously not feasible or was impossible with the background art.

In some embodiments, the present inventor discovered a means to create such novel and unique systems and methods by identifying the following:
  a) The present inventor identified that prior expandable slit sheet paper had properties that prevented the ability to create viable void fill product, including that prior expandable slit sheet paper a) required too great of a force to expand the paper and b) was not sufficiently strong enough to avoid tearing;
  b) The present inventor identified that the existing slit sheet expansion devices were not capable of creating an expanded slit sheet paper that resists retraction upon expansion, without requiring a <u>second</u> further step of wrapping the expanded slit sheet paper or otherwise retaining the expanded slit sheet paper in an expanded state;
  c) The present inventor identified that a resistance has to be applied to the drawing of the expandable slit sheet paper and that the box or dispenser within which the slit paper is contained has to be provided with a novel mechanism to apply the required resistance.

Accordingly, in some embodiments of the present invention, one main object of the present invention is to overcome the shortcomings of the background art identified by the inventor.

In accordance with one illustrative embodiment of the invention, a novel shipping box is used in a unique manner to dispense expanded slit sheet material as a void fill made completely of paper, allowing for it to be completely recycled when the expanded slit sheet material has been fully dispensed. In accordance with another illustrative embodiment of the invention, a novel metal device is used in a unique manner to dispense rolls of expanded slit sheet material for void fill applications of, e.g., continuous use. In accordance with another illustrative embodiment of the invention, a highly unique automated metal device provided that dispense rolls of expanded slit sheet material for, e.g., high speed use. In another illustrative embodiment of the invention, a dual purpose container is provided for shipping the rolls of slit paper and for center dispensing and expanding slit sheet paper.

In some preferred embodiments, a novel void fill dispensing system is provided that includes both a) a novel extensible slit sheet paper and b) a novel dispenser mechanism. In the preferred embodiments, the novel dispenser mechanism is specially configured to provide a sufficient amount of resistance to enable expansion of the novel extensible slit sheet paper, but, at the same time, avoiding pre-mature tearing of the novel extensible slit sheet paper.

Additionally, in the preferred embodiments, the novel dispenser mechanism is also specially configured to cause the expandable slit sheet paper to have surfaces of the expanded cells contact one another during the expansion process, shortly after expansion, and/or shortly before expansion such that when the novel dispenser mechanism expands the novel extensible slit sheet paper, the expanded sheet has a tendency to inhibit retraction of the expanded sheet. For example, the expanded sheet is preferably expanded in a state such that adjacent expanded cells a caused to contact one another and interlock at least to some degree so as to resist retraction of the expandable slit sheet product.

According to some preferred embodiments, a novel dispenser mechanism includes a support for a roll of expandable slit sheet material (preferably, a roll of extensible slit sheet material), and a specially designed restricting orifice that is configured to receive expandable slit sheet paper that is laterally pulled from a center of the roll of expandable slit sheet material.

The use of a hexagonal cell forming slit pattern in such a center pull system would have been expected to fail or at least produce low cushioning because expanded hexagonal cells have an inherent tendency to retract/un-expand. Furthermore, it would have been expected that pulling a slit sheet paper in this manner would not be viable because the expansion forces required would be too great, especially in relation to the low tear strength of existing expandable slit sheet papers. Additionally, as expandable slit sheet papers had only previously been expanded in a flat state to enable uniform opening of cells, it would not have been appreciated that a center pull system could be used to expand a special extensible paper type expandable slit sheet paper. However, the present inventor has discovered that by employing a novel extensible slit sheet paper, it is possible to expand extensible slit sheet paper with a center pull mechanism by having a specialized outlet in a manner to create adjacently contacting opened cells (e.g., an expanded sheet with expanded hexagonal cells) that contact one another in a manner to substantially inhibit or to be even free of retraction, advantageously retaining its expanded state and cushioning properties.

While this disclosure is not limited by proposed theories, the present inventor has found that by establishing a center pull mechanism, when employing an extensible slit sheet paper, and when employing a specially configured outlet that a) provides sufficient resistance to enable expansion, b) avoids premature tearing or "catching" of the cells of the paper, c) enables the paper to flow or move through the specially configured outlet in a manner that the expanded slit sheet paper freely twists and/or folds during expansion enables the creation of highly useful and advantageous expanded slit sheet paper void fill (e.g., directly or immediately after expansion) without requiring secondary steps such as, e.g., rolling or wrapping of the expanded sleet sheet paper. The present inventor theorizes that his unique system advantageously enables the paper to twist and/or to fold in a manner that causes the expanded cell to retain or substantially its expanded state without significant retraction. Thus, while one of ordinary skill in the art would expect that expanded hexagonal cell forming slit sheet material would retract and fail to provide adequate cushioning, it has now been found that the inventor's novel process of center pulling hexagonal cell forming slit sheet material can cause the expanded cells to remain expanded.

Although embodiments of the present invention could be implemented without the use of extensible slit sheet paper, the present inventor has also discovered that due to the unfavorable properties of expandable slit sheet papers that are not extensible, systems that do not employ extensible slit sheet paper would be substantially less viable.

In some of the preferred embodiments of the present invention, the present invention can include one or more of the following illustrative aspects (i.e., aspects 1-174 below).

1. A dispenser for void fill material, comprising:
   a roll of expandable slit sheet material;
   a support for holding the roll of expandable slit sheet material;
   an outlet arranged proximate the roll of expandable slit sheet material and arranged such that an end of the roll extends through said outlet, said outlet having a maximum cross dimension that is substantially smaller than the width of the expandable slit sheet paper and being configured to provide frictional resistance to the roll such as to cause the roll of expandable slit sheet material to expand into an expanded state with open cells.

2. The dispenser of aspect 1, wherein said outlet is arranged to receive said slit sheet material from a center of the roll of expandable slit sheet material.

3. The dispenser of any of the preceding aspects, wherein said outlet is aligned with a center axis of said roll of expandable slit sheet material.

4. The dispenser of any of the preceding aspects, wherein said outlet is laterally positioned adjacent a lateral side of the roll to receive said slit sheet material from a center of the roll of expandable slit sheet material.

5. The dispenser of aspect 1, wherein said support is made of recyclable corrugated, cardboard or paper.

6. The dispenser of aspect 1, wherein said outlet is formed within a corrugated or cardboard panel made of recyclable paper whereby edges of said corrugated or cardboard form a perimeter edge of said outlet such as to provide frictional resistance to the roll such as to cause the roll of expandable slit sheet material to expand into the expanded state.

7. The dispenser of aspect 1 or any of the preceding aspects, wherein the outlet is configured such that said expandable slit sheet material passes through the outlet in a non-planar state across a width of the expandable slit sheet paper.

8. The dispenser of aspect 1 or any of the preceding aspects, wherein the outlet is configured such that said expandable slit sheet material passes through the outlet in a non-planar irregular pattern across a width of the expandable slit sheet paper.

9. The dispenser of aspect 1 or any of the preceding aspects, wherein the dispenser is configured such that said expandable slit sheet material passes through the outlet in a non-planar irregular pattern, which non-planar irregular pattern changes over time, across a width of the expandable slit sheet paper.

10. The dispenser of aspect 1 or any of the preceding aspects, wherein said support is a cardboard box.

11. The dispenser of aspect 10 or any of the preceding aspects, wherein said outlet is an opening formed within at least one panel of a cardboard box.

12. The dispenser of aspect 11 or any of the preceding aspects, wherein said box includes at least one panel that is adjustable to contact a perimeter side of the roll of expandable slit sheet material.

13. The dispenser of aspect 11 or any of the preceding aspects, wherein said outlet is within a movable cover panel.

14. The dispenser of aspect 1 or any of the preceding aspects, wherein said roll of expandable slit sheet material has a hollow center region, and wherein said dispenser includes a removable core that is locatable within the hollow center region during shipping or transport of the dispenser with the roll of expandable slit sheet material.

15. The dispenser of aspect 1, wherein said support is made of a rigid material.

16. The dispenser of aspect 15 or any of the preceding aspects, wherein said support is made of metal.

17. The dispenser of any of the preceding aspects, wherein the outlet includes a donut member fixed within a plate or panel.

18. The dispenser of aspect 17, wherein the donut member is made with plastic.

19. The dispenser of aspect 17, wherein the donut member is made with plastic and the support is made with metal.

20. The dispenser of any of the preceding aspects, wherein the dispenser is configured for manual operation with a user manually pulling the expandable slit sheet material through the outlet.

21. The dispenser of any of the preceding aspects, wherein the dispenser is configured for automated operation and includes a plurality of rollers configured to move the expandable slit sheet material through said outlet.

22. The dispenser according to aspect 21 or any of the preceding aspects, wherein the plurality of rollers include at least one roller pair downstream of the outlet having mechanical elements that grip the slits of the expandable slit sheet paper.

23. The dispenser of aspect 22, wherein said mechanical elements include hooks.

24. The dispenser of aspect 23, wherein said hooks are semi-flexible hooks made of plastic.

25. The dispenser of aspect 1 or any of the preceding aspects, wherein said dispenser is configured to cause the expandable slit sheet paper to twist, rotate or move around an axis extending through the outlet.

26. The dispenser of aspect 1 or any of the preceding aspects, wherein said dispenser is configured to direct said expandable slit sheet paper through the outlet by directing an end of the expandable slit sheet paper that is at an interior of the roll of slit sheet paper laterally from a hollow center of the roll of expandable slit sheet paper and then through said outlet.

27. The dispenser of aspect 1 or any of the preceding aspects, further including:
   said outlet being configured to impart frictional resistance to said expandable slit sheet material while manually or automatically drawing the expandable slit sheet material downstream of the outlet such as to cause the expandable slit sheet material to expand into said open cells.

28. The dispenser according to any of the preceding aspects, wherein:

the outlet has a configuration that allows for the expandable slit sheet paper to flow therethrough without premature tearing and yet to expand into said open cells.

29. The dispenser according to any of the preceding aspects, wherein:
the outlet has a configuration that includes an arc that extends around at least ⅓ of the perimeter of the outlet.

30. The dispenser according to any of the preceding aspects, wherein:
the outlet has a configuration that includes an arc that extends around at least ⅓ of the perimeter of the outlet, which arc extends around an axis within an interior of the outlet.

31. The dispenser according to any of the preceding aspects, wherein:
the outlet has a configuration that includes an arc that extends around at least ½ of the perimeter of the outlet.

32. The dispenser according to any of the preceding aspects, wherein:
the outlet has a configuration that includes an arc that extends around at least ⅗ of the perimeter of the outlet.

33. The dispenser according to any of the preceding aspects, wherein:
the outlet has a configuration in the shape of a semi-circle or half-circle or partial-circle.

34. The dispenser according to aspect 33 or any of the preceding aspects, wherein said semi-circle or half-circle or partial-circle includes substantially straight edge adjacent a partially circular portion.

35. The dispenser according to aspect 33 or any of the preceding aspects, wherein said semi-circle or half-circle or partial-circle includes a peripheral arc that is not an exact circular shape with a constant radius of curvature.

36. The dispenser according to any of the preceding aspects, wherein the outlet has a configuration that is substantially D-shape.

37. The dispenser according to any of the preceding aspects, wherein the outlet has a configuration that is substantial crescent shaped.

38. The dispenser according to any of the preceding aspects, wherein the outlet has a configuration that is substantially lune shaped.

39. The dispenser according to any of the preceding aspects, wherein the outlet has an arcuate perimeter region around a portion of the outlet that allows the expandable slit sheet material to be moved around an axis of the outlet such as to slide along the arcuate perimeter region with components of sliding movement both parallel to said axis of the outlet and tangential to said axis of the outlet and around the arcuate perimeter region.

40. The dispenser according to any of the preceding aspects, wherein:
the outlet has a configuration that includes an arc that extends around at least ⅓ of the perimeter of the outlet, which arc extends around an axis within an interior of the outlet.

41. The dispenser according to any of the preceding aspects, wherein:
the outlet has a configuration a friction imparting region that applies friction to said expandable slit sheet material by causing the expandable slit sheet material passing through the outlet to compress in a direction tangential to an axis of the outlet.

42. The dispenser according to aspect 41 or any of the preceding aspects, wherein said friction imparting region causes regions of said expandable slit sheet paper along a transverse direction to the direction of expansion of the expandable slit sheet paper to contact and press against one another.

43. The dispenser according to any of the preceding aspects, wherein said outlet is adjustable.

44. The dispenser according to any of the preceding aspects, wherein said outlet includes at least a portion that is movable such as to adjust the size or shape of the outlet.

45. The dispenser according to any of the preceding aspects, wherein said outlet includes a reciprocating, articulating, sliding, or pivoting member that is adapted to be secured at a plurality of positions in order to adjust the size or shape of the outlet.

46. The dispenser according to any of the preceding aspects, wherein said outlet has a maximum dimension across said outlet of less than 4 inches.

47. The dispenser according to any of the preceding aspects, wherein said outlet has a maximum dimension across said outlet of less than 3 inches.

48. The dispenser according to any of the preceding aspects, wherein said outlet has a maximum dimension across said outlet of less than 2.75 inches.

49. The dispenser according to any of the preceding aspects, wherein said outlet has a maximum dimension across said outlet of less than 2.5 inches.

50. The dispenser according to any of the preceding aspects, wherein said outlet has a maximum dimension across said outlet of between 2 to 3 inches, or wherein said outlet has a maximum dimension across said outlet of between 2.25 and 2.75 inches, or wherein said outlet has a maximum dimension across said outlet of between 2.3 and 2.6 inches.

51. The dispenser according to any of the preceding aspects, wherein said expandable slit sheet paper is made of an extensible paper.

52. The dispenser according to any of the preceding aspects, wherein said expandable slit sheet paper is made of an extensible paper that is extensible in a machine direction in a range of at least 3%.

53. The dispenser according to any of the preceding aspects, wherein said expandable slit sheet paper is made of an extensible paper that is extensible in a cross direction in a range of at least 3%.

54. The dispenser according to any of the preceding aspects, wherein said expandable slit sheet paper is made of an extensible paper that is extensible in a machine direction in a range of at least 4%.

55. The dispenser according to any of the preceding aspects, wherein said expandable slit sheet paper is made of an extensible paper that is extensible in a cross direction in a range of at least 4%.

56. The dispenser according to any of the preceding aspects, wherein said expandable slit sheet paper is made of an extensible paper that is extensible in a machine direction in a range of at least 5%.

57. The dispenser according to any of the preceding aspects, wherein said expandable slit sheet paper is made of an extensible paper that is extensible in a cross direction in a range of at least 5%.

58. The dispenser according to any of the preceding aspects, wherein said expandable slit sheet paper is made of an extensible paper that is extensible in a machine direction in a range of at least 5% and in a cross direction in a range of at least 5%.

59. The dispenser according to any of the preceding aspects, wherein said expandable slit sheet paper is made of an extensible paper that is extensible in a machine direction in a range of at least 6% and in a cross direction in a range of at least 6%.

60. The dispenser according to any of the preceding aspects, wherein said expandable slit sheet paper is made of an extensible paper that is extensible in a machine direction in a range of at least 7% and in a cross direction in a range of at least 7%.

61. The dispenser according to any of the preceding aspects, wherein said expandable slit sheet paper is made of an extensible paper that is extensible in a machine direction in a range of between 5% to 15% and in a cross direction in a range of between 5% to 15%.

62. The dispenser according to any of the preceding aspects, wherein the plurality of slits each have a width of between 0.35 and 0.65 inches.

63. The dispenser according to any of the preceding aspects, wherein the plurality of slits each have a width of between 0.45 and 0.55 inches.

64. The dispenser according to any of the preceding aspects, wherein the plurality of slits each have a width of about 0.5 inches.

65. The dispenser according to any of the preceding aspects, wherein:
said expandable slit sheet paper is configured that a flat sheet of such expandable slit sheet paper can be expanded from an unexpanded state to a completely expanded state by applying a force of less than 0.4 pounds per inch throughout the entire expansion.

66. The dispenser according to any of the preceding aspects, wherein:
said expandable slit sheet paper is configured that a flat sheet of such expandable slit sheet paper can be expanded from an unexpanded state to a completely expanded state by applying a force of less than 0.3 pounds per inch throughout the entire expansion.

67. The dispenser according to any of the preceding aspects, wherein:
said expandable slit sheet paper is configured that a flat sheet of such expandable slit sheet paper can be expanded from an unexpanded state to a completely expanded state by applying a force of less than 0.25 pounds per inch throughout the entire expansion.

68. The dispenser according to any of the preceding aspects, wherein:
said expandable slit sheet paper is configured that a flat sheet of such expandable slit sheet paper can be expanded from an unexpanded state to a completely expanded state by applying a force of less than 0.22 pounds per inch throughout the entire expansion.

69. A void fill product formed from an expandable slit sheet material, comprising:
an expandable slit sheet material in an expanded state wherein the expanded slit sheet material is spiraled such that regions proximate opposite sides of the expanded slit sheet paper in a direction transverse to the expansion direction of the expanded slit sheet material contact each other in a manner that open cells within said regions interlock and inhibit retraction of the expanded slit sheet material.

70. The void fill product of aspect 69 or any of the preceding aspects, wherein said expandable slit sheet material is a tubular void fill tube having a diameter along at least a portion of its length of between about 2 to 5 inches.

71. The void fill product of aspect 69 or any of the preceding aspects, wherein said expandable slit sheet material is a tubular void fill tube having a diameter along at least a portion of its length of between about 2 to 4 inches.

72. The void fill product of aspect 69 or any of the preceding aspects, wherein said expandable slit sheet material is a tubular void fill tube having a diameter along its length of between about 2 to 5 inches.

73. The void fill product of aspect 69 or any of the preceding aspects, wherein said expandable slit sheet material is a tubular void fill tube having a diameter along length of between about 2 to 4 inches.

74. A method of forming a void fill product, comprising:
providing a sheet of expandable slit sheet paper in an unexpanded state, said sheet of expandable slit sheet paper having a length that is substantially greater than a width across the expandable slit sheet paper;
directing the expandable slit sheet paper through an outlet, said outlet having a maximum cross dimension that is substantially smaller than the width of the expandable slit sheet paper;
expanding the expandable slit sheet paper to an expanded state in which the slits of the expandable slit sheet paper expand into open cells due to friction applied by the outlet and causing regions of the expandable slit sheet paper across a widthwise direction of the expandable slit sheet paper to contact one another during said expanding or shortly after said expanding.

75. The method of aspect 74 or any of the preceding aspects, further comprising:
during directing of the expandable slit sheet paper through the outlet, causing the expandable slit sheet paper to twist, rotate or move around an axis extending through the outlet.

76. The method of aspect 74 or any of the preceding aspects, further including:
said directing of the expandable slit sheet paper through the outlet including directing an end of the expandable slit sheet paper that is at an interior of the roll of slit sheet paper laterally from a hollow center of the roll of expandable slit sheet paper and then through said outlet.

77. The method of aspect 74 or any of the preceding aspects, further including:
imparting frictional resistance to said expandable slit sheet material by the outlet such while manually or automatically drawing the expandable slit sheet material downstream of the outlet such as to cause the expandable slit sheet material to expand into said open cells.

78. The method of aspect 74 or any of the preceding aspects, further including:
providing the outlet with a configuration that allows for the expandable slit sheet paper to flow therethrough without premature tearing yet to expand into said open cells.

79. The method of aspect 74 or any of the preceding aspects, further including:
providing the outlet with a configuration that allows for the expandable slit sheet paper to flow therethrough without premature tearing yet to expand into said open cells while the expandable slit sheet paper is rotated, twisted or moved around an axis extending through the outlet.

80. The method of aspect 74 or any of the preceding aspects, further including:
providing the outlet with a configuration that includes an arc that extends around at least ⅓ of the perimeter of the outlet.

81. The method of aspect 74 or any of the preceding aspects, further including:
providing the outlet with a configuration that includes an arc that extends around at least ⅓ of the perimeter of the outlet, which arc extends around an axis within an interior of the outlet.

82. The method of aspect 74 or any of the preceding aspects, further including:
providing the outlet with a configuration that includes an arc that extends around at least ½ of the perimeter of the outlet.

83. The method of aspect 74 or any of the preceding aspects, further including providing the outlet with a configuration that includes an arc that extends around at least ⅗ of the perimeter of the outlet.

84. The method of aspect 74 or any of the preceding aspects, further including providing the outlet with a configuration in the shape of a semi-circle or half-circle or partial-circle.

85. The method of aspect 74 or any of the preceding aspects, further including providing the outlet with a configuration in the shape of a semi-circle or half-circle or partial-circle, wherein said semi-circle or half-circle or partial-circle includes substantially straight edge adjacent a partially circular portion.

86. The method of aspect 74 or any of the preceding aspects, further including providing the outlet with a configuration in the shape of a semi-circle or half-circle or partial-circle, wherein said semi-circle or half-circle or partial-circle includes a peripheral arc that is not an exact circular shape with a constant radius of curvature.

87. The method of aspect 74 or any of the preceding aspects, further including providing the outlet with a configuration that is substantially D-shape.

88. The method of aspect 74 or any of the preceding aspects, further including providing the outlet with a configuration that is substantial crescent shaped.

89. The method of aspect 74 or any of the preceding aspects, further including providing the outlet with a configuration that is substantially lune shaped.

90. The method of aspect 74 or any of the preceding aspects, further including providing the outlet with an arcuate perimeter region around a portion of the outlet that allows the expandable slit sheet material to be moved around an axis of the outlet such as to slide along the arcuate perimeter region with components of sliding movement both parallel to said axis of the outlet and tangential to said axis of the outlet and around the arcuate perimeter region.

91. The method of aspect 74 or any of the preceding aspects, further including:
providing the outlet with a configuration that includes an arc that extends around at least ⅓ of the perimeter of the outlet, which arc extends around an axis within an interior of the outlet.

92. The method of aspect 74 or any of the preceding aspects, further including providing the outlet with a friction imparting region that applies friction to said expandable slit sheet material by causing the expandable slit sheet material passing through the outlet to compress in a direction tangential to an axis of the outlet.

93. The method of aspect 74 or any of the preceding aspects, further including providing the outlet with a friction imparting region that applies friction to said expandable slit sheet material by causing the expandable slit sheet material passing through the outlet to compress in a direction tangential to an axis of the outlet, wherein said friction imparting region causes regions of said expandable slit sheet paper along a transverse direction to the direction of expansion of the expandable slit sheet paper to contact and press against one another.

94. The method of aspect 74 or any of the preceding aspects, wherein said outlet is adjustable.

95. The method of aspect 74 or any of the preceding aspects, wherein said outlet includes at least a portion that is movable such as to adjust the size or shape of the outlet.

96. The method of aspect 74 or any of the preceding aspects, wherein said outlet includes a reciprocating, articulating, sliding, or pivoting member that is adapted to be secured at a plurality of positions in order to adjust the size or shape of the outlet.

97. The method of aspect 74 or any of the preceding aspects, wherein said outlet has a maximum dimension across said outlet of less than 4 inches.

98. The method of aspect 74 or any of the preceding aspects, wherein said outlet has a maximum dimension across said outlet of less than 3 inches.

99. The method of aspect 74 or any of the preceding aspects, wherein said outlet has a maximum dimension across said outlet of less than 2.75 inches.

100. The method of aspect 74 or any of the preceding aspects, wherein said outlet has a maximum dimension across said outlet of less than 2.5 inches.

101. The method of aspect 74 or any of the preceding aspects, wherein said outlet has a maximum dimension across said outlet of between 2 to 3 inches.

102. The method of aspect 74 or any of the preceding aspects, wherein said outlet has a maximum dimension across said outlet of between 2.25 and 2.75 inches.

103. The method of aspect 74 or any of the preceding aspects, wherein said outlet has a maximum dimension across said outlet of between 2.3 and 2.6 inches.

104. The method of aspect 74 or any of the preceding aspects, wherein said expandable slit sheet paper is made of an extensible paper.

105. The method of aspect 74 or any of the preceding aspects, wherein said expandable slit sheet paper is made of an extensible paper that is extensible in a machine direction in a range of at least 3%.

106. The method of aspect 74 or any of the preceding aspects, wherein said expandable slit sheet paper is made of an extensible paper that is extensible in a cross direction in a range of at least 3%.

107. The method of aspect 74 or any of the preceding aspects, wherein said expandable slit sheet paper is made of an extensible paper that is extensible in a machine direction in a range of at least 4%.

108. The method of aspect 74 or any of the preceding aspects, wherein said expandable slit sheet paper is made of an extensible paper that is extensible in a cross direction in a range of at least 4%.

109. The method of aspect 74 or any of the preceding aspects, wherein said expandable slit sheet paper is made of an extensible paper that is extensible in a machine direction in a range of at least 5%.

110. The method of aspect 74 or any of the preceding aspects, wherein said expandable slit sheet paper is made of an extensible paper that is extensible in a cross direction in a range of at least 5%.

111. The method of aspect 74 or any of the preceding aspects, wherein said expandable slit sheet paper is made of an extensible paper that is extensible in a machine direction in a range of at least 5% and in a cross direction in a range of at least 5%.

112. The method of aspect 74 or any of the preceding aspects, wherein said expandable slit sheet paper is made of an extensible paper that is extensible in a machine direction in a range of at least 6% and in a cross direction in a range of at least 6%.

113. The method of aspect 74 or any of the preceding aspects, wherein said expandable slit sheet paper is made of an extensible paper that is extensible in a machine direction in a range of at least 7% and in a cross direction in a range of at least 7%.

114. The method of aspect 74 or any of the preceding aspects, wherein said expandable slit sheet paper is made of an extensible paper that is extensible in a machine direction in a range of between 5% to 15% and in a cross direction in a range of between 5% to 15%.

115. The method of aspect 74 or any of the preceding aspects, wherein the plurality of slits each have a width of between 0.35 and 0.65 inches.

116. The method of aspect 74 or any of the preceding aspects, wherein the plurality of slits each have a width of between 0.45 and 0.55 inches.

117. The method of aspect 74 or any of the preceding aspects, wherein the plurality of slits each have a width of about 0.5 inches.

118. The method of aspect 74 or any of the preceding aspects, wherein:
said expandable slit sheet paper is configured that a flat sheet of such expandable slit sheet paper can be expanded from an unexpanded state to a completely expanded state by applying a force of less than 0.4 pounds per inch throughout the entire expansion.

119. The method of aspect 74 or any of the preceding aspects, wherein:
said expandable slit sheet paper is configured that a flat sheet of such expandable slit sheet paper can be expanded from an unexpanded state to a completely expanded state by applying a force of less than 0.3 pounds per inch throughout the entire expansion.

120. The method of aspect 74 or any of the preceding aspects, wherein:
said expandable slit sheet paper is configured that a flat sheet of such expandable slit sheet paper can be expanded from an unexpanded state to a completely expanded state by applying a force of less than 0.25 pounds per inch throughout the entire expansion.

121. The method of aspect 74 or any of the preceding aspects, wherein:
said expandable slit sheet paper is configured that a flat sheet of such expandable slit sheet paper can be expanded from an unexpanded state to a completely expanded state by applying a force of less than 0.22 pounds per inch throughout the entire expansion.

122. A dispenser for expandable slit sheet material, comprising:
a coreless roll of expandable slit sheet material;
a box or housing container, said coreless roll being supported by said container;
said container having an exit opening aligned with a center axis of said roll, whereby expandable slit sheet material is removed laterally from an interior of said roll and through said exit opening.

123. The dispenser of aspect 122, further including:
a restriction member partially closing said exit opening and movably mounted on said container between a first position in which said restriction member does not close said exit opening and a second position in which said restrictor member partially or at least partially closes said exit opening.

124. The dispenser of aspect 122 or any of the preceding aspects, wherein said exit opening is closed to form a non-circular opening and is configured to cause the expandable slit sheet paper to expand when pulled through the exit opening.

125. The dispenser of aspect 122 or any of the preceding aspects, wherein said dispenser dispenses void fill material.

126. The dispenser of aspect 122 or any of the preceding aspects, wherein said roll of expandable slit sheet material comprises extensible slit sheet material.

127. The dispenser of aspect 122 or any of the preceding aspects, wherein said exit opening forms a lune shape opening.

128. The dispenser of aspect 127 or any of the preceding aspects, wherein said lune shape is a crescent.

129. The dispenser of aspect 128 or any of the preceding aspects, wherein said crescent has rounded horns.

130. The dispenser of aspect 127 or any of the preceding aspects, wherein said lune shape is a semi-circle.

131. The dispenser of aspect 127 or any of the preceding aspects, wherein said lune shape is in the form of the letter "D".

132. The dispenser of aspect 127 or any of the preceding aspects, wherein said lune shape is an arch.

133. The dispenser of aspect 127 or any of the preceding aspects, wherein said lune shape is an opening whose area is less than that of a full circle.

134. The dispenser of aspect 122 or any of the preceding aspects, wherein a portion of the periphery of said opening is in the form of an arc or semi-circle which, in combination with the remainder of the periphery of the opening, produces an opening that is less than that of a full center and served to facilitate the expansion of the slit paper.

135. The dispenser of aspect 134 or any of the preceding aspects, wherein the remainder of the periphery of said opening is a curved section having a length in the range from 10% to 50% of the length of the semi-circular section.

136. The dispenser of aspect 122 or any of the preceding aspects, wherein said opening is a semi-circular section is in the form of the shape of a crescent, said crescent tapering to rounded edges at its ends.

137. The dispenser of aspect 122 or any of the preceding aspects, wherein said opening is in the form of an archway.

138. The dispenser of aspect 137 or any of the preceding aspects, wherein said archway is in the form of a semi-circle, wherein said semi-circle is in the range from plus/minus 25% of a semi-circle.

139. The dispenser of aspect 137 or any of the preceding aspects, wherein said archway is in the form of a semi-circle, wherein said semi-circle is in the range from plus/minus 15% of a semi-circle.

140. The dispenser of aspect 137 or any of the preceding aspects, wherein said archway is in the form of a semi-circle, wherein said semi-circle is in the range from plus/minus 5% of a semi-circle.

141. The dispenser of aspect 137 or any of the preceding aspects, wherein said archway is in the form of a half of circle, plus/minus 25%.

142. The dispenser of aspect 123 or any of the preceding aspects, wherein said partially closed exit opening has a concave-convex figuration formed by the intersection of the arcs of two circles on a plane.

143. The dispenser of aspect 123 or any of the preceding aspects, wherein said partially closed exit opening is in the shape of a lune, said lune being in the form of a circular disk with a portion of another disk removed from it, so that what remains is a shape enclosed by two circular arcs which intersect at two points.

144. A method, comprising:
   a) shipping the dispenser for expandable slit sheet material of aspect 122, with a core placed in and located within the center of the roll,
   b) prior to dispensing expandable slit sheet material from said exit opening, removing the core from the box or housing.

145. The method of aspect 144, further including:
dispensing expandable slit sheet material is removable from an interior of said roll and laterally through said exit opening.

146. The method of aspect 144 or any of the preceding aspects, further comprising:
providing a restriction member partially closing said exit opening and movably mounted on said container between a first position in which said restrictor member does not close said exit opening and a second position in which said restrictor member partially closes said exit opening.

147. The method of aspect 144 or any of the preceding aspects, wherein said expandable slit sheet material is paper.

148. The method of aspect 144 or any of the preceding aspects, wherein said expandable slit sheet material comprises extensible paper.

149. The method of aspect 144 or any of the preceding aspects, wherein said exit opening forms a non-circular opening and is configured to cause the expandable slit sheet paper to expand when pulled through the exit opening.

150. The method of aspects 144 or any of the preceding aspects, wherein said dispenser dispenses void fill material and comprising the step of inserting said void fill material in a shipping container.

151. The method of aspect 144 or any of the preceding aspects, wherein said roll of expandable slit sheet material comprises extensible slit sheet paper.

152. The method of aspect 144 or any of the preceding aspects, further including a restriction member that is movable to a position partially closing said exit opening and forming a lune shape opening.

153. The method of aspect 152 or any of the preceding aspects, wherein said lune shape is a crescent.

154. The method of aspect 153 or any of the preceding aspects, wherein said crescent has rounded horns.

155. The method of aspect 152 or any of the preceding aspects, wherein said lune shape is a semi-circle.

156. The method of aspect 152 or any of the preceding aspects, wherein said lune shape is in the form of the letter "D".

157. The method of aspect 152 or any of the preceding aspects, wherein said lune shape is an arch.

158. The method of aspect 152 or any of the preceding aspects, wherein said lune shape is an opening whose area is less than that of a full circle.

159. The method of aspect 144 or any of the preceding aspects, wherein a portion of the periphery of said opening is in the form of an arc or semi-circle which, in combination with the remainder of the periphery of the opening, produces an opening that is less than that of a full center and served to facilitate the expansion of the slit paper.

160. The method of aspect 159 or any of the preceding aspects, wherein the remainder of the periphery of said opening is a curved section having a length in the range from 10% to 50% of the length of the semi-circular section.

161. The method of aspect 144 or any of the preceding aspects, wherein said opening is a semi-circular section is in the form of the shape of a crescent, said crescent tapering to rounded edges at its ends.

162. The method of aspect 144 or any of the preceding aspects, wherein said opening is in the form of an archway.

163. The method of aspect 162 or any of the preceding aspects, wherein said archway is in the form of a semi-circle, and wherein said semi-circle is in the range from plus/minus 25% of a semi-circle.

164. The method of aspect 162, wherein said archway is in the form of a semi-circle, wherein said semi-circle is in the range from plus/minus 15% of a semi-circle.

165. The method of aspect 162, wherein said archway is in the form of a semi-circle, wherein said semi-circle is in the range from plus/minus 5% of a semi-circle.

166. The method of aspect 162, wherein said archway is in the form of a half of circle, plus/minus 25%.

167. The method of aspect 152, wherein said partially closed exit opening has a concave-convex figuration formed by the intersection of the arcs of two circles on a plane.

168. The method of aspect 152, wherein said partially closed exit opening is in the shape of a lune, said lune being characterized as being in the form of a circular disk with a portion of another disk removed from it, so that what remains is a shape enclosed by two circular arcs which intersect at two points.

169. A dispenser for expandable slit sheet material, comprising:
   a) a roll of expandable slit sheet material;
   b) a container or support supporting said roll, said container or support having an exit opening proximate a longitudinal end of said roll, whereby expandable slit sheet material is removable from a longitudinal end of the roll and through said exit opening; and
   c) said exit opening being configured such as to provide frictional resistance to the roll such as to cause the roll of expandable slit sheet material to expand into an expanded state with open cells.

170. A method of shipping and dispensing a void fill product, comprising:
   a) inserting a roll of expandable slit sheet paper material wound on a removable core into a box, said roll being supported by said box;
   b) said box having at least a first and a second flap at one end of the box, said first and second flap closing said one end of the box for shipping;
   c) said core member being located within the center of the roll;
   d) prior to dispensing expandable slit sheet material from said exit opening, opening said first and said second flap and removing the core from the box;
   e) said box having an exit opening in at least one of said first and said second flap, said exit opening being aligned with a center axis of said roll, whereby expandable slit sheet material is removable from an interior of said roll and through said exit opening; and
   f) withdrawing expandable slit sheet material through said exit opening and expanding said expandable slit sheet material.

171. The method of aspect 170, further comprising:
said box being formed of corrugated paper, causing said opening to imparting frictional resistance to said expandable slit sheet material by the outlet such while manually or automatically drawing the expandable slit sheet material downstream of the outlet such as to cause the expandable slit sheet material to expand into said open cells.

172. The method of aspect 170 or 171, further comprising: said opening has a concave-convex figuration formed by the intersection of the arcs of two circles on a plane.

173. The method of aspect 172, wherein said concave-convex configuration is rounded at the intersection of the arcs of two circles.

174. The method of aspect 170, 171, 172, or 173 further comprising third flap that has an exit opening that is in line with the exit opening of said first or second flap when said flaps are closed thereby providing at least a pair of inline exit openings whereby said at least a pair of said inline exit openings impart frictional resistance to said expandable slit sheet material as the expandable slit sheet material is drawn downstream of the outlet such as to cause the expandable slit sheet material to expand into said open cells.

Expanded Slit Sheet Paper Art Incorporated by Reference

Further information relating to illustrative expandable slit sheet paper that can be employed in various embodiments of the present invention, slit patterns, and the expansion process by which such expandable slit sheet paper is expanded is found in U.S. Pat. Nos. a) 5,538,778, b) 5,667,871, c) 5,688,578, d) 5,782,735, e) 3,908,071, f) 3,104,197, g) 3,220,116, h) 3,266,972, i) 3,269,393, j) 3,908,071, k) 6,024,832, l) 6,458,447 and m) 6,712,930, and in U.S. application Ser. No. 14/901,977, and in PCT application No. WO1984002936A1, and in U.S. Published Patent Application Nos. US 2002/0060034, US 2007/0240841, and the disclosures of which are all incorporated by reference herein in their entireties, as though recited in full herein.

In the preferred embodiments, the terminology "expandable" as applied to paper sheets, means a paper having a slit pattern that enables expansion of the paper, such as, e.g., as disclosed in U.S. Pat. Nos. (a) 5,538,778, (b) 5,667,871, (c) 5,688,578, (d) 5,782,735 and (e) 10,226,907, and in PCT Application No. PCT/US2014/054615, the entire disclosures of which patents and PCT application are all incorporated by reference herein as though recited in full. In the preferred embodiments, a slit pattern is configured to enable the paper to be expanded lengthwise, with a related decrease in width. In some embodiments, the slit pattern produces a paper that increases in length due to the slit pattern when processed in an expander, such as, e.g., an expander of the type described in any of the following U.S. and PCT applications (a) 2017/0203866, (b) 2018/022266, (c) 2018/0127197, and (d) PCT/US2014/054615, incorporated herein by reference in their entireties.

U.S. Pat. Nos. 5,667,871 and 5,688,578, slit Sheet Packing Material, teach the use of a plurality of individual slits forming parallel spaced rows forming a hexagonal expanded sheet with and without a separator sheet. It requires machinery to stretch the paper into its three-dimensional shape at the customer's location such as disclosed in U.S. Pat. No. 5,538,778 which teaches the method and apparatus for producing the expansion of the slit sheet material performed at the packing site's location. U.S. Pat. No. 5,782,735 discloses an expander for expanding the slit sheet material of U.S. Pat. Nos. 5,667,871 and 5,688,578.

For reference, FIGS. 3(A) and 3(B) correspond to FIGS. 1 and 3 of U.S. Pat. No. 5,667,871 (the '871 patent). These figures describe existing "slit sheet" expandable paper structure. As explained in the '871 patent:

"The slit paper, indicated generally as 10, is illustrated in FIG. [3(A)] as it would come off the slitting machine. The sheets can be formed on a flat-bed slitter and produced directly as rectangular sheets, as well as on a rotary slitter and cut into individual sheets or stored directly as a continuous sheet in roll form. The flexible sheet 10 is preferably manufactured from exclusively recycled paper with the grain of the paper running in the direction of arrow A. The flexible sheet 10 is provided with slits 14 and slits 16 are parallel to the edges 22 and 24 of the flexible sheet 12 and perpendicular to the paper grain. The slits 14 and slits 16 are placed in rows and separated from one another by land 20 and legs 21 [shown in FIG. 3(B)]. The land 20 is a consistent size and provides the support required to prevent the paper from tearing into strips when opened. The cushioning effect is produced by the flexing of the lands and legs under a load. It is therefore necessary that the land 20 be of sufficient size to provide cushioning. The spacing between the rows of slits 14 and slits 16 must also be of sufficient size to prevent the paper from tearing. The offset positioning of the rows of slits 14 and slits 16 gives the paper resiliency when opened and is discussed in detail further hereinafter. The existence of partial slits 14 and 16 at the ends 25 and 18 of the flexible sheet 10 do not hinder the efficiency of the slit paper 10. The flexible sheet 10 when flat; lies in a first plane."

"When expanded, the expanded sheet, indicated generally as 12, is formed of hexagonal cells 26, legs 21 and land 20 areas, as illustrated in FIG. [3(B)]. Preferably, at least a majority of the land 20 areas lie in a plurality of parallel planes. The planes of the land 20 areas form an angle of at least about 45 degrees with the plane of the sheet in flat form."

"The slitting operation in which the slits are cut into the sheet material can take several forms. In one embodiment, rectangular sheets are provide with its total number of slits in one action. The term rectangular should be understood to include rectangles in which all four sides are equal, that is, square. Where the sheet material is subjected to rotary cutting or slitting, the pressure required for the cutting action is significantly lower that which is required for the flat bed cut, since essentially only a single row or a few rows of slits are cut simultaneously. Unlike prior art structures and systems, expansion contemporaneous with slitting is not desirable. Therefore a critical balance must be struck between resistance to opening of the cells during the rewind step and ease of opening of cells during the expansion step. By achieving this critical balance and producing a flat, unexpanded sheet, the sheet material has an effective thickness which is as much as one twentieth of the thickness of a sheet of expanded material. The compact configuration provides for the optimization of shipping and storage."

In the preferred embodiments, the term "slit sheet" means an expandable paper sheet having a slit pattern. The following are direct quotes of U.S. Pat. No. 5,667,871 (the '871 patent).

First, column 10, lines 13-48, of the '871 patent explains:

"The length of the slit and the ratio of the land intervals between slit affects the dimensions of the polygons which are formed during the expansion step. The higher the ratio of slit length to interval length the greater is the maximum angle which can be formed between the plane of the sheet and the planes of the land areas. The greater the uniformity of the shape and size of the formed polygonal shaped open areas and the angle to which the land areas incline relative to the flat sheet, the greater is the degree to which interlocking of land areas can be achieved. Interlocking of land areas, that is, the nesting of layers of sheets, reduces the effective thickness of the sheets. However, the net effect is still a dramatic increase in effective sheet thickness. For example, 0.008 inch thick paper having a silt pattern of a ½"

slit, 3/16" slit spacing, and 1/8" row spacing, produces a 1/4" by 3/16" land which can expand to under about one quarter of an inch thickness and will have a net effective thickness for two layers, when nested, of about 0.375 inches. It is noted that the land width is double the width of the legs. The net effect is a useful thickness expansion of roughly 20 times the unexpanded thickness of the paper."

"The longer the slit relative to the rigidity of the sheet material, the weaker is the interlocking effect and the cushioning effect due to the weakness of the expanded structure. If the slits are too small, expansion can be severely limited and cushioning can be excessively limited. This does not mean that the dimensions are narrowly critical, but rather that the dimension must be selected relative to the characteristics of the paper, as for example the degree of rigidity, and the cushioning or energy absorbing effects which are required. The resistance to expansion increases relative to the increase in the size of the land areas. It should be understood that some resistance to opening is desired. The object rests on, or contacts the edge of the sheet formed by the incline of the land areas which turns the perimeter of the openings into upper and lower edges."

Second, column 10, lines 58-67 and column 11, lines 1-6, of the '871 patent further explains:

"As heretofore mentioned, the slit dimensions can be varied to ease the process of opening. A 5/8" slit, 3/16" land by 3/16 row opens very easily since the number of hexagons is reduced. When the size of the hexagons are increased and the numbers decreased; the stretched thickness was increased, producing a very viable wrap material. This sizing increases the yield of the paper and provides almost the same protection as the 1/2" slit. This sizing provides a less expensive product utilizing a larger content of post consumer waste while maintaining the integrity of the wrap product. The 1/2" slit, 3/16" land by 1/8" row pattern produces a more protective wrap due to the greater number of wraps that can be made within the same volume. Thus, a 2½ pound vase dropped from a thirty inch height, with only 1/2" of cumulative sheet thickness around the vase, can be protected with the 1/2" slit, 1/4 by 3/16 inch land pattern."

Various Embodiments

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 43A-43E are explanatory views representing illustrative manners of causing a tubular void fill tube to overlap such that contact occurs between the opposite ends and/or regions near the opposite ends and/or regions at different locations within the transverse direction of the expanded slit sheet paper;

FIGS. 63 to 66 show another illustrative embodiment which pertains to a non-automated dispenser made of, e.g., recyclable material such as, e.g., cardboard or paper or the like;

FIG. 67 shows another illustrative embodiment which also pertains to a non-automated dispenser made of, e.g., recyclable material such as, e.g., cardboard or paper or the like;

Figure 1:
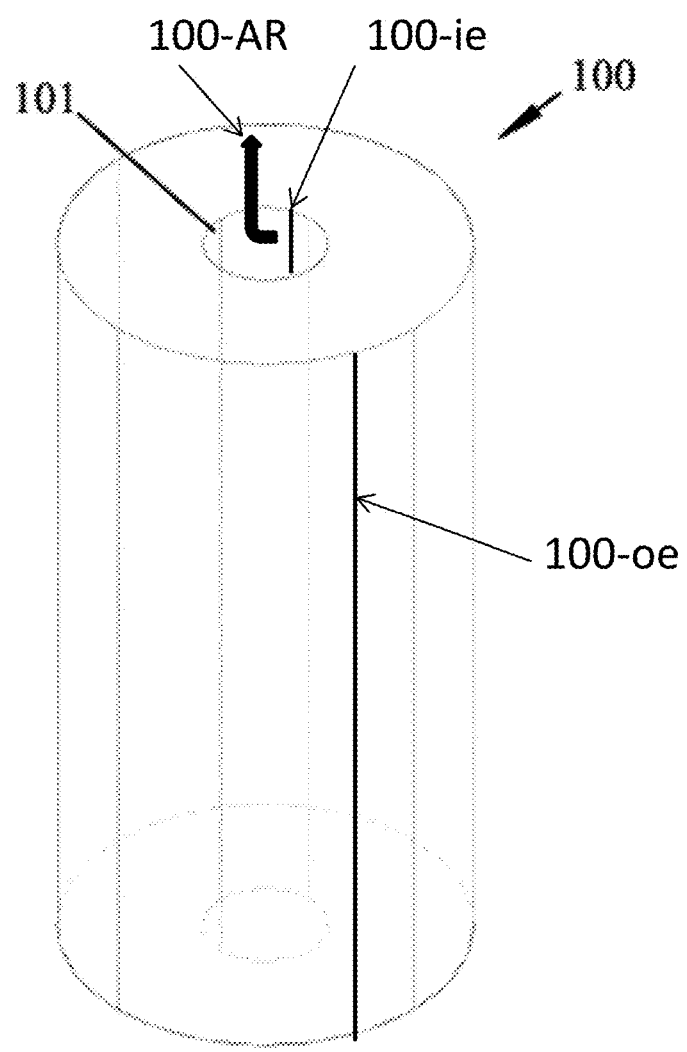
FIG. 1 is a perspective view of roll of unexpanded slit sheet material.

In the attached drawings, some figures are photograph(s) of actual products. Accordingly, these photographs show illustrative examples, to scale, such that such figures show illustrative examples to scale and angles and relative dimensions shown in these figures are as shown in these figures in such illustrative examples. Additionally, other figures also show illustrative embodiments, to scale, such that the figures show illustrative examples to scale and angles and relative dimensions shown in these figures are as shown in these figures in such illustrative examples. Moreover, in some alternative embodiments, all shown angles and relative dimensions can be varied slightly, such as, e.g., plus or minus 15% in some examples, or plus or minus 10% in some other examples.

Definitions

For the purposes of the present invention, the term "dispensing donut" refers to a device having a central opening that is configured to receive expandable slit sheet material. In the preferred embodiments, a dispensing donut is specially configured to control the friction applied to achieve unique expansion while avoiding pre-mature tearing and while facilitating movement of the paper there-through that leads to contact of expanded cells in a manner to inhibit retraction after expansion. In some preferred embodiments, the dispensing donut is made of molded paper, plastic, metal or the like, and has a smooth surface that reduces the friction created from the edges of the dispensing area of the dispenser (such as, e.g., to avoid rough cardboard edges of a dispensing box or sharp cut edges of a metal dispenser). As described herein below, in some preferred embodiments the central opening of the dispensing donut is referred to as a "donut aperture" and is, in some embodiments, adjustable in size.

For the purposes of the present invention, the term "stretching direction" refers to the direction that is transverse to the direction of the slits of the slit sheet material. Typically, this is the machine direction.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments a) Embodiments Described in 62/980,122, 62/976,930 and 62/975,678

The disclosures of non-provisional applications 15,428, 144 (US 2018/0222665) and Ser. No. 16/018,702 (PCT/US2018/039416) are incorporated by reference in their entirety, referenced and recited herein as if in full as part of the description of the present invention.

Patent application Ser. No. 16/018,702 (PCT/US2018/039416) describes a use of extensible paper to greatly reduce the tension required to stretch the slit sheet material. It is intended for the new art shipping box and tensioning device of this application to utilize the extensible paper of the provisional pending application but, not necessarily exclusively.

The instant art of the void fill system is made from a roll of unexpanded slit sheet material as found in the present Goodrich art that dispenses wrapping material. This single roll is placed into a box and oriented such that the dispensing of the expanded slit sheet material is done at the center of the wound roll. In order to stabilize the roll and hold it in position, a dispensing system encapsulates the roll to provide ease of use and an opening to allow the material to exit continuously. The opening is also the area that provides the friction to facilitate expansion of the slit sheet material. The corrugated dispensing box also acts as the shipping box.

Figure 2:
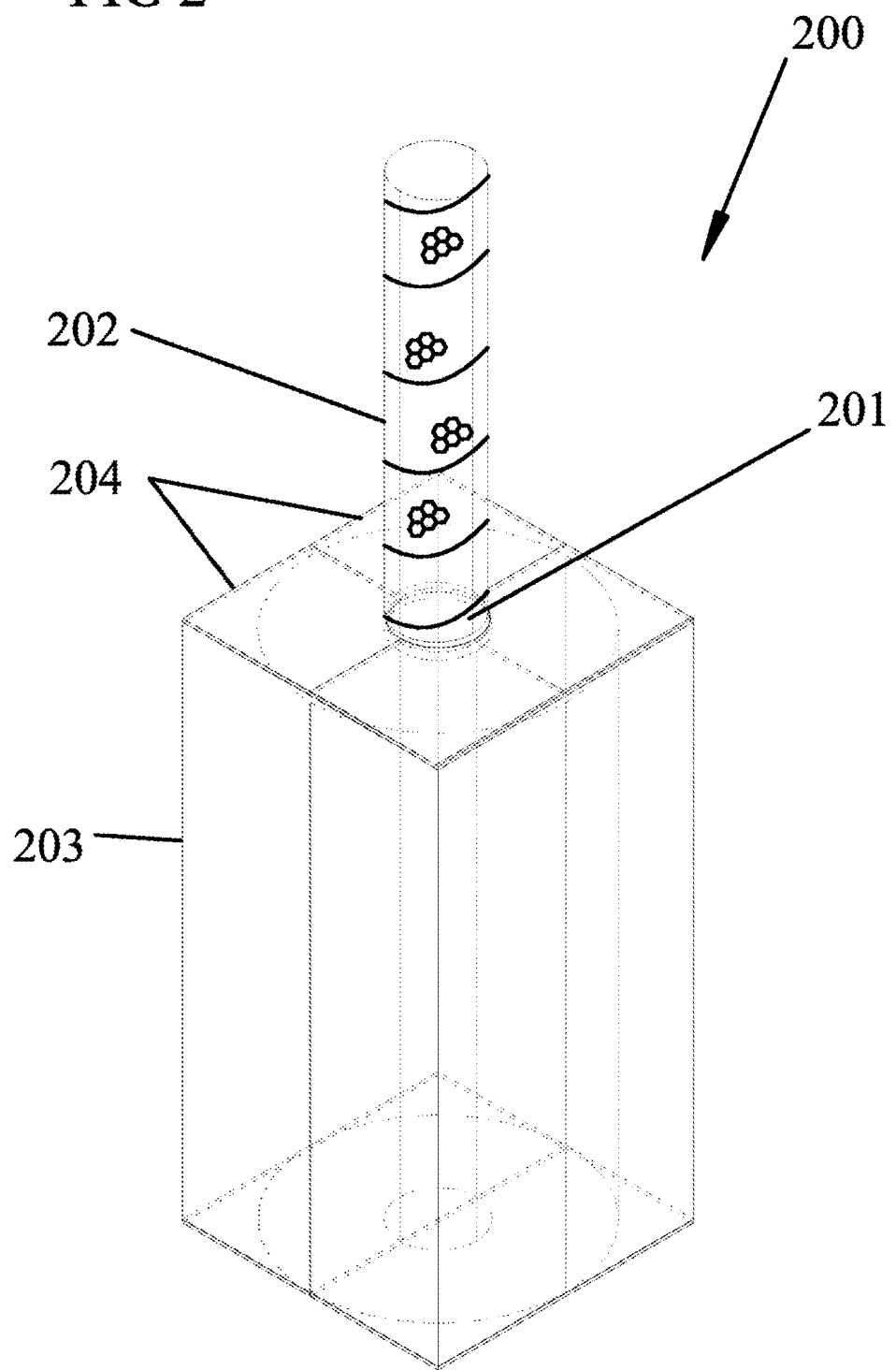
FIG. 2 is a perspective view of the expanded void fill material being dispensed from the shipping/dispensing box.
Figure 3:
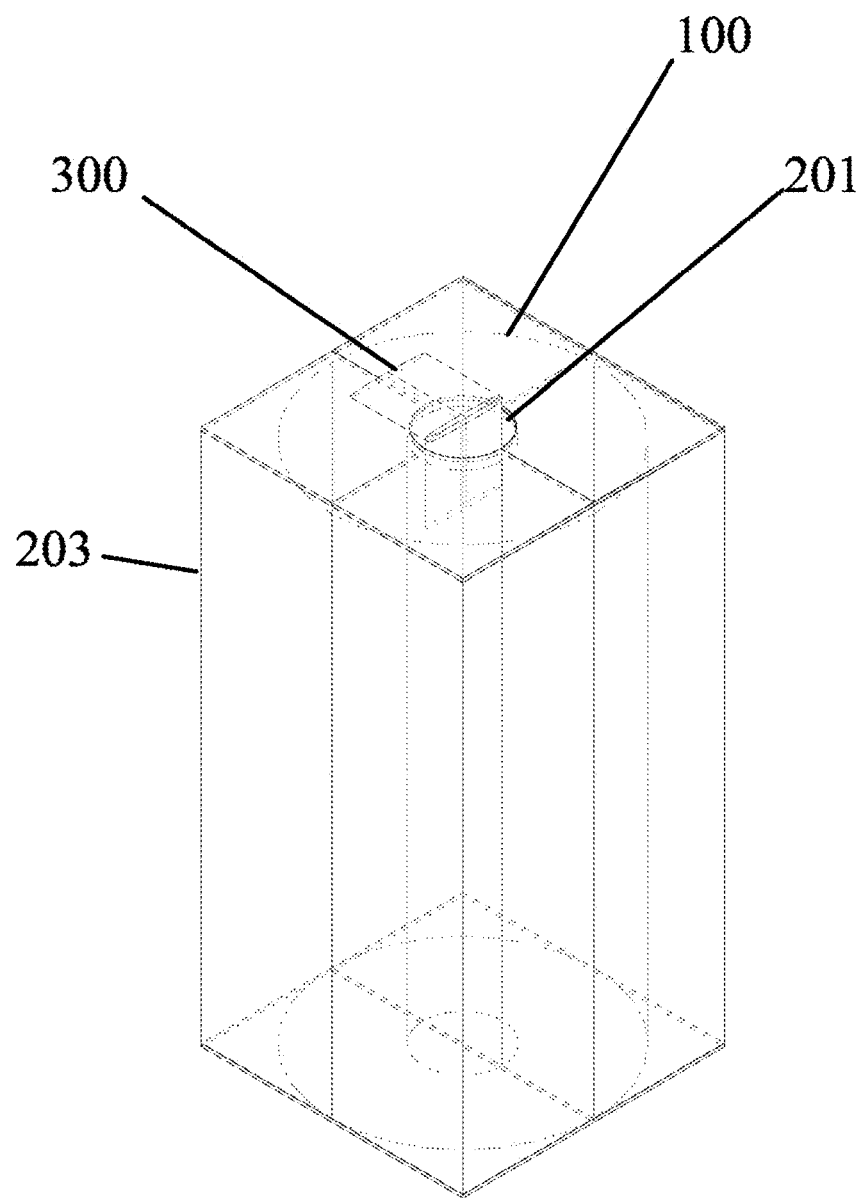
FIG. 3 is a perspective view of a shipping box with unexpanded slit sheet material dispensed and resting flat on the top of the shipping/dispensing box.
Figure 4:
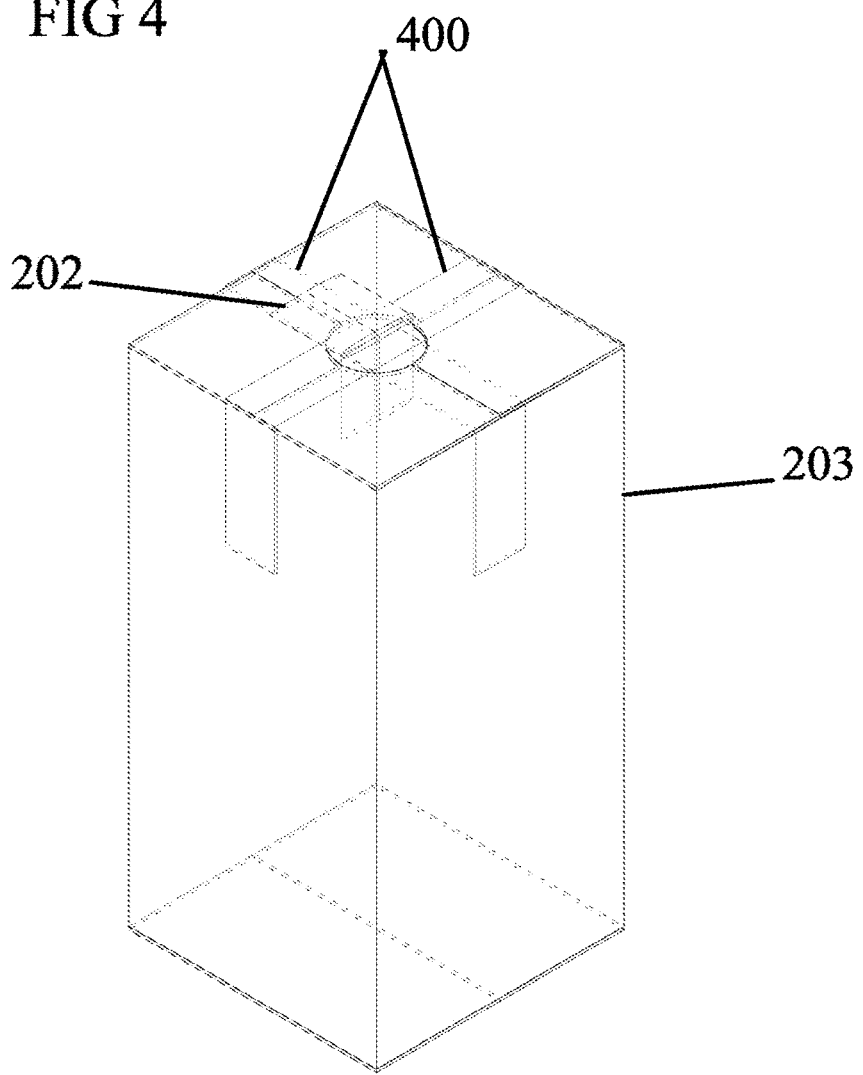
FIG. 4 is a perspective view of a shipping box with unexpanded slit sheet material dispensed and resting flat and taped on the top of the shipping/dispensing box.
Figure 12:
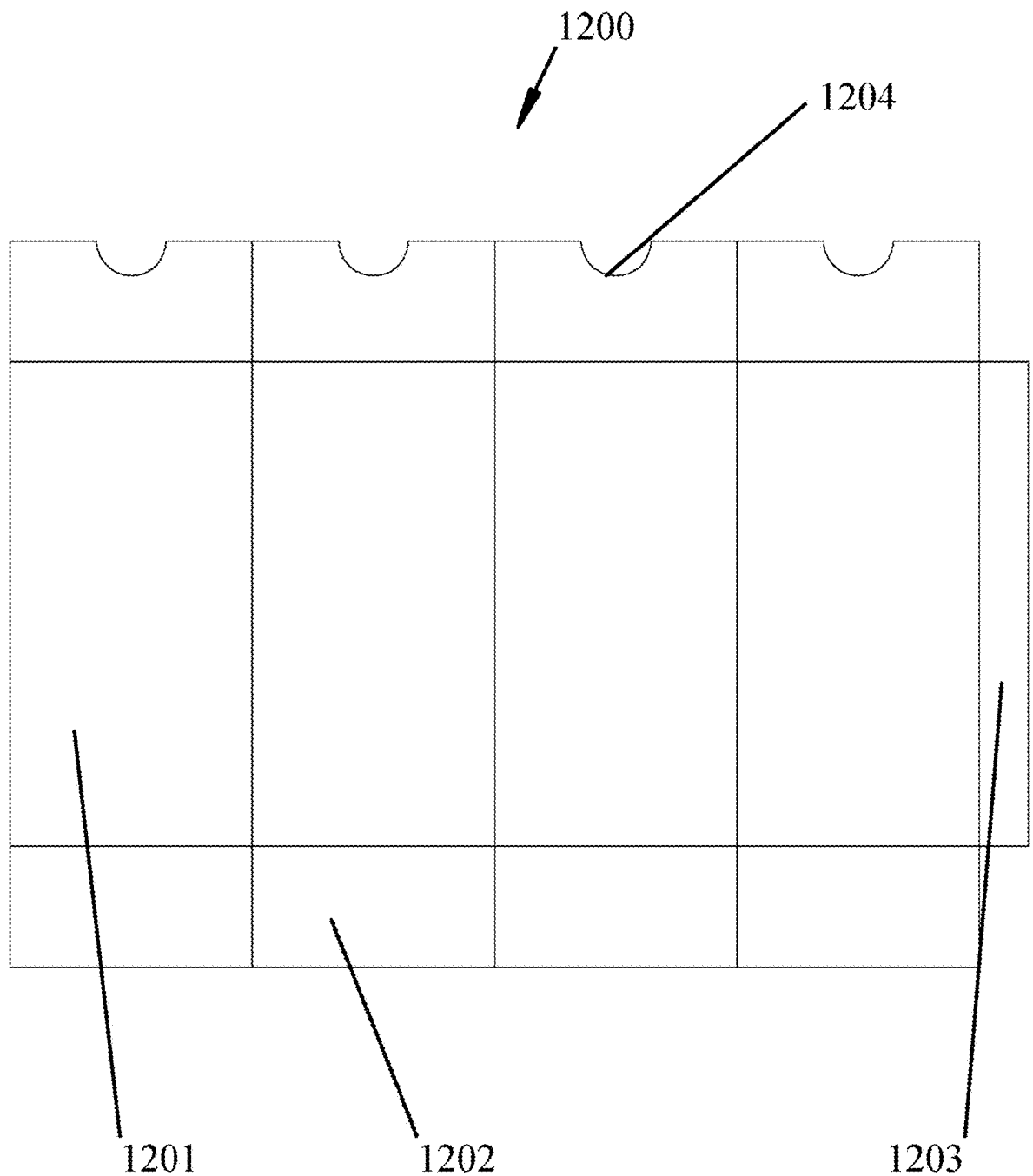
FIG. 12 is a planar view of the dispensing box.

The shipping box and the tensioning device in its preferred embodiment is to be made from paper and further it is to be made from corrugated paper normally found within the art. The shipping box, as shown in FIG. 2 is made with a hole in the center where it aligns with the center of the unexpanded slit sheet roll. This enables the slit sheet material to feed outward from the center of the roll in a turning tube-shaped action that stretches the paper based on the friction that is exerted at the exit point. The hole of the box is made by cutting into the flaps of the paper box as shown in FIG. 12, 1204. A small amount of dispensed material 300 is fed from the roll and is fed through the dispensing box to be placed on top of the corrugated box as shown in FIG. 3. It is then taped to the box as part of the overall securing to the box for shipping as shown in FIG. 4, 400. The purpose of this is to enable the user to quickly obtain the slit paper for immediate use.

Figure 5:
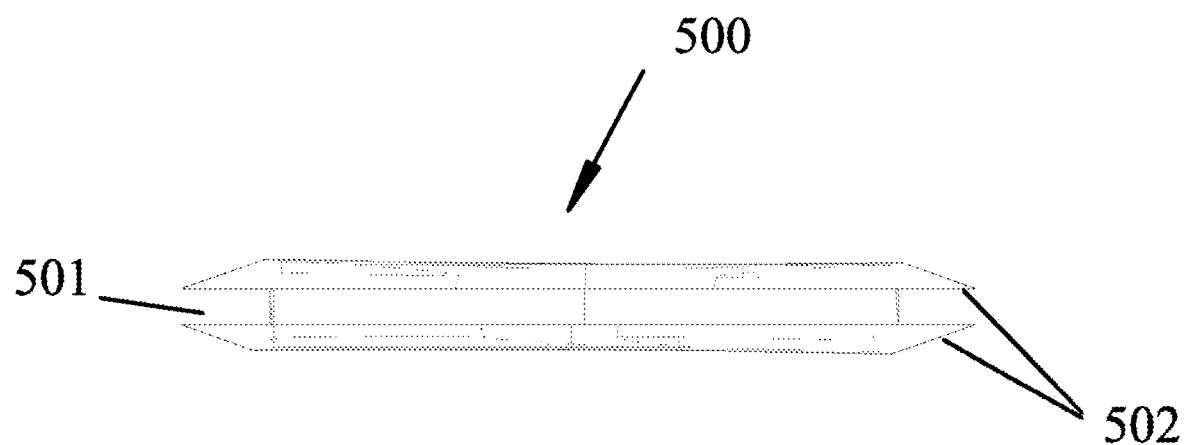
FIG. 5 is a side view of the dispensing donut.
Figure 11:
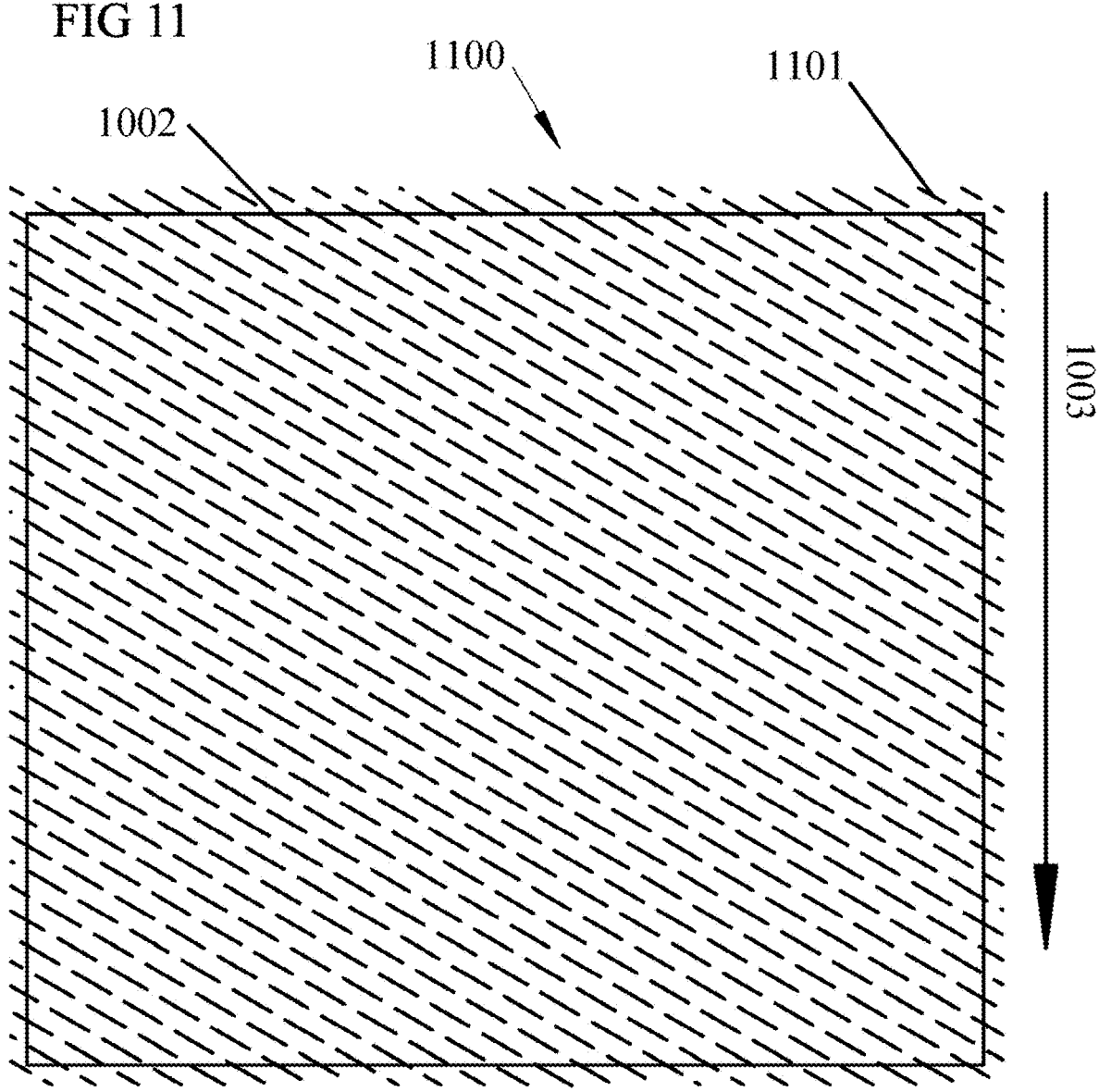
FIG. 11 is a planar view of an alternative die slit pattern of the manufacturing process of the slit sheet material.

Another preferred embodiment of the shipping box is with the use of a dispensing donut. The Slit sheet material 202 can be made from a variety of Kraft papers. The use of a recycled Kraft paper would require reduced friction at the exit point of the dispensing box to inhibit tearing. Also a reduction in friction is required where the expansion, as compared to the expanded slit sheet wrapping product, utilizes an angled knife, as shown in FIG. 11, that would allow the slit sheet to stretch prior to being dispensed from the box. A dispensing donut 500, as shown in FIG. 5, is placed within the hole of the dispensing box. The use of extensible paper, as found within the prior art of Ser. No. 16/018,702 (PCT/US2018/039416) incorporated by reference and recited herein as if in full as part of the description of the present invention, reduces the stretching tension by over 66%. This reduction in force to stretch further is facilitated by the use of the dispensing donut 500 for even faster friction free dispensing as the extensible expands very easily with little resistance and with a low level of required friction.

Figure 7:
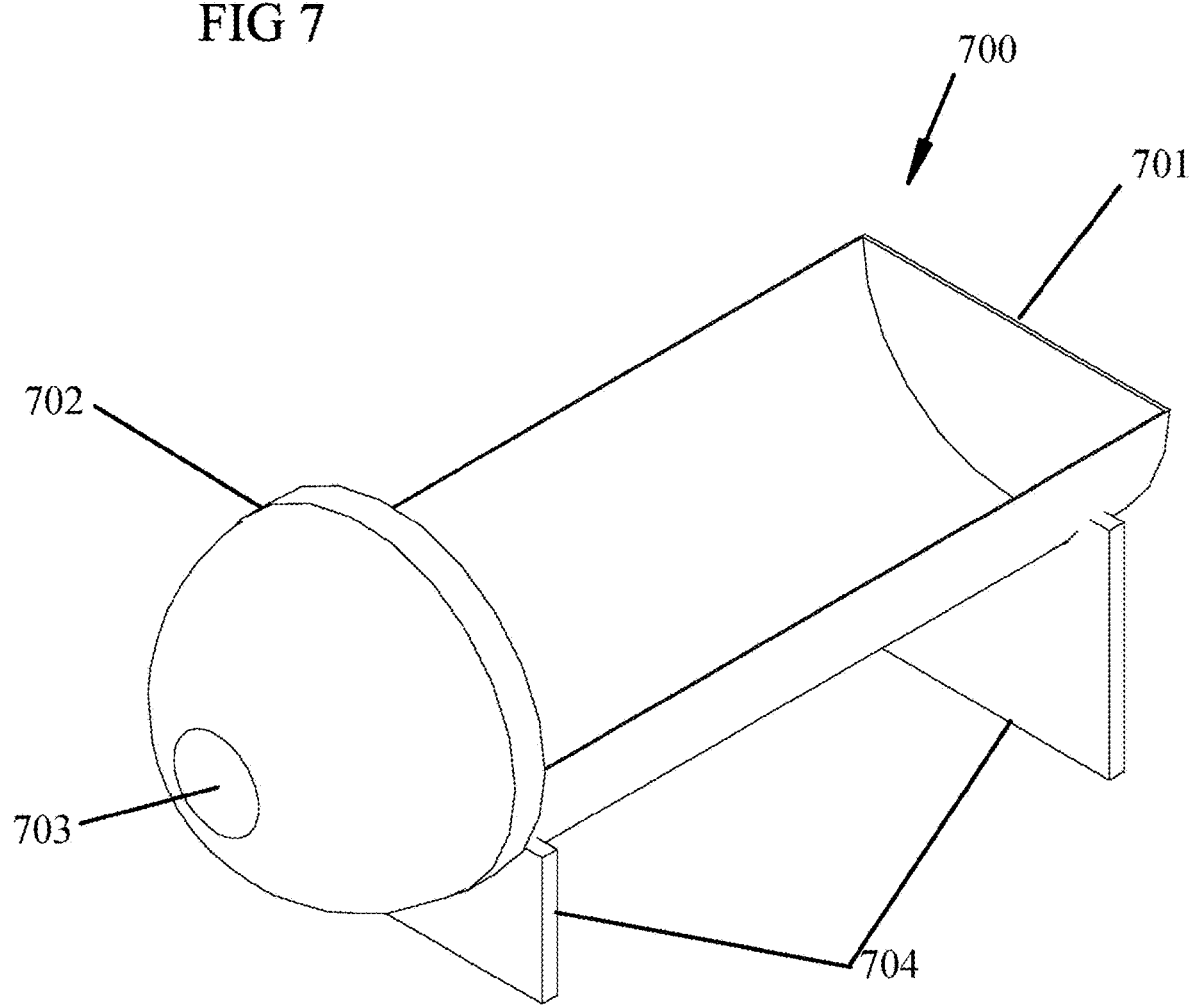
FIG. 7 is a perspective view of an empty metal dispensing system.
Figure 8:
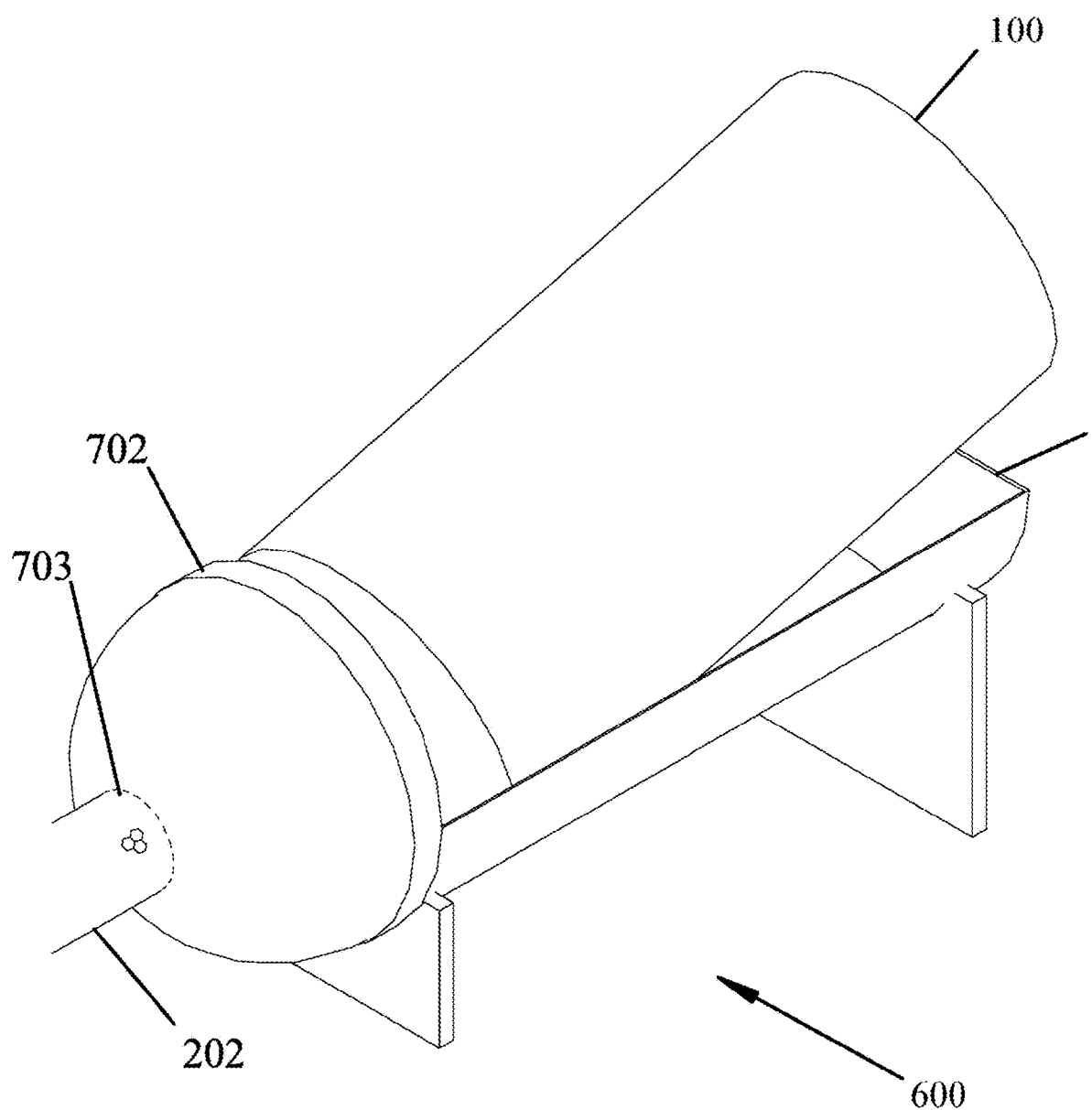
FIG. 8 is a perspective view the unexpanded roll being loaded into the metal dispensing system.

Another preferred embodiment is with the use of a metal dispensing system 700 as shown in FIG. 7. In the case were high volume of material is used daily the dispenser can be made of metal and conveniently positioned and or mounted to the table. In this case a shipping box design would be less convenient. In this instance the dispenser is shaped to load a slit sheet roll quickly as shown in FIG. 8. Loading quickly requires a certain amount of slit sheet material to be available for the user to feed through the dispenser 202 as shown in FIG. 8. To facilitate this, a small portion of slit sheet material is taped (1300) to the top of the slit sheet material as found in FIG. 13. In another embodiment, the exit feed hole can be made into an aperture as found in FIG. 14 1402 with adjustment screw 1400 so that the hole diameter can be optimized in size for the best stretching and feeding speed.

Figure 15:
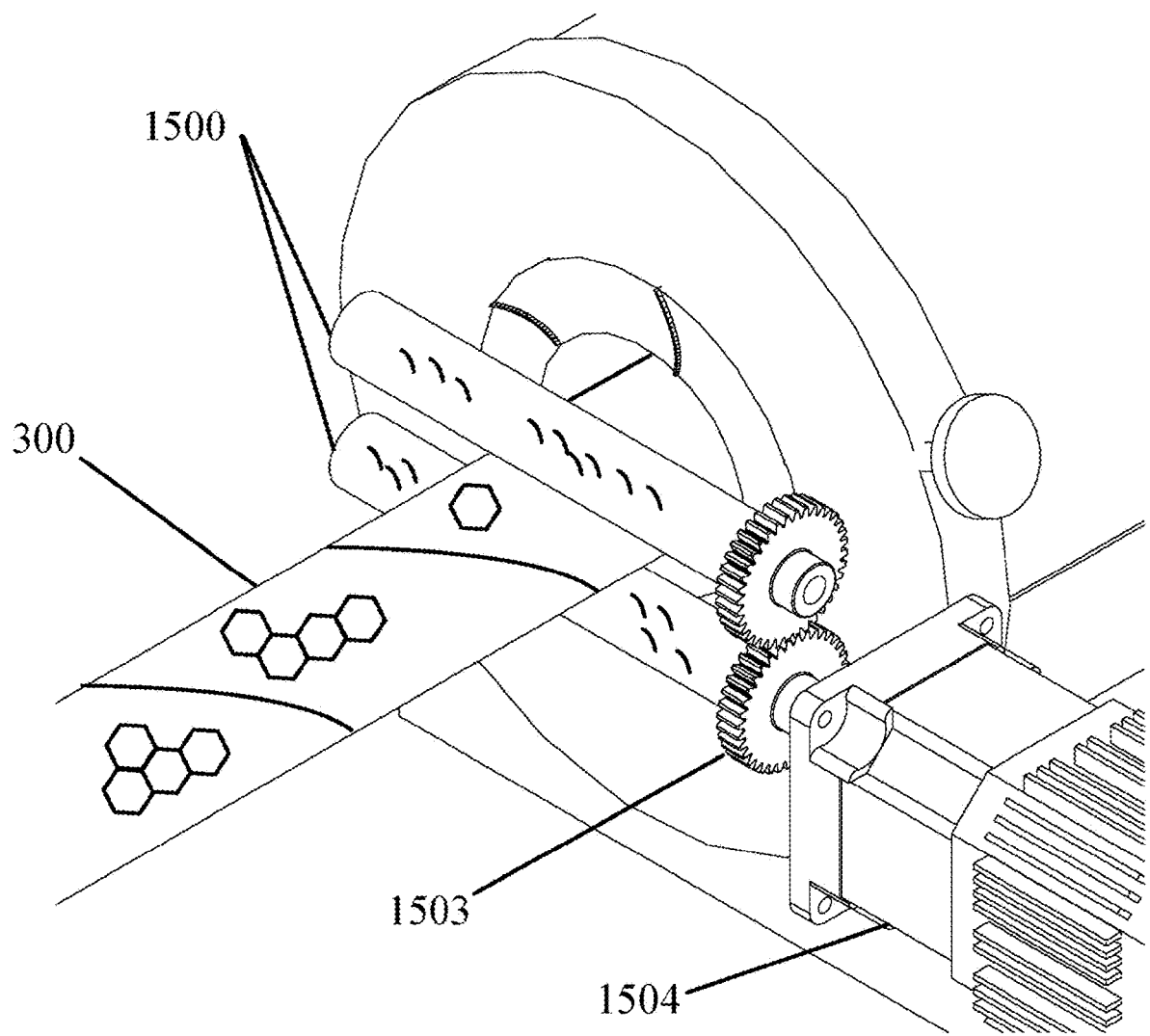
FIG. 15 is a close-up perspective view of the automated dispensing system.
Figure 16:
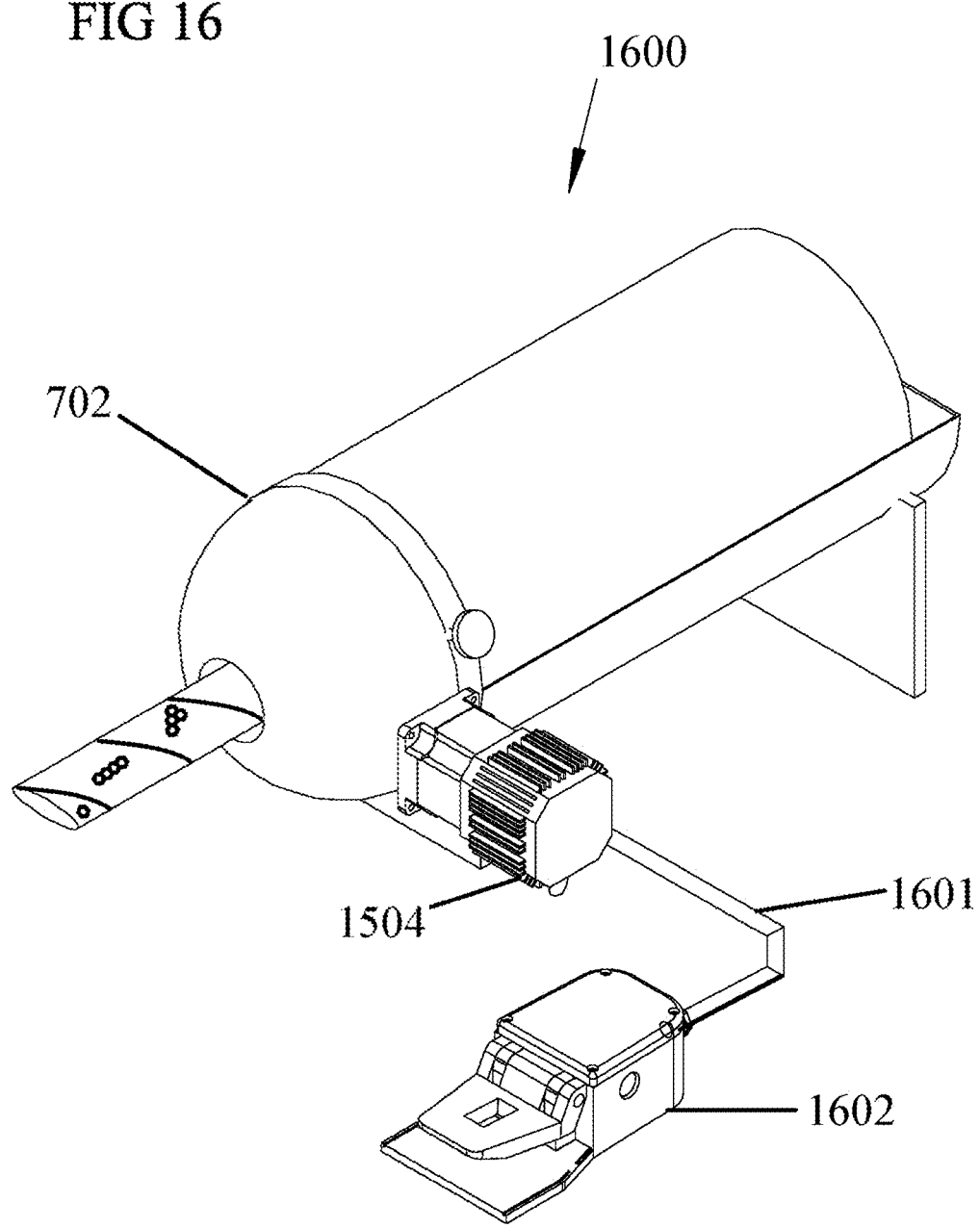
FIG. 16 is a perspective view of the automated dispensing system.

Another preferred embodiment is with the metal dispenser being powered with an electric motor and a foot switch or the like as shown in FIG. 16. The Motor is attached to the manual metal dispensing system with a set of barb-type rollers as found in FIG. 15 1500 and feeds the slit sheet material continuously through the use of an electric foot pedal switch or the like. It is intended that the Goodrich art Ser. No. 14/480,319 with the use of parallel rollers separated narrow enough to grip the exiting paper and wide enough to allow the tubular slit sheets to flex into itself such that the cells are not crushed.

Figure 10:
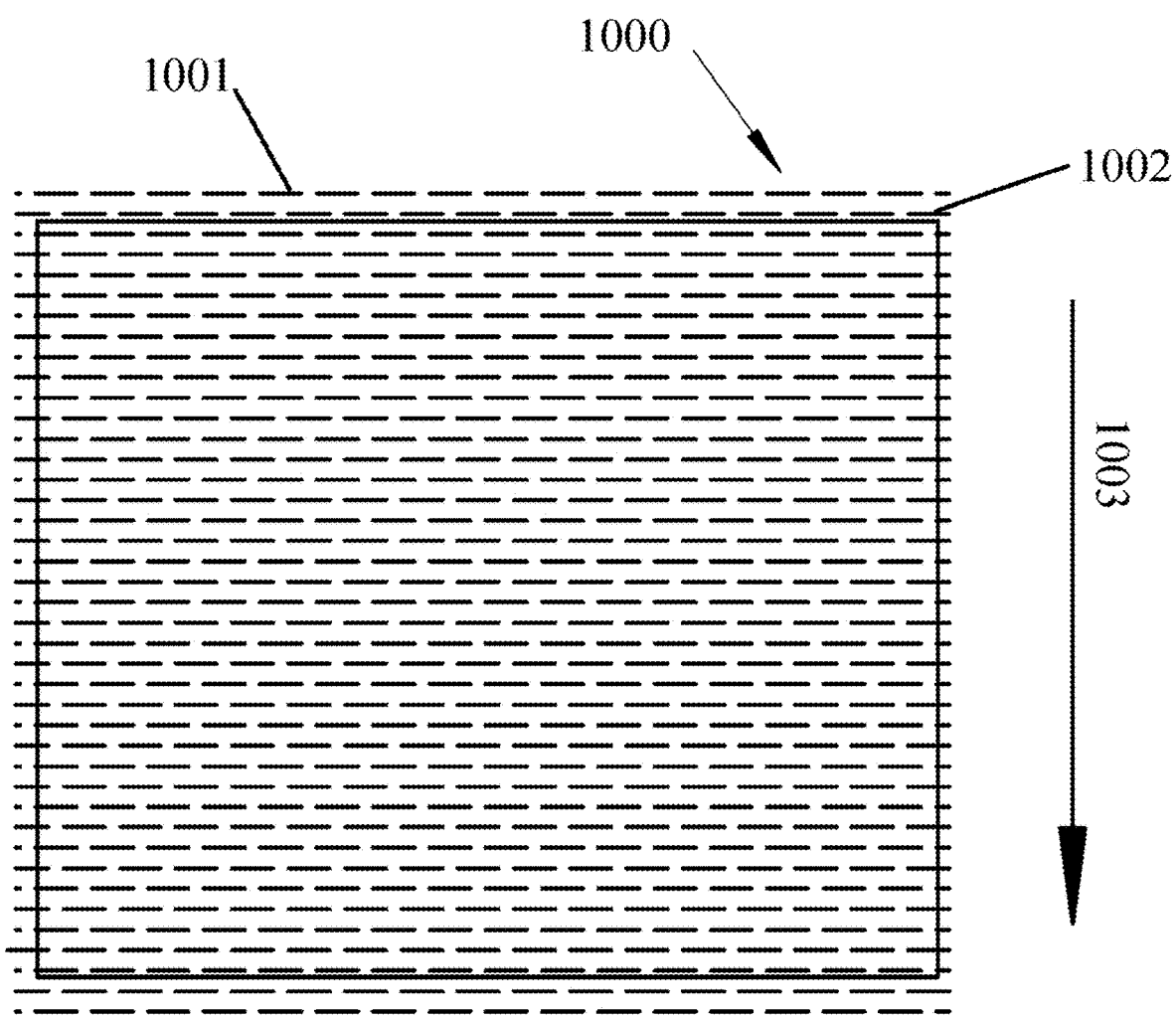
FIG. 10 is a planar view of the die slit pattern of the manufacturing process of the slit sheet material.

Another preferred embodiment is with the use of an angled slit pattern so that the expansion occurs more easily. FIG. 10 shows the standard slit pattern that has been used for the wrapping equipment. The slits are transverse to the manufacturing direction and is transverse to the unwinding of the roll. This makes it easy to utilize the product from the outside layer of the roll but, in the instant art, the slit paper has to expand somewhat transverse to the machine direction. To facilitate a more immediate and easy expansion, the cells are angled so that the cells begin expansion as soon as it begins the unwinding process. To determine the right angle it is important to know which paper is going to be used and the slit pattern desired. Therefore, there is a myriad of angles that would be best suited for the application.

It is also optimal in some instances to turn the slits up to 90 degrees parallel to the direction of manufacture as indicated by arrow 1003, so that the expansion is immediate. As illustrated in FIG. 11, the slitting blades can be at an angle of less than 90° to the machine direction, as for example, in the range from and preferably in the range from 40° to 85° To best determine the angle of the die cutting blades three aspects of the slit paper are necessary, the type of paper, the slit pattern size, and the width of the roll used. If the paper is 20" wide and therefore 20" of paper in a circular form is exiting the core, the buildup of material within the paper core could overfill the area and jam prior to exit. To solve this issue the paper roll would be made with a shorter length so that there is less buildup within the core. If the slit pattern is reduced in size, then the buildup will be less and a longer roll can be used. Another way to solve the problem of premature buildup in the inner core is to increase the size of the core itself.

Figure 17:
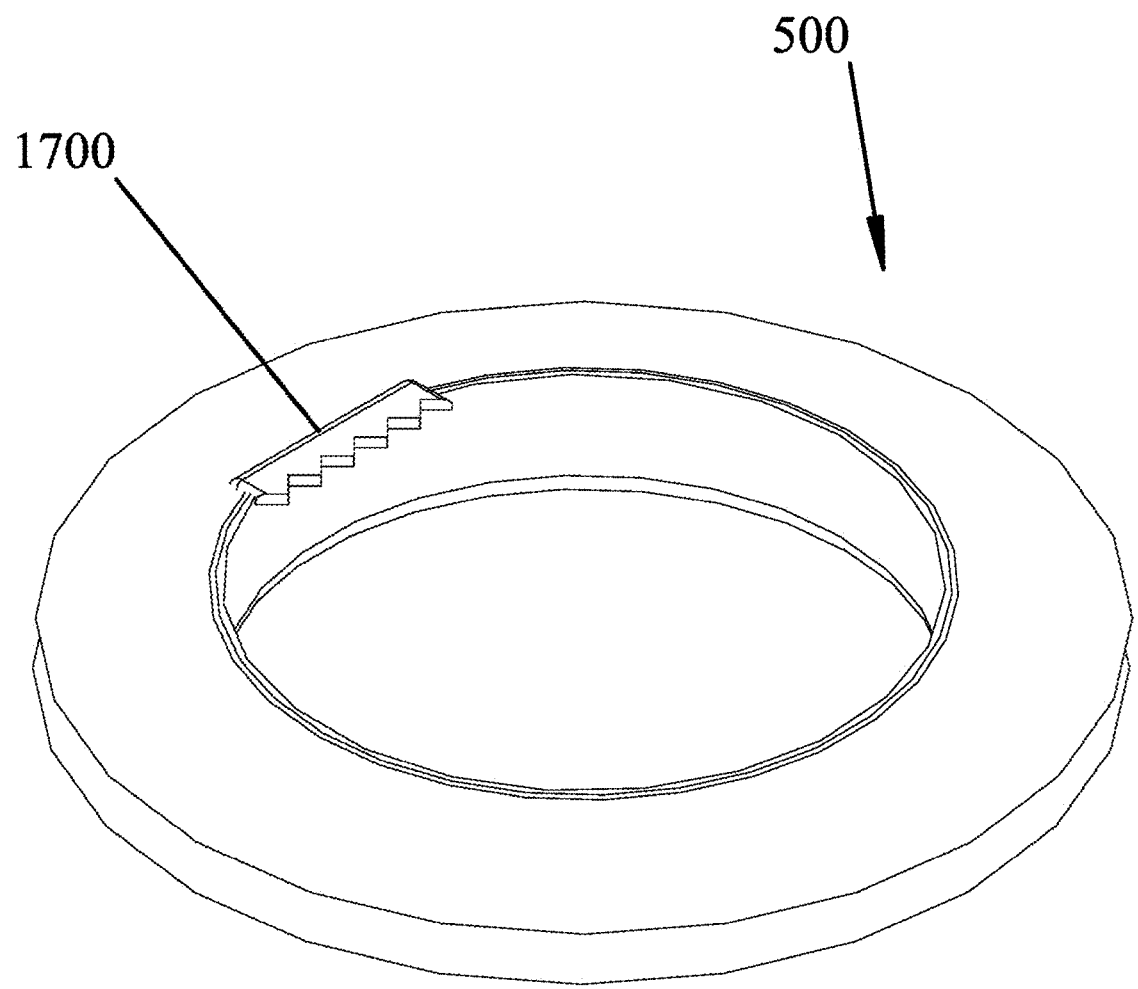
FIG. 17 is a perspective view of an alternative dispensing donut that has a tearing tooth section for easy tearing.

Another preferred embodiment is with the use of molded notches or blades within the dispensing donut as found in FIG. 17. A single notch or small notches as shown in FIG. 17, 1700 at only at one side of the dispensing donut so that the user can dispense at a slight angle away from the notches when dispensing. When it is time to tear the product, the user would engage the notches by angling the slit sheet material upward or slightly towards the notches thereby, inhibiting the exit flow and facilitating the tearing process.

Figure 20:
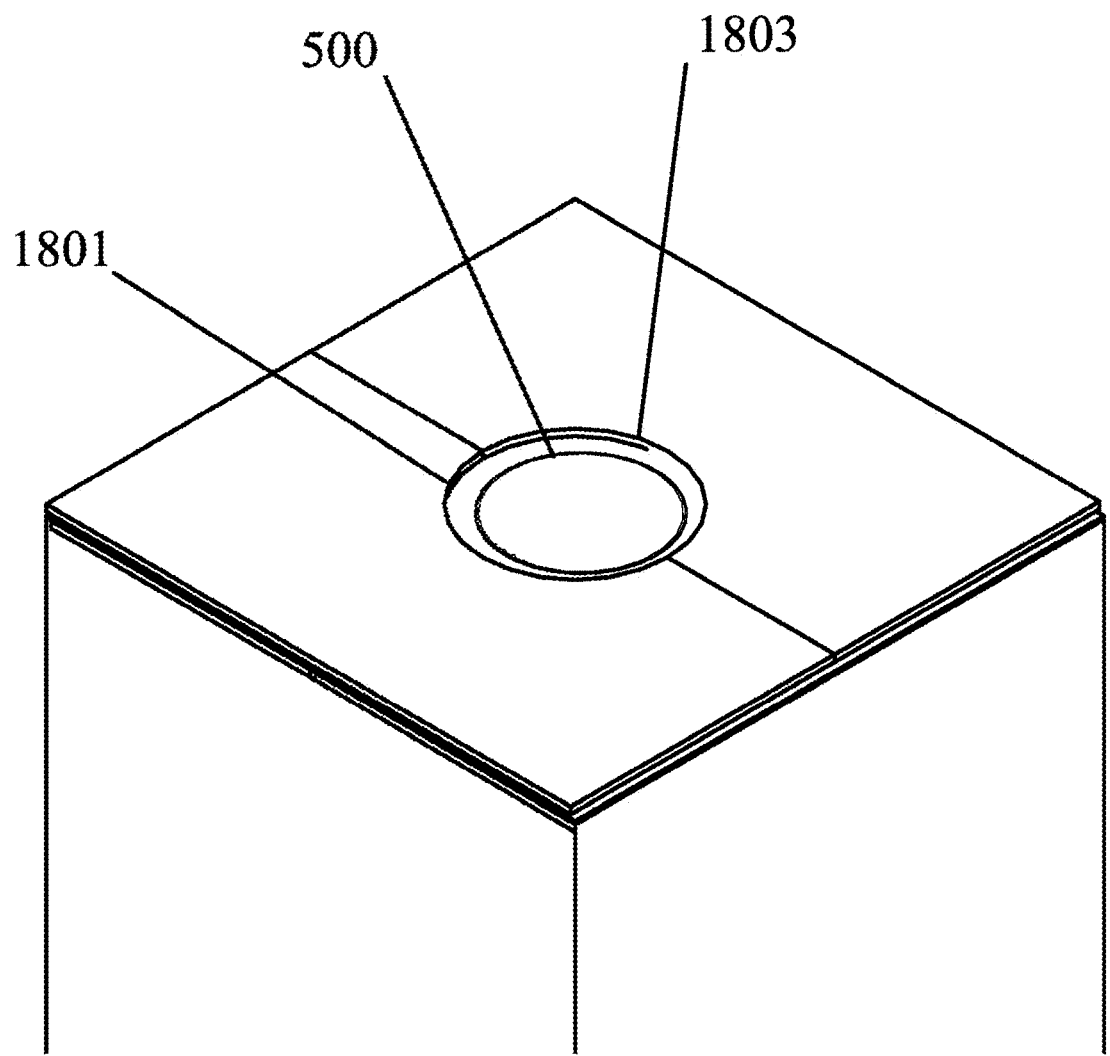
FIG. 20 is a perspective view of the alternative box assembled with the dispensing donut.

Another preferred embodiment to facilitate ease of assemble of the dispensing donut into the box is to use the two inner opposing box panels for the insertion of the dispensing donut to be almost exact to the inner dimensions of the dispensing donut. The exterior opposing flap pairs would have larger openings that would move the edge of the corrugated away from the opening of the dispensing donut to remove any friction created by the panel radial edge as shown in FIG. 20, 1801. This approach eases the assembly process but, remains a durable design since the outer larger radial cutaway on the outer flaps still rest on the dispensing donut to inhibit dislodging of it.

Further Discussion of the Figures

FIG. 1 is a perspective view of the unexpanded slit paper in roll form 100, where the intended unwinding/feeding section 101 is the center of the roll in the preferred embodiments. As shown in FIG. 1, the roll 100 is wound such that the sheet is formed of numerous wound layers of sheet material, including an interior end 100-*ie* and an exterior outer end 100-*oe* of the sheet. In the preferred embodiments described herein, the sheet is fed from the center by feeding the interior end 100-*ie* upwardly in the direction of the arrow 100-AR shown in FIG. 1.

FIG. 2 is a perspective view of the dispensing system 200 where the slit sheet material 202 is being expanded through hole 201 die cut into box flaps 204.

FIG. 3 is a perspective view of the expanded slit material where the hidden slit sheet roll 100 is in the box 203. A small portion of the slit sheet material 300 is drawn through hole 201 flattened and placed against the top of the box 203.

FIG. 4 is a perspective view of the box 203 where flattened slit sheet material is placed under and releasably secured by packing tape 400.

FIG. 5 is the dispensing donut 500 with reduced radius area 501 creates upper and lower smooth edge areas 502.

Figure 6:
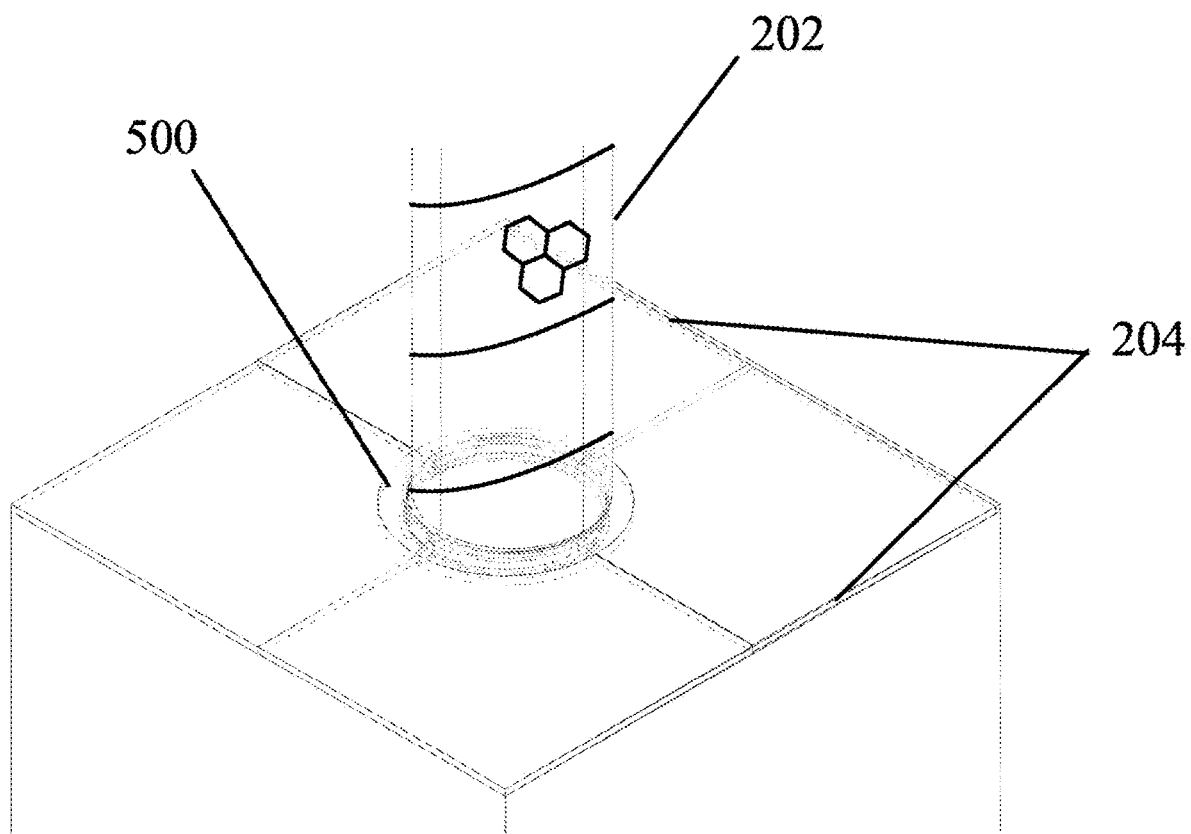
FIG. 6 is a perspective view of the expanded slit sheet material exiting thought the dispensing donut.

FIG. 6 is a perspective view of the dispensing donut 500 in position and secured within the layers of flaps 204 to reduce the friction of the dispensed expanded slit sleet material 202.

FIG. 7 is a perspective view of an empty metal dispensing system 700 where empty loading area 701 is connected to hollow holding fixture 702 that has the exit feed hole 703. Feet 704 hold the dispensing system 700 slightly higher than the packing table.

FIG. 8 is a perspective view of the loading of the slit sheet roll 100 into the metal dispensing system into loading area 701 to be pushed under hollow holding fixture 702 while simultaneously making sure slit sheet material 202 is fed through hole 703.

Figure 9:
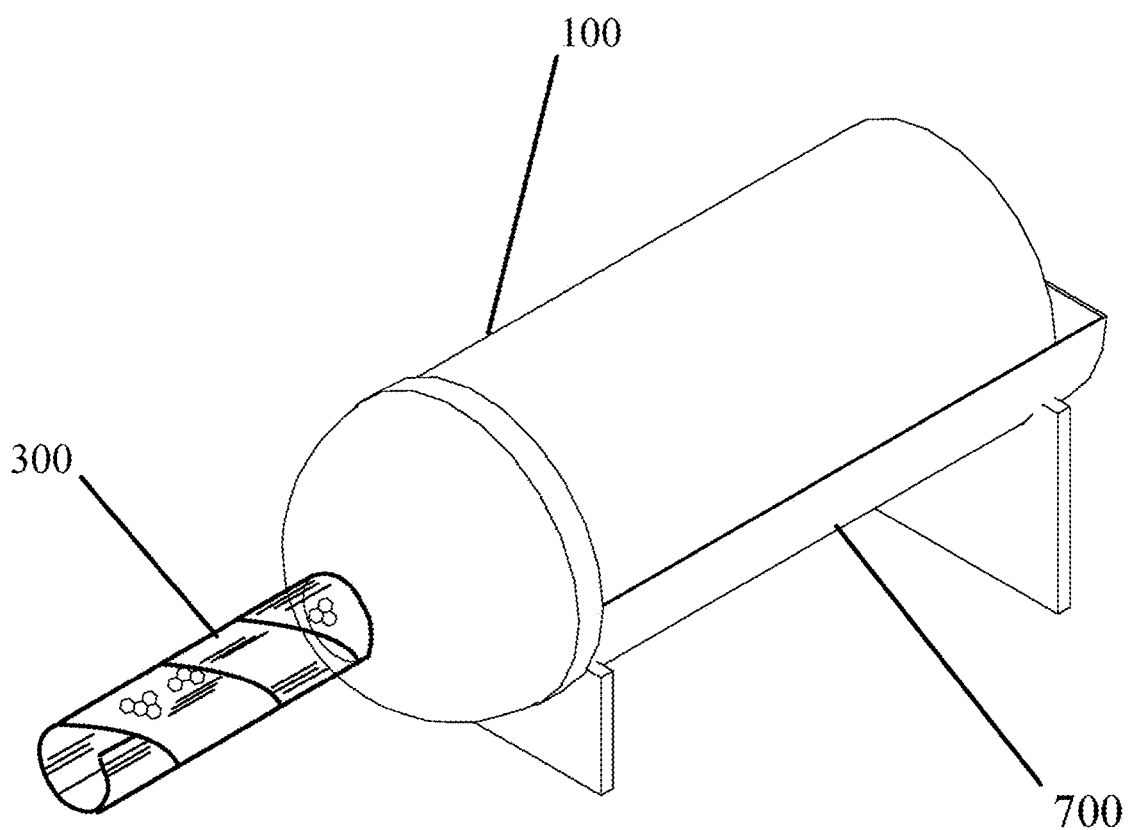
FIG. 9 is a perspective view metal dispensing system dispensing the expanded slit sheet material.

FIG. 9 is a perspective view of the metal dispensing system 700 has slit sheet roll 100 mounted with expanded slit sheet material exiting the dispenser.

FIG. 10 is a planar view of the die cut pattern 1000 where slit knives 1001 are transverse to manufacturing direction 1003. The slit paper outline 1002 depicts the area in which the paper is to be die cut to be completely cut edge to edge.

FIG. 11 is the angled die cut pattern 1100 where 1101 slit knives are angled towards but, not completely transverse to the machine direction 1003. Outline 1002 shows the position of paper as it passes over the knives to be completely cut edge to edge.

FIG. 12 is a planar view of the manufactured box layout 1200 prior to being glued together with box flap 1203 being joined to first panel 1201. Cut out half-circle 1204 in each of the four flap panels 1202 that make up the round hole of FIG. 2,101.

Figure 13:
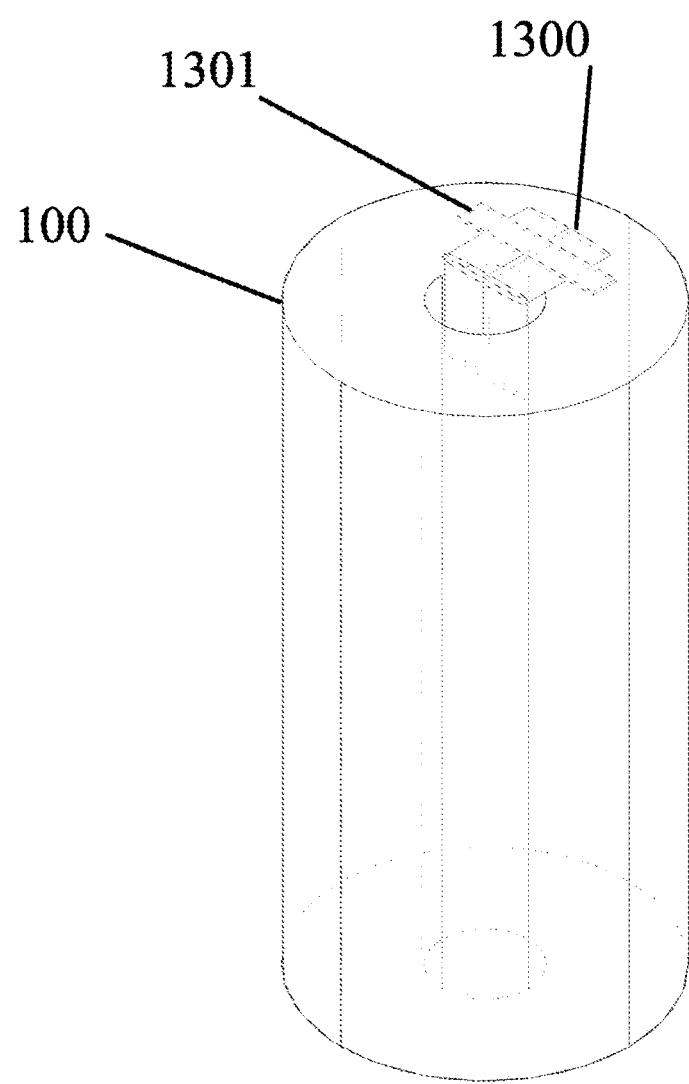
FIG. 13 is a perspective view of the flattened slit sheet taped to the outer layer of the slit sheet roll material.

FIG. 13 is a perspective view of the unexpanded slit sheet roll 100 with flattened expanded sheet 1300 placed on the top of the roll for ease of and releasable secured with tape 1301.

Figure 14:
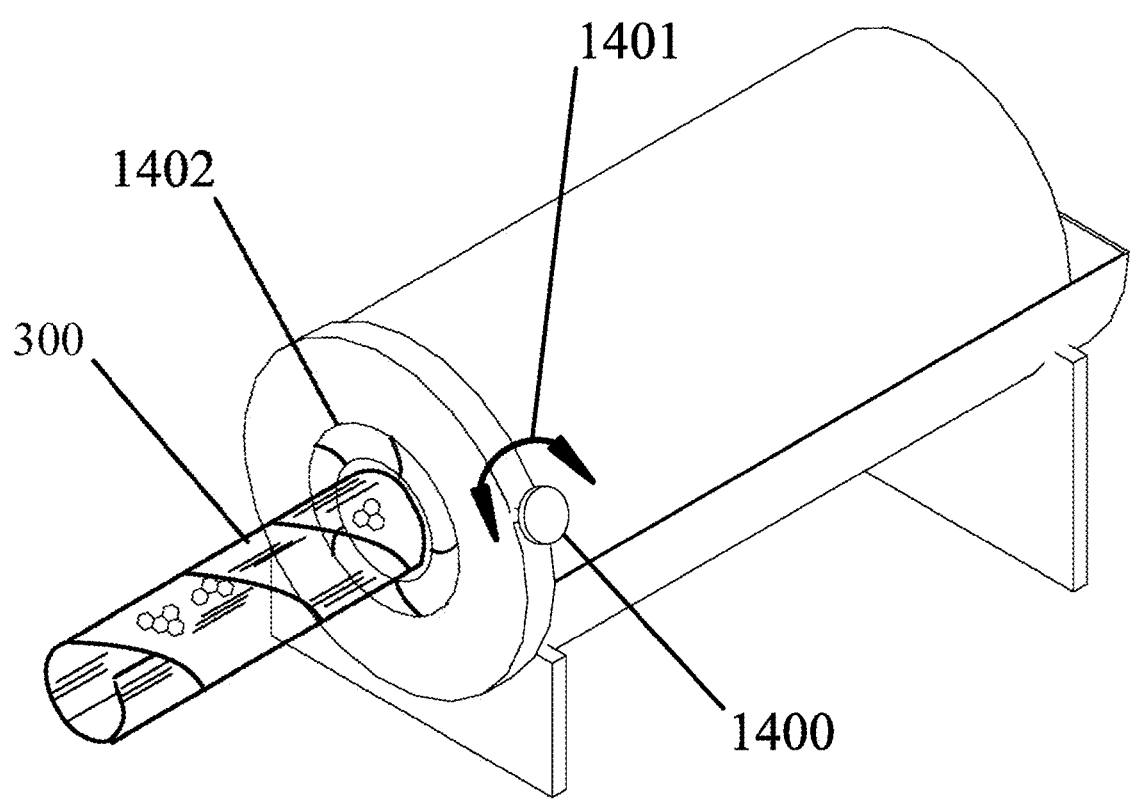
FIG. 14 is perspective view of an alternative metal dispensing system.

FIG. 14 is a perspective view of a manual dispensing system with that includes modulating screw 1400 that turns clockwise and counterclockwise, as shown with curved arrow 1401, to enable donut aperture 1402 to adjust in diameter and thereby affecting the exit tension of expanded slit sheet roll 300.

FIG. 15 is a perspective view of the motor and barbed powered rollers 1500 that are connected to motor 1504 through gearing rollers 1503. The barbed power rollers feed the expanded slit sheet tube 300.

FIG. 16 is a perspective view of the powered dispensing system 1600 showing electric motor 1504 connected to electric powered foot operating foot pedal 1602 through electrical wires 1601. Hollow holding fixture 702 hides the powered barb rollers and gears for safety.

FIG. 17 is a perspective view of an alternative donut 500 that shows the molded teeth or notches 1700 that are part of the edge of the dispensing donut 500.

Figure 18:
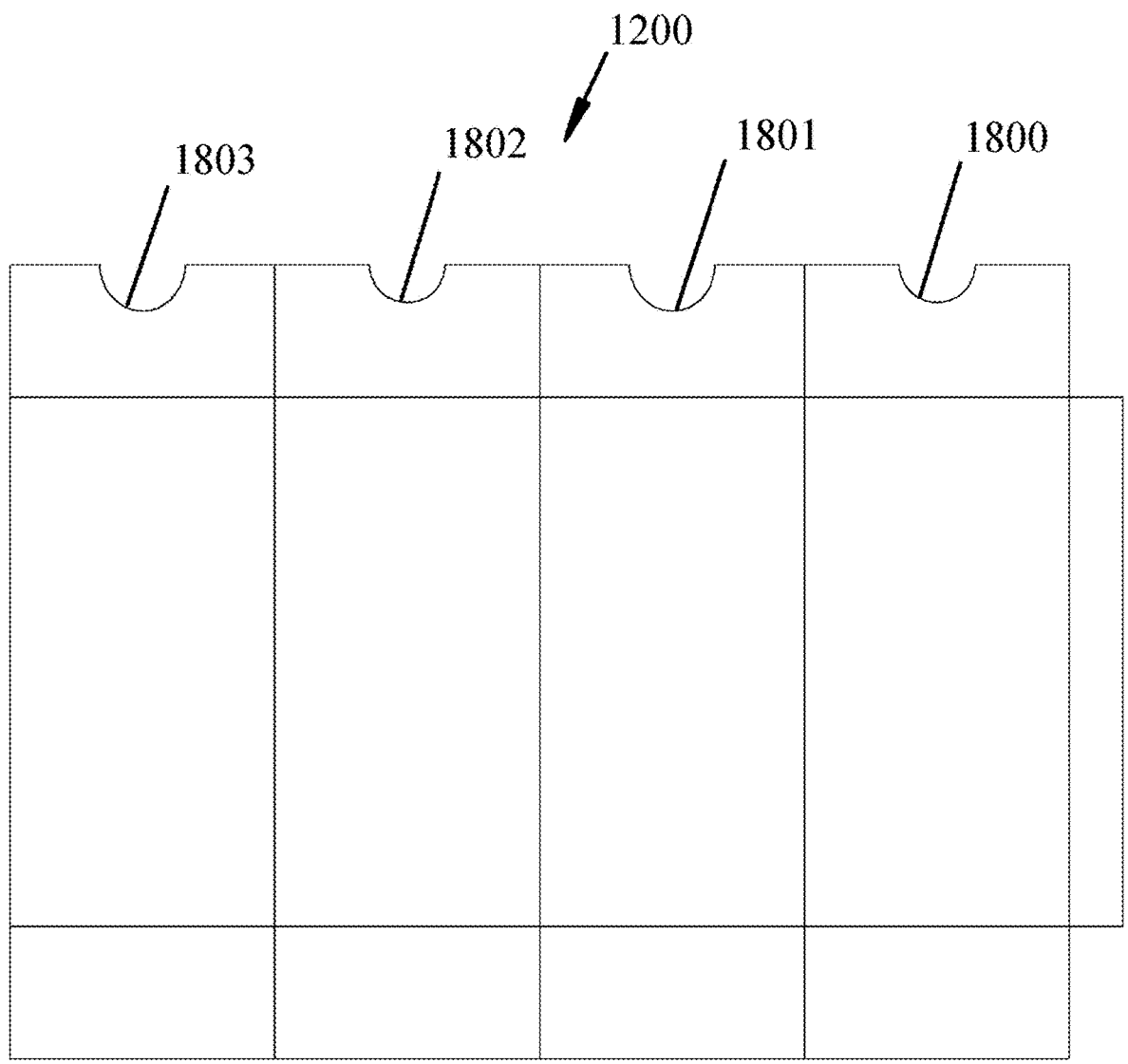
FIG. 18 is a planar view of an alternative box design to ease the assembly of the dispensing donut.

FIG. 18 is a planar view of the alternative box where opposing outer panels with radial cuts 1803 and 1801 are larger than inner opposing panels with radial cuts 1800 and 1802 that are used to fit securely the dispensing donut of FIG. 5, 500.

Figure 19:
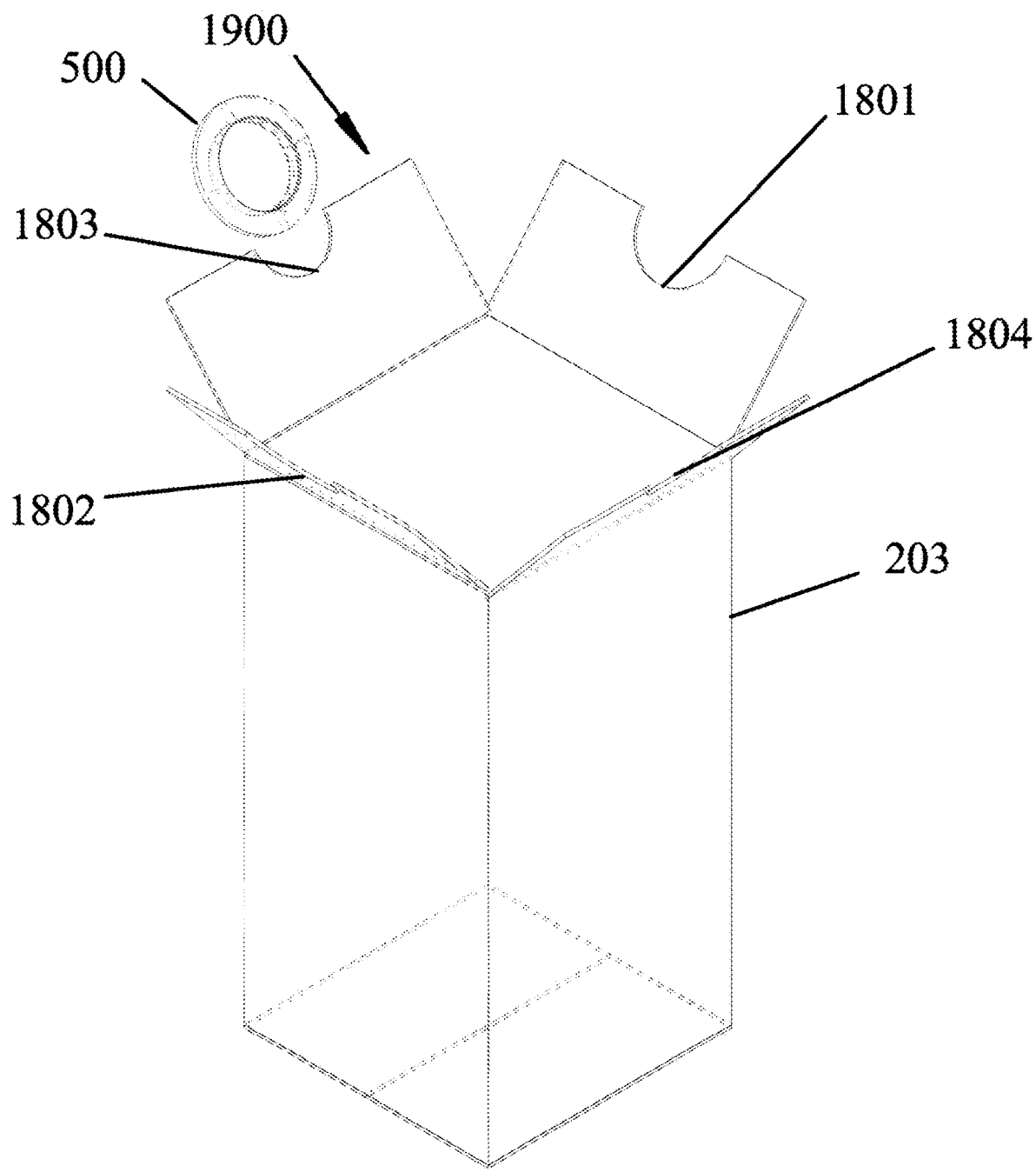
FIG. 19 is an exploded perspective view of the alternative box and dispensing donut assembly.

FIG. 19 is a perspective view of the exploded view of the box panels with radial cuts 1800-1804 in the open position. Dispensing donut 500 is placed in a downward motion 1900 into the inner radial cut of the box panel 1803 and subsequently 1804 as the two panels are rotated to the horizontal position as shown in FIG. 20. Box panels with radial cuts 1801 and 1802 are closed over the inner box panels 1803 and 1804 to trap and securely inhibit any movement or tearing of the inner box panels 1803 and 1804 during use.

FIG. 20 is a perspective view of all radial cut panels 1800-1804 cut and placed in the horizontal closed position that is ready for shipment with dispensing donut securely trapped with outer panels 1801 and 1803.

b) Embodiments Described in 62/983,601

As discussed above, in the background art, there are devices for expanding slit sheet paper. However, those devices are particularly designed for the use as a wrapping product and are not appropriate for creation of a void fill product.

As described in the background above, the present inventor pioneered the use of expanded slit sheet paper for cushioning products. Since the present inventor's introduction of expanded slit sheet paper as a cushioning product, dispensing systems have been used that expand the slit sheet paper in a manner to enable the expanded slit sheet paper to be wrapped around a product. Towards that end, prior expansion devices of expanded slit sheet paper feed the slit sheet paper in a uniform and flat manner so that the cells of the paper are substantially uniformly opened upon expansion. Then, the expanded paper, while in this flat state, is wrapped around an item to protect that item.

Rather than wrapping an item, a prior expansion device could have theoretically been used to expand the paper (i.e., in its flat state) and then the expanded paper could have theoretically been rolled upon itself in a manner not to surround a product, but to create a void fill for cushioning. However, it was not previously possible to create a viable and useful void fill product using such prior expansion devices.

For example, when paper is expanded with such prior expansion devices, after expansion, the paper has a tendency to retract. That is, the expanded paper needs to remain under tension to remain expanded. Accordingly, such prior expansion devices are useful when wrapped around an item because the act of wrapping the item maintains the expanded state of the expanded slit sheet paper, and once the item is wrapped a few times by the expanded slit sheet paper, the layers of the wrapped expanded paper can interlock around the item and, hence, remain in an expanded state around the item.

However, if the expanded paper was not wrapped around an item and attempted to be used as a void fill, there would be a problem in that the expanded paper would have a tendency to retract and lose its expanded state (which expanded state is necessary for cushioning capabilities).

Moreover, as the expanded slit sheet paper is, by itself, thin (even in an expanded state), it would be difficult to wrap the paper around itself to form a void fill product.

Moreover, in order to form a void fill product with such prior expansion devices, the paper would <u>first</u> need to be expanded and <u>second</u> would need to be wrapped around itself to avoid contraction. Thus, such prior expansion devices do not lend themselves to the creation of a viable void fill product.

According to some further embodiments, a novel dispenser is provided that is even more uniquely capable of suitable creating a void fill product by expanding of expandable slit sheet paper.

In some illustrative embodiments, a modified semi-circular opening is provided for the dispensing of slit sheet material in both manual-type and automated-type systems, which modified semi-circular opening has been unexpectedly now found to be more reliable for continuous stretching without tearing until so desired.

According to some alternative embodiments, one or more of the embodiments described herein-above can be modified to employ a novel and advantageous opening or outlet or donut aperture.

In particular, the use of a semi-circular shape, partially circular shape, or crescent shape opening has now been found to be highly advantageous in some preferred embodiments and implementations. While it would be expected that the use of a semi-circular opening would result in premature tearing of the slit paper during the expanding of the slit paper, the present inventor discovered that, surprisingly, the opposite occurs. On the contrary, the present inventor has discovered that the tendency of the slit sheet paper to tear in an uncontrolled manner has been reduced by the implementation of such novel openings, rather than being exacerbated.

The use of a semi-circle exit feed or crescent shaped exit feed unexpectedly provides tension to expand the slit sheet material completely while simultaneously increasing the feeding speed without the fear of ripping the material prematurely. This shape of a crescent can be used in some embodiments within all of the dispensing systems described herein. In particular, while an exemplary implementation is described in relation to a corrugated box embodiment, such a novel opening shape can be implemented within any of the void fill dispensing systems described herein. The opening exposes edges of the corrugated paper and the edges of the corrugated paper is employed to resist the dispensing of the slit sheet material.

In the preferred embodiment, the crescent shape is a type of lune (e.g., partial moon shape), which includes a generally circular disk shape with a portion of another generally disk shape removed from it, so that what remains is generally a shape enclosed by two circular arcs which intersect at two points. In a crescent, the enclosed shape does not include the center of the original disk. The tapered regions towards the points of intersection of the two arcs are known as the "horns" of the crescent. See: Wikipedia. It should be noted that in the preferred embodiments, the horns of the crescent are advantageously rounded at their ends, rather than tapering to a point.

Figure 23:
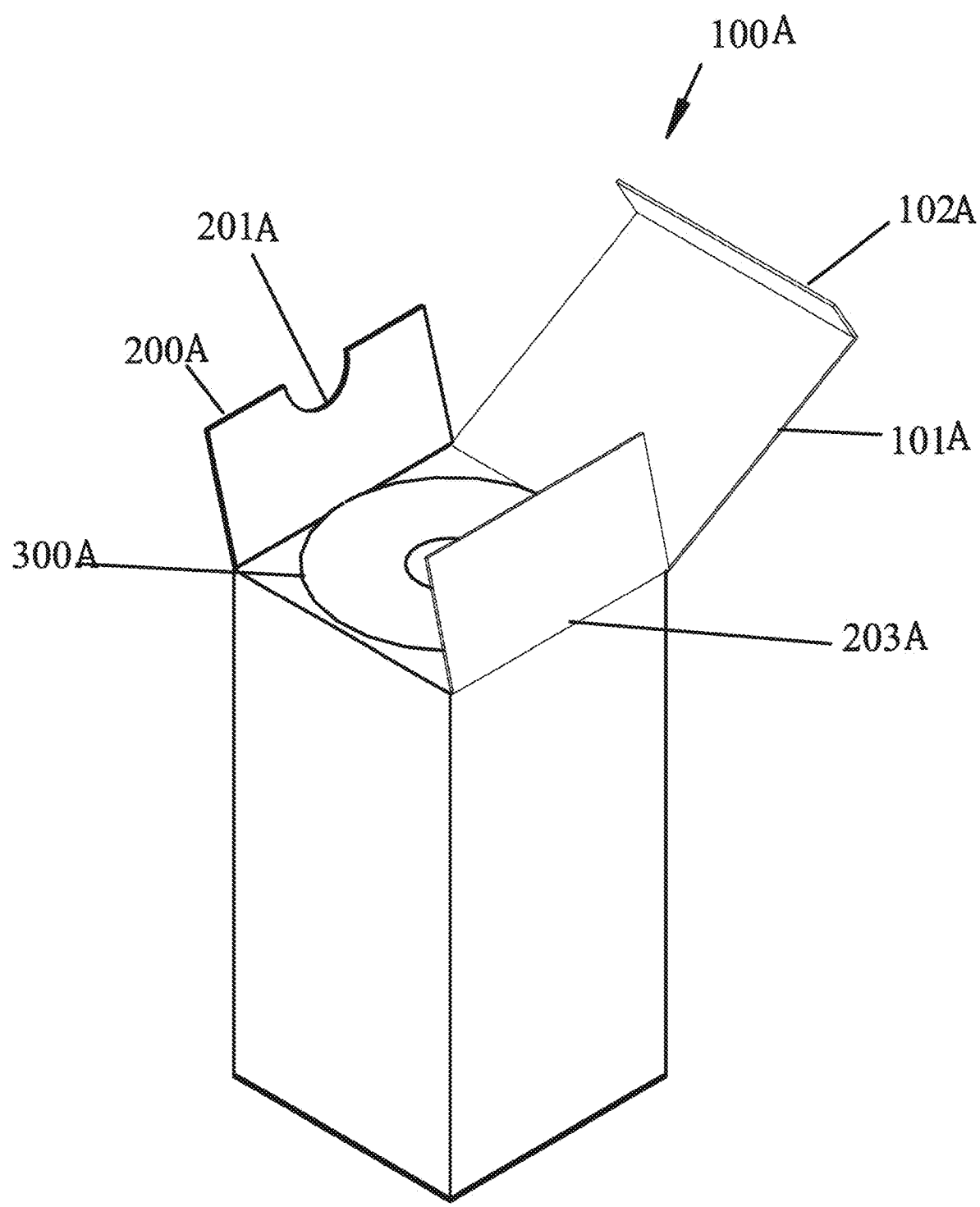
FIG. 23 is a perspective view of the box shown in FIG. 21 including a roll of unexpanded slit sheet material with all upper dispensing panels folded outward and away from the box so that the roll can be loaded.

The shape can be slightly adjusted dependent upon the slit pattern which varies the tension and ease of feed necessary to dispense well. FIG. 23 shows opening 201A as a semi-circle with the opposing flap 203A being rectangular/square and, therefore, forcing the expanded slit material 204A material through an irregular shape.

By way of an example, the semi-circle could be made smaller to increase tension or the panel 203A could be adjusted (e.g., curved) to enable a fuller circular. This is very easily accomplished by increasing the length of panel 203A beyond the centerline of the two flaps making it greater in length while panel 200A is reduced in length and therefore reduces the semi-circular hole. Conversely, the panel 203A could be made shorter and the panel 200A made longer which would increase the circumference of the circle.

Figure 25A:
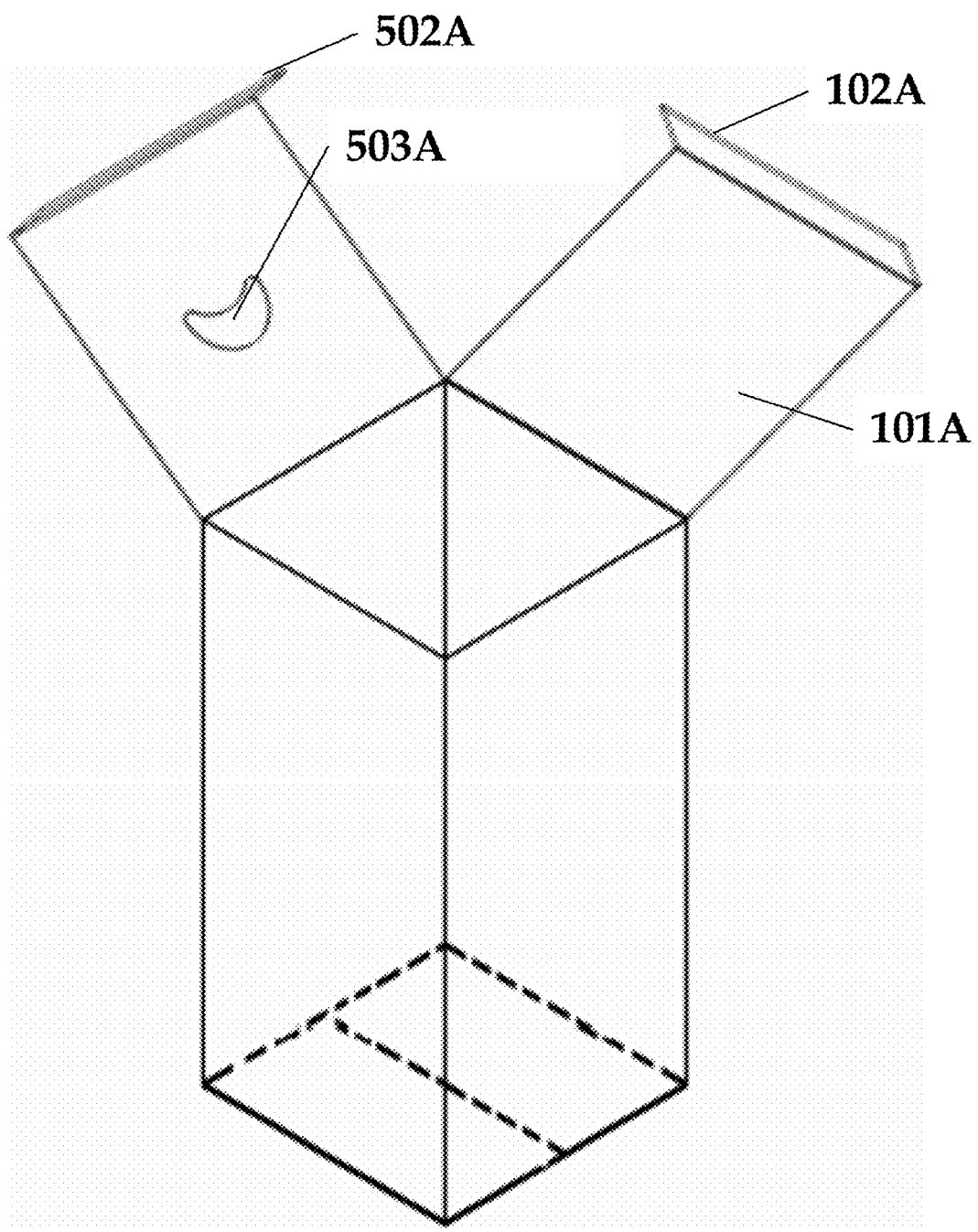
FIGS. 25A-25C show perspective views of an alternative box design with an alternative slit sheet dispensing hole according to some illustrative embodiments.
Figure 25B:
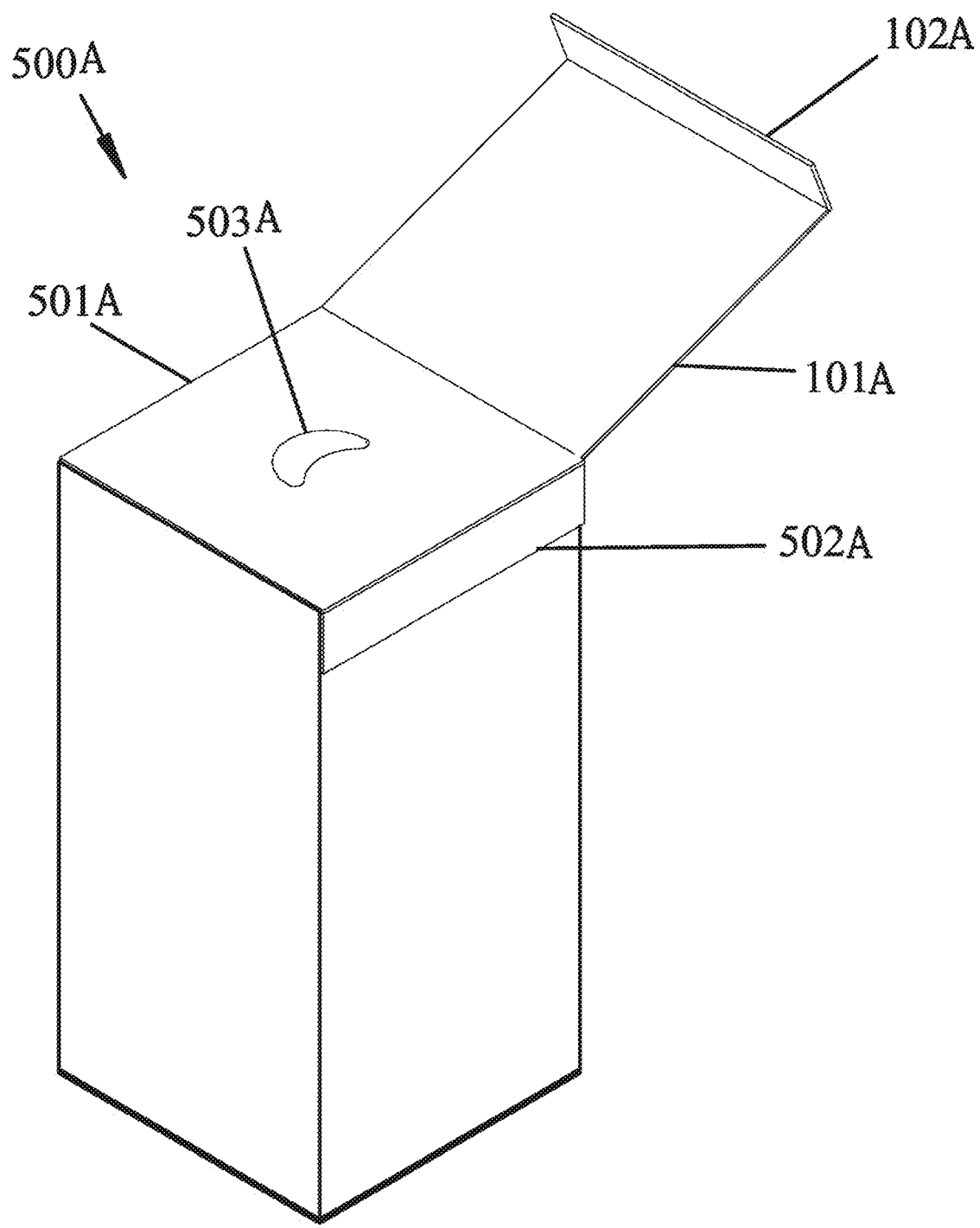
Figure 25C:
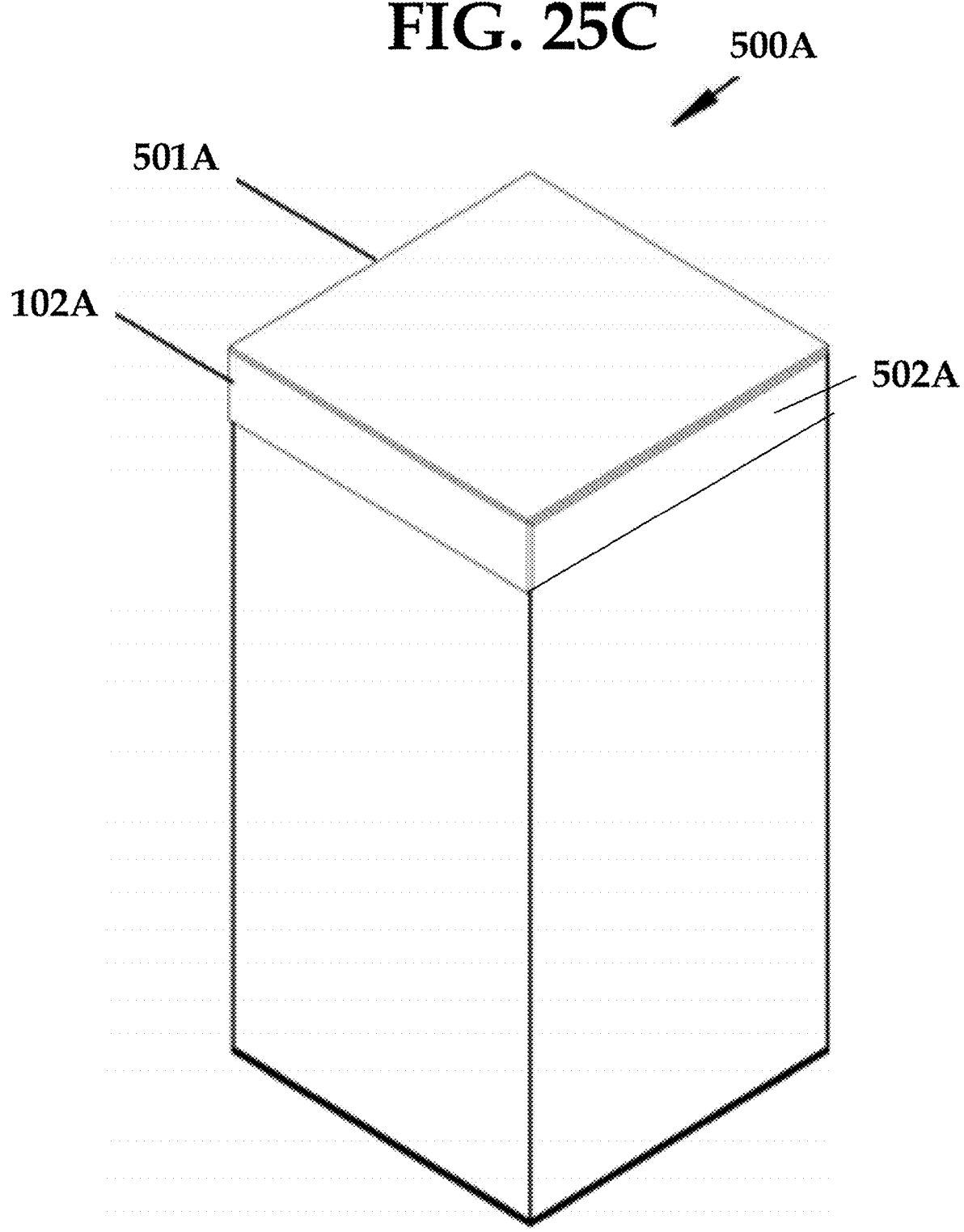

FIGS. 25A-25C show perspective views of an alternative box design with an alternative slit sheet dispensing hole according to some illustrative embodiments. Towards this end, FIG. 25A shows a perspective view of a dispensing box in an open configuration without a roll of expandable slit sheet material therein. In addition, FIG. 25B shows a perspective view of the dispensing box in a use configuration in which a panel having a dispensing opening is positioned over the upper end of the box. In such a position, with a roll of slit sheet material within the box, the slit sheet material can be dispensed and expanded through the opening in the dispensing opening. Furthermore, FIG. 25C shows the dispensing box in a fully closed position in which both of the top panels have been closed. This position is suitable for shipping (e.g., with a roll of slit sheet material contained within the box) and/or storage or the like.

FIGS. 25A-25C shows a variation of design from other embodiments described above, but, overall, the purpose is to create variations to obtain the desired shape of the hole. One skilled within the art can create a multitude of designs to accomplish the required end results based on this disclosure. Thus, there are a variety of ways to provide a desired opening configuration, each of which can produce essentially functionally similar results.

Figure 22:
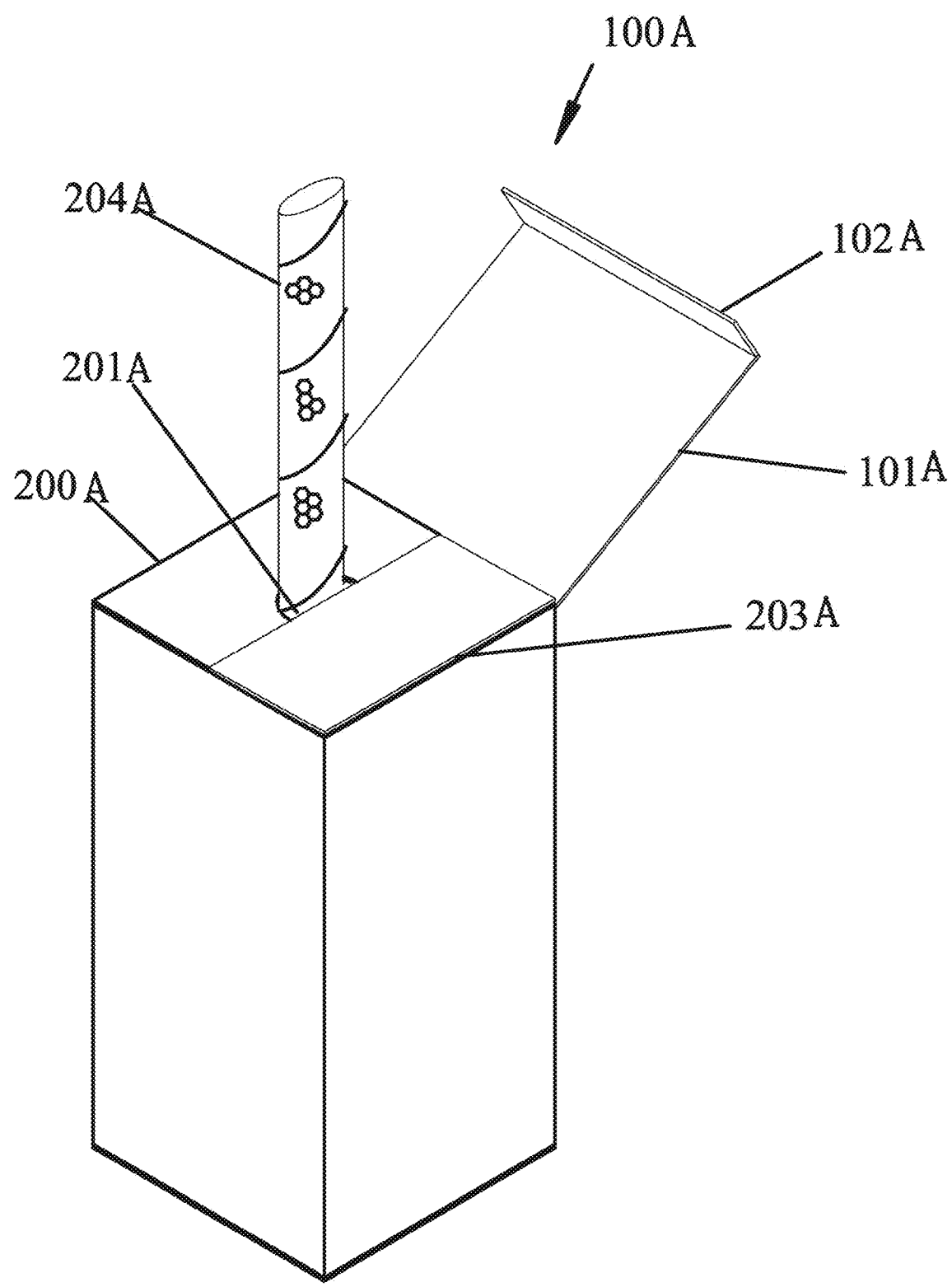
FIG. 22 is a perspective view of the void fill material being expanded and dispensed from the shipping/dispensing box shown in FIG. 21.

The opening as shown in FIG. 22 is in the form of an archway. The archway can be in the form of a semicircle but can be in the range from a semicircle, plus/minus 25%. Preferably the archway can be in range from a semicircle, plus/minus 15%, and more preferably the range can be a semicircle, plus/minus 5%. As employed herein, the term "semicircle" is inclusive of a half of circle, plus/minus 25% and thus encompasses the term "partial-circle."

The opening can have other than a straight line in combination with a curved section as shown by example in FIG. 25B, 503A (e.g., in which a substantially smile-shaped configuration is shown). The perimeter of the opening can have a semi-circular segment in combination with an inner curved section where the length of the perimeter of the semi-circular segment is greater than the length of the perimeter of the curved section. The length of the inner curved section 503aA can be in the range from 10% to 50% of the length of the semicircular section. The semi-circular opening can be in the form of shape of a crescent, tapering to rounded edges at the ends. The semi-circular opening shapes are inclusive of a half-moon, sickle-shape, arc, curve, bow, the letter "D", and an arch. The crescent shape is preferable because the inner curved section applies a resistance to the drawing of the slit material and facilitates the opening of the cells without tearing the slit sheet material."

It should be appreciated that the dispensing box could be designed with varying top panels and or varying designs to provide the same effect of a semi-circle pattern as can be done with one skilled in the art of box design. In the most preferred embodiments, as shown, feeding of the slit sheet material comes from the center of the roll of slit sheet material 300A as shown in FIG. 23 and feeds directly out of a dispensing box through a semi-circular hole.

Further Discussion of the Figures

Figure 21:
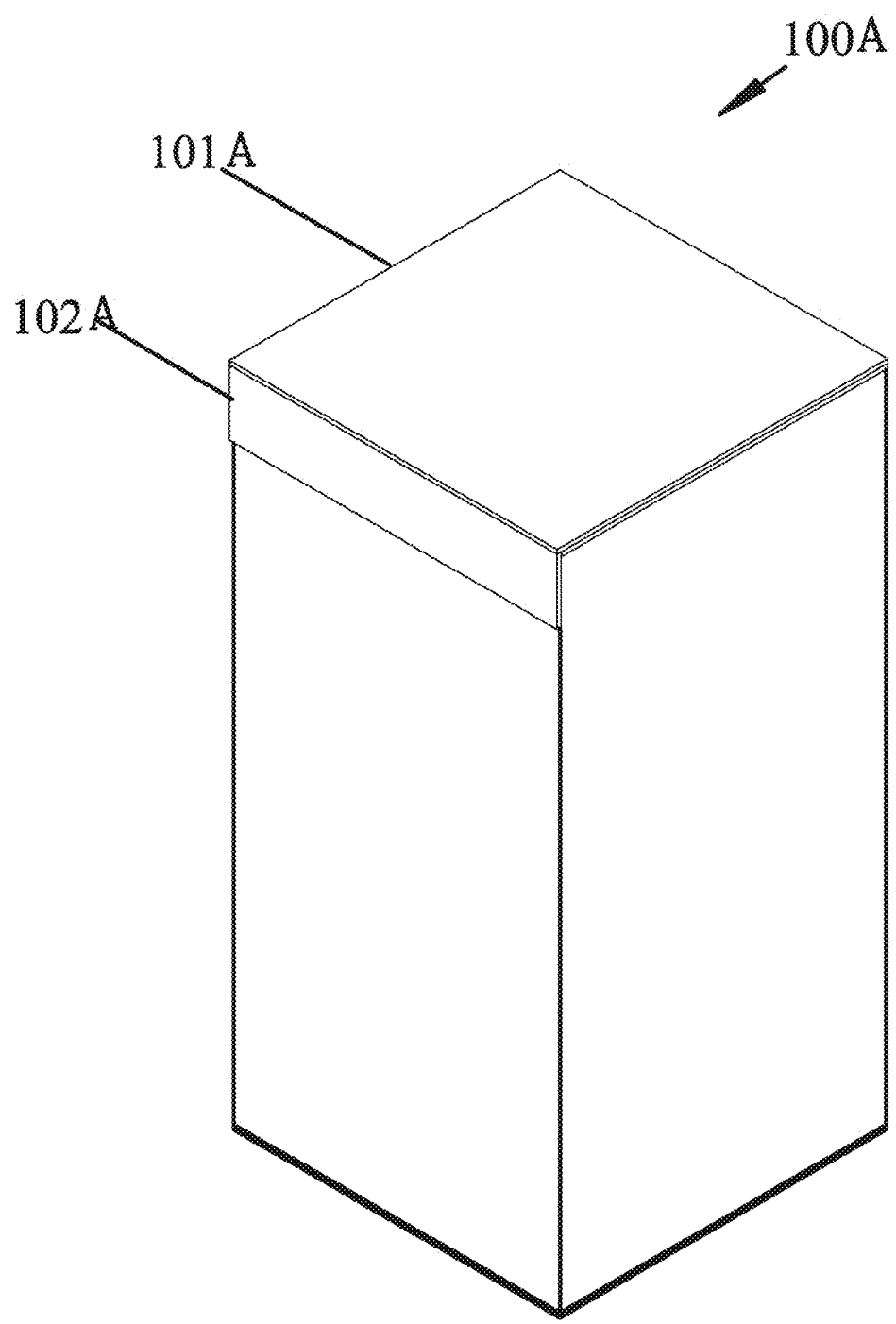
FIG. 21 is a perspective view of closed carton of unexpanded slit sheet material ready to be shipped according to another embodiment.

FIG. 21 is a perspective view of the dispensing box 100A where securing panel 101A is folded over the top section of the box and connected subpanel 102A is folded over the side of the box for secure shipping.

FIG. 22 is a perspective view of the dispensing box 100A with securing panel 101A and subpanel 102A is folded away to enable dispensing of the slit sheet material 204A through semi-circular hole 201A of horizontal panel 200A that is kept in place using horizontal panel 203A.

FIG. 23 is a perspective view of the dispensing box 100A with all panels in the open position for loading of the slit sheet material 300A. Semi-circle opening 201A is easily visible within panel 200A. Panel 203A is easily visible as square. Securing subpanel 102A is attached securing panel 101A.

Figure 24:
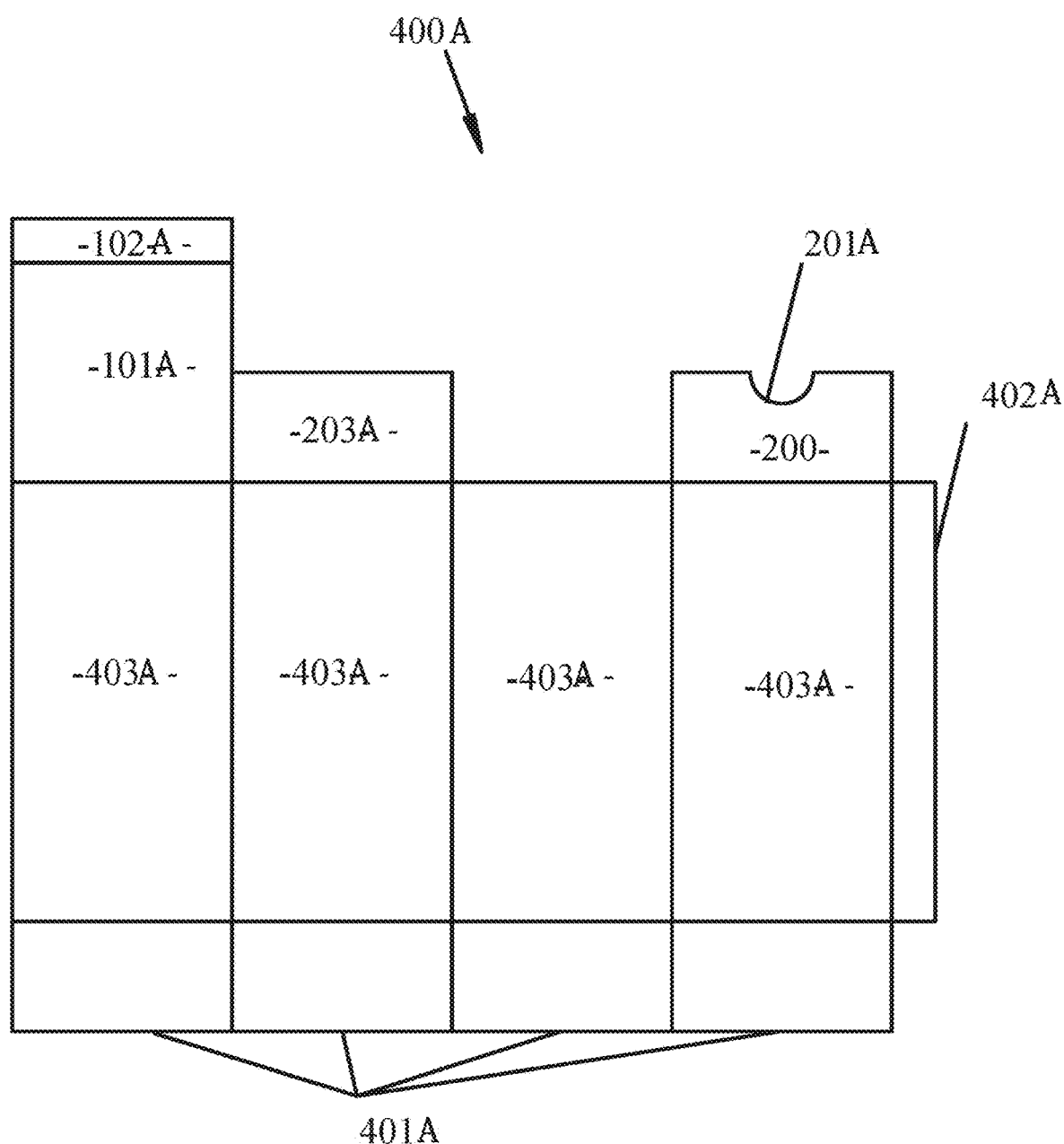
FIG. 24 is a planar view of the cutting die pattern of the box manufacturing process for forming a box as shown in FIG. 21.

FIG. 24 is a planar view of the manufacturing die that will create the dispensing box 400A. Bottom panels 401A make up the foldable panels that make up the bottom of the box. Identical sidewall panels 403A create the four sides of the dispensing box and is adhesively secured, as found typically within the art of corrugated box making, with panel 402A on the first sidewall panel 403A. Securing panel 101A and subpanel 102A make up the top of the box. Panel 203A is the opposing panel to panel 200A that has semi-circular hole 201A that allows the slit sheet material to exit.

FIGS. 25A to 25C show a perspective view of an alternative box design 500A with a dual partial-circle or crescent shaped opening 503A. Panels 501A and subpanel 502A are identical in design to securing panels 101 and subpanel 102A.

c) Embodiments Described in 63/000,390

In accordance with some other embodiments of the invention, an automated slit sheet void fill system is provided.

In particular, in some embodiments, an automated machinery can be employed that dispenses the slit sheet material from the center of a coreless roll.

In accordance with some illustrative embodiments, the void fill dispensing systems described herein can include a roller mechanism to pull and/or push the void fill through the opening of the dispenser.

In some preferred embodiments, an automated dispenser includes two pairs of rollers with one pair being rubber and the other the hook material, such as, for example, hook material sold under the mark Velcro® that can accept the multi-layer spiraling slit sheet material and expand it into its three-dimensional shape as disclosed in U.S. Pat. Nos. 5,688,578 and 5,782,735, the disclosures of which are incorporated herein as if recited in full. In particular, in some embodiments, the pair of rollers having hook material (or other material that would grab the slits of the expandable slit sheet paper) can be further downstream then the rubber rollers and forcefully pull the expandable paper such as to expand the paper being dispensed.

The present inventor has further discovered that the use of a slit sheet expansion system that uses a first pair of rubber rollers and a second pair of hook filament rollers as described in U.S. Pat. No. 5,782,735 successfully stretches the multi-layer spiral wound slit sheet paper as it is fed from the center core of the unexpanded slit sheet roll. The slit sheet paper can, in some preferred embodiments, feed upward in a generally spiraling manner such that the slits leave the core at an approximate 45-degree angle, and travel upward and into the first set of rubber rollers. These rollers firmly grip the material and send it forward to the hook filament rollers. The hook filament rollers turn more quickly than the back (upstream) rubber rollers such as to achieve the expansion of the slit sheet material on a continuous basis. The expanded material passes through the exit hole that allows it to feed outward.

Figure 29:
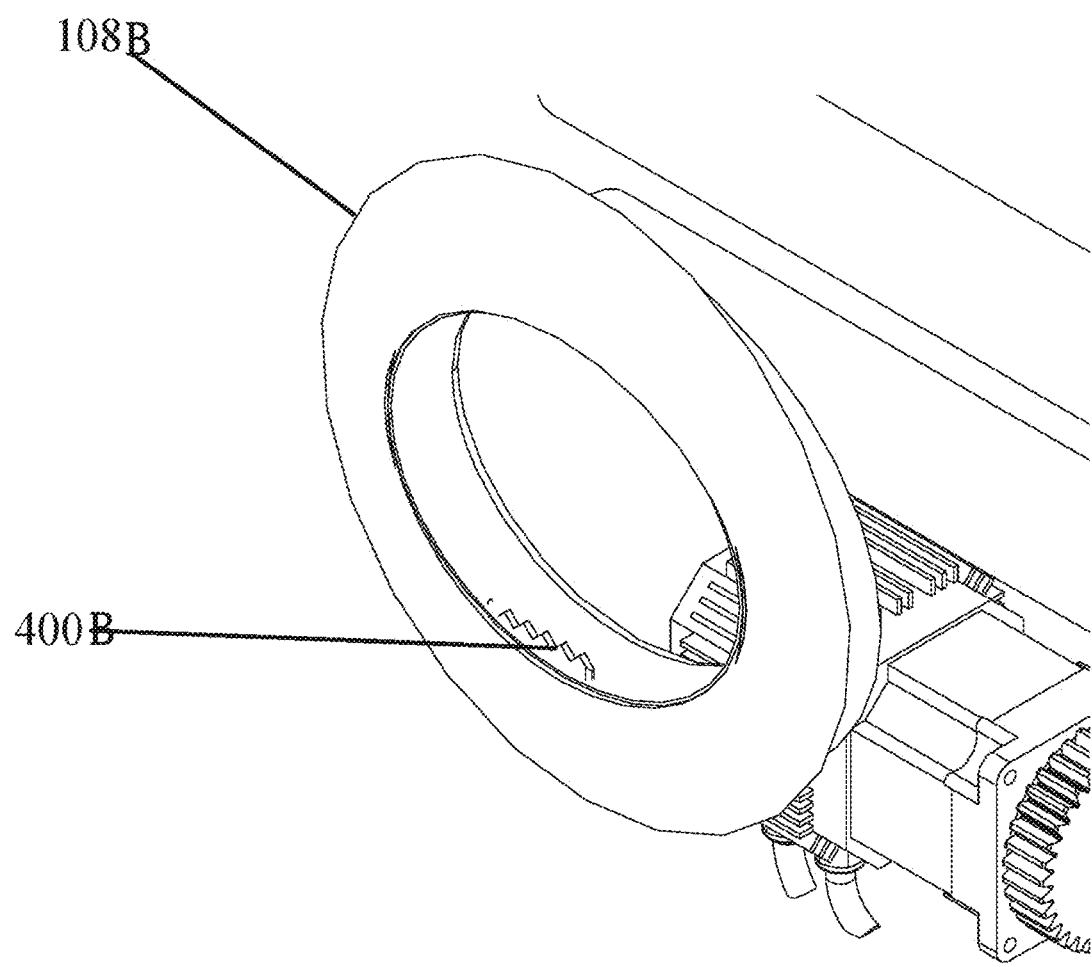
FIG. 29 is an illustrative close-up perspective view of an exit feed including attached serrated edges according to some embodiments.

In some preferred embodiments, when enough material is dispensed for a desired purpose (such as, e.g., to void fill a box or a pack), the operator can cause the serrated teeth to engage the void fill tube being dispensed (such as, e.g., by the operator pulling downward on the expanded slit sheet tube material against the serrated teeth to rip the required length). For reference, an illustrative serrated teeth cutting edge is shown in FIG. 29 at the exit hole 400B. In some alternative embodiments, the cutting of the void fill tube (i.e., expanded slit sheet tube) can be fully automated, such as, e.g., by employing an automated solenoid-reciprocated cutting blade or the like.

Figure 26:
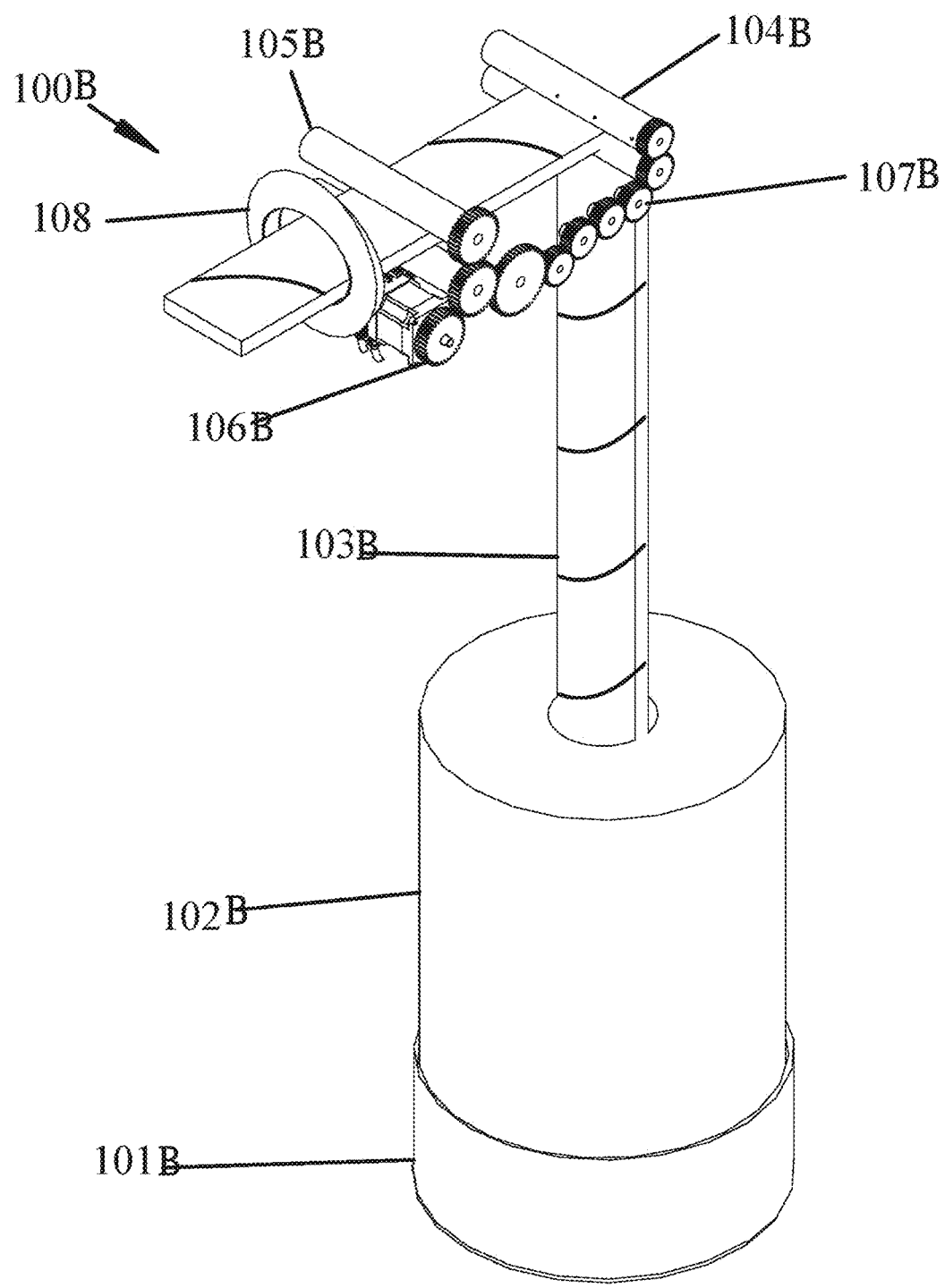
FIG. 26 is a perspective view of a first illustrative automated dispenser embodiment employing a combination of rubber rollers and hook filament rollers.
Figure 27:
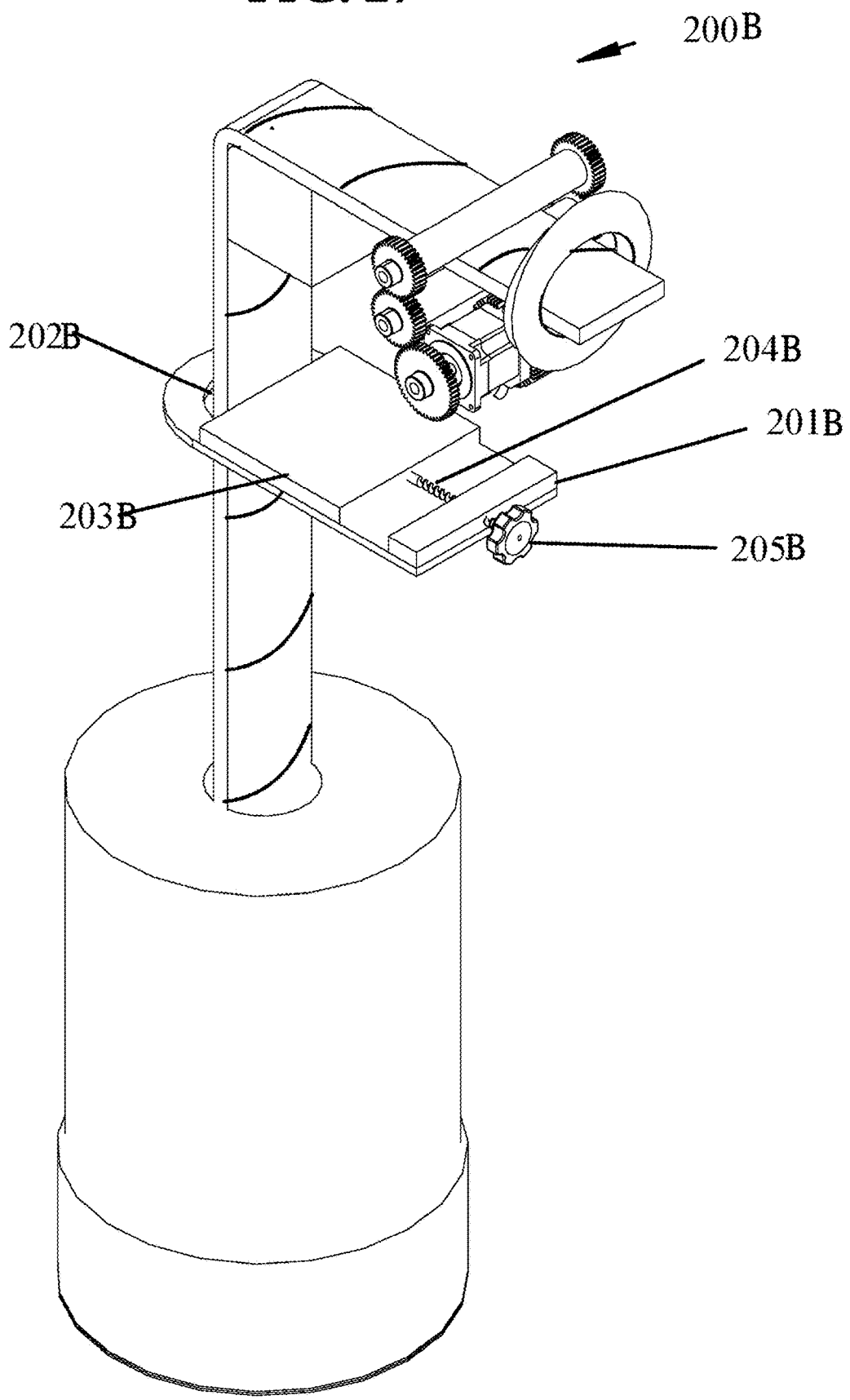
FIG. 27 is a perspective view of a second illustrative automated dispenser embodiment utilizing an illustrative semi-circular opening in combination with the illustrative hook filament rollers.

As shown in the example depicted in FIG. 26, in some embodiments, the stretching can be done in a horizontal direction to save space in areas where overhead space is plentiful. As shown in FIG. 27, in some other embodiments, the stretching can be done in the vertical direction where adjacent space is available, but where overhead space is limited. In either configuration, in some embodiments, the ejection of the material through the exit hole and cutting with the serrated teeth can be implemented in a similar manner.

In some embodiments, as shown in FIG. 27, a semi-circle shaped adjustable restriction area adjuster 201B can be employed to impart a desirable degree of restriction to enable expansion. The shape of the restriction area 202B of the adjuster 201B can be similar to that described herein in relation to other embodiments described herein, such as to advantageously provide the tension to expand the slit sheet material completely while simultaneously increasing the feeding speed without the fear of ripping the material prematurely. Similarly, the adjustable restriction area adjuster 201B shown in FIG. 27 can be employed within other dispensing devices described in this application. As also shown in FIG. 27, in this illustrative example, the shape of the opening is preferably adjustable by rotation of a knob 205B that causes rotation of a screw 204B that laterally moves the panel 203B such as to enable the size of the restriction area 202B to be modified.

The semi-circle can be adjusted dependent upon the slit pattern used. This adjustment varies the tension and ease of feed necessary to dispense well.

Further Discussion of the Figures

FIG. 26 is a perspective view of the dispensing system 100B with paper holder 101B supporting the slit sheet roll 102B with slit sheet spiral 103B spiraling upward to motor driven rubber rollers 104B feeding the slit sheet spiral 103B through to hook filament rolls 105B while being powered by electric motor 106B transferring the motion with multiple gears 107B. The stretched slit sheet spiral 103B then exits through exit hole 108B.

FIG. 27 is a perspective view of the alternative dispensing system 200B that uses adjustable restriction adjuster assembly 201B that applies pressure to the spiral wrap 103B as it passes through restriction area 202B. As indicated above, the restriction area 202B is adjustable using sliding block or panel 203B by turning thumbscrew or knob 205 clockwise (or counterclockwise) that drives threaded shaft or screw 204B and sliding block 203 into restriction area 202B and counterclockwise (or clockwise) to reverse direction of the block 203B.

Figure 28:
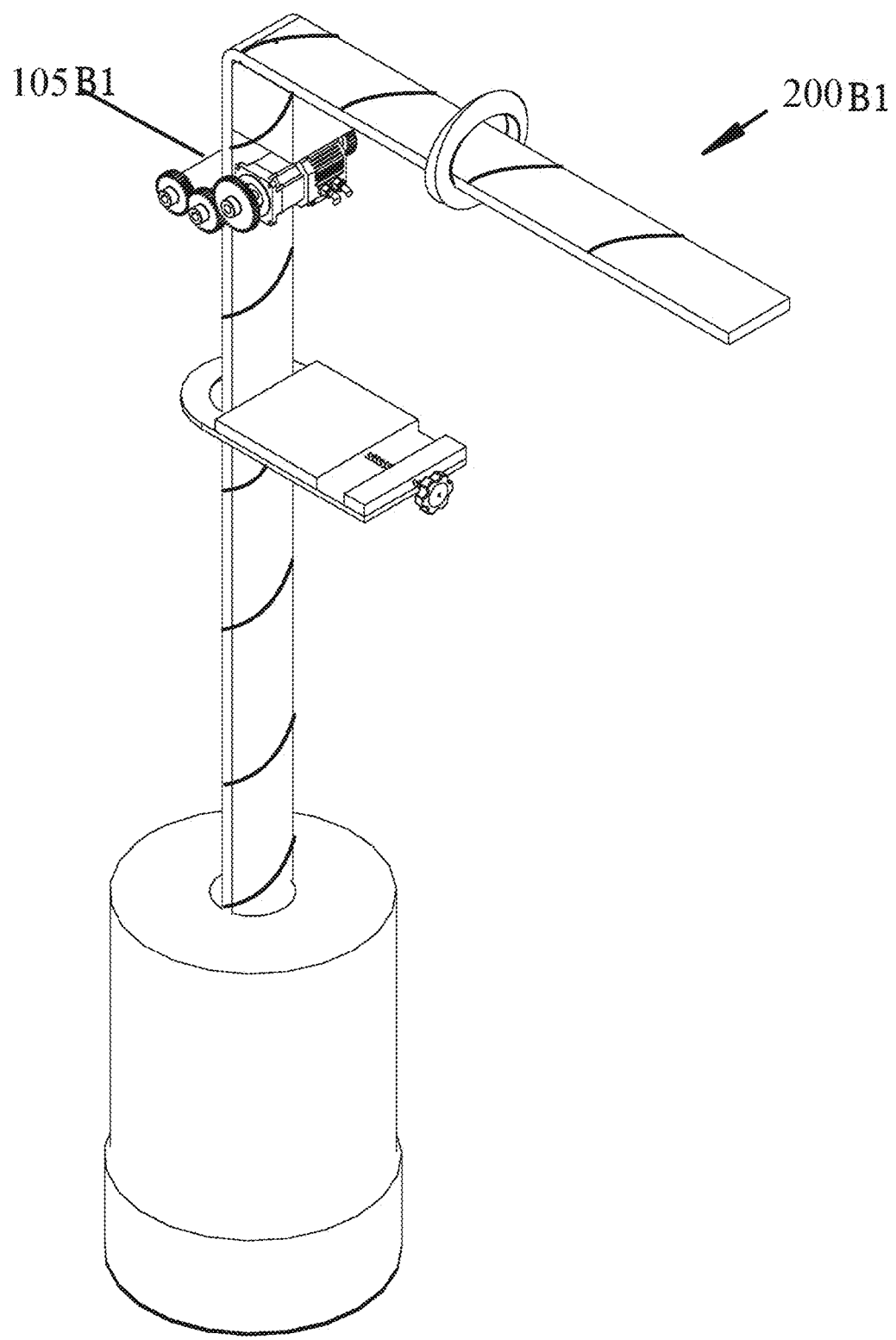
FIG. 28 is a perspective view of a modification of the second illustrative automated dispenser embodiment in which the stretching area is changed to the vertical.

FIG. 28 is a perspective view of the alternative design of the alternative dispensing system 200B where hook filament assembly 105B is moved into a vertical position along spiral slit sheet 103B.

FIG. 29 is a perspective view of an illustrative exit hole 108B that shows serrated teeth 400 according to some illustrative embodiments.

d) Embodiments Described in 63/020,016

According to some embodiments, void fill dispensing systems and methods described in any of the embodiments and implementations described herein can employing coreless expandable slit sheet rolls according to some of the preferred embodiments of the present invention. In particular, in order to remove the expandable slit sheet paper from an interior of the roll, the interior of the roll of expandable slit sheet paper should be free of obstruction. However, for handling and/or transporting of rolls of slit sheet expandable paper, it is advantageous to supply an interior core for structural rigidity and support of the roll.

In some implementations, aspects of the preferred embodiments described in this section related to the use of removable cores can be implemented within systems and methods according to any other embodiments described herein.

Figure 30:
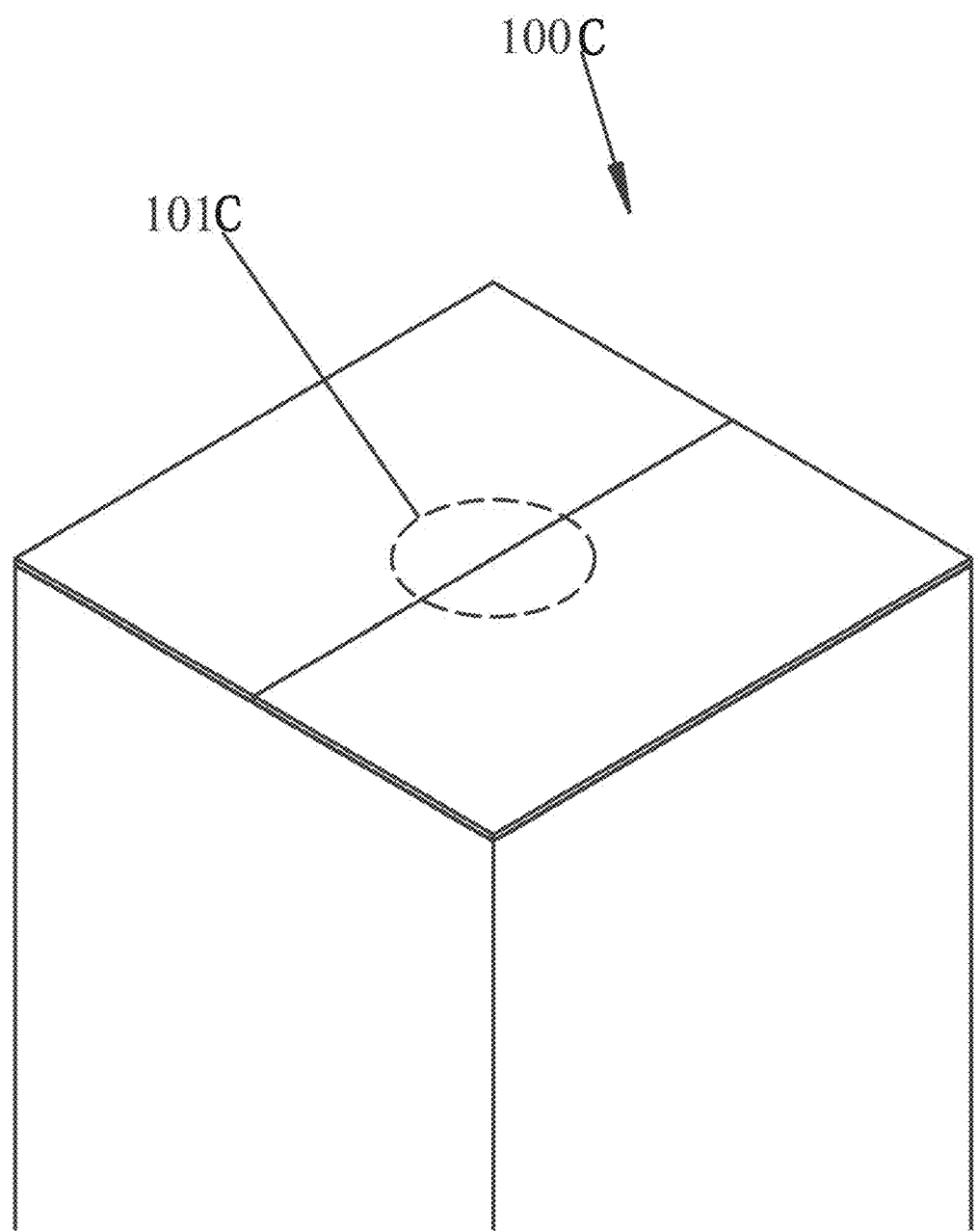
FIG. 30 is a top perspective view of an illustrative dispensing box according to some embodiments including a removable core.

With respect to FIG. 30, this figure shows a top perspective view of an illustrative dispensing box 1000 according to some embodiments. In some embodiments, the dispensing box 1000 can be similar to any of the dispensing boxes described in other embodiments herein. In some preferred embodiments, the dispensing box is made of materials similar to that of the dispensing boxes described herein. By way of example, the materials of the dispensing box can be paper, cardboard, corrugated paper board and/or other paper materials. Preferably, the material of the dispensing box is made with a recyclable material, most preferably, with a recyclable paper material.

As shown in FIG. 30, in some preferred embodiments, an end face of the dispensing box 1000 includes a perforated region 101C. In the preferred embodiments, the perforated region is configured to remain in place during initial use and transport of the box, and then, at a later date, the perforated portion preferably enables a region of the end face of the corrugated box to be removed or opened such as to enable the core 2000 to be pulled or pushed through an opening in the end face of the dispensing box caused by opening or removing of a section of the end face of the box that is surrounded by the perforated region 101C. In some preferred embodiments, the perforated region 101C forms a completely enclosed shape (such as, e.g., a circular shape or other desired shape that is sufficient to allow passing of the core through the end face of the box), whereby the completely enclosed shape upon application of a force along the perforations of the perforated region will cause an entire element within the confines of the perforated region to be removed. Alternatively, the perforated region can be nonfully enclosing such that the interior region can be simply pivoted outwardly to allow the core to pass through the end face of the box 100C.

Figure 31:
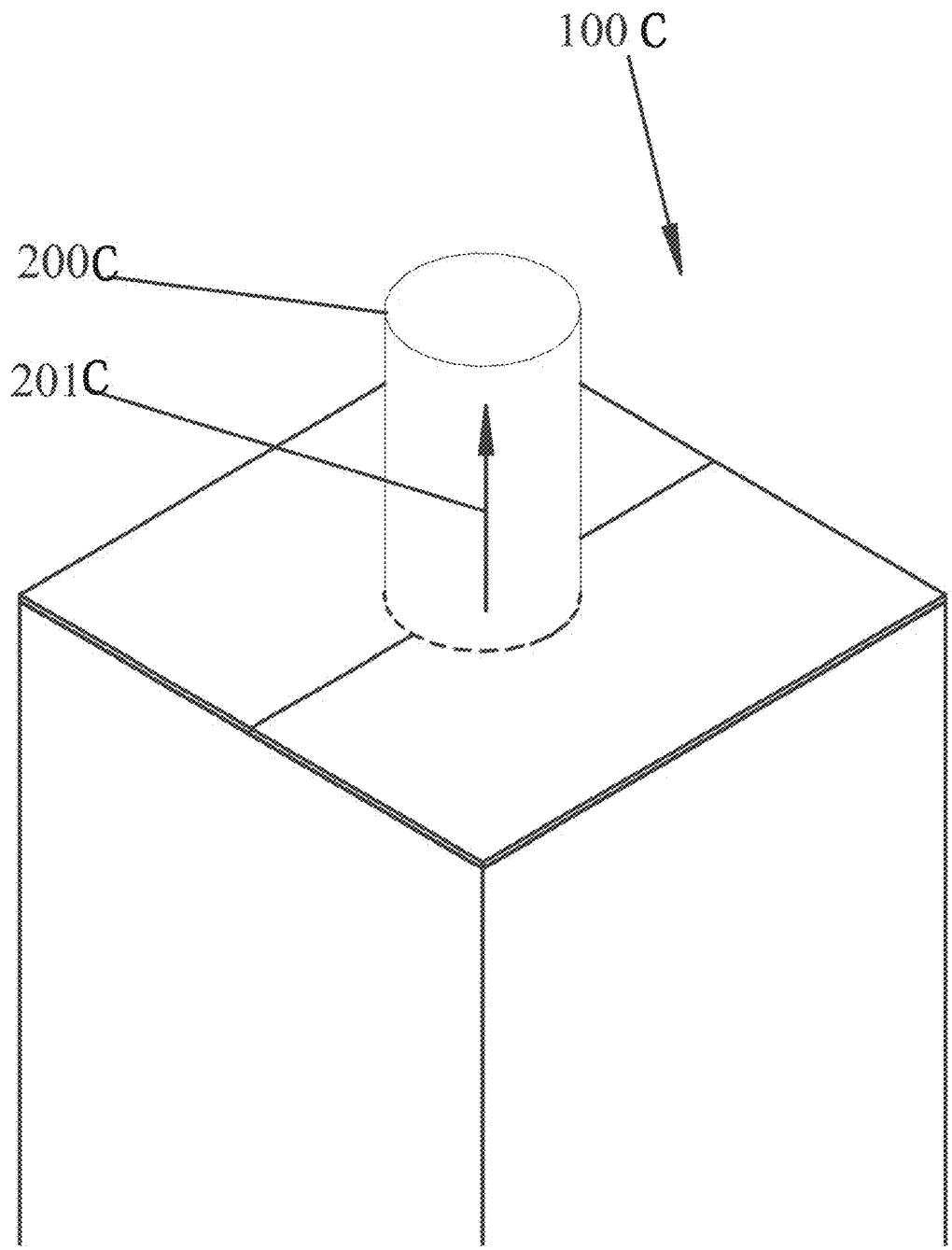
FIG. 31 is a top perspective view similar of the embodiment shown in FIG. 30 showing a state of usage in which an interior core is being removed through the end face of the box.

With respect to FIG. 31, in this figure, a state of usage is illustrated in which the interior core 2000 is being removed through the end face of the box 1000, by being pulled or pushed along the direction of the arrow 201C (e.g., in a direction along the axis of the core 2000). In the state shown in FIG. 31, it should be appreciated that the perforated region 101C of the end face would have already been opened (e.g., fully removed or pivoted outwardly) to allow the core 2000 to be removed from the box 100C.

Figure 32:
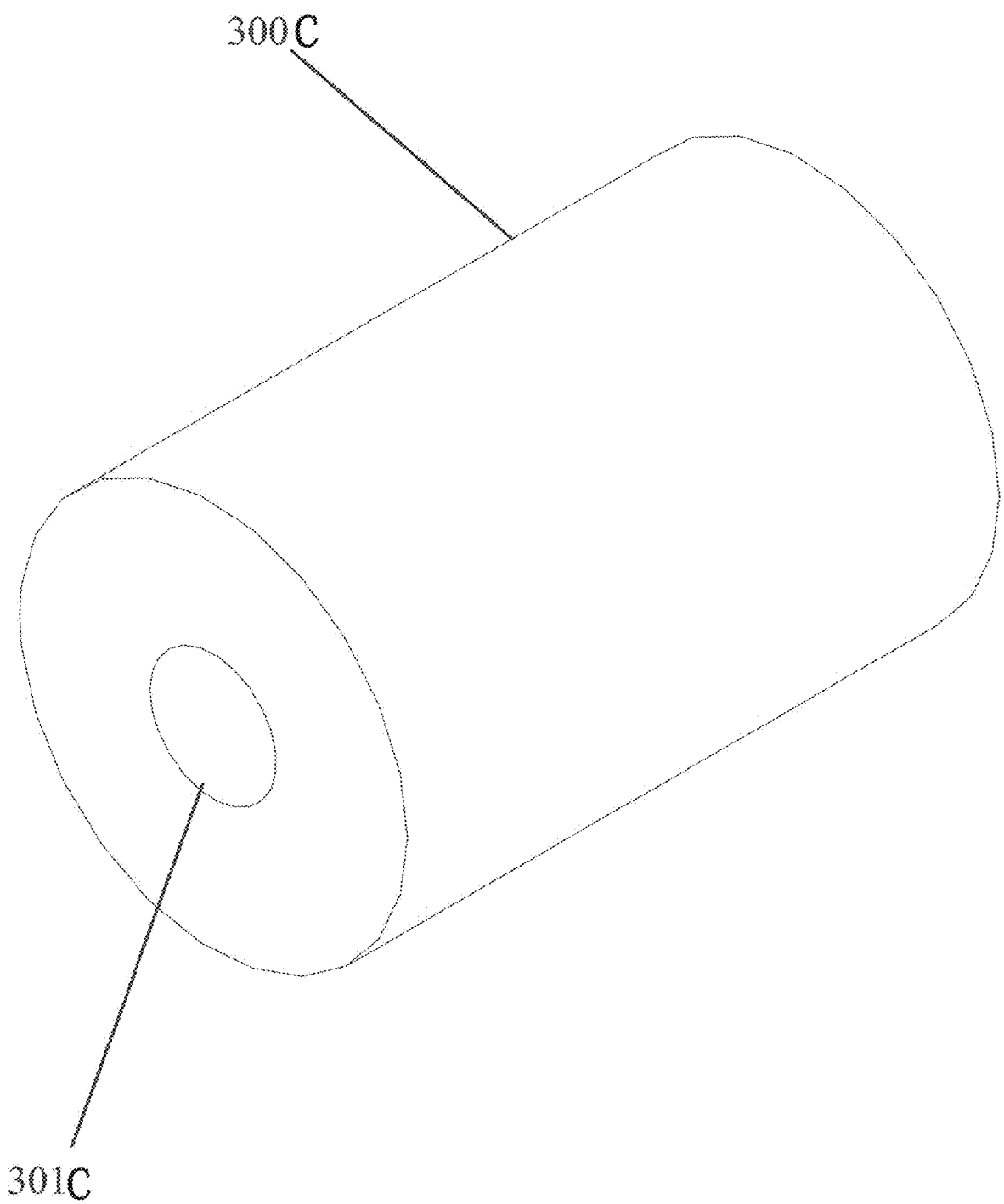
FIG. 32 is an explanatory perspective view of a paper roll employed within the embodiment of FIG. 31 without a central core.

With respect to FIG. 32, FIG. 32 is an explanatory perspective view of a paper roll 3000 without a central core 2000, such that the paper roll 3000 has an internal open center conduit 301C delineated by the innermost layer of paper within the roll 3000. In preferred embodiments, during use, the paper roll 3000 would be a roll of slit sheet expandable paper that is contained inside the box 1000. Accordingly, in some preferred embodiments, a dispensing box 1000 would have a roll 3000 contained therein, along with a core 2000 extending within the center conduit 301C of the roll. In some preferred embodiments, the product could be shipped in this state, and, then, prior to usage (i.e., prior to usage as a dispensing of void fill material similar to embodiments described herein), a user can remove or open the portion delineated by the perforated region 101C (e.g., which can be a "punched out" region), then the user can slide the core 2000 out of the dispensing device.

Among other things, such a removable core can be advantageous for maintaining the integrity of the paper roll 3000 during shipping and transport.

Figure 33:
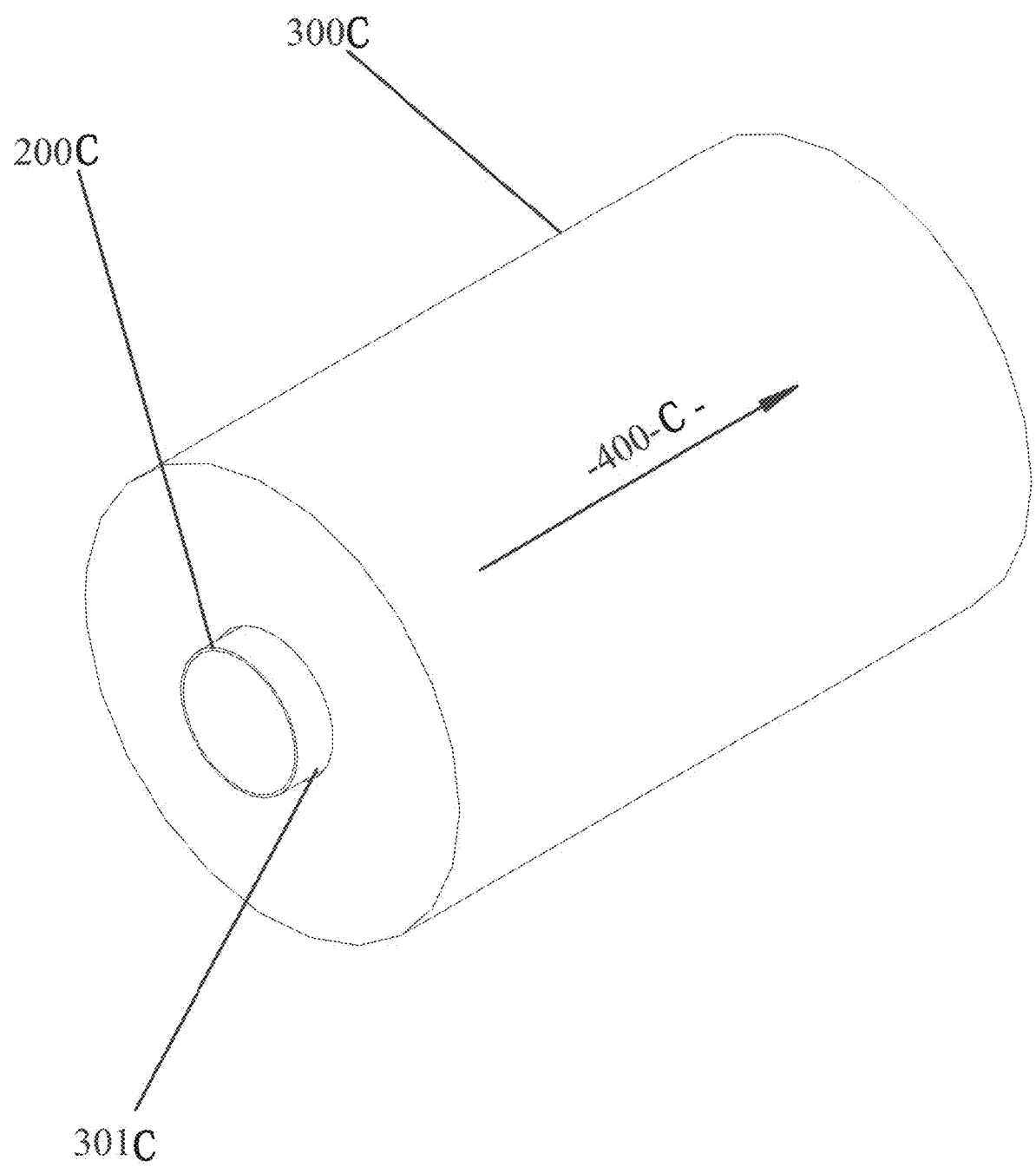
FIG. 33 is another explanatory perspective view of a paper roll employed within the embodiment of FIG. 31, which, however, shows a central core in a partially withdrawn state.

With respect to FIG. 33, FIG. 33 is another explanatory perspective view of a paper roll 3000, which, however, shows a central core 2000 in a partially withdrawn state from the internal open center conduit 301C delineated by the innermost layer of paper within the roll 3000. As with FIG. 32, FIG. 33 shows the roll 3000 without the presence of the exterior box for explanatory purposes. However, in the preferred embodiments, the roll would be contained within such a dispensing box 1000 during use, and the core 2000 would be removed via the opening in the end of the box as described above.

As illustrated by the direction of the arrow 4000 shown in FIG. 33, in the preferred embodiments, while the core 2000 is pulled or pushed from the core in the leftward direction shown in FIG. 33, in use of the dispenser (i.e., which contained within the dispensing box 1000), the expandable slit sheet paper is removed or extended in an opposite direction to the direction of the core, which opposite direction is designated by the arrow 4000 shown in FIG. 33.

Thus, in the preferred embodiments, after removal of the perforated region portion, the core 2000 can be pushed or pulled axially in a first direction for removal from the dispensing box. Then, the expandable slit sheet paper can be dispensed from the dispenser device in an opposite direction to the direction of the removal of the core.

Although the preferred embodiments include a perforated region 101C to enable the core 2000 to be readily removed after shipping, in other embodiments a variety of other structures could be employed to allow removal of the core 2000. For example, in some embodiments, an end face panel of the box can simply be pivoted open to allow the core to be removed. Alternatively, in some embodiments another removable connection mechanism (i.e., rather than perforations) can be employed, such as, e.g., employing a removable cover that is glued, stitched, clipped and/or otherwise mechanically or chemically openably or removably coupled to the box.

Although not shown in FIGS. 30-33, it should be understood that as with other embodiments described herein, the dispensing box 1000 would also include a similar dispensing opening (i.e., similar to that described in relation to other embodiments herein to effect dispensing) on a side of the dispensing box opposite to the perforated region 101C shown in FIG. 30. Moreover, it should be appreciated that any of the shapes and configurations of the dispensing openings as described in any of the embodiments described herein can be employed in illustrative embodiments, including, but not limited to the use of a semi-circle exit feed or crescent shaped exit feed, such as, e.g., to provide tension to expand the slit sheet material during dispensing.

Although the preferred embodiments discussed above include a core 2000 that is removed from the dispenser box 1000 by being axially drawn in a direction (e.g., direction 201C shown in FIG. 31) which is opposite to the axial direction 4000 shown in FIG. 33, in some alternative embodiments, the core 2000 could be removed in the same axial direction that the expandable slit sheet material is removed from the dispensing box. For example, in some embodiments, the core 2000 could consist of a plurality of lengthwise core segments that can be individually removed through the dispensing opening. For example, in some embodiments, the core 2000 can include two elongated pieces having half-circle cross-sectional shapes that are fitted together within the interior of the roll 3000 to form a dual-piece core 2000. In some embodiments, the core could even consist of three or more separable pieces.

According to the preferred embodiments, a dispensing system employing a removable core can advantageously provide substantial benefits facilitating handling, transport or shipping of the dispensing device. Notably, as described above, in some preferred embodiments, an internal core 2000 can be mounted within the dispensing system and included within the original product. Then, the original product, with the internal core 2000 can be readily shipped or otherwise handled, and, upon reaching or being located at a dispensing location, the core 2000 can be readily removed and the device can be conveniently used to dispense void fill material in accordance with various embodiments as described herein above.

Moreover, in some preferred embodiments, the core 2000 would be removed prior to use and then discarded. However, in some embodiments, if the device is later desired to be stored, transported or otherwise manipulated, the core 2000 could potentially be replaced within the center conduit of the paper roll for ease in transport, handling and/or the like.

In the preferred embodiments, the paper roll 3000 is initially manufactured such as to be formed without an internal core. Then, upon fabrication of the dispensing system, the paper core 2000 is preferably inserted within the interior of the paper roll 3000. In the preferred embodiments, the paper core 2000 has an axial length that is the same or approximately the same as the axial width of the paper roll 300. However, in some embodiments, the paper core 2000 can have an axial length that is slightly greater than the axial length of the paper roll 3000, such that the paper core extends slightly beyond the edge of the paper roll 3000 to facilitate manual grasping of the paper core 2000 for removal by pulling in the direction of the arrow 201C shown in FIG. 31. Moreover, in the preferred embodiments, the core 2000 is made of paper or cardboard such as to be recyclable and/or is made of another recyclable material.

e) Embodiments Described in 63/064,393

FIGS. 34-37 depict additional embodiment of the invention which involves a shipping/dispensing box that includes another novel opening configuration according to some illustrative embodiments.

In fabricating of the embodiment shown in FIGS. 34-37, the shape of the opening can be slightly adjusted dependent upon the slit pattern which varies the tension and ease of feed necessary to dispense well. Alternatively, in some embodiments, the opening can be configured to be adjustable to enable adjustment as desired during use of the device.

Figure 35:
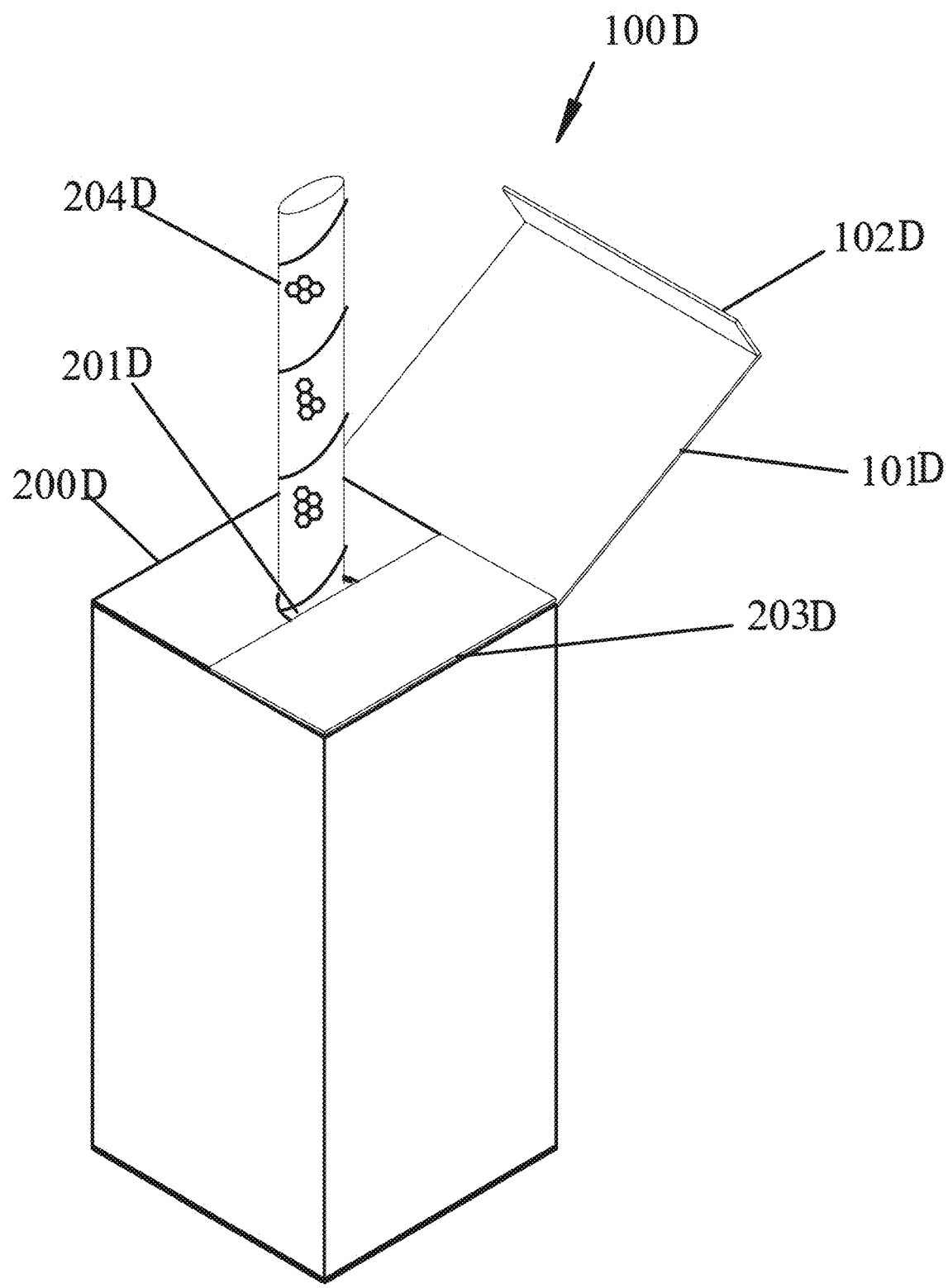
FIG. 35 is a perspective view of the void fill material being expanded and dispensed from the shipping/dispensing box shown in FIG. 34.

As shown in FIG. 35, in this example, the opening 201D has a substantially semi-circle or "D" shape with the opposing flap 203D being square (straight) and, therefore, forcing the expanded slit material 204D material through an irregular shape opening 201D. As described above, the shape of the opening 201D as shown in FIG. 35 falls within the term "semi-lune" which is in the configuration of the letter "D".

By way of an example, in some embodiments, the semi-circle could be made smaller to increase tension or the panel 203D could be adjusted to enable a fuller circular shape (e.g., to enable a larger % of a circular shape). This is very easily accomplished by increasing the length of panel 203D beyond the centerline of the two flaps making it greater in length while panel 200D is reduced in length and therefore reduces the semi-circular hole. Conversely, in some embodiments, panel 203D could be made shorter and panel 200D made longer which would increase the circumference of the circle. Additionally, in some embodiments, the end position of the panel 203D can be made adjustable (such as, e.g., by employing a releasable attachment mechanism, such as, e.g., a hook and loop fastening fabric on the rear of the panel 203D to enable the position to be adjusted adjacent the opening 201D).

Figure 38:
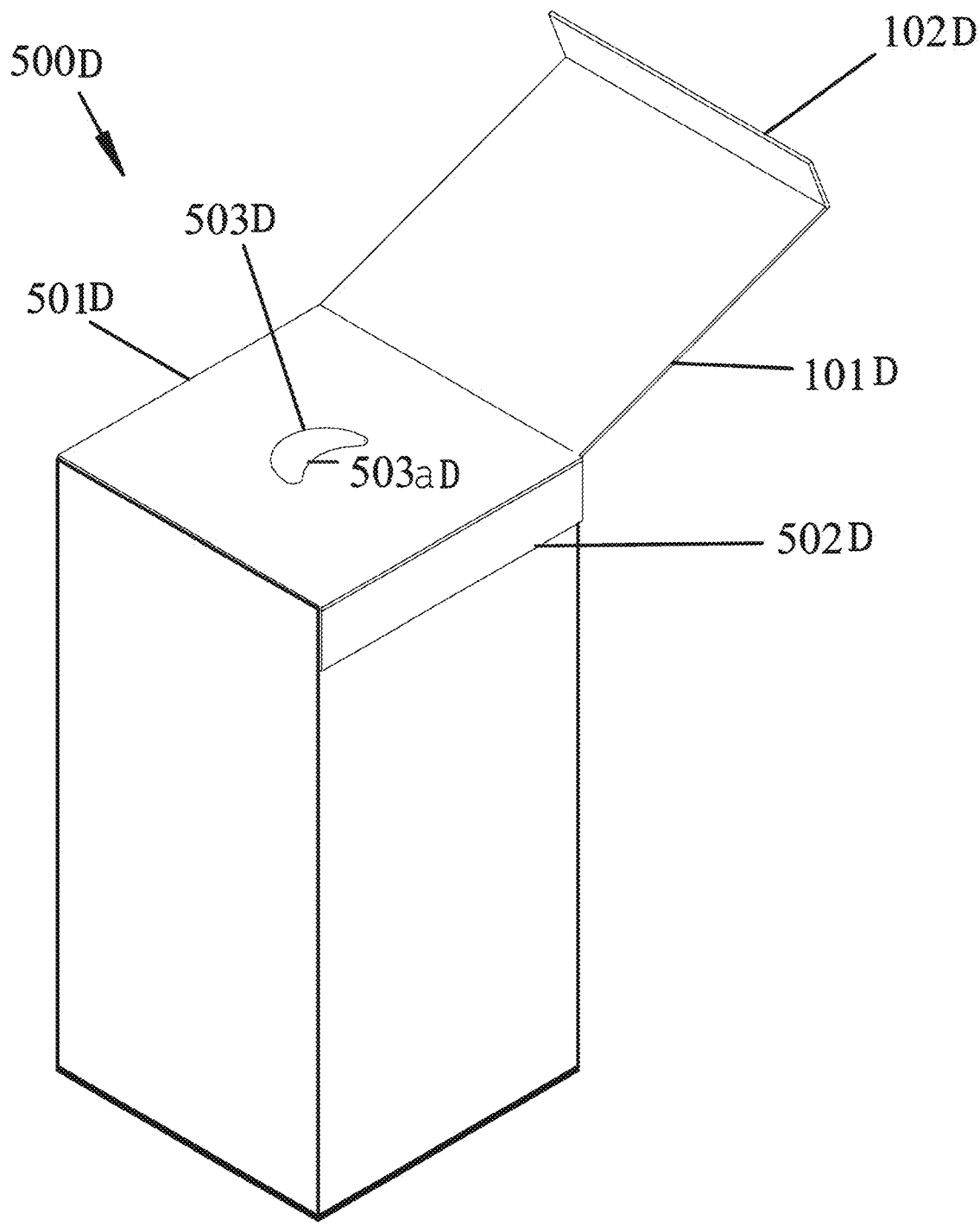
FIG. 38 is a perspective view of an alternative box design with an alternative slit sheet dispensing hole.

FIG. 38 shows a variation of the design shown in FIG. 35, but, overall, the purpose is to create variations to obtain the desired shape of the hole. One skilled within the art can create a multitude of designs to accomplish the required end results. Thus, there are a variety of ways to provide a desired opening configuration, each of which can produce essentially functionally similar results. In some preferred embodiments, a common characteristic of the designs is to provide an opening whose area is less than that of a full circle and, preferably, with a portion of the periphery in the form of an arc or semi-circle which, in combination with the remainder of the periphery of the opening, produces an opening that is less than that of a full circle and serves to facilitate the expansion of the slit paper 300D.

The opening as shown in FIG. 35 is in the form of an archway. The archway can be in the form of a semicircle but can be in the range from a semicircle, plus/minus 25%. Preferably, the archway can be in range from a semicircle, plus/minus 15%, and, more preferably, the range can be a semicircle, plus/minus 5%. As employed herein, the term "semicircle" is inclusive of a half of circle, plus/minus 25% and, thus, encompasses the term "partial-circle". The term "semicircle" also encompasses the term semi-lune as noted above.

Preferably, the opening is a concave figuration formed by the intersection of the arcs of two circles on a plane, or on a sphere the intersection between two great semicircles The opening can have other than a straight line in combination with a curved section as shown by example in FIG. 38, 503aD. The perimeter of the opening can have a semicircular segment in combination with an inner curved section where the length of the perimeter of the semi-circular segment is greater than the length of the perimeter of the curved section. The length of the inner curved section 503aD can be in the range from 10% to 50% of the length of the semicircular section. The semi-circular opening can be in the form of shape of a crescent, tapering to rounded edges at the ends. The semi-circular opening shapes are inclusive of a half-moon, sickle-shape, arc, curve, bow, the letter "D", and an arch. The crescent shape is preferable because the inner curved section applies a resistance to the drawing of the slit material and facilitates the opening of the cells without tearing the slit sheet material.

Figure 36:
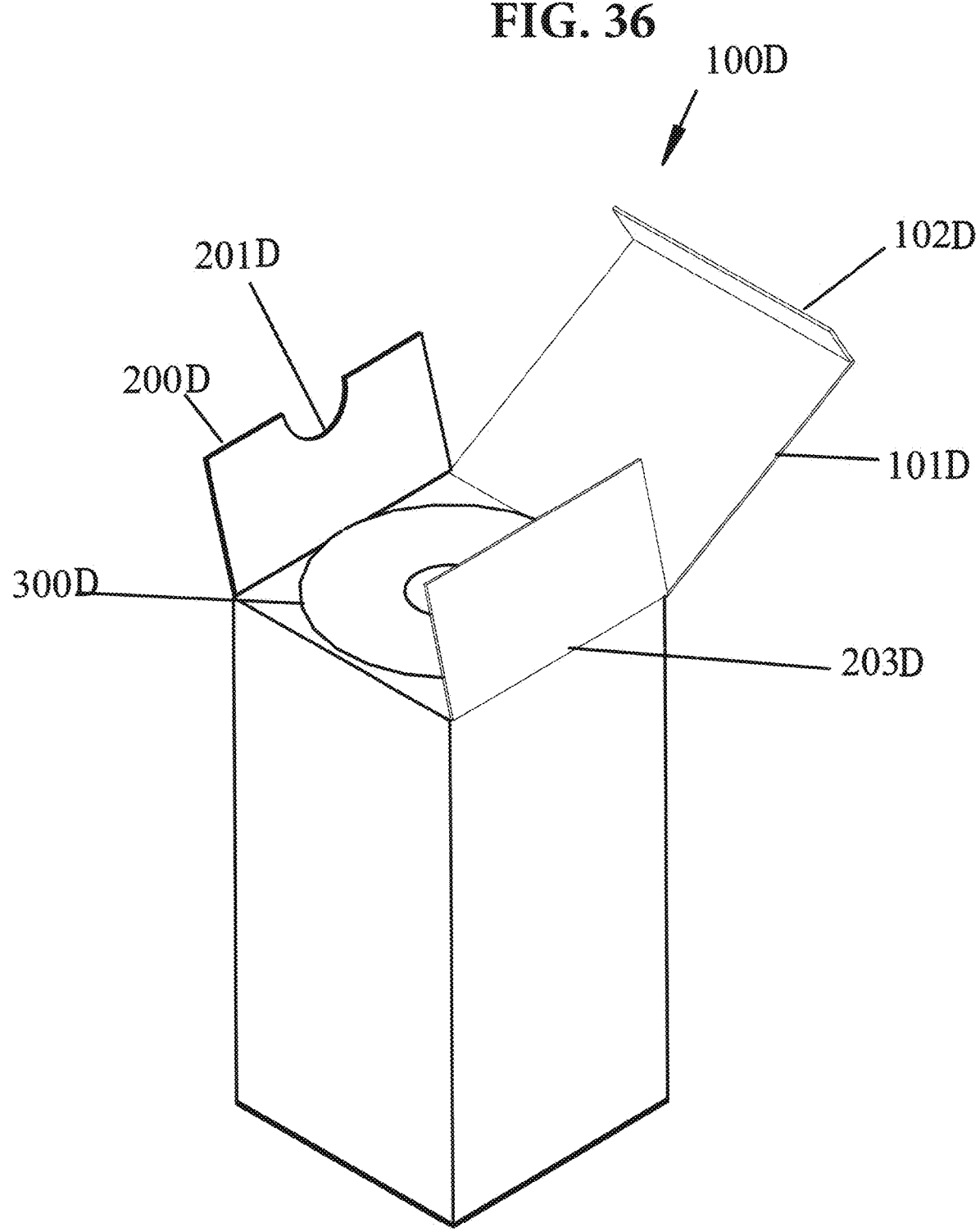
FIG. 36 is a perspective view of the void fill dispenser embodiment shown in FIG. 34 showing a roll of unexpanded slit sheet material with all upper dispensing panels folded outward and away from the box so that the roll can be loaded.

In other embodiments, the dispensing box could be designed with varying top panels and or varying designs to provide the same effect of a semi-circle pattern as can be done with one skilled in the art of box design. Notably, feeding of the slit sheet material comes from the center of the roll of slit sheet material 300D as shown in FIG. 36 and feeds directly out of a dispensing box through a semi-circular hole.

In further embodiments, the opening is in the shape of a concave figure formed by the intersection of the arcs of two circles on a plane.

Further Discussion of the Figures

Figure 34:
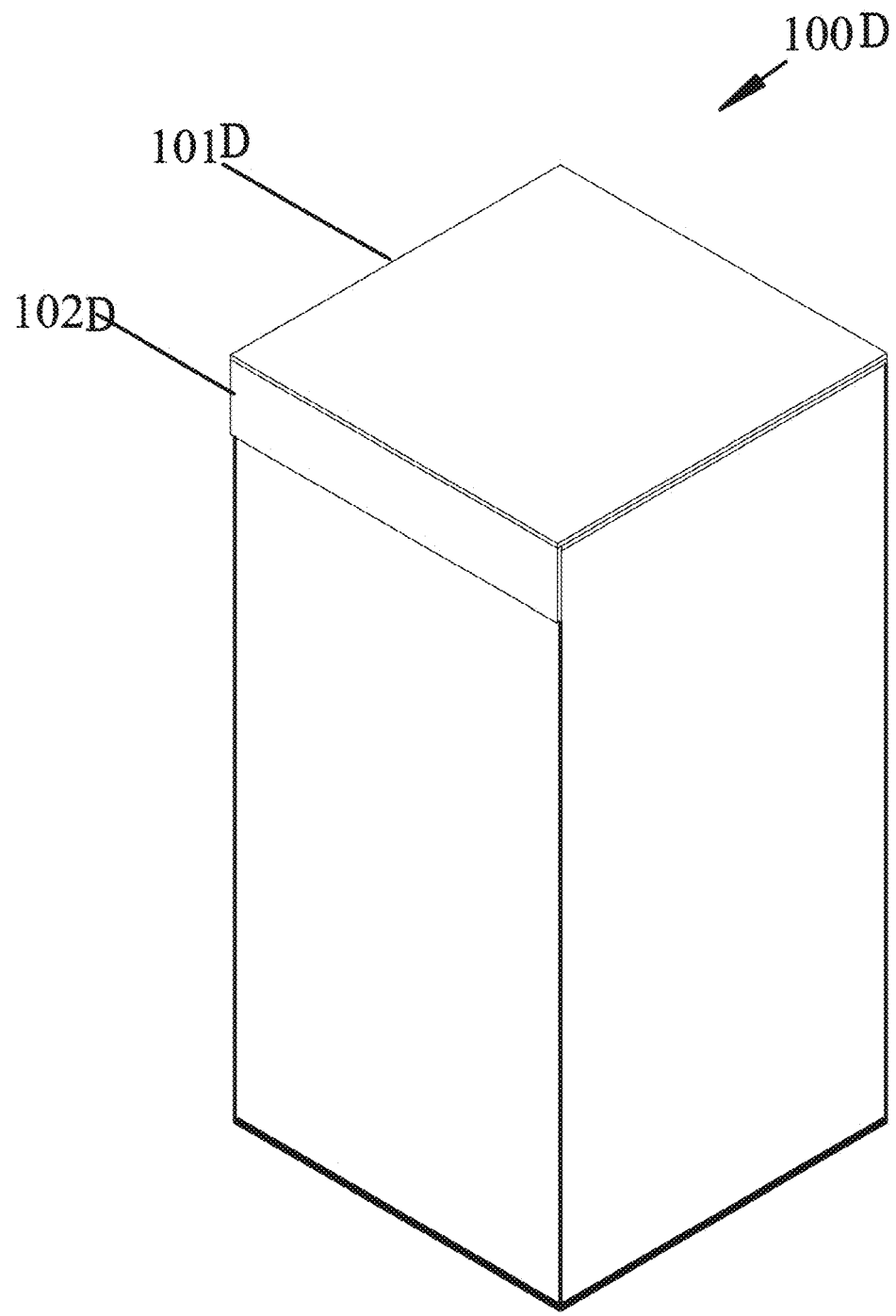
FIG. 34 is a perspective view of another void fill dispenser embodiment employing a shipping/dispensing box depicting a closed state of the box or carton containing unexpanded slit sheet material ready to be shipped.

FIG. 34 is a perspective view of the dispensing box 100D where securing panel 101D is folded over the top section of the box and connected subpanel 102D is folded over the side of the box for secure shipping.

FIG. 35 is a perspective view of the dispensing box 100D with securing panel 101D and subpanel 102D folded away to enable dispensing of the slit sheet material 204D through semi-circular hole 201D of horizontal panel 200D that is kept in place using horizontal panel 203D.

FIG. 36 is a perspective view of the dispensing box 100D with all panels in the open position for loading of the slit sheet material 300D. Semi-circle opening 201D is easily visible within panel 200D. Panel 203D is easily visible as square. Securing subpanel 102D is attached securing panel 101D.

Figure 37:
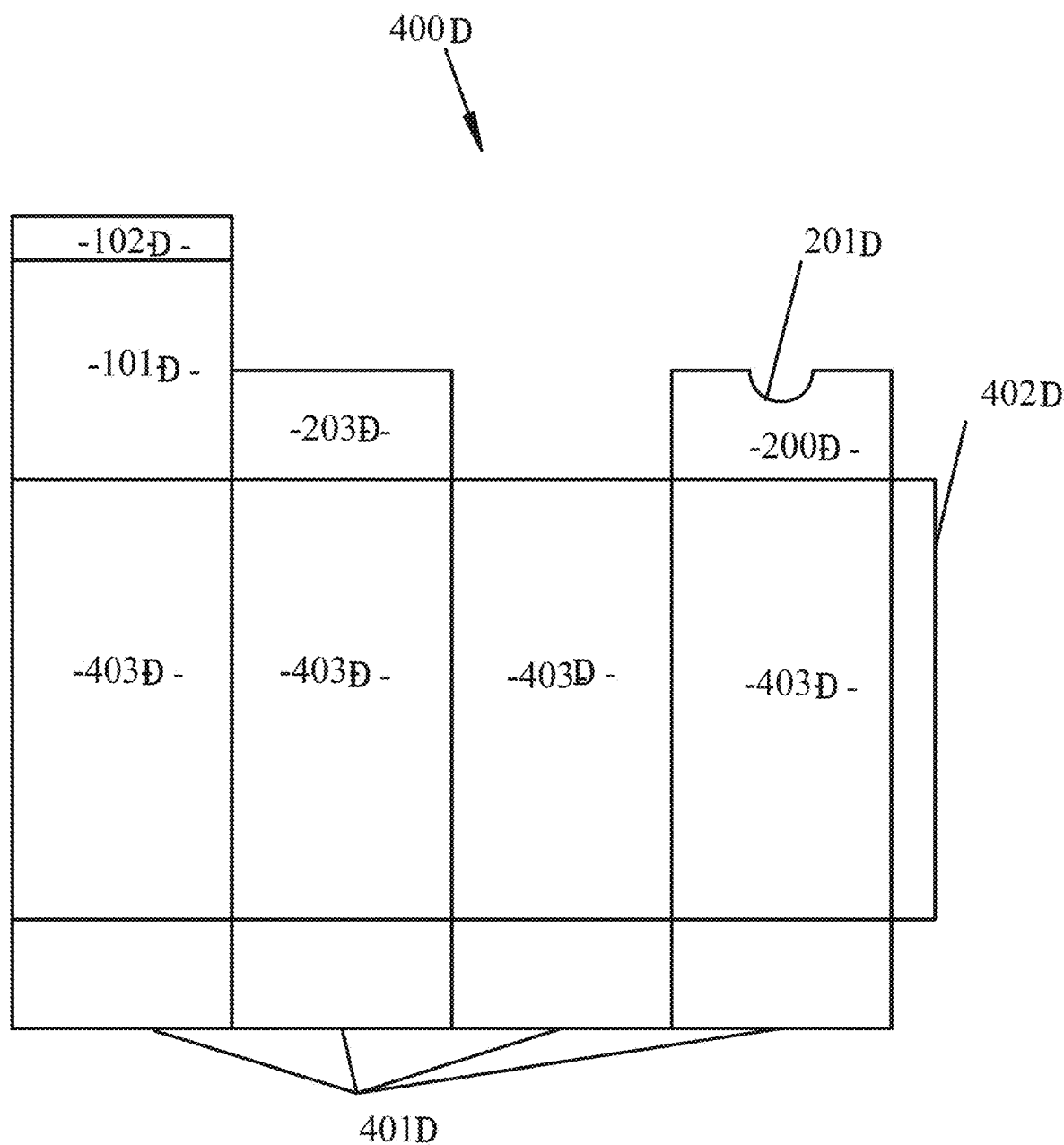
FIG. 37 is a planar view of the cutting die pattern of the box manufacturing process for forming a shipping/dispensing box as shown in FIG. 34.

FIG. 37 is a planar view of the manufacturing die that will create the dispensing box 400D. Bottom panels 401D make up the foldable panels that make up the bottom of the box. Identical sidewall panels 403D create the four sides of the dispensing box and are adhesively secured, as found typically within the art of corrugated box making, with panel 402D on the first sidewall panel 403D. Securing panel 101D and subpanel 102D make up the top of the box. Panel 203D is the opposing panel to panel 200D that has semi-circular hole 201D that allows the slit sheet material to exit.

FIG. 38 is a perspective view of an alternative box design 500D with a dual partial-circle or crescent shaped opening 503D. Panels 501D and subpanel 502D are identical in design to securing panels 101D and subpanel 102D.

Figure 39:
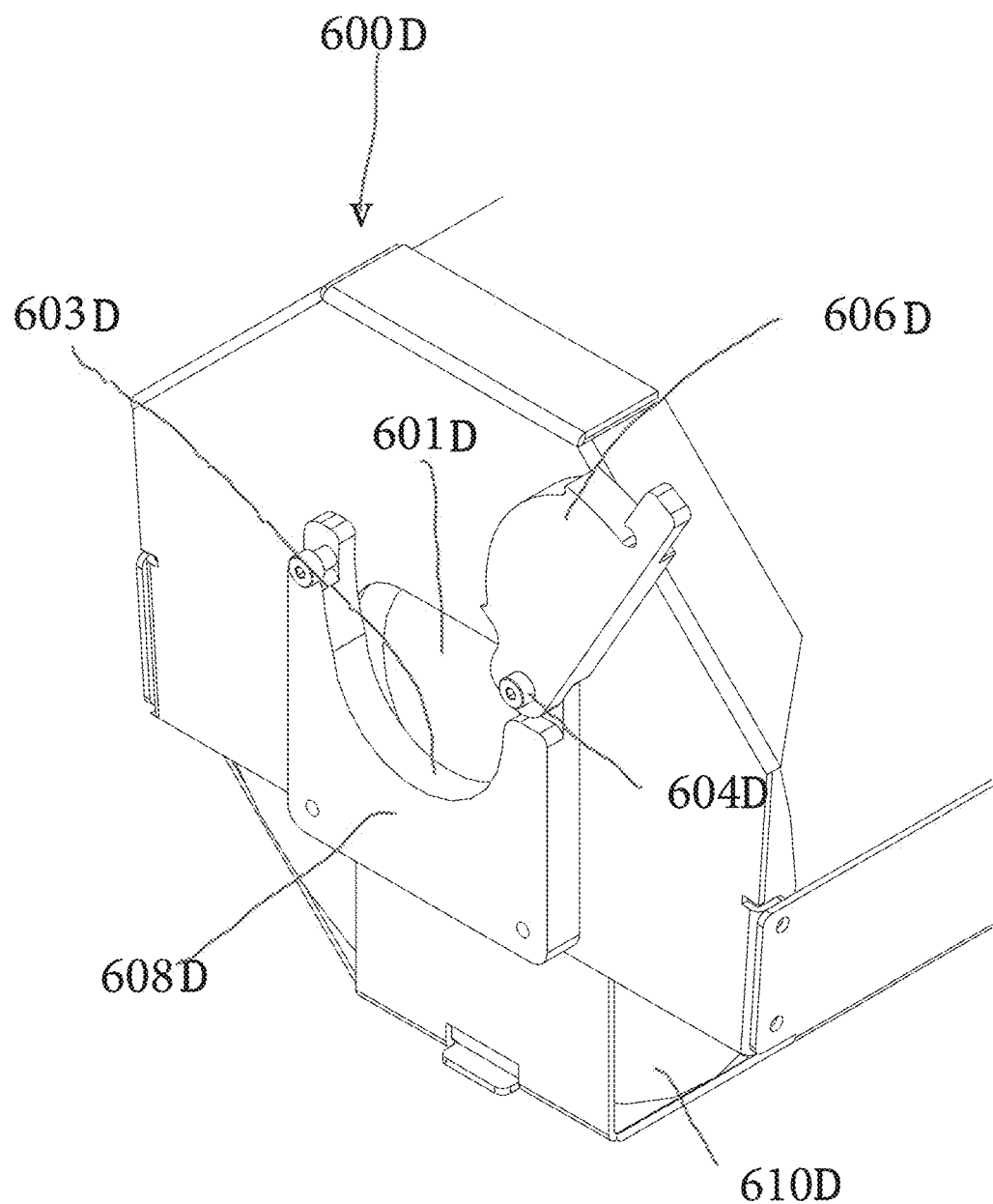
FIG. 39 is a perspective view of an alternative design for a unit for supporting a roll of unexpanded slit sheet material and having a member for opening access to the roll of unexpanded slit sheet material.
Figure 40:
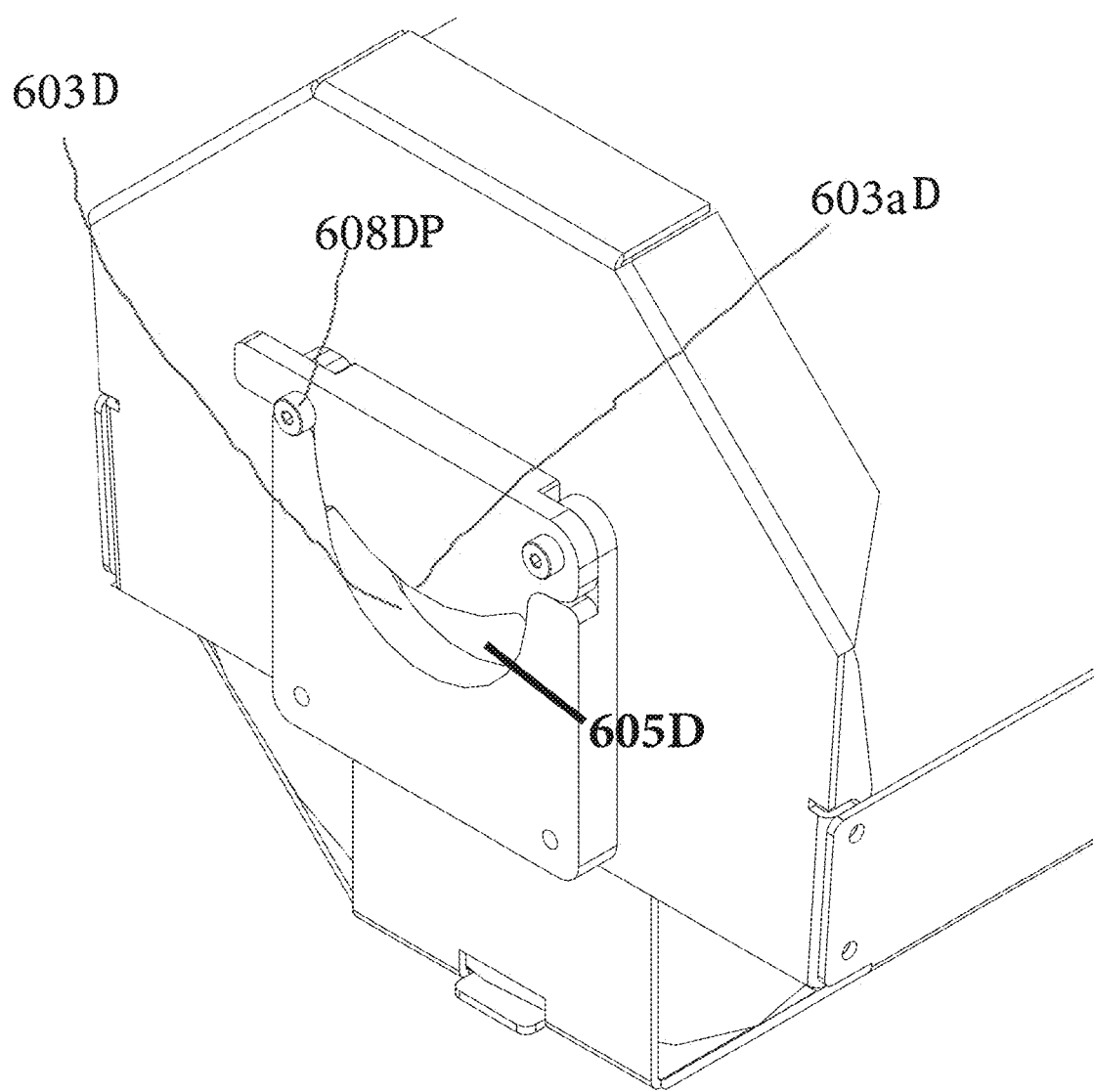
FIG. 40 is a perspective view of an alternative design for a unit for supporting a roll of unexpanded slit sheet material and having a member for opening access to the roll of unexpanded slit sheet material through a crescent shaped opening.

FIG. 39 is a perspective view of an alternative design indicated generally as 600D, for a unit for supporting a roll 610D of unexpanded slit sheet material. The frame member 600D has an opening 601D for access to the roll of unexpanded slit sheet material 610D. The paper is fed through opening 601D access to which is regulated by a member 606D for partially blocking the opening 601D. In some embodiments, the member 606D preferably pivots or rotates around the pin 604D, such as to move between a raised position such as shown in FIG. 39 and a lowered position such as shown in FIG. 40. In some embodiments, the pin 604D can be positionable to adjust the height of the member 606D so as to adjust the width of the opening. Similarly, in some embodiments, a second pin (shown in FIG. 39) can be adapted to be adjustably engaged to a distal end of the member 606D so as to allow adjustability of the position of the member 606D so as to allow for adjustment of the opening by varying the position of the member 606D.

In some alternative or variation embodiments, the member or device 606D can include one or more of the following:

A) a guillotine blade that slides along guides or rotates about a pivot or otherwise is movable such as to be able to adjust the position and, thus, be able to adjustably partially or incompletely comes down towards the slit expandable paper and cause the paper to expand as it passes beneath the guillotine blade by applying friction thereto;

B) a broad flat or convex blade that moved into the path of the slit paper and causes the paper to expand as it passes between the concave solid member 608 and the blade by applying friction thereto;

C) a blade that is a movable piece that can be, e.g., guided along the member upon which it slides;

D) a flap, or a closure, or a gateway, that is a movable, solid barrier for opening and closing an exit from a receptacle, container or housing that turns on hinges, slides in grooves, rotates about a pivot, or otherwise moves via some mechanical moving mechanism or support;

E) a door that slides in grooves, rotates about a hinge, pivots, or otherwise moves via some mechanical moving mechanism or support, or that otherwise provides a movable barrier that allows egress of paper from a roll of paper, by moving from an open position to a partly closed position;

F) a shutter that is a movable cover for opening or closing the aperture of the paper's passageway from the paper support 600D;

G) a lid that is a movable cover for an egress from a hollow receptacle or box containing a roll of expandable slit paper; and/or H) a cover plate that is a structure for closing an opening or egress from a receptacle that contains a roll of center pull expandable slit paper.

FIG. 40 is a perspective view of the device of FIG. 39, indicated generally as 600D, for a unit for supporting a roll 610D of unexpanded slit sheet material. The blade 606D is rotated about the pivot member 604D until it comes into contact with the pin 608DP of the member 608D. The rotation mechanism can be a pivot pin, or shaft on which the blade 606D turns or rotates.

In FIG. 40, the frame member 600D opening 601D for access to the roll of unexpanded slit sheet material 610D is shown in the closed position that provides a partial opening that is a crescent shaped opening 605D. The paper can be manually or by a powered system pulled through the crescent shaped opening formed by the plate 603D and the blade 606D. The edges 603aD and 603D, in combination, produce an opening 605D that restricts or resists the movement of the slit paper. The restriction of the flow of the paper causes the slit paper to expand as shown in, e.g., FIG. 35 and/or FIG. 41.

Figure 41:
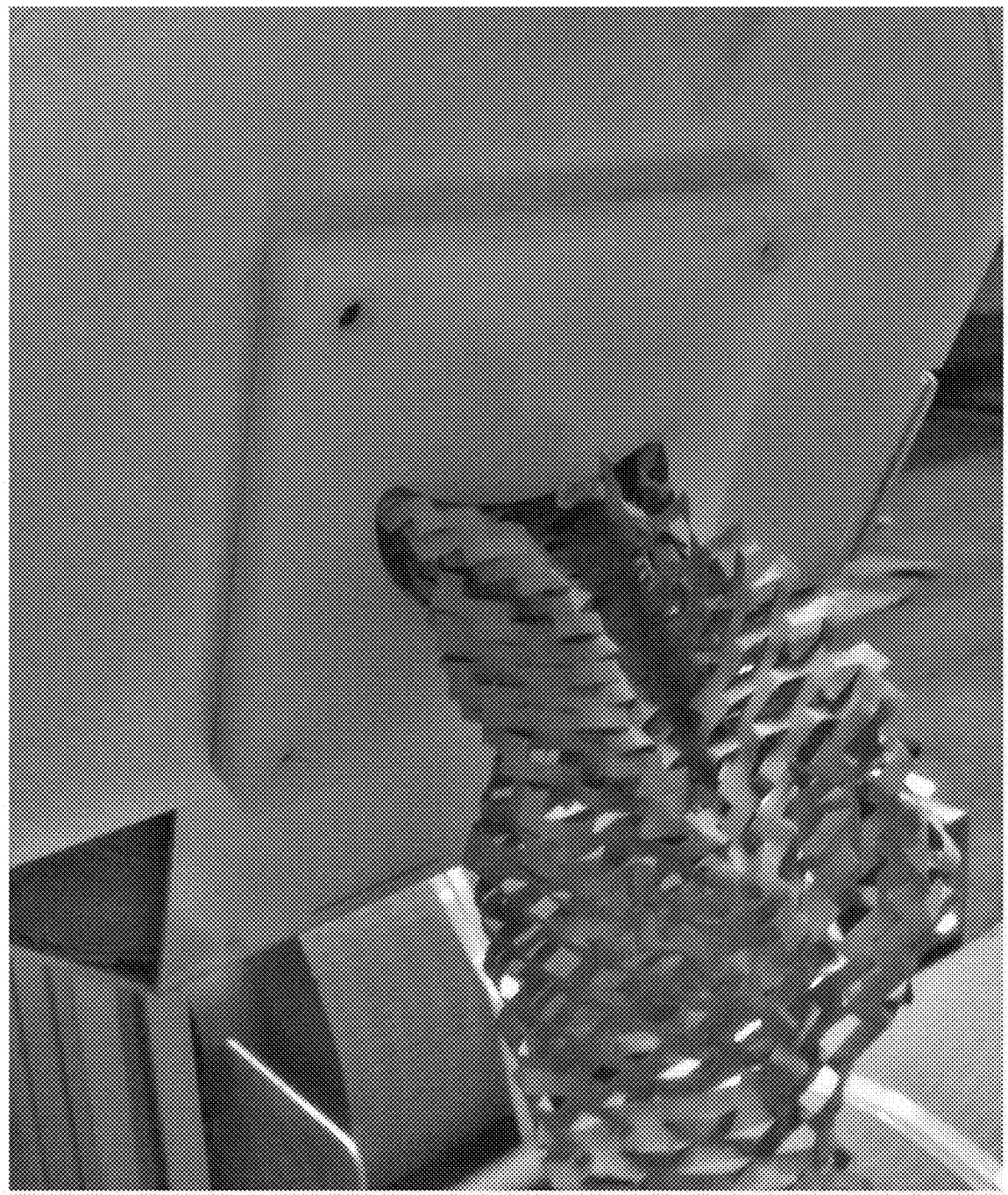
FIG. 41 is a perspective photograph showing a view of an expanded slit sheet paper being dispensed from a crescent shape opening according to some illustrative embodiments.

Towards that end, FIG. 41 is a photograph of an expanded slit sheet paper being dispensed from a crescent shaped open such as to illustrate a manner of expansion according to some preferred embodiments.

In some preferred embodiments, the paper roll 300D is initially manufactured such as to be formed without an internal core. Then, upon fabrication of the dispensing system, the paper core (such as, e.g., core 2000 in FIG. 33) is preferably inserted within the interior of the paper roll 300D. In the preferred embodiments, the paper core 2000 has an axial length that is the same or approximately the same as the axial width of the paper roll 300D. However, in some embodiments, the paper core 2000 can have an axial length that is slightly greater than the axial length of the paper roll 300D, such that the paper core extends slightly beyond the edge of the paper roll 300D to facilitate manual grasping of the paper core 2000 for removal by pulling in the direction of the arrow 201C shown in FIG. 31.

f) Discussion of Further Embodiments and Features

As explained herein-above, in some of the preferred embodiments, of the invention, a void fill dispensing system and method is provided that can—highly advantageously—create a viable void fill product with expandable slit sheet paper despite the fact that such was previously impossible with the background art.

In some embodiments, the present inventor discovered a means to create such novel and unique systems and methods by identifying the following:
  a) The present inventor identified that prior expandable slit sheet paper had properties that prevented the ability to create viable void fill product, including that prior expandable slit sheet paper a) required too great of a force to expand the paper and b) was not sufficiently strong enough to avoid tearing.
  b) The existing slit sheet expansion devices were not capable of creating an expanded slit sheet paper that resists retraction upon expansion, without requiring a second further step of wrapping the expanded slit sheet paper or otherwise retaining the expanded slit sheet paper in an expanded state.

In some preferred embodiments, a novel void fill dispensing system is provided that includes both a) a novel extensible slit sheet paper and b) a novel dispenser mechanism. In the preferred embodiments, the novel dispenser mechanism is specially configured to provide a sufficient amount of resistance to enable expansion of the novel extensible slit sheet paper, but, at the same time, avoiding pre-mature tearing of the novel extensible slit sheet paper.

Additionally, in the preferred embodiments, the novel dispenser mechanism is also specially configured to cause the expandable slit sheet paper to have surfaces of the expanded cells contact one another during the expansion process, shortly after expansion, and/or shortly before expansion such that when the novel dispenser mechanism expands the novel extensible slit sheet paper, the expanded sheet has a tendency to inhibit retraction of the expanded sheet. For example, the expanded sheet is preferably expanded in a state such that adjacent expanded cells a caused to contact one another and interlock at least to some degree so as to resist retraction of the expandable slit sheet product.

According to some preferred embodiments, a novel dispenser mechanism includes a support for a roll of expandable slit sheet material (preferably, a roll of extensible slit sheet material), and a specially designed restricting orifice that is configured to receive expandable slit sheet paper that is laterally pulled from a center of the roll of expandable slit sheet material.

The use of a hexagonal cell forming slit pattern in such a center pull system would have been expected to fail or at least produce low cushioning because expanded hexagonal cells have an inherent tendency to retract/un-expand. Furthermore, it would have been expected that pulling a slit sheet paper in this manner would not be viable because the expansion forces required would be too great, especially in relation to the low tear strength of existing expandable slit sheet papers. Additionally, as expandable slit sheet papers had only previously been expanded in a flat state to enable uniform opening of cells, it would not have been appreciated that a center pull system could be used to expand a special extensible paper type expandable slit sheet paper. However, the present inventor has discovered that by employing a novel extensible slit sheet paper, it is possible to expand extensible slit sheet paper with a center pull mechanism by having a specialized outlet in a manner to create adjacently contacting opened cells (e.g., an expanded sheet with expanded hexagonal cells) that contact one another in a manner to substantially inhibit or to be even free of retraction, advantageously retaining its expanded state and cushioning properties.

While this disclosure is not limited by proposed theories, the present inventor has found that by establishing a center pull mechanism, when employing an extensible slit sheet paper, and when employing a specially configured outlet that a) provides sufficient resistance to enable expansion, b) avoids premature tearing or "catching" of the cells of the paper, c) enables the paper to flow or move through the specially configured outlet in a manner that the expanded slit sheet paper freely twists and/or folds during expansion enables the creation of highly useful and advantageous expanded slit sheet paper void fill (e.g., directly or immediately after expansion) without requiring secondary steps such as, e.g., rolling or wrapping of the expanded sleet sheet paper. The present inventor theorizes that his unique system advantageously enables the paper to twist and/or fold in a manner that causes the expanded cell to retain or substantially its expanded state without significant retraction. Thus, while one of ordinary skill in the art would expect that expanded hexagonal cell forming slit sheet material would retract and fail to provide adequate cushioning, it has now been found that the inventor's novel process of center pulling hexagonal cell forming slit sheet material can cause the expanded cells to remain expanded.

Although embodiments of the present invention could be implemented without the use of extensible slit sheet paper, the present inventor has also discovered that due to the unfavorable properties of expandable slit sheet papers that are not extensible, systems that do not employ extensible slit sheet paper would be substantially less viable.

According to some alternative embodiments, one or more of the embodiments described herein-above can be modified to employ a novel and advantageous opening or outlet or donut aperture.

Novel-Shaped Outlet

As described herein-above, in preferred embodiments, the dispenser is preferably configured with a unique and novelly-shaped outlet in accordance with embodiments described herein. As also indicated herein-above, by combining such a unique outlet with unique extensible slit sheet paper and/or other advantageous features of dispensers described herein, a highly effective void fill dispensing device can be achieved.

In some examples, as discussed above, the use of a semi-circular shape, partially circular shape, or crescent shape opening has been determined by the inventor to be highly advantageous in some preferred embodiments and implementations. While it would be expected that the use of a semi-circular opening would result in premature tearing of the slit paper during the expanding of the slit paper, the present inventor discovered that, surprisingly, the opposite occurs. On the contrary, the present inventor has discovered that the tendency of the slit sheet paper to tear in an uncontrolled manner has been reduced by the implementation of such novel openings, rather than being exacerbated.

The use of a semi-circle exit feed or crescent shaped exit feed unexpectedly provides tension to expand the slit sheet material completely while simultaneously increasing the feeding speed without the fear of ripping the material prematurely. This shape of a crescent can be used in some embodiments within all of the dispensing systems described herein. In particular, while an exemplary implementation is described in relation to a corrugated box embodiment, such a novel opening shape can be implemented within any of the void fill dispensing systems described herein. In the preferred embodiment, the crescent shape is a type of lune (e.g., partial moon shape), which includes a generally circular disk shape with a portion of another generally disk shape removed from it, so that what remains is generally a shape enclosed by two circular arcs which intersect at two points. In a crescent, the enclosed shape does not include the center of the original disk. The tapered regions towards the points of intersection of the two arcs are known as the "horns" of the crescent. See: Wikipedia. It should be noted that in the preferred embodiments, the horns of the crescent are advantageously rounded at their ends, rather than tapering to a point.

As employed herein, the term "crescent" describes a shape that is formed by two arcs intersecting at two points. Similarly, the term "lune" describes a concave-convex area or region bounded by arcs of equal or different radii. The arcs radii can have the same radii centers or spaced radii centers. Advantageously, the corners of the lune are rounded. As employed herein, the term "arc" is generic and includes, inter alia: a circular arc (arc of a circle); a parabolic arc is (the arc of a parabola); and an oval arc (the arc of an oval).

Figure 42:
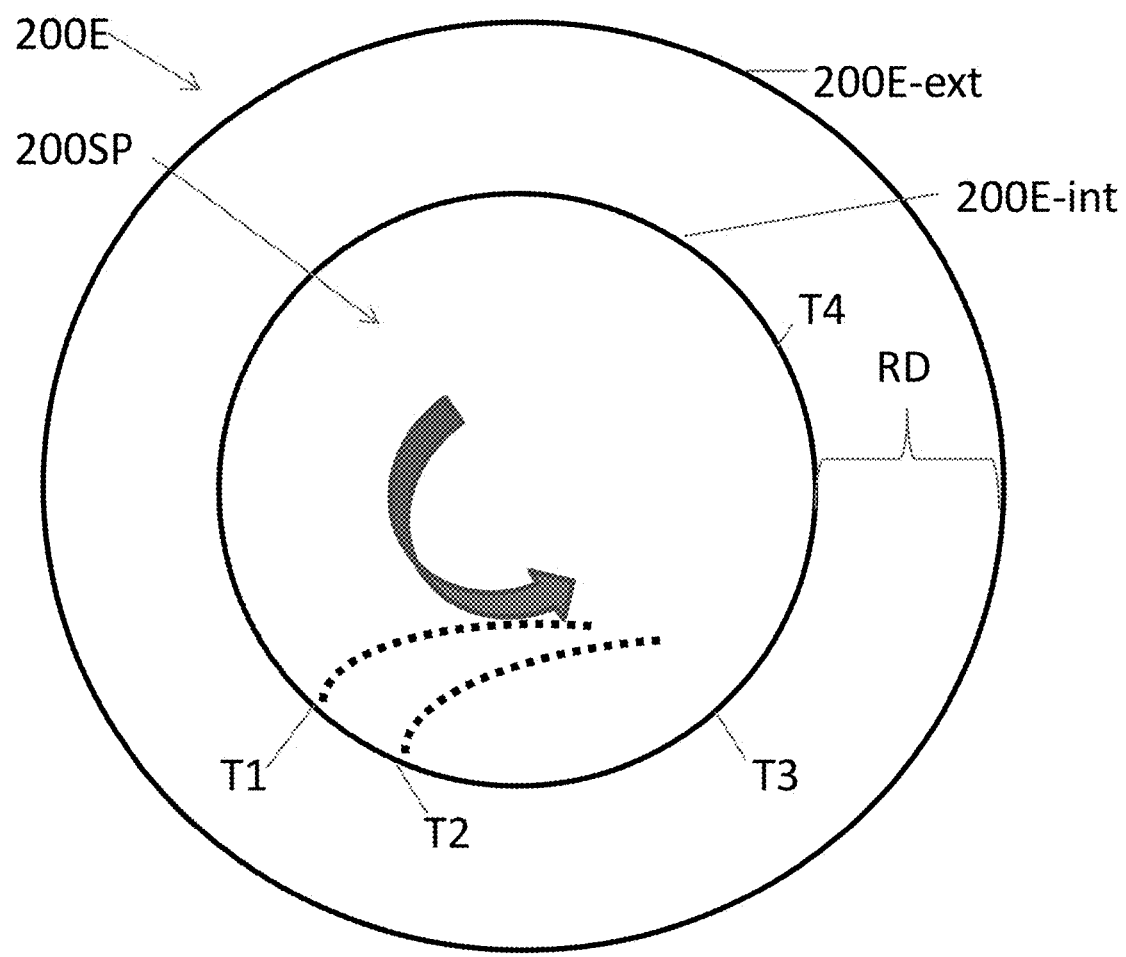
FIG. 42 is a schematic drawing show the end face of a roll of expandable slit sheet paper for explanatory purposes.

With reference to FIG. 42, FIG. 42 is a schematic drawing show the end face of a roll of expandable slit sheet paper 200E. In this illustrative example, the perimeter or exterior of the roll is shown at 200E-ext and the interior of the roll is shown at 200E-int. As described herein, in preferred embodiments in which the slit sheet paper is "removed" by being laterally pulled from an "interior end of the roll" at the interior region 200E-int rather than from the exterior end of the roll at the exterior region 200E-ext, as the slit sheet paper is continuously pulled from the center of roll, the paper is caused to laterally exit from the center interior of the roll by disengaging from the contacting layers of sheet within the roll, and being laterally pulled within the interior space 200SP within the center of the roll 200E.

In this manner, it should be appreciated that as the slit sheet paper is continuously pulled from the interior of the roll 200E, the roll thickness diameter RD will continually decrease until all of the paper is eventually removed from the center of the roll 200E.

During this continued process, the interior end of the roll will disengage from the interior of the roll progressively in a manner to continuously change the point of disengagement in a circular pattern (which is dependent of the direction in which the roll is wound around the core. For example, as shown in FIG. 42, the roll may first disengage at a point T1, then later at a point T2, then later at a point T3, then later at a point T4, etc., and continuously progress in this manner as illustrated by the curved arrow shown in FIG. 42.

The present inventor has discovered that, in some embodiments, by capitalizing on this rotational quality, such as, for example, by imparting a unique dispenser outlet that a) provides sufficient resistance to enable cell expansion while b) enabling the withdrawn product to continue to follow with a circling or spiraling pattern, a highly advantageous void fill product can be achieved. Moreover, as indicated above, the present inventor also discovered that such a product is most viable by employing an extensible slit sheet paper in the preferred embodiments.

In some preferred embodiments, the outlet opening of the dispenser is configured in a manner to accommodate two goals: a) to provide sufficient resistance to enable the cells of the slit sheet paper to be expanded (e.g., upon manually pulling the slit sheet paper through the outlet or automatically pulling the slit sheet paper through the outlet) and b) to provide sufficient accommodation to allow the slit sheet paper to smoothly flow through the outlet in a manner that avoids premature tearing of the slit sheet paper and that enables the slit sheet paper that exits the outlet to form a properly configured void fill product.

Towards that end, in some preferred embodiments, the outlet is configure to enable the slit sheet paper that exits the outlet to form a properly configured void fill product by enabling the paper to continue to rotate during passage through the outlet in a manner to create a tubular void fill tube member that exits the outlet.

Figure 53:
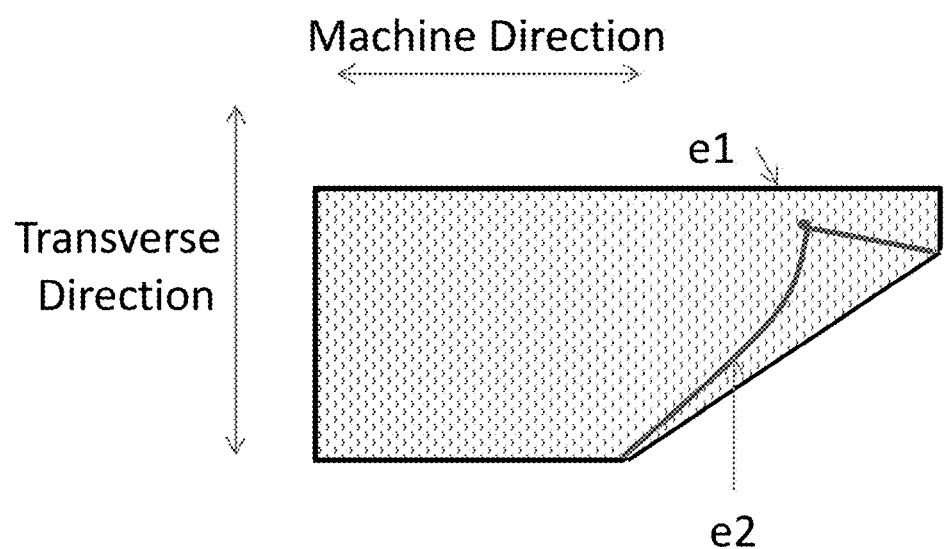
FIG. 53 is an explanatory schematic diagram depicting handling of expanded slit sheet paper in accordance with some embodiments of the invention in a manner to achieve contact between different portions of the slit sheet paper during expansion.

In the preferred embodiments, this void fill tube member is a uniquely configured member in which the expandable slit sheet paper has been expanded such that cells of the expandable slit sheet paper are opened, and, at the same time, the expandable slit sheet paper forms a tubular shape in which opposing portions of the expandable slit sheet paper contact one another such as, e.g., to form a tubular or generally tubular shape. For example, as shown in the explanatory schematic diagram of FIG. 53, in some preferred embodiments, opposing portions of the expandable sleet sheet paper that is pulled from the roll (i.e., from the interior) is caused to form a tubular configuration in which the opposite ends e1 and e2 in a transverse direction of the slit sheet paper is caused to contact one another and/or in which regions near the opposite ends e1 and e2 or regions at different locations within the transverse direction of the slit sheet paper are caused to contact one another.

In this manner, by virtue of such contact with the slit sheet paper in an expanded state, the open cells of the expanded slit sheet paper can interlock in a manner to cause the tubular void fill tube member to retain or substantially retain its expanded form.

Furthermore, in the preferred embodiments, the continued pulling of the tubular void fill tube imparts a rotation that increases contact or enhances contact between the opposite ends e1 and e2 and/or regions near the opposite ends e1 and e2 and/or regions at different locations within the transverse direction. Thus, the dispensing is preferably configured in a manner to enhance formation of such a tubular void fill member, and to enhance interlocking of cells thereof.

Additionally, in the formation of the tubular void fill member, the cells preferably interlock not only in a direction that is parallel to the length of the tubular void fill member, but in preferred embodiments, the cells also preferably interlock in a direction transverse to the length of the tubular void fill member. Accordingly, by interlocking in a direction transverse to the length of the tubular void fill member, the tubular void fill member can be even further inhibited from retraction after expansion.

For further reference, FIGS. 43A-43E are explanatory views representing illustrative manners of causing a tubular void fill tube to overlap such that contact occurs between the opposite ends e1 and e2 and/or regions near the opposite ends e1 and e2 and/or regions at different locations within the transverse direction of the expanded slit sheet paper.

For example, as shown in the illustrative example in FIG. 43A, in some embodiments, the expandable slit sheet paper forms a substantially tubular shape with at least a portion of one end overlapping the other end as shown. Here, this view is a schematic representation of a cross-section taken through the tubular void fill tube. However, as the tubular void fill tube is continuously rotating, it should be appreciated that in actual preferred embodiments, multiple layers and variations are formed during expansion. As shown in FIG. 43A, in this illustrative example, an underside of one end (e.g., e1) of the expanded slit sheet paper extends around and contacts an upper-side of the other end (e.g., e2) of the expanded slit sheet paper.

In the example shown in FIG. 43B, one end (e.g., e1) is flipped outwardly but still extends over the other end (e.g., e2).

Figure 43C:
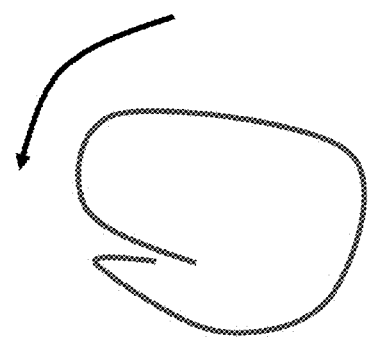

In the example shown in FIG. 43C, one end (e.g., e1) is flipped inwardly but still extends over the other end (e.g., e2). However, in this illustrative example in FIG. 43C, an upper-side of one end (e.g., e1) of the expanded slit sheet paper contacts an upper-side of the other end (e.g., e2) of the expanded slit sheet paper.

In some embodiments, as this formation is a continuous process, the tubular void fill tube can include a variety of different regions, with sections similar to one or more of FIGS. 43A, 43B and/or 43C. Of course, in other embodiments, other forms of overlapping and/or contact can be achieved.

As also further depicted in FIGS. 43A-43C, in the preferred embodiments, during the formation of the expanded tubular void fill tube, the expanded paper is caused to rotate, such as, e.g., in the direction of the arrows shown in the respective figures. As described herein, in the preferred embodiments, this rotation, thus, enhances the contact pressure between the above-noted portions of the void fill tube such as to further enhance the formation of the void fill tube and the tendency for the open cells to interlock and the expanded slit sheet paper to, thus, retain its expanded state.

Although FIGS. 43A-43C show embodiments in which a substantially tubular shape is created in which opposite ends in a traverse direction contact one another, in other embodiments, although less preferred in many instances, such a configuration is not required to be created. For example, in some embodiments, rather than employing a center pull of the paper, or by controlling the rotation in a manner to avoid rotation through the outlet, the outlet can be adapted to provide another form of contact between the cells of the expanded slit sheet paper. For example, as shown in FIG. 43D, in some embodiments, the outlet can cause the slit sheet paper to overlap in another manner (such as, e.g., by one or more portion folding back as shown in FIG. 43D) such that upon expansion the cells interlock. However, without rotation, such an embodiment is less desirable. For example, as shown in FIG. 43E, where rotation is imparted, even if an overlapping similar to that shown in FIG. 43D is provided, the product will have a tendency to further rotate to cause further contact and interlocking, such as, e.g., illustrated by the dashed lines in FIG. 43E which represent the expanded slit sheet paper being twisted in a manner to bring opposite ends into contact with one another.

For further reference, FIGS. 48-52 show an illustrative embodiment of a manually operated cardboard box dispensing system in which a roll of slit sheet expandable paper is retained within a cardboard box that is substantially similar to the device shown in, e.g., FIG. 22, but employing a different flap structure (e.g., in which the opening in FIGS. 48-52 is within a single top panel. In this illustrative embodiment, a substantially semi-circular shaped opening is employed.

Figure 48:
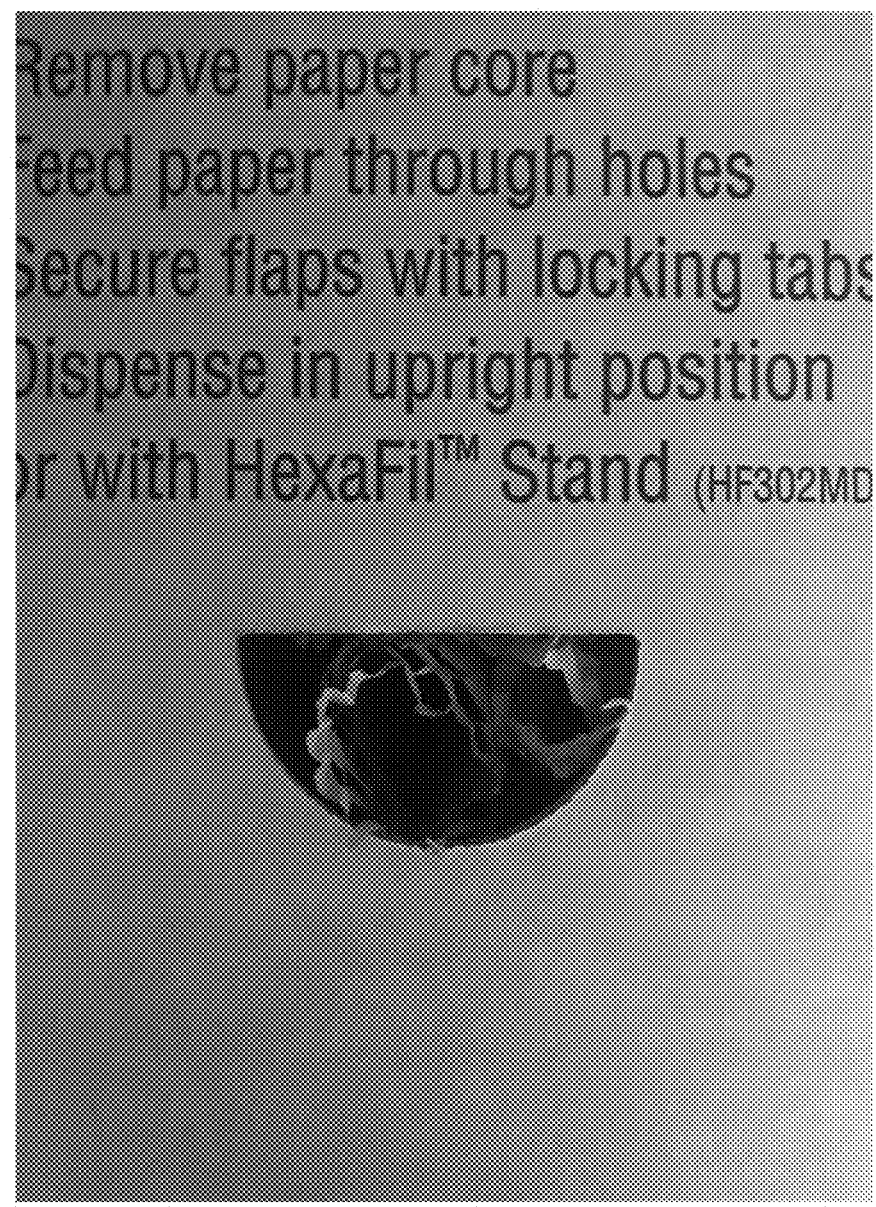
FIGS. 48-52 show an illustrative embodiment of a manually operated cardboard box dispensing system according to some illustrative examples.

Towards that end, FIG. 48 shows a top view of the dispensing device showing the dispensing opening and an end of the expandable slit sheet paper shown below the dispensing opening.

Figure 49:
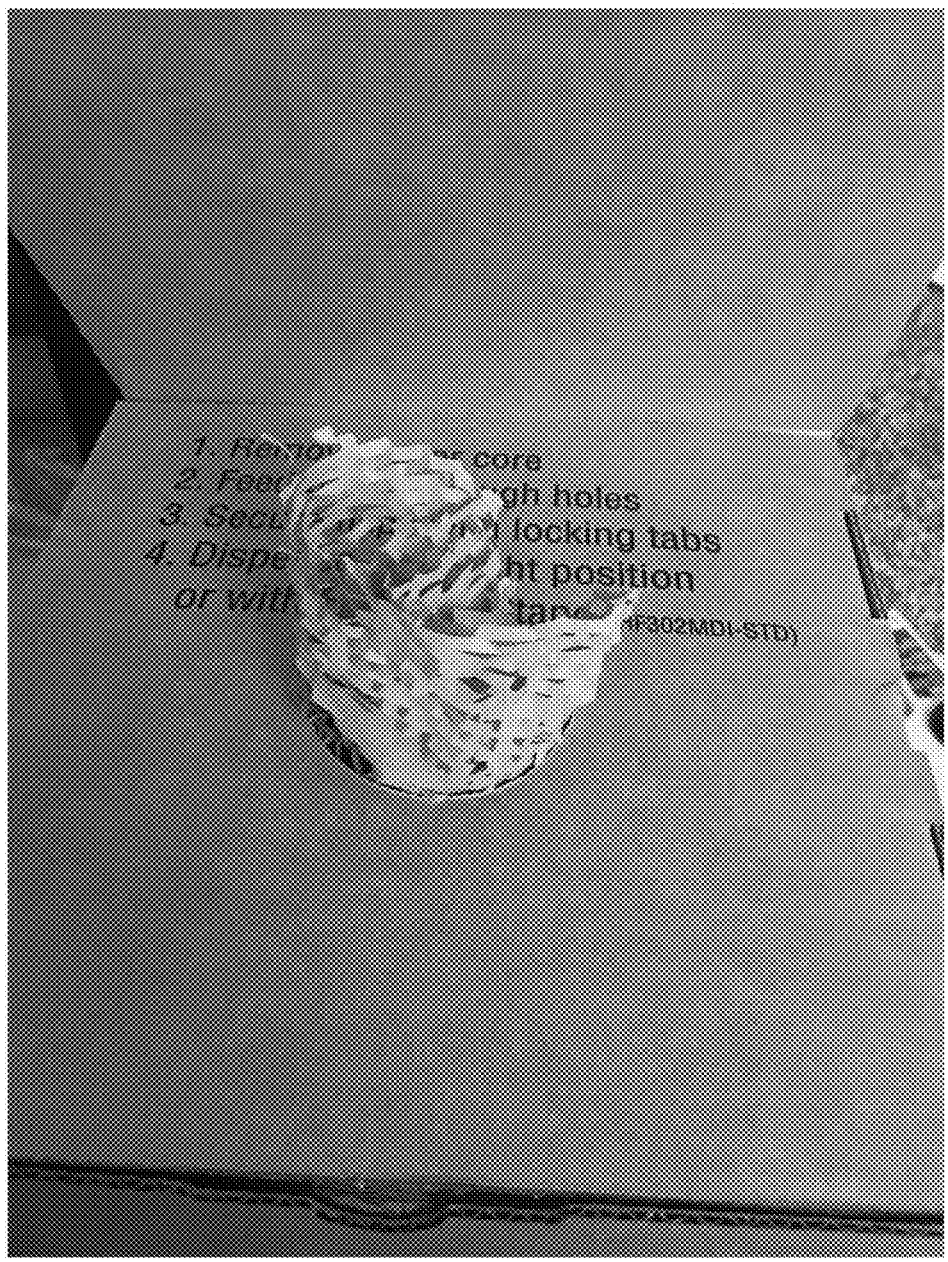

In use, a user can manually grasp the end of the expandable slit sheet paper and pull the paper upward through the opening. This pulling of the paper causes the paper to rotate in the manner described above, while concurrently engaging the edges of the semi-circular opening. As shown in FIG. 49, as the paper exits the opening, it begins to form a tubular void fill member having a spiraling configuration and in which the expanded cells begin to interlock as described above.

Figure 50:
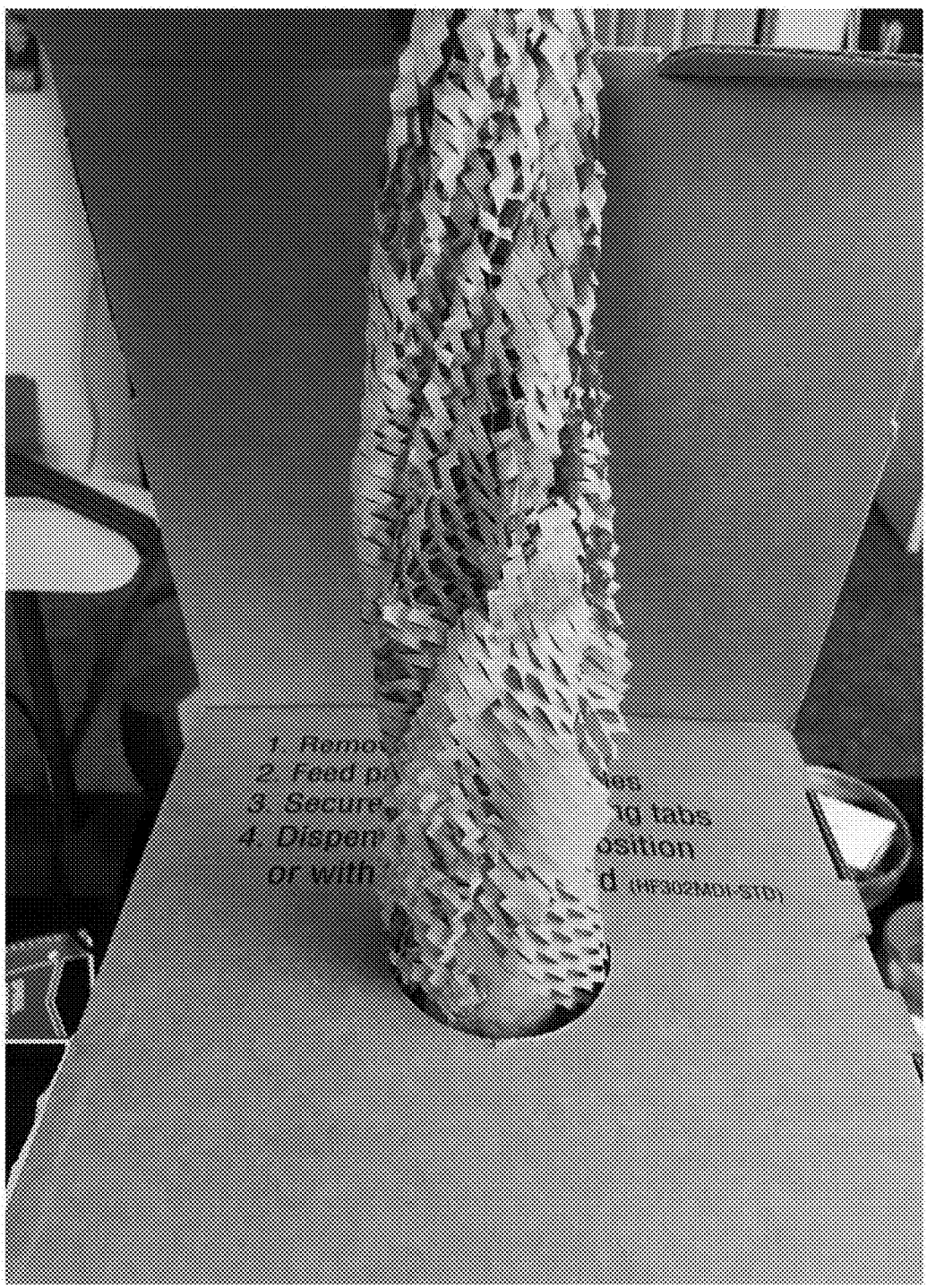

As shown in FIG. 50, during continued pulling of the tubular void fill tube, the expanded void fill tube continues to substantially maintain its configuration, and to maintain a relatively consistent tubular form. And, as also shown, the tubular void filled tube also has a spiraling configuration as described above.

Figure 51:
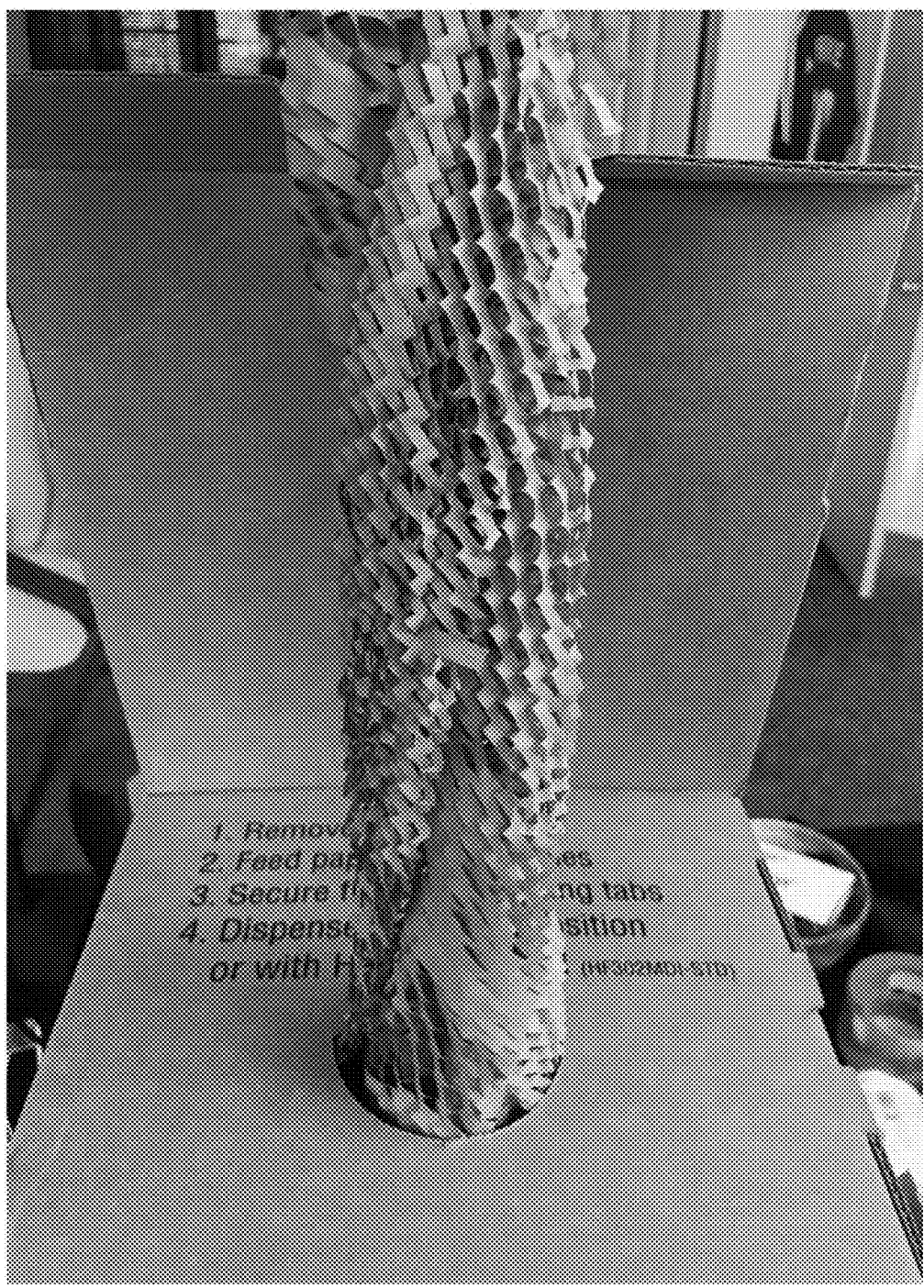

As further shown in FIG. 51, even after further pulling of the tubular void fill tube from the position shown in FIG. 50, the tubular shape continues to be formed.

In use, a user can readily manually grasp the tubular void fill tube with both hands and severe a desired length of the void fill tube. Then, the void fill tube can be placed within a box or package as void fill to protect an item and/or to otherwise provide product cushioning and/or protection.

In the preferred embodiments, the tubular void fill tube is readily manipulated by hand, such that a long length of tube can be removed and rolled, folded or otherwise manipulated to fill a desired space within a box or package or the like.

In the illustrative embodiment shown in FIGS. 48 to 52, the semi-circular outlet opening is substantially a half circle, with a diameter of about 2.4 inches. Accordingly, as the opening is a half-circle, the maximum width between the flat side of the opening and the peak of the arc is about 1.2 inches. In this illustrative example, the device, thus, creates a void fill tube having a diameter transverse to the longitudinal direction of the tube of about 2-3 inches (e.g., approximately 2.4 inches) as shown. In this illustrative embodiment, the slits of the slit sheet paper are about % inch slits, and the paper employed is an extensible paper. In this illustrative embodiment, the size of the tubular void fill is advantageous and convenient for many applications and uses of void fill.

In some other embodiments, a tubular void fill product can be created with difference diameters, such as, e.g., in some embodiments a diameter of even just about 1 inch or less, or in some embodiments, a diameter of about 1.5 inches or more, or in some embodiments, a diameter of about 2.0 inches or more, or in some embodiments, a diameter of about 3.0 inches or more, or in some embodiments, a diameter of about 4.0 inches or more, or even larger in some embodiments.

Figure 52:
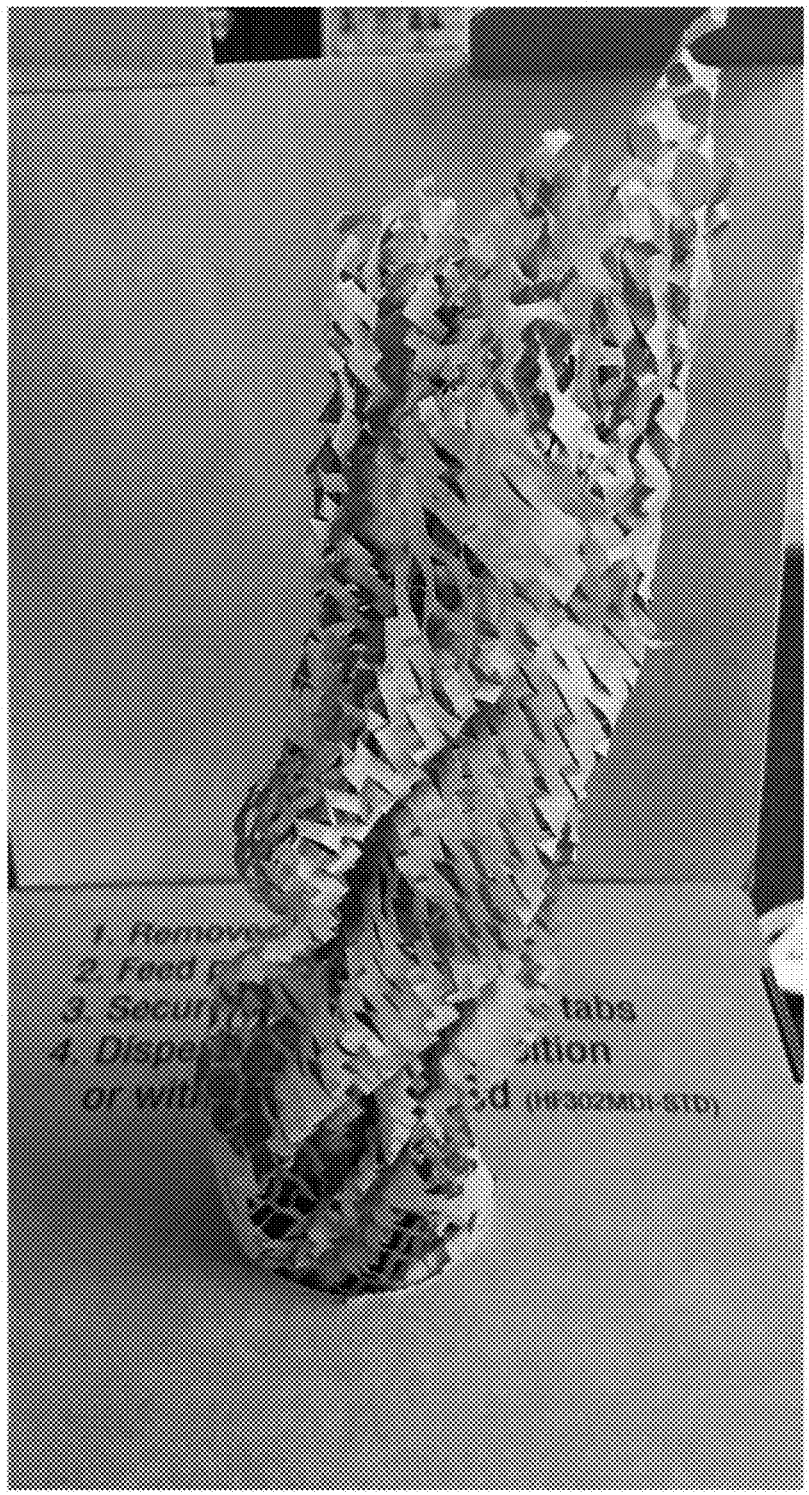

As illustrated in FIG. 52, the tubular void fill product is advantageously configured such that due to the interlocking of a sufficient % of opened cells, the tubular void fill member is inhibited from simply retracting after expansion and can retain a substantially expanded state to facilitate use and operation as a void fill product.

With reference to FIGS. 44A to 47B, a variety of illustrative outlet configurations are shown according to a plurality of alternate embodiments. It should be appreciated that some embodiments may have greater qualities for achieving purposes of the preferred embodiments herein. It should also be appreciated that these are merely some exemplary embodiments and that other constructions can be implemented in other embodiments.

In all of these illustrative embodiments, the outlet is configured to have a non-circular shape, but the outlet is configured to include a substantially arc or curve shaped outer wall that spans (extends around) at least about ⅓ or more, or preferably about ½ or more of the perimeter of the outlet. In some preferred embodiments, such as, e.g., the embodiment shown in FIG. 48, the arc shape portion spans or extends around about ⅗ or more of the perimeter of the outlet.

Figure 44A:
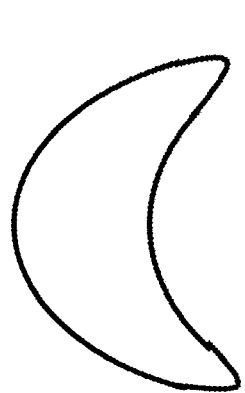
FIGS. 44A-44C, FIGS. 45A-45C, FIGS. 46A-46B, and FIGS. 47A-47B show illustrative outlet configurations according to some illustrative embodiments.
Figure 44B:
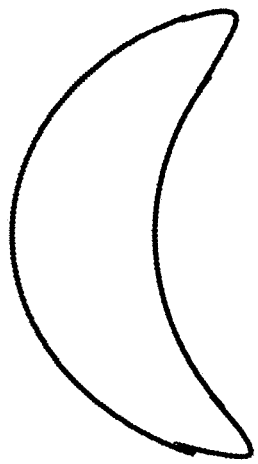
Figure 44C:

In some embodiments, the arc or curved portion is substantially circular (i.e., having a substantially constant curvature). However, in some other embodiments, the curvature does not need to be substantially circular or constant. By way of example, FIGS. 44A, 44B and 44C show illustrative embodiments employing various degrees of curvature of a crescent type shape or smile-face type shape according to some illustrative embodiments.

Figure 45A:
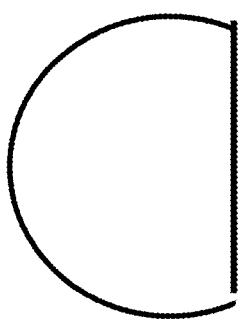
Figure 45B:
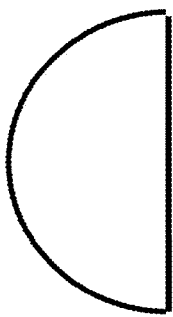
Figure 45C:

For reference, FIGS. 45A, 45B and 45C show other illustrative embodiments in which FIG. 45B depicts a substantially semi-circular configuration, while FIG. 45A shows a configuration similar to FIG. 45B in which a fuller or larger portion of a circle is created, while FIG. 45C shows a configuration in which a smaller portion of a circle is created. As described in illustrative embodiments discussed above, in some embodiments, a single outlet can have a movable member that can vary the positioning of the flat or straight side of this type of outlet to adjust to outlet configuration between these configurations shown in FIGS. 45A, 45B and 45C, etc.

While some preferred embodiments have been described herein in which the outlet opening is semi-circle shaped or crescent shaped or smile-shaped, in some other embodiments, other shapes of the outlet can be provided. In the preferred embodiments, however, the shapes of the outlets are preferably provided in a manner to achieve advantages and qualities of embodiments described herein.

Figure 46A:
Figure 46B:

For example, FIGS. 46A and 46B show some other illustrative embodiments in which the outlet includes an arc shaped section that spans about ½ or more of the perimeter of the outlet. However, in these illustrative embodiments, the remaining portion has a different configuration from that of the semi-circle type or crescent type configuration. In the preferred embodiments, the remaining portion is not configured in a manner that will snag or otherwise substantially interfere with the rotation or twisting of the tubular void fill tube as it passes through the opening. Accordingly, as shown in FIGS. 46A and 46B, in some embodiments, the remaining portions preferably include smooth and gradual curvatures.

Figure 47A:
Figure 47B:

As some other examples, FIG. 47A shows an example that is similar to that shown in FIGS. 46A and 46B, but with the remaining portion having a more varied configuration, and FIG. 47B shows an example in which the outlet has a plurality of arc-shaped portions, with a first arc shaped portion shown at the left side of FIG. 47B and a second arc-shaped portion shown at the right side of FIG. 47B.

In the preferred embodiments, the arc-shaped portions shown in the various embodiments are preferably provided to enable the expandable slit sheet paper to relatively freely flow and rotate to assume a tubular void fill tube form as described above. Accordingly, it should be appreciated that while an exact circular arc or an arc having a constant curvature may not be required in various embodiments, the arc-shaped portions should be curved in relation to the interior of the outlet, whereby the arc-shaped portion presents a smooth surface that does not substantially impede rotation of the tubular void fill tube as it is expanded and passes through the outlet opening.

Although the most preferred embodiments of the invention very advantageously dispense void fill from the center of a roll of expandable slit sheet paper that is wound into a roll without a central core or central support member such that the inner end of the roll of slit sheet paper can be grasped and laterally pulled from the interior of the roll, in some alternative embodiments, rather than dispensing the void fill from the center of the expandable slit sheet paper, a dispenser is employed that dispenses and expands the paper from the outer perimeter end of the expandable slit sheet paper.

Figure 54A:
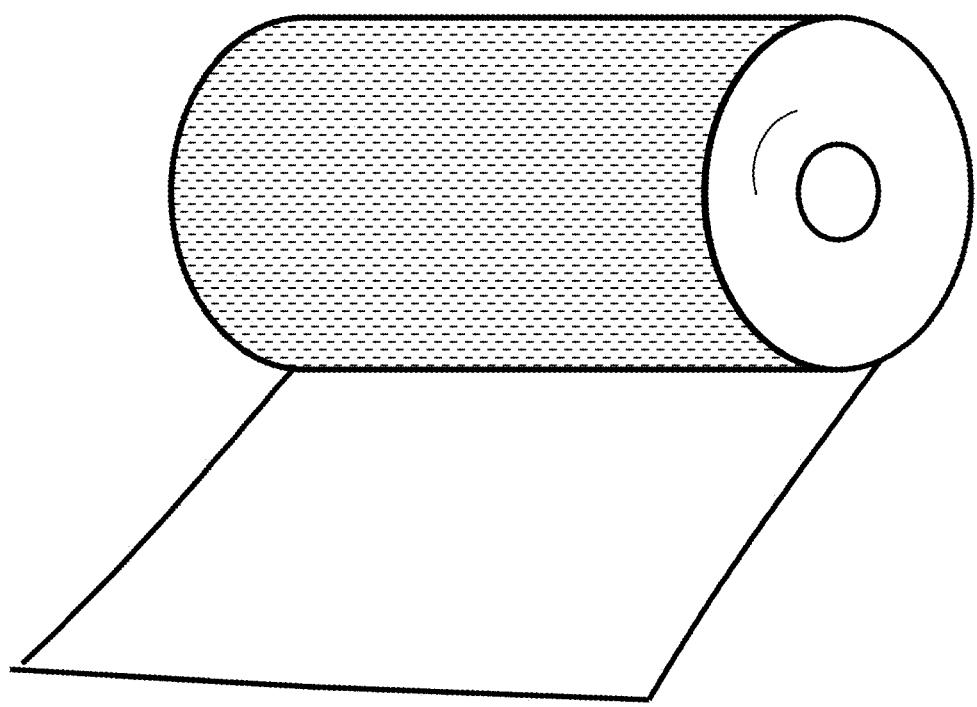
FIG. 54A is a perspective view of a roll of slit sheet paper that is in a state of being unwound from an exterior end of the roll.
Figure 54B:
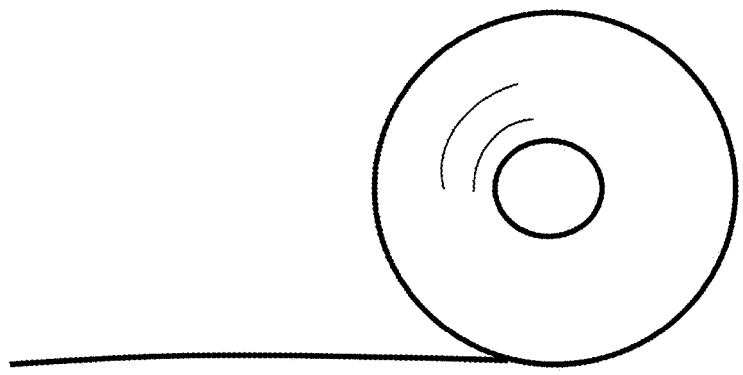
FIG. 54B is a side view of the roll of slit sheet paper from the right side of FIG. 54A.

For example, FIG. 54A is a perspective view of a roll of slit sheet paper that is in a state of being unwound from an exterior end of the roll, and FIG. 54B is a side view of the roll of slit sheet paper from the right side of FIG. 54A. According to some alternative embodiments, a dispenser can be provided that supports a roll in a state similar to that shown in FIGS. 54A and 54B, such as, e.g., by supporting the roll on a device having an interior rod that extends through the roll. In this regard, structure similar to that of prior expansion systems and devices as incorporated herein by reference can be employed, as long as the structure enables the roll to be supported and the expandable paper to be fed from a perimeter end as show in, e.g., FIGS. 54A and 54B.

Figure 55:
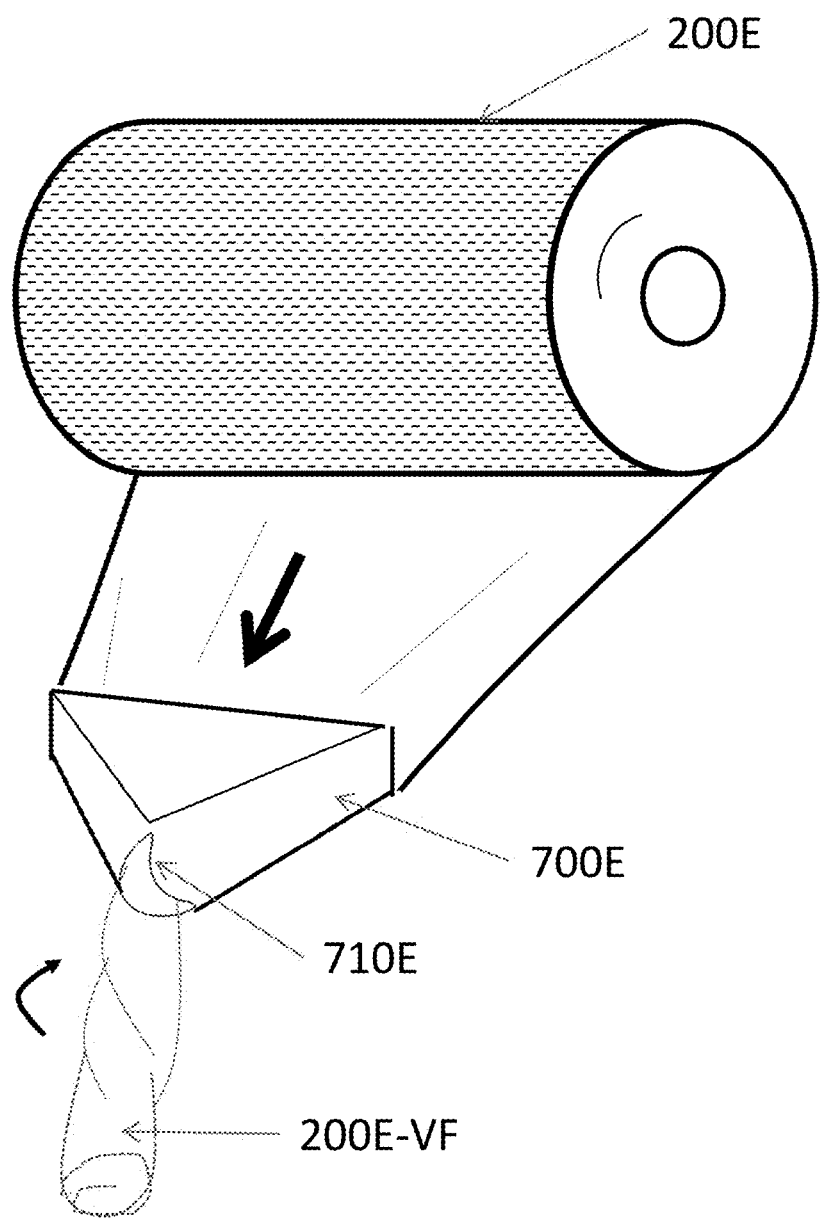
FIG. 55 is a perspective view of an alternative, less preferred, embodiment of a slit sheet paper void fill dispensing mechanism according to another alternative embodiment in which the slit sheet paper is fed in a machine direction into a contraction device.

FIG. 55 is shows a perspective view of an illustrative alternative, less preferred, embodiment of a slit sheet paper void fill dispensing mechanism according to another alternative embodiment in which the slit sheet paper is fed in a machine direction into a contraction device. Towards that end, as shown in FIG. 55, the roll of slit sheet material (which starts as a roll similar to that shown in FIGS. 54A and 54B) is fed in the machine direction (shown by the large black arrow) into a contraction device 700E, which is configured in the shape of a funnel with a wider inlet opening that receives the expandable slit sheet paper and a smaller outlet opening 710E through which the expandable slit sheet paper is dispensed.

In the preferred embodiments, as the expandable slit sheet paper is fed through the contraction device, the expandable slit sheet paper is fed in such a manner that regions of the expandable slit sheet paper are caused to contact one another (e.g., at a plurality of locations transverse to the machine direction) such that upon expansion the expandable slit sheet paper has open cells that contact one another in a manner to inhibit retraction after expansion. As illustrated in FIG. 55, in the preferred embodiments, the expandable slit sheet material exiting the outlet of the contraction device preferably forms a generally elongated or tubular configuration 200E-VF in which the expandable slit sheet material has been expanded and a plurality of regions of the expandable slit sheet material along a direction transverse to the machine direction are in contact with one another such as to inhibit retraction of the generally elongated or tubular member.

In some most preferred implementations, the outlet 710E is arranged and configured in a manner such as to impart or facilitate a twisting motion such as to cause the expandable slit sheet paper to expand in a tubular form generally similar to some of the embodiments described herein above. By way of example, in some embodiments, the outlet 710E can be formed in a curved or arcuate manner, or in a spiral manner, such as to initiate a rotational motion as the expandable slit sheet material exits the outlet 710E. In the preferred embodiments, the outlet 710E is configured in such a manner as to enable the slit sheet paper to freely flow through the outlet without tearing, but at the same time to provide sufficient resistance to enable expansion of the expandable slit sheet paper as it is pulled through the outlet. As with other embodiments described herein, in some embodiments, a device similar to FIG. 55 can be a manual dispensing device. On the other hand, in some alternative embodiments, a device similar to FIG. 55 can be configured as an automated device in accordance with embodiments described herein. Moreover, in various embodiments, the outlet 710E could also be configured to have a shape that is similar or the same as that of other outlets described herein with respect to other embodiments of the invention described herein. Furthermore, in some other alternative variations of the embodiment shown in FIG. 55, in some alternative embodiments a mechanism can be provided upstream of the contraction device 700E or within the contraction device 700E that causes the expandable slit sheet paper to twist in a manner similar to that of other embodiments herein. For example, such a device that causes the expandable slit sheet to twist could include one or more guide surface and/or one or more rotating mechanism that imparts rotation to the expandable slit sheet material. However, it should also be appreciated that in some embodiments, such a twisting or rotational motion of the expandable slit sheet material would not be implemented or employed.

Figure 56:
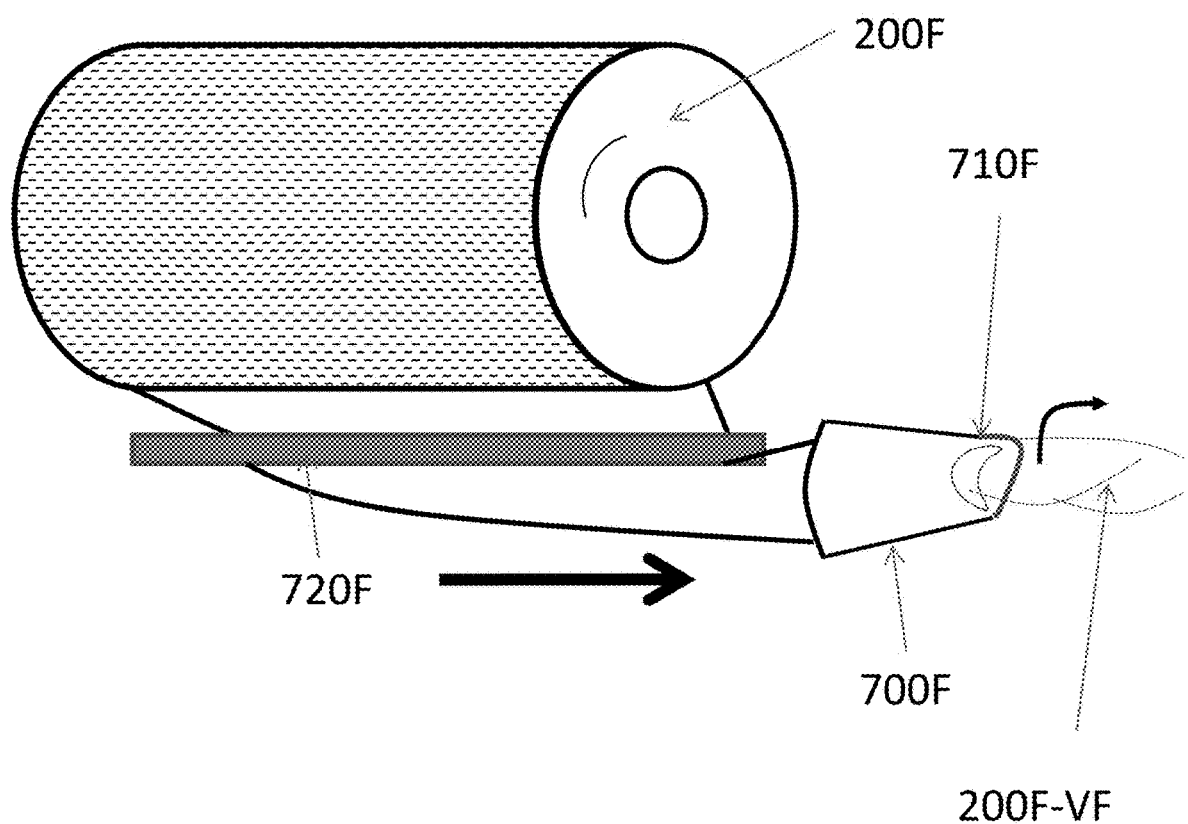
FIG. 56 is a perspective view of an alternative, less preferred, embodiment of a slit sheet paper void fill dispensing mechanism according to another alternative embodiment in which the slit sheet paper is fed laterally to the machine direction into a contraction device.

FIG. 56 is a perspective view of another alternative, less preferred, embodiment of a slit sheet paper void fill dispensing mechanism according to another alternative embodiment in which the slit sheet paper is fed laterally to the machine direction into a contraction device.

Towards that end, as shown in FIG. 56, the roll of slit sheet material (which starts as a roll similar to that shown in FIGS. 54A and 54B) is fed transverse to the machine direction (shown by the large black arrow) into a contraction device 700F, which is configured in the shape of a funnel with a wider inlet opening that receives the expandable slit sheet paper and a smaller outlet opening 710f through which the expandable slit sheet paper is dispensed. In some embodiments, in order to facilitate laterally directing the expandable slit sheet material, one or more guide rod 720F can be provided to facilitate guiding of the slit sheet material towards the contraction device 700F, and can facilitate guidance, for example, of the expandable slit sheet paper in a manner that the paper does not prematurely separate from the exterior of the roll 200F.

In some preferred embodiments, as the expandable slit sheet paper is fed through the contraction device, the expandable slit sheet paper is fed in such a manner that regions of the expandable slit sheet paper are caused to contact one another (e.g., at a plurality of locations transverse to the machine direction) such that upon expansion the expandable slit sheet paper has open cells that contact one another in a manner to inhibit retraction after expansion. As illustrated in FIG. 56, in the preferred embodiments, the expandable slit sheet material exiting the outlet of the contraction device preferably forms a generally elongated or tubular configuration 200F-VF in which the expandable slit sheet material has been expanded and a plurality of regions of the expandable slit sheet material along a direction transverse to the machine direction are in contact with one another such as to inhibit retraction of the generally elongated or tubular member.

In the preferred embodiments, as the expandable slit sheet paper is fed through the contraction device, the expandable slit sheet paper is fed in such a manner that regions of the expandable slit sheet paper are caused to contact one another (e.g., at a plurality of locations transverse to the machine direction) such that upon expansion the expandable slit sheet paper has open cells that contact one another in a manner to inhibit retraction after expansion. In some most preferred implementations, the outlet 710F is arranged and configured in a manner such as to impart or facilitate a twisting motion such as to cause the expandable slit sheet paper to expand in a tubular form generally similar to some of the embodiments described herein above. By way of example, in some embodiments, the outlet 710F can be formed in a curved or arcuate manner, or in a spiral manner, such as to initiate a rotational motion as the expandable slit sheet material exits the outlet 710F. In the preferred embodiments, the outlet 710F is configured in such a manner as to enable the slit sheet paper to freely flow through the outlet without tearing, but at the same time to provide sufficient resistance to enable expansion of the expandable slit sheet paper as it is pulled through the outlet. As with other embodiments described herein, in some embodiments, a device similar to FIG. 56 can be a manual dispensing device. On the other hand, in some alternative embodiments, a device similar to FIG. 56 can be configured as an automated device in accordance with embodiments described herein. Moreover, in various embodiments, the outlet 710F could also be configured to have a shape that is similar or the same as that of other outlets described herein with respect to other embodiments of the invention described herein. Furthermore, in some other alternative variations of the embodiment shown in FIG. 56, in some alternative embodiments a mechanism can be provided upstream of the contraction device 700F or within the contraction device 700F that causes the expandable slit sheet paper to twist in a manner similar to that of other embodiments herein. For example, such a device that causes the expandable slit sheet to twist could include one or more guide surface and/or one or more rotating mechanism that imparts rotation to the expandable slit sheet material. However, it should also be appreciated that in some embodiments, such a twisting or rotational motion of the expandable slit sheet material would not be implemented or employed.

Figure 57:
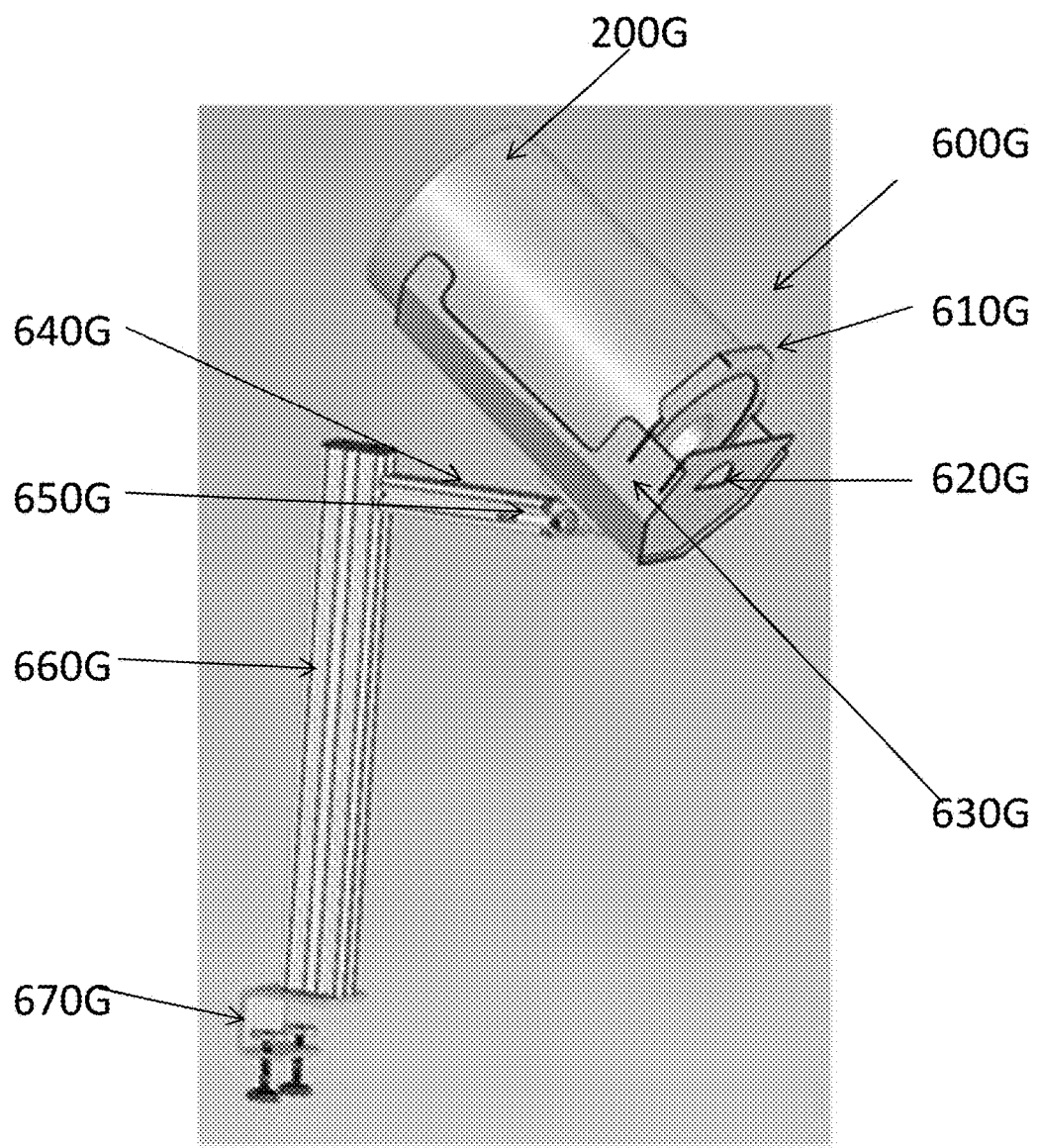
FIG. 57 is a perspective view of another alternative dispenser according to some illustrative embodiments of the invention.

FIG. 57 is a perspective view of another alternative dispenser 600G according to some illustrative embodiments of the invention. In the preferred embodiment, the dispenser shown in FIG. 57 is made of metal or another rigid material.

As shown in FIG. 57, the dispenser 600G includes a support 630G that supports a roll of slit sheet material 200G. In this illustrative embodiment, the support 630G includes a retaining member 610G that holds the roll 200G at a separation distance from the outlet 620G formed in a lower plate member. As with other embodiments described hereinabove, in operation, the expandable slit sheet material would be pulled from a center of the roll and extended through the outlet for dispensing. Although the outlet 620G could have a variety of configurations (e.g., any of the configurations described herein), in this illustrative example, the outlet 620G has a semi-circular configuration.

In operation, this illustrative dispenser 600G can be attached to a table or other support surface using an adjustable table mounting device 670G (e.g., employing one or more screw adjustment members as shown to press and hold to a side of a table). Alternatively, other attachments and/or supporting bases and/or the like can be employed. In this illustrative embodiment, the dispenser 600G includes a generally upright support beam 660G, and a laterally extending support arm 640G. In some embodiments, and adjustment mechanism 650G can be provided to adjust the tilting angle of the support 630G and/or to adjust the elevation of the arm 640G along the beam 660G.

Figure 58:
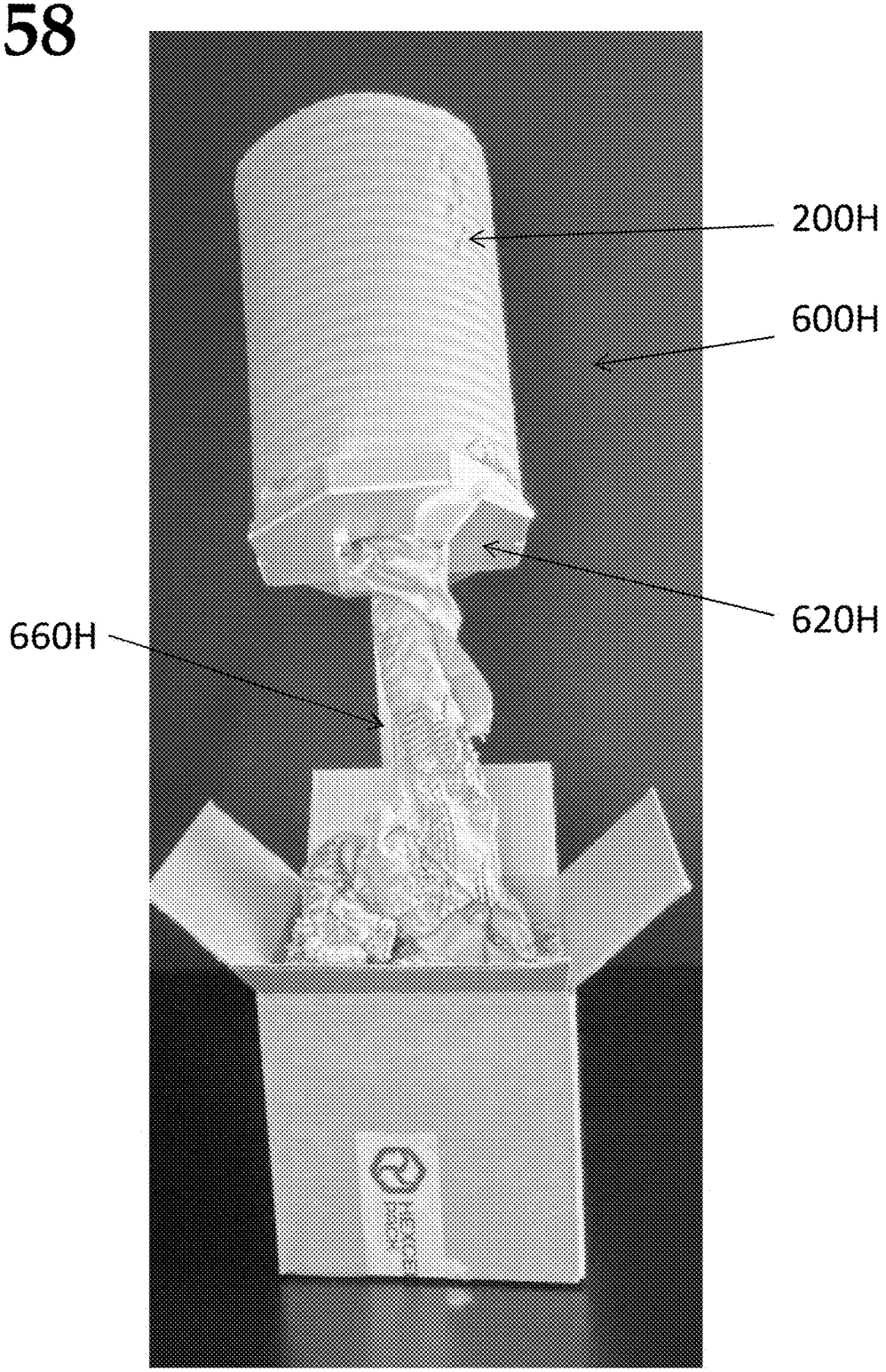
FIG. 58 is a front view of another alternative dispenser according to some other illustrative embodiments.

FIG. 58 is a front view of another alternative dispenser 600H according to some other illustrative embodiments, which is similar to that shown in FIG. 57. In the preferred embodiment, the dispenser shown in FIG. 58 is made of metal or another rigid material.

As shown in FIG. 58, the dispenser 600H includes a support that supports a roll of slit sheet material 200G. In this illustrative embodiment, the outlet 620H is configured similar to the outlet shown in FIGS. 39 and 40. Although FIG. 58 shows the outlet in an open state similar to that shown in FIG. 39, upon closing of the outlet to a condition similar to that shown in FIG. 40, the outlet would have a crescent shape opening in this example similar to opening 605D shown in FIG. 40. Alternatively, the outlet 620H can be modified to have any of the various configurations described herein.

In the example shown in FIG. 58, the dispenser can be conveniently located proximate a container or box within which the void fill is intended to be inserted. In this example, the dispenser is attached to a table and supported via the beam 660H, and a container or box is placed in front of the dispenser so that a user can fill the container or box with void fill as desired. In this manner, a user can readily manually feed the void fill tube into the container or box and then can manually tear the void fill tube once the container or box is sufficiently filled. Thereafter, a new container or box can be placed at the same location and the void fill filling cycle repeated.

Figure 59:
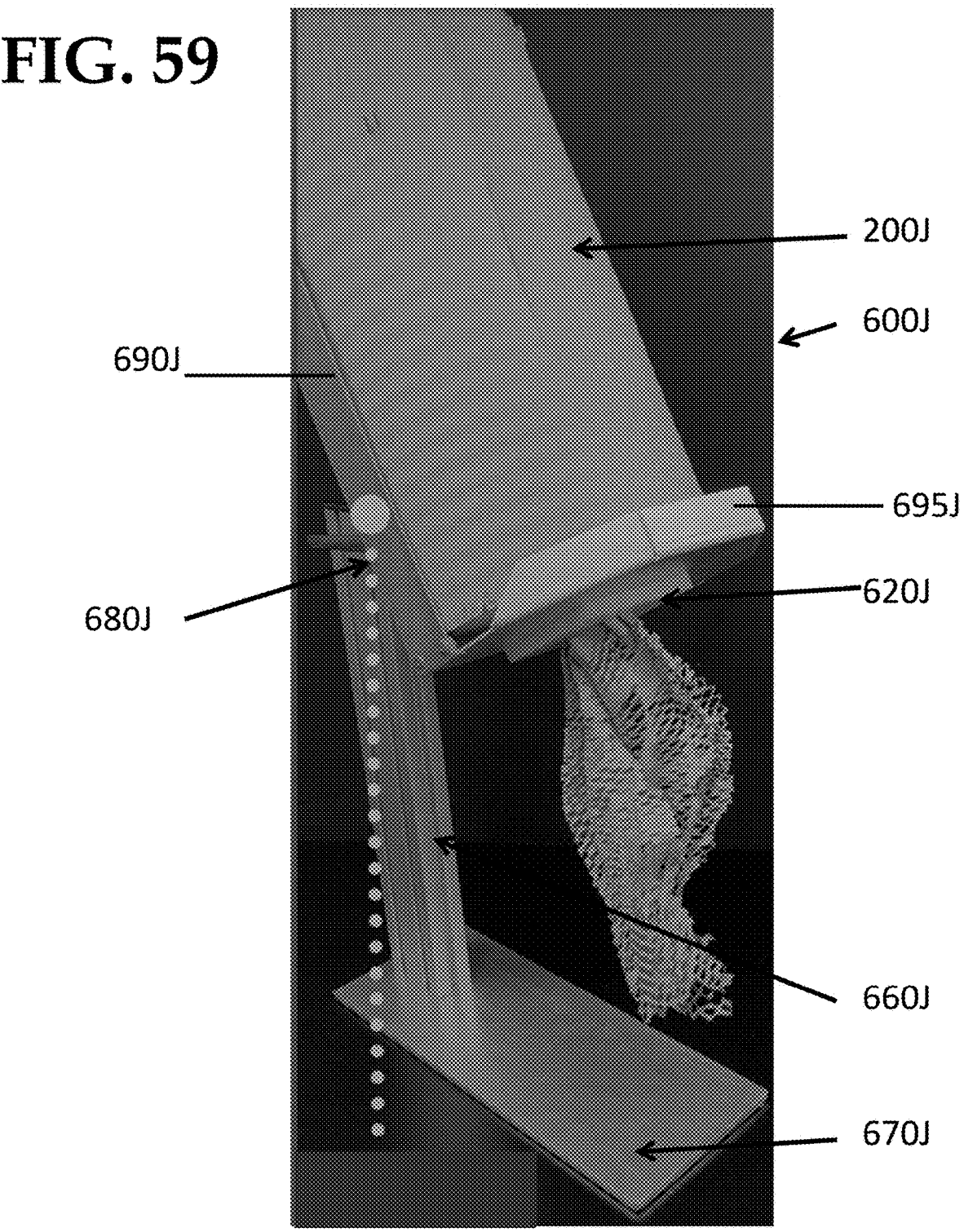
FIG. 59 is a perspective view of another alternative dispenser according to some other illustrative embodiments.

FIG. 59 is a perspective view of another alternative dispenser 600J according to some other illustrative embodiments, which is similar to that shown in FIGS. 57 and 58. In the preferred embodiment, the dispenser shown in FIG. 59 is similarly made of metal or another rigid material.

As shown in FIG. 59, the dispenser 600J includes a support that supports a roll of slit sheet material 200J. In this illustrative embodiment, the outlet 620J is configured similar to the outlet shown in FIG. 41. Towards that end, in some illustrative embodiments, the outlet 620J is crescent shaped. Moreover, in this illustrative embodiment, the outlet 620J is constructed as a plastic insert or donut member. Towards that end, in some preferred implementations metal dispenser systems, the outlet is advantageously made with a plastic to facilitate providing a sufficient smoothness so that the expandable slit sheet material can properly flow through the outlet without being prematurely severed due to sharp or jagged edges. Alternatively, the outlet 620H can be modified to have any of the various configurations described herein.

In the example shown in FIG. 59, the dispenser can be conveniently located proximate a container or box in a similar manner to that shown with respect to FIG. 58. In this example, the dispenser is supported on a table via a widened base 670J that in turn supports the supporting beam 660J. Additionally, in the preferred implementation an adjustment mechanism 680J is also included that enables the support to raise and/or lower the dispensing height of the dispenser along the beam 660J.

Figure 60:
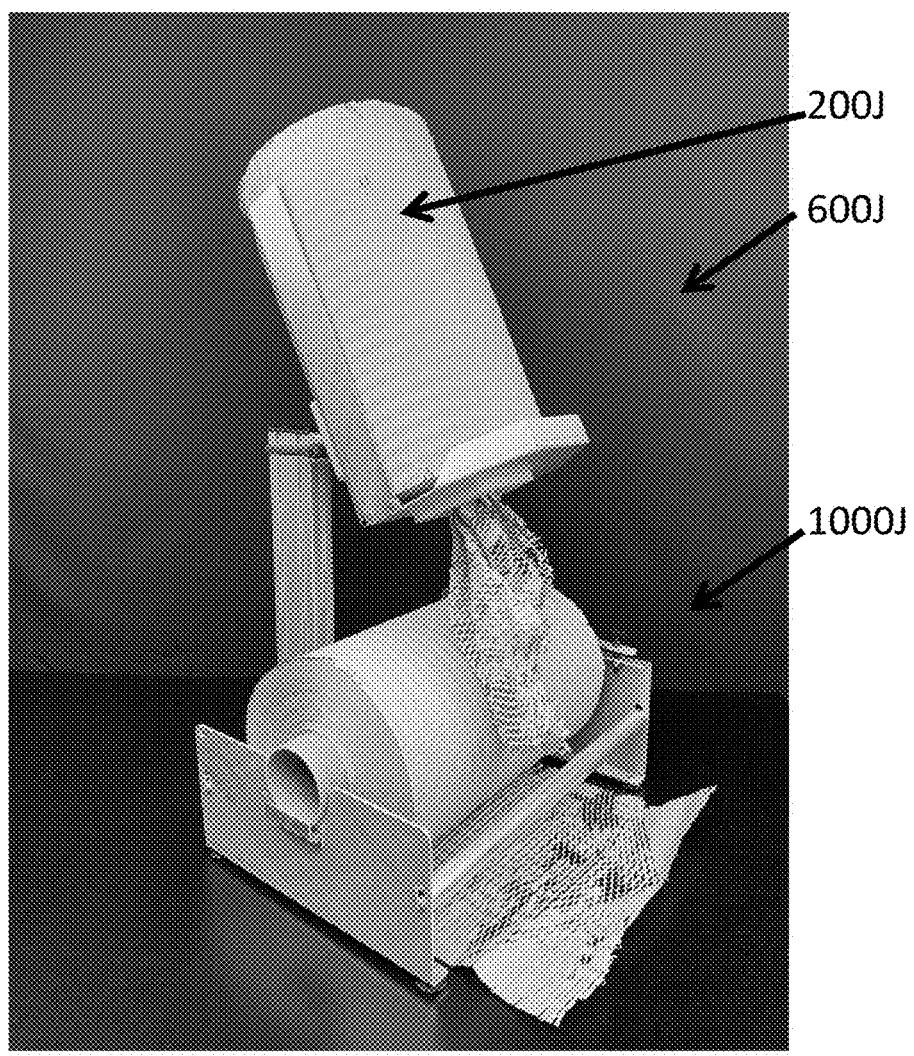
FIG. 60 shows an advantageous combination system in which a dispenser similar to that shown in FIG. 59 is placed proximate an expansion device that is used to wrap items.

With reference to FIG. 60, FIG. 60 shows an advantageous combination system in which a dispenser 600J similar to that shown in FIG. 59 is placed proximate an expansion device 1000J that is used to wrap items by, e.g., placing an item on the expanded sheet pulled from the expansion device 1000J and then wrap the item. In this manner, as shown, a compact system can be provided whereby a user has both of these synergistic devices proximate the user (e.g., as shown, in preferred instances, the devices can be aligned such that the feed of the void fill tube of the dispenser 600J is aligned and extends over the feed of the flat expanded sheet of the expansion device 1000J.

Thus, in use, a user can obtain a container or box, the user can then wrap one or more items with the expansion device 1000J and can place the wrapped item in the container or box. Then, the user can use the dispenser 600J to dispense void fill and fill the remaining space in the box as desired. Notably, in this advantageous combination system, the expanded cells of the void fill can also conveniently interlock with the expanded cells of the sheet that is wrapped around the item(s) with the expansion device 1000J achieving a highly effective packaging.

It should be appreciated that all of the dispensers described herein can be similarly advantageously employed in a synergistic combination usage with expansion devices used for wrapping in various embodiments. Moreover, it should also be appreciated that various embodiments herein can be employed with any existing expansion devices for wrapping as are known in the art, including any and all of the devices described herein and/or in any of the patents incorporated herein by reference.

Moreover, although this illustrative and advantageous use of some void fill dispensers according to illustrative embodiments of the invention is described, it should be appreciated that the void fill dispensing systems and devices herein can be used in a variety of methods, a variety of applications, and in a variety of manners of use.

Figure 61:
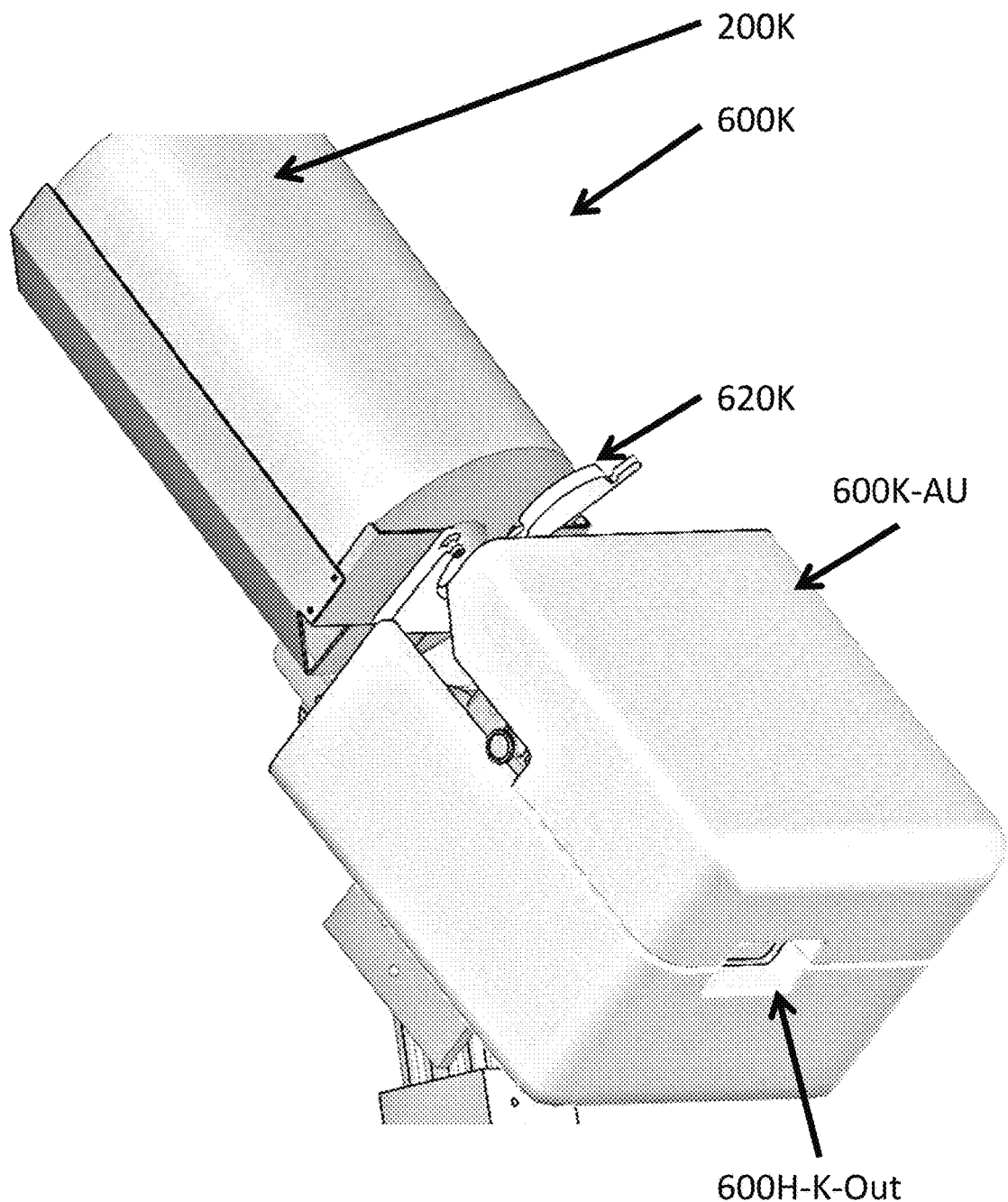
FIGS. 61 to 62 are perspective views of another alternative dispenser according to some further illustrative embodiments.
Figure 62:
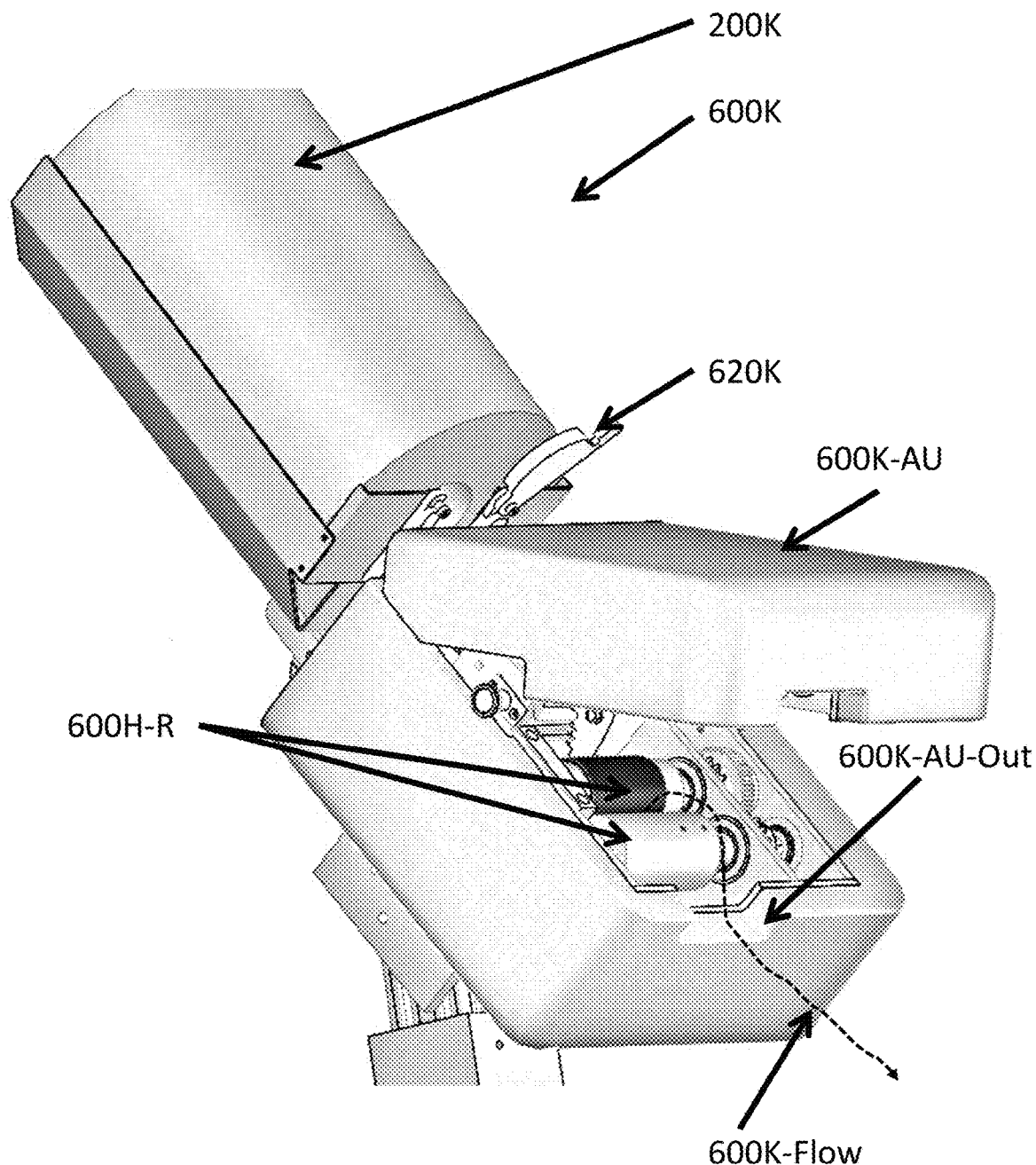

FIGS. 61 to 62 are perspective views of another alternative dispenser 600K according to some further illustrative embodiments. Here, this embodiment is similar to the embodiment shown in FIG. 58, with additional mechanisms to impart automated dispensing. In the preferred embodiment, the dispenser shown in FIGS. 60 to 61 is made of metal or another rigid material.

As shown in FIG. 61, the dispenser 600K includes a support that supports a roll of slit sheet material 200K. In this illustrative embodiment, the outlet 620K is configured similar to the outlet shown in FIGS. 39 and 40. Although FIG. 61 shows the outlet in an open state similar to that shown in FIG. 39, upon closing of the outlet to a condition similar to that shown in FIG. 40, the outlet would have a crescent shape opening in this example similar to opening 605D shown in FIG. 40. Alternatively, the outlet 620K can be modified to have any of the various configurations described herein.

In the example shown in FIG. 61, the dispenser can be conveniently located proximate a container or box within which the void fill is intended to be inserted. In this example, the dispenser can be, e.g., attached to a table and supported via the beam, and a container or box can be, e.g., placed in front of the dispenser so that a user can fill the container or box with void fill as desired. In this manner, a user can readily place the void fill tube into the container or box and then can manually tear the void fill tube once the container or box is sufficiently filled. Thereafter, a new container or box can be placed at the same location and the void fill filling cycle repeated.

In contrast to the embodiment shown in FIG. 58, the device shown in FIGS. 61 to 62 include an automated compartment 600K-AU that contains an electric motor (not shown) and a plurality of drive rollers 600H-R as shown to help drive or pull the expandable slit sheet material through the outlet 620K and to effect expansion of the cells as described herein. In operation, the expanded sheet would follow the flow path shown by the dashed line arrow in FIG. 61 and be dispensed via the outlet 600K-AU-Out. In some illustrative embodiments, the rollers 600H-R can include a hook roller similar to that described above that is configured to engage with the slits of the expandable slit sheet paper in order to grab the sheet and effect expansion as described herein.

In use, an operator would lift the lid of the automated compartment as shown in FIG. 61, and would feed the expandable slit sheet paper through the outlet 620K and into a rear opening of the automated compartment (not shown) and then between the rollers 600H-R and through the path 600K-Flow. Then, the user would close the lid and the system could then operated by the user employing the automated expansion of the expandable slit sheet paper. In some preferred embodiments, the system can include a switch or pedal via which a user can turn on and off the system to start and stop the process of expansion. In that manner, the user can use the automated system to dispense the void fill to an extent as desired. In some alternative embodiments, the system could be computer controlled such that a computer processor is configured to drive the system and expand the paper at a rate determined by programming of the computer.

FIGS. 63 to 66 show another illustrative embodiment which pertains to a non-automated dispenser made of, e.g., recyclable material such as, e.g., cardboard or paper or the like. In particular, FIGS. 63 to 66 depict a novel dispenser support 100L-S that can be provided to support a dispenser 100L as shown. Although the support 100L-S is shown as supporting a dispenser 100L, it should be appreciated that a similar support could be employed to support various other dispensers described herein, and, especially, various dispensers described herein formed of recyclable material and/or formed in a substantially box-shape configuration.

Figure 63:
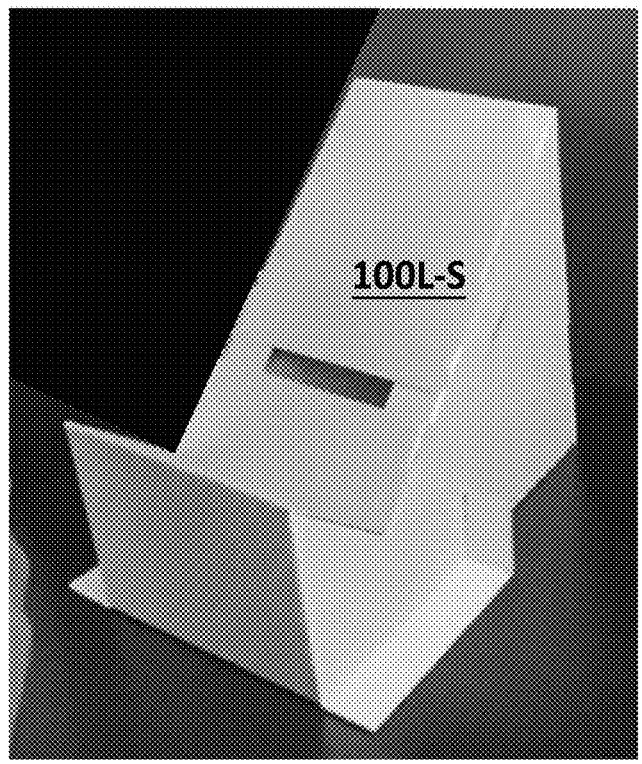
Figure 64:
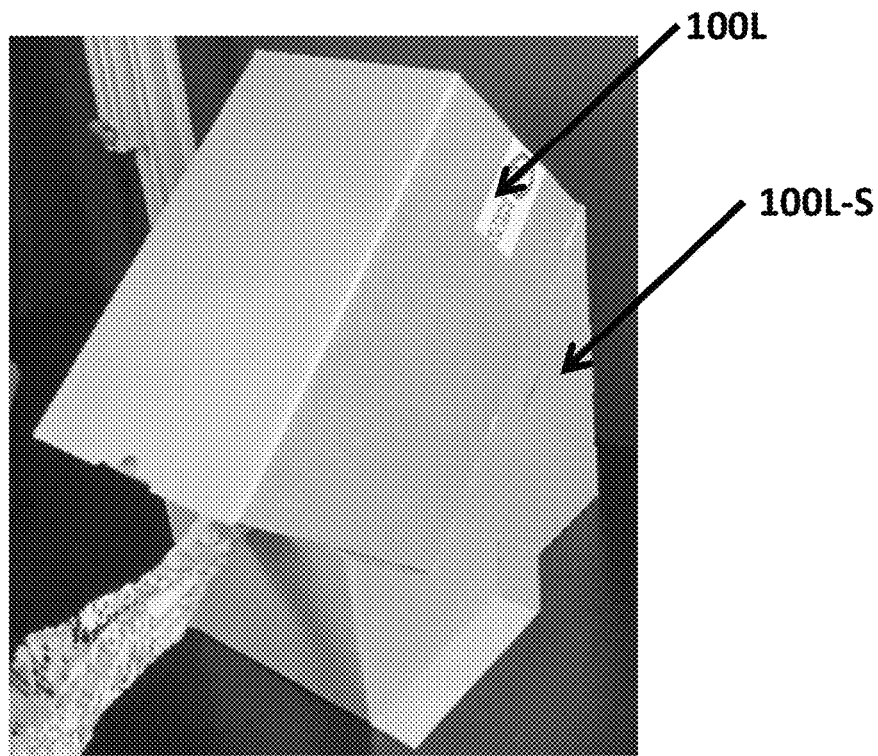
Figure 65:
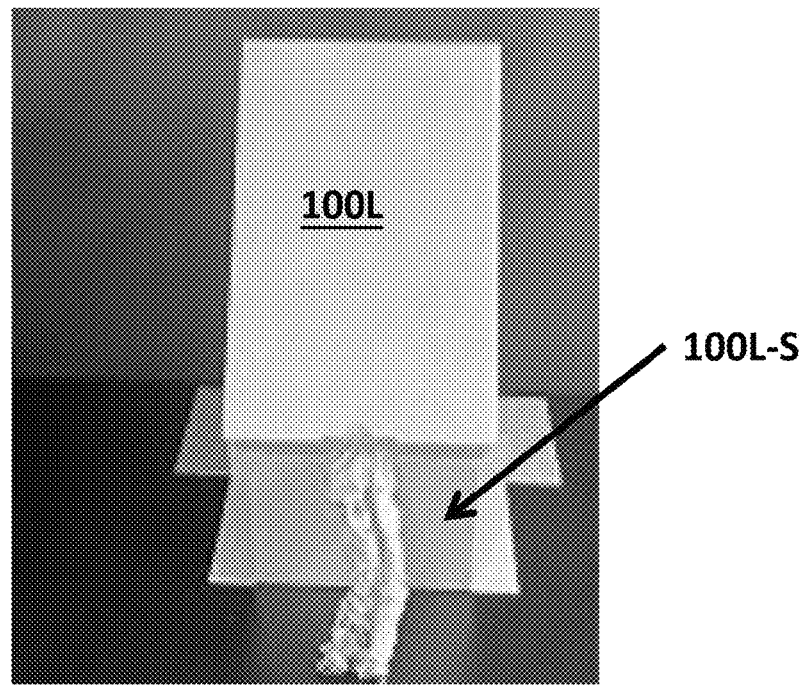
Figure 66:
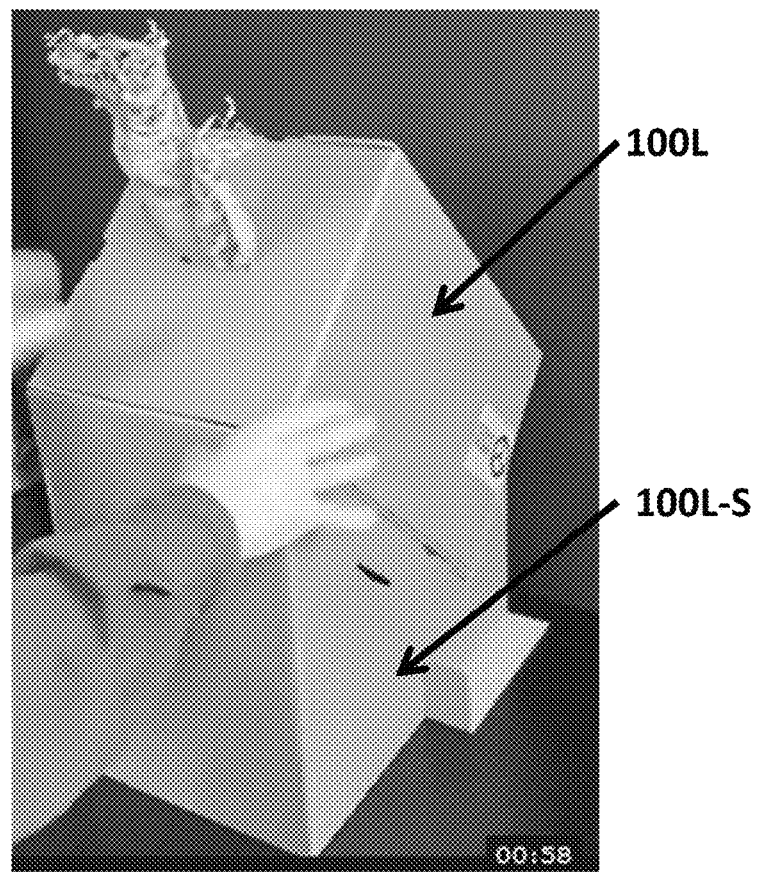

In the preferred embodiment, the support 100L-S is made of recyclable material, and, most preferably, cardboard as shown. In the preferred embodiment, the support 100L-S provides a substantially L-shaped upper support surface as best seen in FIG. 63, which is inclined at an angle as shown. In this manner, the support 100L-S preferably is configured to alternatively support the dispenser 100L in either an inverted dispensing position (such as, e.g., shown in FIGS. 64 and 65) or in an upward dispensing position (such as, e.g., shown in FIG. 66). In this manner, the support 100L-S can advantageously enable users to adjust their work space as desired based on circumstances.

Figure 67:
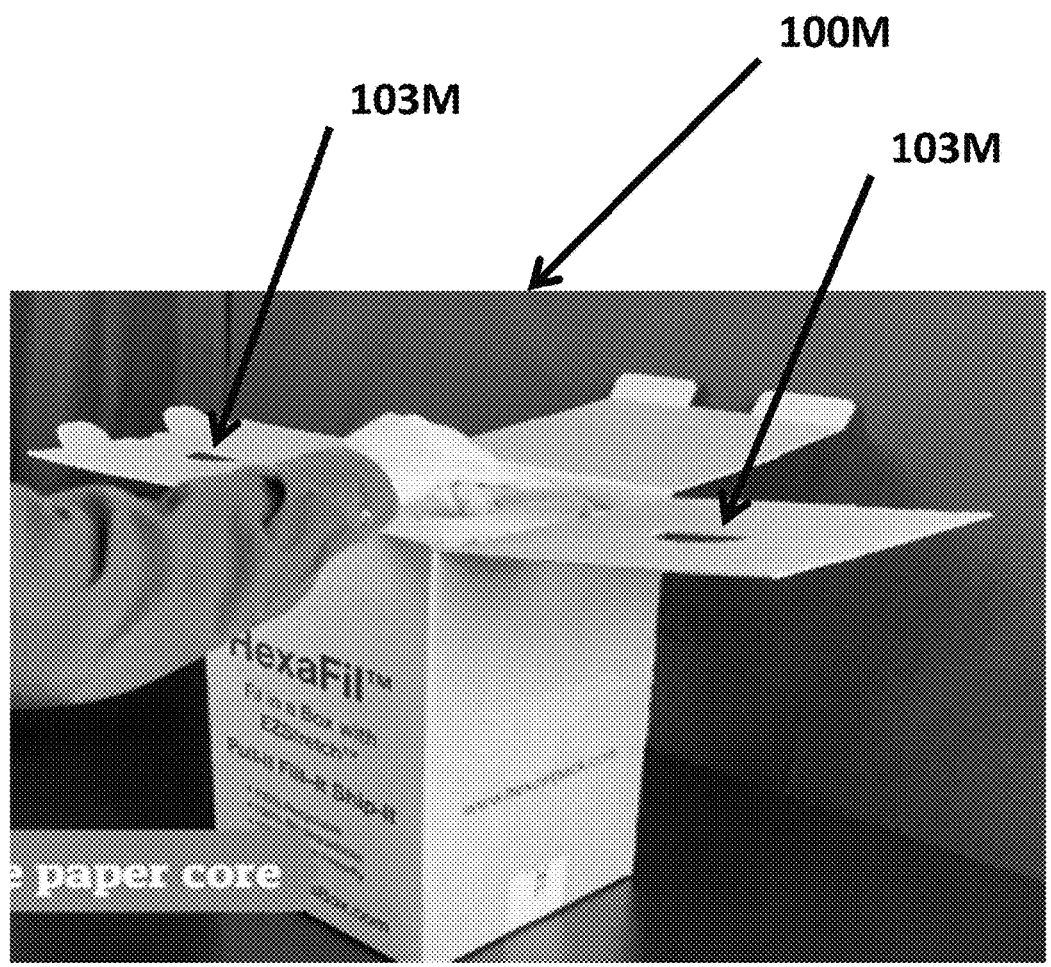

FIG. 67 shows another illustrative embodiment which also pertains to a non-automated dispenser 100M made of, e.g., recyclable material such as, e.g., cardboard or paper or the like. In particular, the embodiment shown in FIG. 67 is similar to the embodiments shown in FIGS. 34-37 and 48-52 which include a semi-circular opening. However, the embodiment shown in FIG. 67 depicts another advantageous panel structure according to some alternative embodiments. In particular, as shown in FIG. 67, in some illustrative embodiments, rather than having the outlet of the dispenser 100M formed within a thickness of a single panel, the embodiment shown in FIG. 67 employs multiple panels each having an corresponding outlet 103M, which outlets are aligned to form a single common outlet opening having two layers of panels upon one another. In this manner, the thickness of the container or box at the outlet(s) 103M can be twice that of a single panel. Among other things, this can help to enhance the strength and rigidity during operation, and can also present a larger friction surface to facilitate applying sufficient friction to desirably achieve smooth and reliable expansion of the expandable slit sheet paper as it is pulled through the outlet(s) 103M. In the illustrative embodiment shown in FIG. 67, in use, the operator can manually grasp the inner end of the roll of slit sheet material (as shown), then the operator can rotate the panel shown at the right side of the figure so as to be placed over the roll within the box, while threading the paper through the outlet 103M of that panel, and then the user can fold the panel shown at the left side of the figure so as to be placed over the first panel while threading the paper through the outlet 103 of that second panel. Then, the user can extend the tabs shown at the left side of the second panel in FIG. 67 within two respective slots formed proximate the hinge of the first panel, such as to retain the panels in alignment such with the expandable slit sheet material extending through the aligned outlet 103M.

Although FIG. 67 shows a semi-circle shaped outlet, it should be appreciated that other embodiments can employ any other outlet configuration as described herein.

In some embodiments that employ recyclable cardboard or corrugated board materials such as, e.g., shown in various embodiments described herein-above, in some cardboard box configurations, the outlet is formed in a substantially semi-circular configuration as shown. In such embodiments, the arc of the semi-circle does not have to be of constant radius of curvature, but can be varied in alternative embodiments. In cardboard embodiments, having a structure of a configuration which includes a straight side of the outlet can help create a stronger outlet rigidity. For example, if a crescent shape is employed or another shape in which a portion of the perimeter of the outlet extends inward, such inwardly extending portion could be subject to bending forces. Accordingly, some preferred recyclable box constructions include such a semi-circular configuration as shown in some illustrative embodiments. However, other embodiments can employ other configurations of outlets as described herein, such as, e.g., crescent shape, etc.

In some embodiments that employ metal or other rigid material dispensers (e.g., non-recyclable rigid materials), the outlet can be formed of plastic or polymeric materials in some embodiments. For example, as shown in FIGS. 41, 59 and 60, in some embodiments employing metal dispensers, a plastic outlet can be provided. Among other things, a plastic outlet can advantageously avoid sharp edges that often occur when cutting holes within metal panels. In some preferred embodiments, the outlet openings in such plastic outlets can be formed in a crescent shape or in a smile-shape or lune-shape. In particular, by forming the outlet in a manner such that rather than having a straight edge (as with a semi-circle), the edge curves or extends inward to some extent, the friction applied by such an edge can be increased. Accordingly, which a plastic or polymeric outlet is provided, due to the smooth nature of the plastic or polymeric edge of the outlet, the inward extension can help to achieve a desirable degree of friction to ensure smooth expansion of the void fill. Moreover, in such embodiments, because the outlet can be made with a strong plastic or polymeric material, the strength of the outlet can be maintained without concern. Nevertheless, in various other embodiments, the shape of the outlet in a metal or other rigid material dispenser can be similar to any of the outlet configurations described herein. By way of example, FIG. 57 shows an illustrative metal or other rigid material dispenser having a semi-circular outlet, and other figures herein show various other outlet configurations in other metal or rigid material dispensers (see, e.g., FIGS. 7, 14 and 27).

In some embodiments of the invention, in order to facilitate feeding of the expandable slit sheet material from the center of the roll of slit sheet material, a mechanism is advantageously provided to help maintain the position of the roll of slit sheet material within the support. For example, in the embodiment shown in FIG. 59 (by way of one illustrative example), the edges 690J can be arranged to apply pressure on the side of the roll 200J supported thereon. Similarly, the edges 695J can be arranged to apply pressure on the side of the roll 200J supported thereon.

Figure 68A:
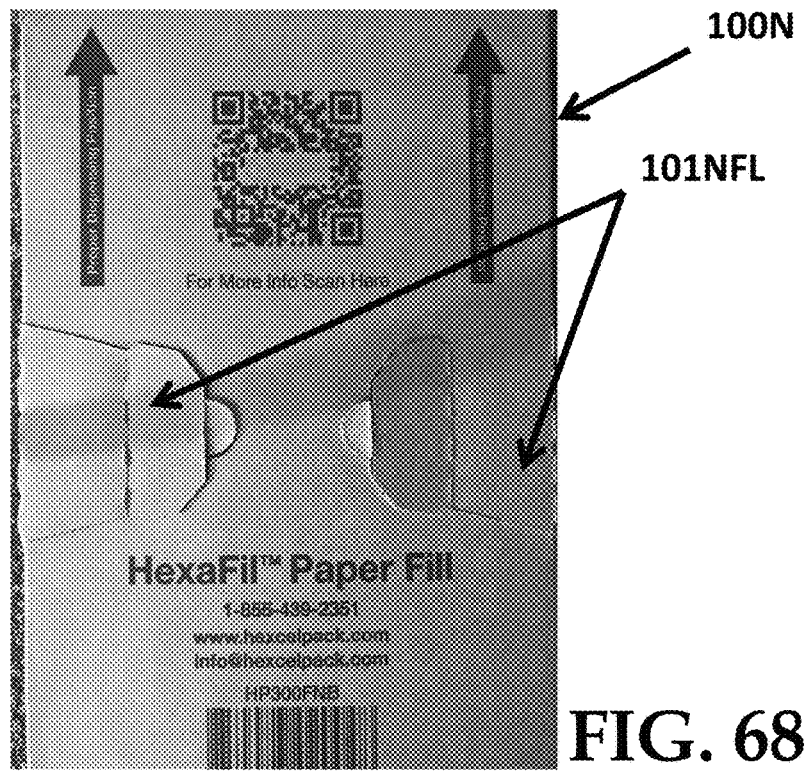
FIGS. 68A-68C show an illustrative embodiment in which at least one wall of a dispenser box is adapted to include at least one tab member for supporting a roll within the dispenser.
Figure 68B:
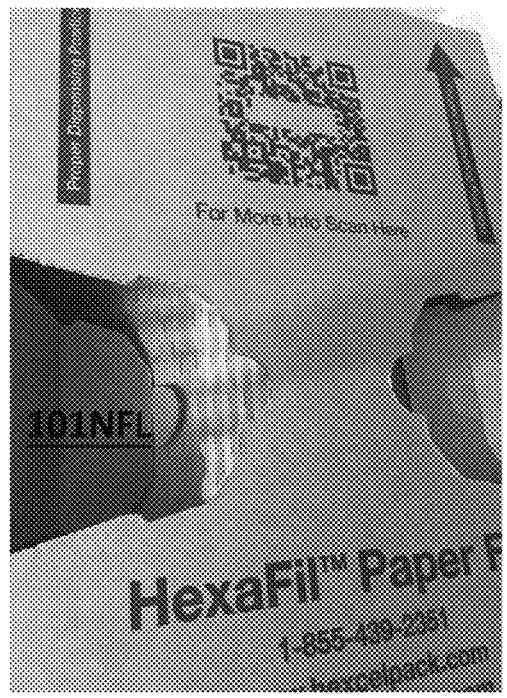
Figure 68C:
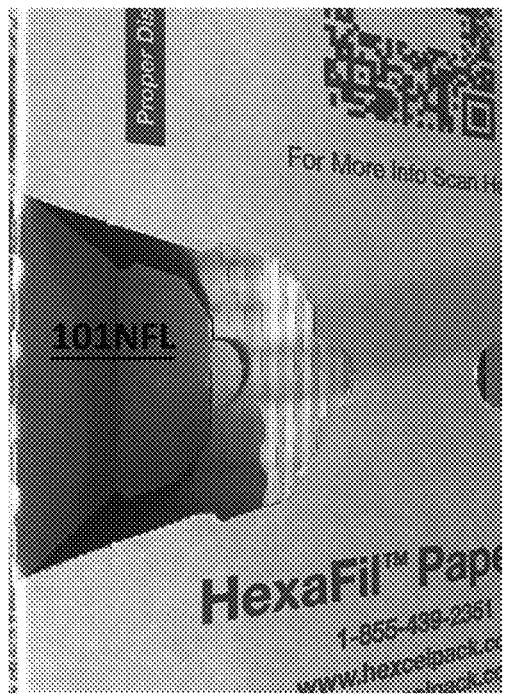
Figure 69:
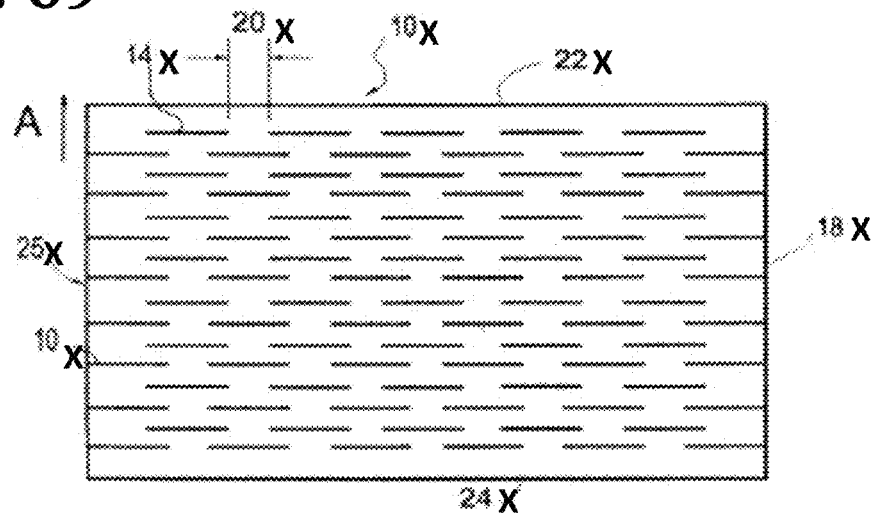
FIGS. 69-73 describe illustrative expansion of expandable slit sheet paper in some embodiments.
Figure 70:
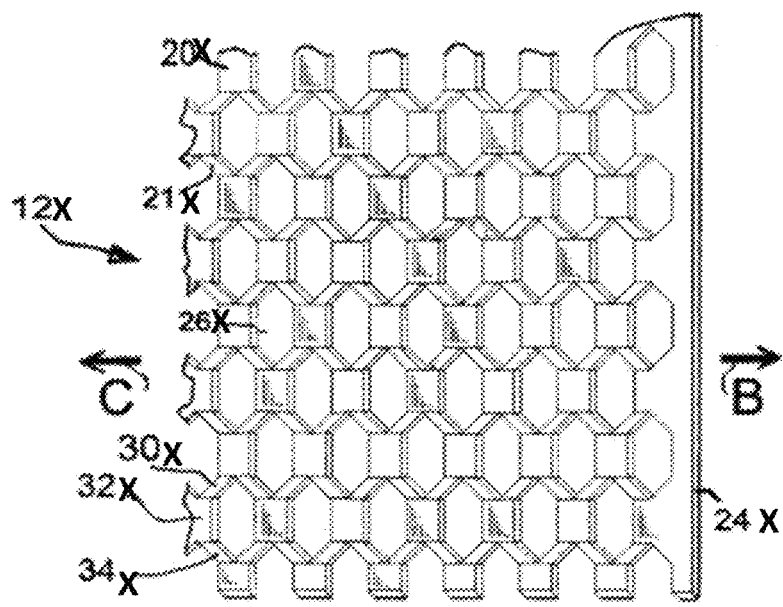

As another example, in embodiments that employ a dispenser box for supporting the roll of expandable paper, which box is made with recyclable cardboard or corrugated board materials, the box can be adapted to have one or more panel or member that applies a supporting pressure against the roll during use. In some embodiments, such a panel or member can be an additional member or insert that is located inside the box to facilitate placement of the roll within the box. In some embodiments, as shown in FIGS. 68A to 68C, one or more outer wall of the box (such as, e.g., one or more of the walls of the box that is perpendicular to the wall of the box having the outlet) can include one or more tab members 101NFL that can be pressed inward from a shipping position as shown in FIG. 68A in which the tab members 101NFL are co-aligned with the outer wall of the box to a roll-contacting position as shown in FIGS. 68B and 68C. Towards that end, in the preferred embodiments, as shown, the tab members 101NFL can include perforations around 3 sides thereof, such that during shipment the tab members can serve as part of the exterior walls, but upon assembly and usage, the tab members can be pressed inwards, thus tearing the perforations, and the tab members 101NFL can be pressed inwards such as to support the perimeter of the roll as shown.

Among other things, these supporting members can help to retain the positioning of the roll with respect to the respective support, and can also help to prevent the roll from rotating within the support.

For reference, FIGS. 69-73 describe illustrative expansion of expandable slit sheet paper in some embodiments, as well as the potential for interlocking between adjacent layers of expanded slit sheet paper in some circumstances. In this regard, FIGS. 69 and 70 correspond to FIGS. 1 and 3 of U.S. Pat. No. 5,667,871 (the '871 patent) incorporated herein by reference above. These figures describe existing "slit sheet" expandable paper structure. As explained in the '871 patent:

"The slit paper, indicated generally as 10[x], is illustrated in FIG. [69] as it would come off the slitting machine. The sheets can be formed on a flat-bed slitter and produced directly as rectangular sheets, as well as on a rotary slitter and cut into individual sheets or stored directly as a continuous sheet in roll form. The flexible sheet 10[x] is preferably manufactured from exclusively recycled paper with the grain of the paper running in the direction of arrow A. The flexible sheet 10[x] is provided with slits 14[x] and slits 16[x] are parallel to the edges 22[x] and 24[x] of the flexible sheet 12[x] and perpendicular to the paper grain. The slits 14[x] and slits 16[x] are placed in rows and separated from one another by land 20[x] and legs 21 [x] [shown in FIG. 70]. The land 20[x] is a consistent size and provides the support required to prevent the paper from tearing into strips when opened. The cushioning effect is produced by the flexing of the lands and legs under a load. It is therefore necessary that the land 20[x] be of sufficient size to provide cushioning. The spacing between the rows of slits 14[x] and slits 16[x] must also be of sufficient size to prevent the paper from tearing. The offset positioning of the rows of slits 14[x] and slits 16[x] gives the paper resiliency when opened . . . ." "When expanded, the expanded sheet, indicated generally as 12[x], is formed of hexagonal cells 26[x], legs 21[x] and land 20[x] areas, as illustrated in [FIG. 70]. [When in a planar state, in some embodiments], at least a majority of the land 20[x] areas lie in a plurality of parallel planes. The planes of the land 20[x] areas form an angle of at least about 45[x] degrees with the plane of the sheet in flat form."

Figure 71:
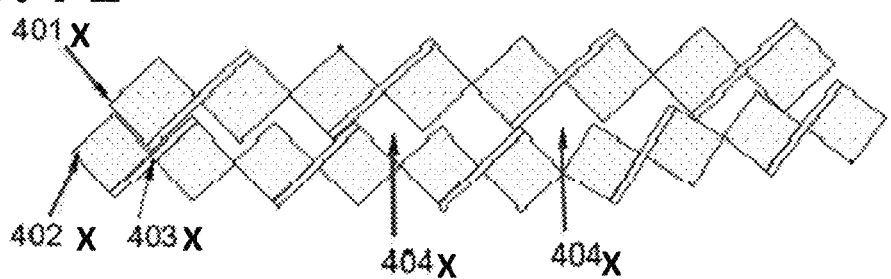

FIG. 71 is cross-sectional side view showing two expanded sheets layered against one another for explanatory purposes. In particular, this figure illustrates how adjacent expanded cells can interlock under some conditions. Notably, when the layers are flat or substantially flat as shown in FIG. 71, interlocking is more readily achieved. When the layers are highly curved or folded, interlocking can be reduced or eliminated. In the preferred embodiments of the invention, when a void fill tube is created, layers can be curved with respect to one another. However, with preferred embodiments described herein, in most preferred examples, interlocking between a sufficient number of expanded cells between adjacent layers can be achieved in order to inhibit or limit retraction in some embodiments.

As shown in FIG. 71, the figure shows a side view of two expanded layers 401x and 402x, having regions 403x where side walls of adjacent layer contact each other and nest and interlock. In this illustrative example, nesting is shown at a lower extent than may occur in conditions in which cells in adjacent layers are evenly expanded and laid upon one another. However, FIG. 71 helps to illustrate that even with variation in expansion or unevenness between layers, nesting and interlocking can occur as shown.

Figure 72:
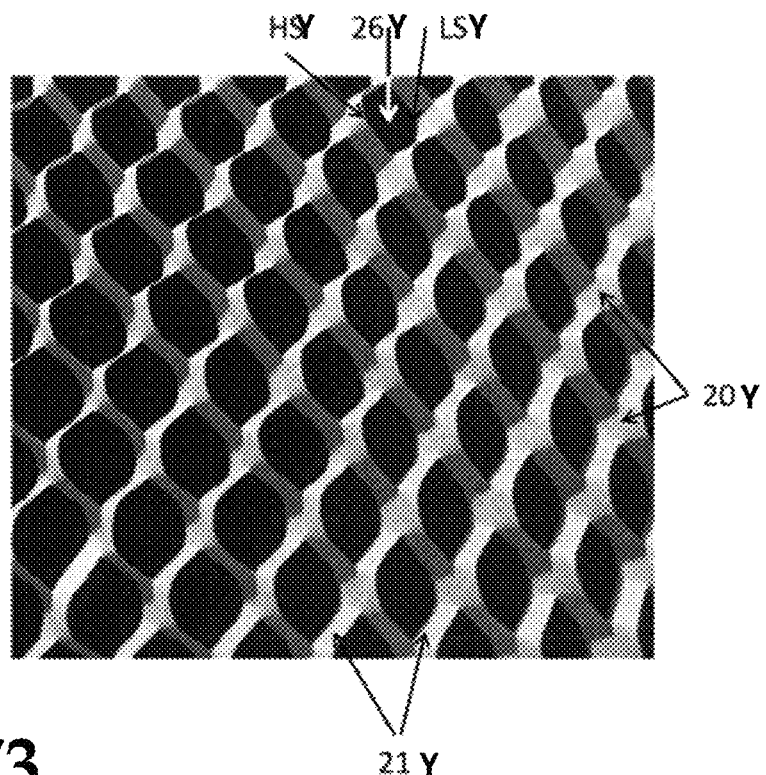

For further reference, FIG. 72 shows an illustrative expandable slit sheet paper in an expanded state, showing open cells 26Y (which are substantially hexagonal) and land portions 20Y and leg portions 21Y. As shown, the land portions have upper ends HSY and lower ends LSY. During interlocking and/or nesting, these upper ends and lower ends can contact and interlock or nest with upper ends and lower ends in layers above and/or below.

Figure 73:
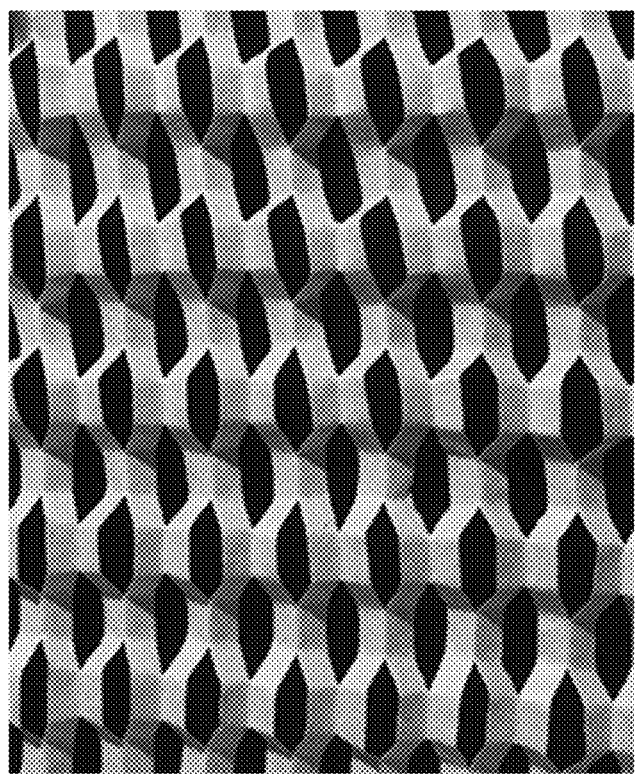

For further reference, FIG. 73 shows another expandable slit sheet paper in an expanded state. As with the examples shown in FIGS. 69-72, in some embodiments an expandable slit sheet paper can be employed that is expandable into a state similar to that shown in FIG. 73, and, similarly to the above discussion, adjacent layers of expanded slit sheet paper shown in FIG. 73 can interlock and nest. In some embodiments, the expandable slit sheet paper can expand similarly to any of the expandable slit sheet papers disclosed in the present inventor's co-pending U.S. application Ser. No. 16/929,843 filed on Jan. 6, 2021, the entire disclosure of which is incorporated herein by reference.

Extensible Paper Employed in Preferred Embodiments

As described herein above, in the most preferred embodiments, the slit sheet paper is made with an extensible paper. In some most preferred embodiments, extensible papers as set forth in the present inventor's above-referenced U.S. Pat. No. 10,669,086 are employed, the entire disclosure of which is incorporated herein by reference.

According to some embodiments, the extensible paper is extensible in a machine direction in a range of at least 5%. According to some embodiments, the extensible paper is extensible in a cross direction in a range of at least 5%. According to some embodiments, the extensible paper is extensible in a machine direction in a range of at least 5% and in a cross direction in a range of at least 5%. According to some embodiments, the extensible paper is extensible in a machine direction in a range of at least 6% and in a cross direction in a range of at least 6%. According to some embodiments, the extensible paper is extensible in a machine direction in a range of at least 7% and in a cross direction in a range of at least 7%. According to some, most preferred, embodiments, the extensible paper is extensible in a machine direction in a range of at least 8% and in a cross direction in a range of at least 8%. According to some embodiments, the extensible paper is extensible in a machine direction in a range of between 5% to 15% and in a cross direction in a range of between 5% to 15%. According to some embodiments, the extensible paper is extensible in a machine direction in a range of between 7% to 15% and in a cross direction in a range of between 7% to 15%.

According to some illustrative embodiments, the plurality of slits each have a width of between 0.35 and 0.65 inches; according to some embodiments, the plurality of slits each have a width of between 0.45 and 0.55 inches. According to some embodiments, the plurality of slits each have a width of about 0.5 inches. According to some embodiments, the plurality of slits each have a width of less than 0.5 inches. According to some embodiments, the plurality of slits each have a width of less than 0.45 inches. According to some embodiments, the plurality of slits each have a width of less than 0.4 inches.

As indicated above, in some most preferred embodiments, extensible papers as set forth in the above-referenced U.S. Pat. No. 10,669,086 are employed. Towards that end, the following paragraphs (in quotations) under this section are quoted from the '086 patent set forth details of extensible papers according to some preferred embodiments that can be employed in preferred embodiments of the present invention.

"For the purposes of the present invention, the term 'extensible' as applied to paper sheets, means a paper sheet that is able to stretch in a longitudinal direction of the paper sheet upon applying a force in the longitudinal direction of the paper sheet. Illustrative extensible sheets are disclosed in U.S. Pat. No. 3,908,071, U.S. patent application Ser. No. 14/901,977 (U.S. Pat. No. 9,945,077), International Application No. WO 1984002936, U.S. Publication Nos. 2002/0060034, 2007/0240841 (U.S. Pat. No. 7,918,966), and U.S. Pat. Nos. 3,104,197, 3,220,116, 3,266,972, 3,269,393, 3,908,071, 6,024,832, 6,458,447, and 6,712,930, the entire disclosures of which are incorporated by reference herein, as though recited in full. It should be understood that the stretching of an extensible paper must be measured in an unslit sheet of paper. As disclosed in U.S. Pat. No. 3,266,972, the test and characterization procedures employed in measuring elongation (extensibility) properties can be in accordance with standard TAPPI test Elongation T457. In addition, as disclosed in U.S. Pat. No. 3,266,972, the expression 'extensible papers' means a paper having an increasable elongation in the machine direction as compared to standard, non-extensible Kraft paper."

"In some preferred embodiments, extensible paper can be produced by varying the accumulation of paper fibers by essentially slowing the paper feeding process during the drying method to trap extra fibers that make the paper appear to have microscopically sized rows of paper that you would see if one were to pleat the paper. The difference is that extensible paper's microscopic rows are adhered to each other through the use of binders and other types of adhesives in conjunction with the drying process. Reference is made to patent U.S. Application No. 2007/0240841 (U.S. Pat. No. 7,918,966) where the purpose is to create a non-creped extensible paper that does not easily disconnect from itself. In addition, the surface of the extensible paper is still fairly flat."

"In the preferred embodiments of the present invention, the extensible paper that is employed has low extensible properties as compared to other types of extensible papers. In this regard, an optimal extensible paper enables a smooth transition from an unexpanded to the expanded slit sheet by providing a small amount of stretching at the very start of expansion of the extensible slit sheet paper material."

"In some exemplary constructions, during expansion of a slit sheet, the force required to initiate expansion is substantially higher than the force required to continue expansion. For example, once the paper initially starts to bend at the slits, the expansion continues more easily during continued bending at the slits. The force required to continue the expansion of the slit sheet during this continued bending is dramatically reduced beyond the above-noted initial expansion. In some preferred embodiments, the extensible slit sheet paper substantially reduces the force required to initiate expansion. On the other hand, in some preferred embodiments, during the above-noted continued expansion, the extensible paper does not substantially stretch simultaneously with the process of expanding the slit sheet paper; otherwise, the expanded sheet might not optimally be made into a cushioning wrap."

"It should be noted that in this application, all theories related to functioning of the invention are provided to facilitate appreciation of concepts of the invention, rather than by way of limitation. Extensible paper, as designed, stretches as part of an increase in paper strength. In some embodiments, the functioning of the invention involves that the extensible slit sheet paper substantially utilizes the extensible property to ease the rotating the cells into the stretched shape and to resist tearing of the slit sheet during the expansion step. This means that at the initial point at which the cell rotates (i.e., initiating rotation between legs 38a and 38b on each side of the slit and land 20) the extensible slit sheet paper is substantially enhanced by the extensible paper's ability to stretch. In some embodiments, the functioning of the invention, thus, involves that extensible papers' properties are substantially utilized at this initial point and substantially finished as soon as the cell begins to rotate into its three dimensional shape (i.e., after this initial point, the reliance on the extensible nature of the paper may be less substantial or even non-existent). After that initial point, the slit pattern properties, regardless of paper type, opens with greater ease to the point at which it forms a hexagon. Accordingly, in some embodiments, the extensible property substantially merely comes into play at the initial moment of expansion. In some other embodiments, while the extensible features of the paper comes into play most substantially at this initial point of rotation, the extensible features of the paper can have some affect during further expansion of the paper, whereby the initial point of expansion can be substantially facilitated due to extensibility and further expansion can also be, at least, somewhat facilitated due to extensibility."

"In some of the preferred embodiments, preferable extensible papers that can be employed include extensible papers where the purpose of the extensible nature is to provide the type of stretching found for the use of multi-wall bags for heavy weight items like cement, or seed and the like. U.S. Patent Publication No. 2016/0355985 (U.S. application Ser. No. 14/901,997) and U.S. Pat. Nos. 3,104,197 and 3,266,972 teach the manufacture and properties of this form of extensible paper. Further teachings can be found in "Understanding sheet extensibility", R. S. Seth, Pulp & Paper Canada T31, 106:2 (2005) III, pages 33-40 (T31-T38). The disclosures of the foregoing patents, patent publication, and printed publication are incorporated herein by reference, as though recited in full."

"The prior expanded slit sheet art (See, e.g., U.S. Pat. Nos. 5,538,778, 5,667,871, 5,688,578, and 5,782,735) focused on paper strength to inhibit tearing during the expansion process and Kraft paper was satisfactory because the strength required coincided with the thickness required to make a satisfactory wrapping product. The increased strength of an expandable sheet does not contribute to or increase the value/performance of the expansion of the slit sheet material. It has now been found by the present inventor that an expandable slit sheet paper can be substantially improved by the use of an extensible sheet. In the preferred embodiments, this use of an extensible slit sheet paper advantageously provides a reduction in force required to open the slit sheet and therefore provides a faster and easier expanding process for the user of the expanded slit sheet. The unexpected benefit resulting from the reduction in force at the very start of the expansion of the slit sheet provides an unexpected improvement to the slit sheet packaging product and renders the employment of the extensible paper highly unique. Notably, the prior expanded slit sheet paper persisted in and was widely used in the marketplace for decades without the contemplation of the present invention or the potential advantages therefrom."

"As set forth in this application, the present inventor has discovered that the force needed to expand an expandable slit sheet paper is far greater than the force required to expand an extensible slit sheet paper. By way of example, a 50 pound Kraft paper expandable slit sheet that is 15" wide prior to expansion requires approximately 4-6 pounds or 0.4 pounds per inch, whereas the force required to expand an extensible slit sheet of the same paper weight is 0.15-0.22 pounds per inch. This is a marked difference between the papers. Kraft paper has the strength to provide an acceptable expandable slit sheet. However, unexpectedly, the extensible slit sheet imparts an ease of expansion that greatly reduces the force required to expand the slit sheet, not based on the main purpose for extensible paper which is to increase its tensile strength but, rather, its capability to stretch. Since extensible paper is higher in cost and Kraft paper was strong enough, it was not previously known that extensible paper could be of benefit for making slit paper sheets of the types found in, e.g., U.S. Pat. Nos. 5,538,778, 5,667,871, 5,688, 578, and 5,782,735, and U.S. Non-Provisional application Ser. No. 15/428,144. For example, it was not appreciated that an extensible slit sheet could have provided an equivalent strength to light weight, thin papers that previously had no applicability as a wrapping product. Light weight Kraft paper tears more easily than heavier weights of Kraft paper. It has now been found that the extensible paper enables the use of the lighter weight expanded slit-sheet papers that also advantageously provide gentler cushioning required by fragile items when a slit sheet is expanded, in contrast to the more rigid cushioning provided by heavier weight expanded slit-sheet papers."

"Reference is particularly made to the graph of Table 1 on page 5 of U.S. Patent Publication No. 2016/0355985 (now U.S. Pat. No. 9,945,077) as if recited in full, that describes paper strength based on certain manufacturing techniques. Within the graph is a column describing elongation at the point of paper break (or tearing of fibers) separated into two sub columns of the machine direction (MD) and cross direction (CD), also referred to as transverse direction. The elongation percentage of Table 1 ranges from 5.3% to 7.1% in the cross direction (CD) and 3.3% to 10.6% in the machine direction (MD)."

"Reference is also made to U.S. Pat. No. 3,266,972 within Table III of column 5 which references elongation in the percentage range from 3.7% to 4.6% in the CD or cross direction and 9.7% to 11.1% in the machine direction."

"In both '985 and '972, the variations are based on the manufacturing process that places an emphasis on tensile strength and stretch in either the cross direction or machine direction accordingly."

"The present inventor has discovered that for the purposes of expanding an extensible slit sheet paper for use as a packaging wrap and/or void fill, machine direction extensible ranges from 1%-9% provide an adequate extensibility, with 1% to 6% preferred, and 1% to 4% most highly preferred. The lower the extensibility coincides with lower costs of the paper per square foot. As indicated above, it should be understood that extensibility is measured on unslit paper."

"In some alternative embodiments, machine direction extensibility ranges of the extendible slit sheet paper can have ranges of:
  a) from 1.5%-9%, or more preferably from 1.5% to 6% preferred, or even more preferably from 1.5% to 4%; or
  b) from 2%-9%, or more preferably from 2% to 6% preferred, or even more preferably from 2% to 4%; or
  c) from 3%-9%, or more preferably from 3% to 6% preferred, or even more preferably from 3% to 4%."

"For the purposes of expanding the slit sheet paper for use as a packaging wrap and/or void fill, it has been found that cross direction extensible ranges from 1%-5% provides an adequate extensibility with 1% to 4% preferred, and 1% to 3% most highly preferred."

"In some alternative embodiments, cross direction extensibility ranges of the extendible slit sheet paper can have ranges of: a) from 1.5%-5%, or more preferably from 1.5% to 4%, or even more preferably from 1.5% to 3%; or b) from 2%-5%, or more preferably from 2% to 4%, or even more preferably from 2% to 3%."

"In combination with the extensible paper, a smaller, lighter weight, and recyclable version of an expander can be employed (such as, e.g., made entirely or substantially entirely with recyclable cardboard in some illustrative embodiments). This expands the market to customers that use a very small amount of wrap as compared to the industrial market. It also provides for a less expensive expansion device to be employed for expanding the slit paper. Additionally, it enhances the ease of use by the packer by providing for less ripping during the wrapping process that occurs when the tension is not properly set. This occurs as the roll, during its continued use, becomes smaller and lighter in weight. As the roll of expanded slit sheet becomes lighter the tension required increases. Thus, there need for a varying tensioning method. With the use of the extensible paper, the tension required is significantly decreased and the strength of the paper is increased. Both benefit the person wrapping by making the tensioning required much less precise to the point at which, a single tension setting can be used with little or no adjustment. If the tension is set higher than necessary, the increase in strength from the extensible paper keeps the product from tearing and therefore makes it easier for the packer to use. Therefore, the packer can make fewer adjustments as the slit sheet roll becomes smaller and smaller."

"The reduction in the force required to expand the slit paper enables a new product to be created using lighter weight papers. In the past, expanded slit sheet paper is primarily used as a wrapping product whereas its use as a void fill would be in limited circumstances due to void fill being typically the cheapest, that is, the lowest cost of all packaging products. The increased strength of the extensible sheet enables the use of a thinner and lighter weight slit sheet paper as a void fill product. If the expanded slit sheet is not being used as a wrap, then the thicker 0.005", 50 pounds per 3,000 square feet paper and above is not required and a lighter weight 0.003-0.0045" thick, 30-40 pounds per 3,000 square feet paper can be used as void fill. It can also be used to provide cushioning that other paper void fill products have not been able to provide. It has now been found that even though the extensible paper has a 10% higher price, the use of a thinner paper provides much more square footage per ton and more than compensates for the increased cost of the extensible paper as compared to Kraft paper."

"Detailed Descriptions of Technologies Employed in the Present Invention Quoted from Disclosures that are Incorporated by Reference"

"The Following are Citations from Clupak's paper patent (U.S. Pat. No. 9,945,077):"

Example 1

Heavy-duty Clupak paper having a basis weight of 84.9 g/m2 was made using a gap-former paper-making machine equipped with a Clupak system, at a paper-making speed of 480 m/min and using, as material, 100% unbleached softwood Kraft pulp that had been beaten at high concentration of 28%. The negative draw on the Clupak was set to −4.5%.

Example 2

Heavy-duty Clupak paper was made in the same manner as in Example 1, except that the paper had a basis weight of 76.1 g/m2 and the negative draw on the Clupak was set to −6.0%.

Example 3

Heavy-duty Clupak paper was made in the same manner as in Example 1, except that the paper had a basis weight of 73.4 g/m2 and the negative draw on the Clupak was set to −4.0%.

Example 4

Heavy-duty Clupak paper was made in the same manner as in Example 1, except that the paper had a basis weight of 85.0 g/m2, the negative draw on the Clupak was set to −4.0%, and the pulp blend consisted of 90% unbleached softwood Kraft pulp and 10% unbleached hardwood Kraft pulp.

Comparative Example 1

Heavy-duty Clupak paper was made in the same manner as in Example 1, except that the paper had a basis weight of 71.9 g/m2 and the negative draw on the Clupak was set to −10.0%.

Comparative Example 2

Heavy-duty Clupak paper was made in the same manner as in Example 1, except that the paper had a basis weight of 85.4 g/m2 and the negative draw on the Clupak was set to −1.0%.

Comparative Example 3

Heavy-duty Kraft paper was made in the same manner as in Example 1, except that the paper had a basis weight of 76.0 g/m2 and the Clupak process was not performed.

TABLE 1

| | | Clupak negative draw % | Basis weight g/m² | Paper thickness µm | Density g/cm³ | Air resistance sec | Tensile index Nm/g MD | Tensile index Nm/g CD | Elongation at break % MD | Elongation at break % CD | TEA index J/g MD | TEA index J/g CD | Tensile stiffness index kNm/g MD | Tensile stiffness index kNm/g CD | Tear index mN·m²/g MD | Tear index mN·m²/g CD | Formation | Breaking after processed into heavy-duty sack |
|---|---|---|---|---|---|---|---|---|---|---|---|---|---|---|---|---|---|---|
| Examples | 1 | −4.5 | 84.9 | 121 | 0.70 | 14 | 88.1 | 31.3 | 7.0 | 7.1 | 3.55 | 1.55 | 5.62 | 3.64 | 12.8 | 28.9 | ○ | ○ |
| | 2 | −6.0 | 76.1 | 118 | 0.65 | 12 | 69.5 | 33.0 | 8.1 | 5.8 | 3.22 | 1.47 | 4.18 | 3.07 | 19.7 | 25.8 | ○ | ○ |
| | 3 | −4.0 | 73.4 | 110 | 0.67 | 13 | 72.5 | 30.1 | 6.0 | 6.0 | 2.60 | 1.17 | 4.95 | 3.43 | 14.9 | 20.3 | ○ | ○ |
| | 4 | −4.0 | 85.0 | 129 | 0.66 | 13 | 83.3 | 39.4 | 7.4 | 6.3 | 3.47 | 1.51 | 5.33 | 3.44 | 13.1 | 25.5 | ⊚ | ○ |

TABLE 1-continued

|  |  | Clupak negative draw | Basis weight | Paper thickness | Density | Air resistance | Tensile index Nm/g | | Elongation at break % | | TEA index J/g | | Tensile stiffness index kNm/g | | Tear index mN·m²/g | | Formation | Breaking after processed into heavy-duty sack |
|---|---|---|---|---|---|---|---|---|---|---|---|---|---|---|---|---|---|---|
|  |  | % | g/m² | µm | g/cm³ | sec | MD | CD | MD | CD | MD | CD | MD | CD | MD | CD |  |  |
| Comparative Examples | 1 | −10.0 | 71.9 | 112 | 0.64 | 12 | 52.0 | 28.0 | 10.6 | 5.3 | 3.47 | 1.02 | 3.09 | 3.14 | 19.7 | 27.1 | ○ | X |
|  | 2 | −1.0 | 85.4 | 130 | 0.66 | 15 | 85.0 | 32.1 | 3.7 | 6.7 | 1.99 | 1.49 | 7.12 | 3.70 | 16.3 | 20.4 | ○ | X |
|  | 3 | Not used | 76.0 | 119 | 0.64 | 18 | 92.1 | 35.5 | 3.3 | 5.4 | 1.89 | 1.49 | 8.92 | 3.85 | 19.1 | 24.9 | ○ | ○ |

"Evaluation Methods:
(Measurement of Tensile Energy Absorption Index)
Measured by the method specified in JIS P8113: 2006.
(Measurement of Breaking Elongation)
Measured by the method specified in JIS P8113: 2006.
(Measurement of Tear Index)
Measured by the method specified in JIS P8116: 2000.
(Measurement of Burst Index)
Measured by the method specified in JIS P8112: 2008.
(Measurement of Tensile Stiffness Index)
Measured by the method specified in ISO/DIS 1924-3.
(Measurement of Freeness after Disintegration)
Measured by the method specified in JIS P8220: 1998 and JIS P8121: 1995."

"Looking at the properties of the Clupak papers in Examples 1 to 4 and Comparative Examples 1 and 2 as well as those of the Kraft paper in Comparative Example 3, as shown in Table 1, the Clupak papers described in Examples 1 to 4 exhibit a good balance of various strengths and elongation and have excellent strength overall; on the other hand, the Clupak papers described in Comparative Examples 1 and 2 and Kraft paper described in Comparative Example 3 exhibit a poor balance of various strengths and elongation and cannot be said to have excellent strength overall." "The following are Citations from "Understanding Sheet Extensibility", R. S. Seth, (Pulp and Paper Research Institute of Canada 3800 Wesbrook Mall Vancouver, BC, Canada V6S 2L9) Pulp & Paper Canada T31, 106:2 (2005) III, pages 33-40 (T31-T38):

Tensile strength and extensibility or stretch are two important failure properties of paper. They are defined by the end-point of the sheet's load-elongation curve (FIG. 1). Individually and together, they are important for many product performance properties. For example, TEA, the tensile energy absorbed by the sheet before failure is proportional to the area under the load-elongation curve. Thus, it depends on both the tensile strength and extensibility of the sheet. A high TEA is desired in sack papers [1]. The bursting strength of paper has been shown to be proportional to the product of tensile strength and the square-root of stretch [2]. The fracture toughness of paper has been found to depend strongly on the sheet's tensile strength and stretch [3, 4]. Sheet stretch has also been regarded as important for paper runnability both at the paper machine's dry-end and in the pressroom [5-8]. Papers with high stretch also seem to have a somewhat higher tearing resistance [9], and folding endurance; they are found to be more dimensionally unstable as well [10]. The factors that control sheet tensile strength are fairly well understood [4]. The tensile strength is high if fibres are strong, long, fine and thin-walled. The fibres should be conformable and have a high fibre-fibre bond strength. The sheet tensile strength is also high if fibres are straight, free from deformations and the sheets are well formed. Otherwise, the stress is unevenly distributed when the sheet is strained, leading to premature failure."

"This report deals with the factors that control sheet stretch."

"Factors that Control Sheet Stretch:
A specimen under tensile load extends more, the longer it is. Therefore, extensibility or stretch or strain at failure as a material property, is expressed as a percentage of the original specimen length (FIG. 1)."

"Role of Bonding:
Regardless of how bonding between the fibres is increased—by wet pressing, beating or refining, or additives, the sheet stretch of a furnish generally increases with increased fibre-fibre bonding. This is observed for almost all papermaking fibres—chemical, mechanical, wood, non-wood, or recycled. The reasons are as follows. Fibres have a certain "stretch-potential". However, this potential is realized in paper only when fibres form a bonded network. If the bonding is weak, the network fails before the stretch-potential is realized; the sheet stretch is low. As bonding in the network is increased, the stretch-potential of fibres is increasingly realized, the sheet stretch increases. Since increased inter-fibre bonding also increases sheet tensile strength, an increase in stretch with tensile strength is often observed for handsheets (FIG. 2). The stronger the sheet, the more the fibres' stretch-potential is utilized. Because of this relationship between tensile strength and stretch, factors such as sheet grammage or formation that tend to affect tensile strength also affect sheet stretch [11]. A comparison of handsheet stretch values at similar tensile strengths provides a meaningful comparison of the stretch-potential of various furnishes."

"The Following are Citations from Trani et al.'s Extensible Paper Patent (U.S. Pat. No. 7,918,966):"

"Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper web not yet formed and presenting a moisture content of about 35%/45% between two rollers rotating at different speeds. One of these rollers, generally the lower roller, is made of rubber and is rotated at lower speed, while the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper to prepare it for transverse extensibility. By an amount which can reach 10-15%. On the other band the spiral groove contributes to maintaining longitudinal advancement of the processed paper web along the machine."

"The Following are Citations from Cabell et al.'s Extensible Paper Web Patent (U.S. Pat. No. 6,458,447):"

"Tensile and Percent Stretch Test:

The tensile test is used for measuring force versus percent elongation properties. The tests are performed on a Thwing Albert Intellect II-STD Model No. 1451-24PGB, available from the Thwing-Albert Co. of Philadelphia, Pa."

"The samples used for this test are 1" wide×6" long with the long axis of the sample cut parallel to the direction of maximum extensibility of the sample. The sample should be cut With a sharp Exacto knife or some suitably sharp cutting device design to cut a precise 1" wide sample. (If there is more than one direction of extensibility of the material, samples should be taken parallel to representative direction of elongation). The sample should be cut so that an area representative of the symmetry of the overall pattern of the deformed region is represented. There will be cases (due to variations in either the size of the deformed portion or the relative geometries of regions 1 and 2) in which it will be necessary to cut either larger or smaller samples than is suggested herein. In this case, it is very important to note (along with any data reported) the size of the sample, which area of the deformed region it was taken from and preferably include a schematic of the representative area used for the sample. Three samples of a given material are tested."

"The Following are Citations from Cramer et al.'s Extensible Paper Patent (U.S. Pat. No. 3,266,972):"

"Test and Characterization Procedures:

The test and characterization procedures employed in measuring various properties reported herein are listed in Table I below. Unless otherwise indicated the code letter numerals indicate standard TAPPI tests."

"Elongation T457:

By the expression "extensible papers" is meant a paper having an increased elongation (generally a minimum of about 6%) in the machine direction.

In runs IA and IB of this example, rosin size (0.3% by weight based on the weight of pl up) is added at the beater and the pH is adjusted to 4.5 with alum. The stock, having a consistency of 3.6% is dropped to the beater chest and is then pumped to a second chest, passed through a Jordan and continuously diluted with "white water" at the Fourdrinier headbox to a consistency of 0.3%. Properties measured on the various papers is reported in Table III. Each paper has a basis weight of from 49.4 to 50.3 pounds per ream."

TABLE III

| Property | | IA | 1B | IC | ID |
|---|---|---|---|---|---|
| Tensile | MD | 15.6 | 16.0 | 18.2 | 22.4 |
| (lbs/in.) | CD | 12.6 | 13.0 | 14.3 | 15.4 |
| Elongation | MD | 10.1 | 11.2 | 9.9 | 9.7 |
| (percent) | CD | 3.7 | 4.3 | 4.4 | 4.6 |
| Work-to-break | MD | 1.01 | 1.05 | 1.14 | 1.34 |
| (in.-lbs./in. 2) | CD | 0.34 | 0.4I | 0.47 | 0.50 |
| MIT Fold | MD | 380 | 398 | 496 | 1,021 |
| | CD | 106 | 94 | 132 | 167 |
| CSI Abrasion | MD | 14 | | 20 | 25 |
| (cycles) | CD | 7 | | 37 | 64 |

"The Following are Citations from Trani et al.'s Multilayer Paper Material Patent (U.S. Pat. No. 8,518,522):"

"These and other objects which will be apparent from the ensuing description are attained according to the invention by a multilayer papery material comprising at least one first three dimensional structure sheet exhibiting reliefs having maximum sizes which are lower than the width of the original sheet, said reliefs being obtained through localized stretching of said first sheet which has an original degree of extensibility of not less than 5% in all the directions, and at least one second sheet made of papery material coupled to said first structure sheet and defining empty spaces with the reliefs thereof."

"As it can be seen from the figures, in the embodiment shown in FIG. 1 the multilayer material of the invention consists of two layers 2, 4 of paper presenting extensibility characteristics of not less than 5% both in a longitudinal and in a transverse direction, and preferably not less than 15%."

"The Following are Citations from Trani et al.'s Extensible Paper Material Application (U.S. Application No. 2007/0240841):"

"Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper Web, not yet formed and presenting a moisture content of about 35%/45%, between two rollers rotating at different speeds. One of these rollers, generally the lower roller, is made of rubber and is rotated at lower speed, While the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper, to prepare it for transverse extensibility, by an amount which can reach 10-15%. On the other hand the spiral groove contributes to maintaining longitudinal advancement of the processed paper web along the machine."

Further details related to extensible papers that can be employed in some preferred embodiments are also quoted in the '086 patent as follows.

"The following is a direct quote of the paragraph on column 1, lines 4-19, of U.S. Pat. No. 3,908,071 incorporated by reference in the preceding paragraph: "Extensible (compacted) paper produced, for example, in accordance with the apparatus and process disclosed in U.S. Pat. No. 2,624,245 has certain well recognized advantages and commercial uses. Such paper is subjected, while in a partially moistened condition, to compressive compaction in the direction of web movement (machine direction or MD) between a pressure nip, thus compacting and forcing the fibers together to produce an inherent stretchability without creping. Compacted paper has improved tensile energy absorption (TEA) burst and tear characteristics which are highly desirable for such end uses as the manufacture of paper sacks." In addition, the following is a direct quote of the Abstract of U.S. Pat. No. 6,024,832 incorporated by reference in the preceding paragraph: "A method for producing extensible paper, comprising the following stages: feeding a mix of vegetable fibres to a kneader member, mixing the mix with water in the kneader, beating the fibres to obtain a pulp, transferring the beaten pulp into a flow chest, feeding the beaten pulp from the flow chest onto a paper web formation cloth with consequent reduction of the water percentage by gravity and vacuum, pressing the web, with consequent further reduction of its water content, initial drying of the paper web to a substantially constant moisture content of between 15% and 65%, compacting, final drying to a moisture content of between 15% and 4%, preferably 10%-8%, glazing, wherein: the beating stage is carried out by rubbing the fibres in a multistage unit to obtain a pulp having a degree of beating of at least 30.degree. SR, the compacting stage is carried out between at least a pair of rollers of which one is of hard material comprising circumferential surface ribs and driven at greater speed, and the other is of soft material with a smooth surface and driven at lesser speed." In addition, the following is a direct quote of the $2^{nd}$ paragraph of the Background section of U.S. Pat. No. 9,945,077 incorporated by reference in the preceding paragraph: "On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above." In addition, the following is a direct quote of the paragraph on column 2, lines 41-56 of U.S. Pat. No. 3,104,197 incorporated by reference in the preceding paragraph: "The use of rubber or rubberous material in conjunction with a hard surface in the manner described is known in the treatment of paper as well as fabrics but only in a general way and the present invention includes the use of rubber considerably softer and more elastic than previously used. Also of great importance in the production of an extensible paper by creping it in this manner is the differential in speeds at which the rolls are driven. If the proper combination of hard and soft surfaces is provided, a semi-dry paper web passing through the nip of the rolls will be carried by the contracting rubber against the direction of web travel toward the nip and over the surface of the hard roll. This creates a uniformly compressed crepe in the paper web giving toughness, pliability and extensibility."

"The following are direct quotes of paragraphs [0003] and [0028] of U.S. Patent Publication No. 2016/0355985 incorporated by reference in the preceding paragraph: (1) "[0003] On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above;" and "[0028] The manufacturing method using this Clupak system is such that a paper web is inserted between a roll and an endless rubber blanket to compress the paper web with a nip bar and the rubber blanket, while at the same time the pre-stretched blanket shrinks to cause the paper web to also shrink and thereby increase its breaking elongation. The Clupak system allows for adjustment of the breaking elongation of kraft paper in the longitudinal direction according to the ratio of the manufacturing speed on the inlet side of the Clupak system and manufacturing speed on the outlet side of the Clupak system, and also according to the pressurization force applied by the nip bar."

In some embodiments, extensible paper employed can involve an extensible paper that can include one or more of the following features, as set forth in the '086 patent.

Example 1: An extensible slit sheet paper cushioning product, comprising: a roll of slit sheet paper having a slit pattern including a plurality of slits extending in a cross direction that forms a plurality of open cells upon expansion in a machine direction, said roll resisting pulling of a length of slit sheet paper along the machine direction to enable expansion of the length of slit sheet paper in the machine direction, said slit sheet paper being formed from a paper that is extensible in the machine direction and the cross direction prior to providing said slit pattern, said extensible paper having an extensible range of 3 to 20% in the machine direction prior to providing said slit pattern.

Example 2: The extensible slit sheet paper cushioning product of example 1, wherein said extensible range is not less than 5% in both the machine direction and cross direction.

Example 3: The extensible slit sheet paper cushioning product of example 1, wherein said extensible range is 3-15% in the machine direction.

Example 4: The extensible slit sheet paper cushioning product of example 1, wherein said slit sheet paper is configured such that expansion is performed by applying an expansion force of 0.15 to 0.22 pounds per inch to form said open cells.

Example 5: The extensible slit sheet paper cushioning product of example 2, wherein said slit sheet paper is configured such that expansion is performed by applying an expansion force of 0.15 to 0.22 pounds per inch to form said open cells.

Example 6: The extensible slit sheet paper cushioning product of example 5, wherein said slit sheet paper has a weight, prior to expansion, from about 30 to 50 pounds per 3,000 sq. ft.

Example 7: The extensible slit sheet paper cushioning product of example 1, wherein said slit sheet paper has a weight, prior to expansion, from about 30 to 50 pounds per 3,000 sq. ft.

Example 8: The extensible slit sheet paper cushioning product of example 1, wherein said extensible range is 3-11.1% in the machine direction.

Example 9: extensible slit sheet paper cushioning product of example 1, wherein said extensible range is 3-11.1% in the machine direction.

Example 10: The extensible slit sheet paper cushioning product of example 1, wherein said extensible range is 3.3-10.6% in the machine direction.

Example 11: The extensible slit sheet paper cushioning product of example 1, wherein said extensible range is 9.7-11.1% in the machine direction.

Example 12: The extensible slit sheet paper cushioning product of example 1, wherein said extensible paper is formed by imparting a treatment prior to providing the slit pattern comprising inserting said paper between a roll and an endless pre-stretched blanket to compress the paper with a nip bar and the blanket (or otherwise compressing the paper between two different (e.g., differently moving) surfaces, such as between two different rollers).

Example 12: The extensible slit sheet paper cushioning product of example 1, wherein said extensible paper is a nonwoven fibrous material with fibre-to-fibre bonding that resists tearing upon 3-15% expansion in the machine direction as measured prior to providing the slit pattern.

Example 13: The extensible slit sheet paper cushioning product of example 1, wherein said roll of slit sheet paper is wound on a cylindrical core, and said length of slit sheet paper extends from said roll of slit sheet paper.

Example 14: The extensible slit sheet paper cushioning product of example 1, wherein said extensible range is 5-15% in a cross-direction.

Example 15: The extensible slit sheet paper cushioning product of example 1, wherein said extensible range is 7.1-15% in a cross-direction.

Example 16: The extensible slit sheet paper cushioning product of example 58, wherein said slit sheet paper is configured such that expansion is performed by applying an expansion force of 0.15 to 0.22 pounds per inch to form said open cells.

In some preferred embodiments, the slit paper pattern of slits advantageously has slits in the range from 0.2 to 0.3 inches (i.e., in the lengthwise dimension of the slits) and spaces between rows in the range from 0.06 to 0.7 inches (i.e., the distance between adjacent rows of slits). Preferably, the slit paper pattern of slits advantageously has slits of about 0.25 inches (i.e., in the lengthwise dimension of the slits) and spaces between rows of about 0.06 to about 0.065 inches (i.e., the distance between adjacent rows of slits) and most preferably spaces between rows of about 0.0625 inches.

In some embodiments, the space between the slits of each row is in the range from about 0.1 to about 0.09 inches and, in some examples, the space between the slits of each row is about 0.094 inches.

The foregoing dimensions produce a slit pattern that creates more cells per square foot, provides crush resistance and resiliency for cushioning items. In some examples, a "thin expanded sheet" can be provided that employs a slit paper pattern of slits in the range from 0.2 to 0.3 inches (i.e., in the lengthwise dimension of the slits) and spaces between rows in the range from 0.06 to 0.7 inches (i.e., the distance between adjacent rows of slits).

In order to expand an expandable slit sheet paper, an expansion force is required to pull the paper to cause the paper to expand and to open the cells. Existing expandable slit sheet paper can be somewhat difficult to expand and requires a substantially higher force for expansion. Additionally, existing expandable slit sheet paper requires a larger slit length in order to enable opening of the cells. Varying slit patterns with expanded slit sheet material require varying force to stretch. The previous slit pattern used in the market requires approximately 6 pounds of pulling force for slit material that is 15 inches wide utilizing 50 # Kraft paper. However, the present inventor has discovered that extensible paper reduces the force required for the same slit pattern and paper weight to, e.g., 2 pounds.

The present inventor has also discovered that this decrease enables further slit pattern opportunities that can provide greater resiliency and a reduced thickness is desired where, in the past, they would be too difficult to stretch manually and provide a burden to the automated expanding equipment. In general terms, the present inventor has discovered that a 10% reduction in slit, land, and row size increases the number of supporting legs by 23.7% —a more than doubling of the strength of the material. This provides cushioning solutions where greater resiliency of the same or smaller leg height can be accomplished.

Additionally, and well known in paper die cutting art, leg height impacts stiffness. As the leg height is reduced, the leg becomes stiffer. This is due to the fiber length that becomes more difficult to bow or flex as the height becomes shorter. According to preferred embodiments of the present invention, the leg height, the number of legs per square foot, and the paper weight is balanced to provide optimal cushioning while providing the least amount of pulling strength to open.

The automated equipment is also impacted with a heavy pulling strength as it requires more maintenance changes to the hook rollers due to them wearing out proportionally to the pulling force required. With the advent of the present inventor's discovery of the unique and unexpected advantages of extensible paper employed in expandable slit sheet products, these limitations based on pulling force are greatly diminished and enable greater market opportunities where greater strength is required.

Presently there is a move towards environmentally friendly packaging products that includes the use of non-powered equipment eliminating the need for electricity.

The use of a manual system to dispense rolls of expanded slit material that can have varying properties of cushioning and provides greater flexibility for protecting a wider variety of weights and densities of fragile items. Accordingly, very substantial benefits and advancements are achieved.

Presently, the crush strength for the current commercial pattern using a 0.5" slit is 2.2 pounds per square inch of strength.

According to some preferred embodiments of the present invention, a preferred reduced slit pattern utilizing 50 # Kraft paper with a slit pattern of 0.45" slit (i.e., length of slit), 0.1688" land (i.e., distance between adjacent slits in a lengthwise direction of the slits), 0.1125" row width (i.e., distance between adjacent rows of slits) is provided. In some embodiments, such a configuration yields 2.72-2.92 pounds of per inch of crush strength, which yields a 27% increase in strength with a 10% decrease in thickness from 0.1875" to 0.16875". In the preferred implementations of this slit pattern, the paper employed is an extensible paper.

According to some other embodiments of the present invention, another preferred slit pattern is 0.40" slit, 0.15" land, 0.1125" row width. In some embodiments, this latter configuration yields 3.1-3.3 pounds per inch crush strength, which yields a 40% increase in crush strength with a 10% decrease in thickness from 0.1875" to 0.16875." In the most preferred implementations of this slit pattern, the paper employed is an extensible paper.

According to the preferred embodiments, this increase in strength can advantageously be used to allow for a reduced thickness of the expanded slit sheet paper, which can, thus, provide, e.g., an equivalent crush strength while providing for a reduction in overall height. For example, in the above illustrative embodiments employing a 50 #paper, the use of 40 #paper would reduce the leg stiffness, but would reduce the cost of the paper.

According to some other preferred embodiments, an expandable slit paper sheet includes a pattern of slits having slit lengths in the range from 0.30 to 0.45 inches and spaces between rows of slits in the range from 0.1125 to 0.1688. In the most preferred implementations of this slit pattern, the paper employed is an extensible paper.

According to some other preferred embodiments, an expandable slit paper sheet includes a pattern of slits having slit lengths in the range of 0.45 inches plus 5% (e.g., 0.4725 inches) to 0.45 inches minus 33% (e.g., 0.30 inches). In the most preferred implementations of this slit pattern, the paper employed is an extensible paper.

According to some other preferred embodiments, an expandable slit paper sheet includes a pattern of slits that upon expansion produces an expandable slit paper having a number of legs per square foot that is at least 20% greater than a slit paper sheet with slit lengths of 0.5 inches which is configured to create hexagonal cells (e.g., with equilateral hexagons).

According to some other preferred embodiments, an expandable slit paper sheet includes a pattern of slits that upon expansion produces an expandable slit paper having a number of legs per square foot that is at least 15% greater than a slit paper sheet with slit lengths of 0.5 inches which is configured to create hexagonal cells (e.g., with equilateral hexagons), and, more preferably, in the range from 20% to 50% greater than such slit paper with slit lengths of 0.5 inches which is configured to create hexagonal cells (e.g., with equilateral hexagons)

In the most preferred embodiments, the paper employed is an extensible paper as described herein-above. The use of such extensible paper highly advantageously enables a reduced slit pattern size in comparison to prior slit patterns. Notably, non-extensible paper has limitations in relation to the viable sizes and dimensions of the slits, and such non-extensible paper does not enable reduction in sizes to that of preferred embodiments described herein because such prior papers would be inoperable and would not adequately expand if such small sizes were attempted to be employed.

Additionally, while the present inventor has discovered novel means to improve cushioning characteristics of expandable slit sheet paper, which involves "reducing" the slit pattern dimensions, it is notable that this reduction of slit pattern dimensions is "not only" unviable with prior expandable slit sheet paper (i.e., which could not achieve such small sizes), but is also "counter-intuitive" to the existing understanding of cushioning properties afforded by such expandable slit sheet papers. Notably, the cushioning of expandable slit sheet papers is directly related to the "width" of the expandable slit sheet paper in an expanded state. Accordingly, for enhancing cushioning, those in the art have sought to actually "increase" this width of the expanded slit sheet paper. However, the present inventor discovered means by which smaller slit patterns could be achieved (e.g., via the use of the extensible paper) and that such smaller slit patterns with such extensible papers could, in fact, provide enhance cushioning despite the losses in cushioning due to the reduced "width" of the expandable slit sheet paper. Additionally, the present inventor also discovered other desirable applications and uses of such novel expandable slit sheet paper.

Notably, non-extensible expanded slit paper sheets do not operate appropriately with slit lengths of less than about 0.5 inches. Accordingly, for expandable slit paper sheets of smaller slit sizes according to the present invention, an extensible paper according to the present invention is advantageously employed.

According to some more preferred embodiments of the invention, a slit pattern is provided which includes slit lengths of 0.35" slits (i.e., the lengths of the slits), 0.13125" lands (i.e., the distances between adjacent slits in the same row of slits in a lengthwise direction of the slits), and 0.0875" row width (i.e., the distances between adjacent rows of slits). In this regard, such a slit pattern is preferably implemented within a pattern of slits similar to that shown in, e.g., FIG. 6(A), in which all of the slits of the expandable slit sheet have the same lengths, the distances between adjacent rows is consistently the same, in which the distance between slits in the same row is consistently the same, and in which the locations of the slits in adjacent rows is arranged with equal overlap to form symmetrical cells. For these embodiments, an extensible slit sheet paper is preferably employed; notably, a non-extensible paper cannot be used to viably operationally function with such a slit pattern.

While, preferably, all of the expanded slit sheet paper would include a same slit pattern throughout the sheet, in some embodiments such a pattern could be employed within a portion or region of the paper and/or some regions of the paper may potentially include some differences in the pattern. Additionally, although the slit lengths and dimensions are preferably consistently the same as indicated above, in some embodiments, there could be some variations in sizes, positions of the slits as long as operation of the product is not impeded.

In some embodiments, a slit pattern having 0.35" slits, 0.13125" lands, and 0.0875" row width can yield 3.52-3.82 pounds per inch crush strength which yields a 60% increase in crush strength with a 30% decrease in thickness from 0.1875" to 0.1125."

In some preferred implementations of all of the embodiments of the invention described above, the lands distance (i.e., the distance SS shown in FIG. 6(A) between the slits) is approximately $\frac{1}{3}$ the length of the slits (i.e., the distance SL shown in FIG. 6(A)). When the distance SS is about $\frac{1}{3}$ the length of the slits, the lengths of the perimeter sides of the created cell openings a26 and b26 are equal. However, in some preferred embodiments, the distance of the lands (i.e., SS) is preferably slightly greater than $\frac{1}{3}$ the length of the slits. For example, in the lattermost embodiments above employing a 0.35" slit length, with 0.13125" land length, the ratio is approximately 0.375. Accordingly, in this example, the length of the lands are approximate 12.5% larger than $\frac{1}{3}$ the length of the slits.

In some preferred embodiments, the lengths of the lands would be about $\frac{1}{3}$ the length of the slits plus or minus about 25%. In some other preferred embodiments, the lengths of the lands would be about $\frac{1}{3}$ the length of the slits plus or minus about 20%. In some preferred embodiments, the lengths of the lands would be about $\frac{1}{3}$ the length of the slits plus or minus about 15%. In some other preferred embodiments, the lengths of the lands would be about $\frac{1}{3}$ the length of the slits plus or minus about 10%.

In some other preferred embodiments, the lengths of the lands would be between about $\frac{1}{3}$ the length of the slits to 25% greater than $\frac{1}{3}$ the length of the slits. In some other preferred embodiments, the lengths of the lands would be between about $\frac{1}{3}$ the length of the slits to 20% greater than $\frac{1}{3}$ the length of the slits. In some other preferred embodiments, the lengths of the lands would be between about $\frac{1}{3}$ the length of the slits to 15% greater than $\frac{1}{3}$ the length of the slits. In some other preferred embodiments, the lengths of the lands would be between about $\frac{1}{3}$ the length of the slits to 10% greater than $\frac{1}{3}$ the length of the slits.

In some other preferred embodiments, the lengths of the lands would be between about 5% greater than $\frac{1}{3}$ the length of the slits to about 25% greater than $\frac{1}{3}$ the length of the slits. In some other preferred embodiments, the lengths of the lands would be between about 10% greater than $\frac{1}{3}$ the length of the slits to about 20% greater than $\frac{1}{3}$ the length of the slits. In some other preferred embodiments, the lengths of the lands would be between about 10% greater than $\frac{1}{3}$ the length of the slits to about 15% greater than $\frac{1}{3}$ the length of the slits. In some other preferred embodiments, the lengths of the lands are such that the slit length SL is approximately set in relation to the split spacing SS as follows: SL=2.6667× SS.

In some preferred embodiments, the dimensions of the expandable slit sheet paper are proportionally reduced from an expandable slit sheet paper having a 0.5" slit length, a $\frac{1}{8}$" (0.125 inch) spacing between rows, and a spacing between slits within the same row (i.e., land length) of $\frac{3}{16}$" (0.1875 inch) as follows: a) the row spacing is proportionally reduced by a ratio SL(new)/0.5 and b) the slit spacing is set at SL(new) divided by 2.6667. For example, some preferred embodiments include dimensions as set forth below Table A:

|  | Slit Length (SL) | Slit Spacing (SS) | Row Spacing (RS) |
|---|---|---|---|
| Example A | 0.45 inches | 0.1687 inches | 0.1125 inches |
| Example B | 0.425 inches | 0.1594 inches | 0.1063 inches |
| Example C | 0.40 inches | 0.1500 inches | 0.1000 inches |
| Example D | 0.375 inches | 0.1406 inches | 0.09375 inches |
| Example E | 0.35 inches | 0.13125 inches | 0.0875 inches |
| Example F | 0.325 inches | 0.1219 inches | 0.0813 inches |
| Example G | 0.30 inches | 0.1125 inches | 0.0750 inches |
| Example H | 0.275 inches | 0.1031 inches | 0.0688 inches |
| Example I | 0.25 inches | 0.09375 inches | 0.0625 inches |
| Example J | 0.225 inches | 0.08438 inches | 0.0563 inches |
| Example K | 0.20 inches | 0.07500 inches | 0.05 inches |
| Example L | 0.175 inches | 0.06562 inches | 0.4375 inches |

In some preferred embodiments, the corresponding row spacings of the Examples A to L in the above Table A are substantially as shown in Table A. In some preferred embodiments, the row spacings of Examples A to L can be substantially as shown in Table A plus or minus 20%, or, more preferably, substantially as shown in Table A plus or minus 15%, or, more preferably, substantially as shown in Table A plus or minus 10%, or, more preferably, substantially as shown in Table A plus or minus 5%.

Furthermore, in some preferred embodiments, the corresponding row spacings of the Examples A to L in the above Table A are, more preferably, within a range that is the same or lower than the row spacings shown in Table A for the respective slit lengths; notably, with reduced slit length, there can be increased difficulty to open the cells, which difficulty is increased with larger row spacings. Accordingly, as the slit lengths are decreased, in some preferred embodiments, the row spacing decreases an extent that is proportionally the same or more than the proportional decrease in the slit length. Notably, while the present inventor discovered that slit lengths could be viably decreased by the use of extensible papers as described herein, the present inventor also noted that even with extensible papers reduction in slit lengths can increase difficulty to open cells in the event that row spacings are proportionally too large.

Although the preceding Table A shows row spacings that are substantially reduced well below the ⅛" (0.125 inch) row spacing of the background art, in some alternative embodiments, the row spacings for various embodiments of the invention (including that of, e.g., Examples A to L in the preceding Table) can still be larger. That is, while the present invention very advantageously enables such a reduced row spacing due to the greatly improved cushioning characteristics that enable the row spacing to be reduced (e.g., the reduction in cushioning resultant from reduced row spacing can be offset by the improved cushioning characteristics of the present invention), such a substantial reduction is not necessarily required, as long as the cell structure can be opened for expansion.

For example, in some alternative embodiments, any of the embodiments of the invention having slit lengths within a range of 0.40 to 0.25 can employ row spacings that are less than that of the existing art, such as, e.g., less than 0.125 inches, or, more preferably, less than 0.12 inches, or, more preferably, less than 0.115 inches, or, more preferably, less than 0.1125 inches, or, more preferably, less than 0.0875 inches, or, in some embodiments more preferably, less than 0.08 inches.

In some other alternative embodiments, the various embodiments of the invention shown in the preceding Table A can be modified such that:

a) the slit spacing (which is shown in Table A as approximately based on the formula SL=2.6667×SS), can be adapted to be based on the formula SL=K×SS, where K is a value between 2.4 and 3.3, or, more preferably, where K is a value between 2.5 and 3, or, more preferably, where K is a value between 2.6 and 2.8); and/or b) the row spacing (which is shown in Table A as approximately based on the row spacing being proportionally reduced by a ratio SL(new)/0.5, such as to be based on the formula RS(new)=0.125/0.5×SL(new) or RS(new)=0.25×SL(new)), can be adapted to be based on the formula RS(new)=Y×SL(new), where Y is a value between 0.2 to 0.4, or, more preferably, where Y is a value between 0.22 and 0.3, or, more preferably, where Y is a value between 0.23 and 0.27.

In some preferred embodiments, the slit paper pattern of slits advantageously has slits in the range from 0.2 to 0.3 inches (i.e., in the lengthwise dimension of the slits) and spaces between rows in the range from 0.06 to 0.7 inches (i.e., the distance between adjacent rows of slits). Preferably, the slit paper pattern of slits advantageously has slits of about 0.25 inches (i.e., in the lengthwise dimension of the slits) and spaces between rows of about 0.06 to about 0.065 inches (i.e., the distance between adjacent rows of slits) and most preferably spaces between rows of about 0.0625 inches.

In some preferred embodiments, the space between the slits of each row is preferably in the range from about 0.1 to about 0.09 inches and, in some examples, the space between the slits of each row is about 0.094 inches.

In all of the embodiments of the present invention, the paper is, most preferably, an extensible paper. In various embodiments, the extensible paper is an extensible paper according to any of the embodiments or examples of extensible paper disclosed herein.

In various embodiments, the extendable paper can employ extensibility according to any of the embodiments described herein, including, e.g., any of the Examples described above. Moreover, the extendable paper can include features of any of the extensible papers described herein in relation to, e.g., opening forces required, paper weight or type, etc.

In some illustrative examples, in some embodiments, an extensible paper is employed having an extensible range of 3 to 20% in the machine direction. In some illustrative examples, in some embodiments, an extensible paper is employed having an extensible range of 3 to 20% in the cross direction. In some illustrative examples, in some embodiments, an extensible paper is employed having an extensible range of 3 to 15% in the machine direction. In some illustrative examples, in some embodiments, an extensible paper is employed having an extensible range of 3 to 15% in the cross direction. In some illustrative examples, in some embodiments, an extensible paper is employed having an extensible range of 7 to 15% in the machine direction. In some illustrative examples, in some embodiments, an extensible paper is employed having an extensible range of 7 to 15% in the cross direction. In some illustrative examples, the extensible range is not less than 5% in both the machine direction and cross direction.

Moreover, in some illustrative examples, the slit sheet paper is an extensible slit sheet configured such that expansion is performed by applying an expansion force of 0.15 to 0.22 pounds per inch to form said open cells.

Moreover, in some illustrative examples, the slit sheet paper is an extensible slit sheet, wherein said slit sheet paper has a weight, prior to expansion, from about 30 to 50 pounds per 3,000 sq. ft. Notably, all of the embodiments of the invention described herein (e.g., the various slit patterns, including slit lengths, slit spacings, row spacings, etc.) can be employed in various implementations of papers with weights within this range in some embodiments, such as, e.g., on 30 #paper, 35 #paper, 40 #paper, 45 # paper, 50 #paper, 55 #paper and on any papers within these ranges. Moreover, in other embodiments, papers can be employed lower than this range of 30 # to 50 #, such as, e.g., 20 # or less, or larger than this range, such as, e.g., 60 # or more.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%. It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A dispenser for void fill material, comprising:
a) a supply of expandable slit sheet paper having a slit pattern with rows of slits that are expandable into open cells;
b) a support for holding the supply of expandable slit sheet paper;
c) an outlet arranged to receive an end region of said expandable slit sheet paper fed from said supply of expandable slit sheet paper and extending through said outlet, said outlet having a maximum cross dimension that is substantially smaller than a width of the expandable slit sheet paper;
d) said expandable slit sheet paper being fed in a machine direction from said support to said outlet; and
e) a roller mechanism that draws the expandable slit sheet paper through the outlet,
wherein said end region of said expandable slit sheet paper passing through said outlet overlaps such that expanded cells of said expandable slit sheet paper that are formed during operation of the dispenser contact one another.

2. The dispenser of claim 1, wherein said roller mechanism includes rollers that grip the expandable slit sheet paper.

3. The dispenser of claim 2, wherein said rollers include rubber that grips the expandable slit sheet paper.

4. The dispenser of claim 2, wherein said rollers include mechanical elements that grip the expandable slit sheet paper.

5. The dispenser of claim 4, wherein said mechanical elements include hooks.

6. The dispenser of claim 1, wherein said supply of expandable slit sheet paper is a roll of expandable slit sheet paper.

7. The dispenser of claim 6, wherein said end region of said supply of expandable slit sheet paper is a region of said expandable slit sheet paper pulled from a perimeter of said roll of expandable slit sheet paper.

8. The dispenser of claim 6, wherein said end region of said supply of expandable slit sheet paper is a region of said expandable slit sheet paper pulled from a perimeter of said roll of expandable slit sheet paper in a machine direction towards said outlet.

9. The dispenser of claim 8, wherein said end region of said supply of expandable slit sheet paper pulled from the perimeter of said roll of expandable slit sheet paper contacts a surface of a guide member before extending through said outlet.

10. The dispenser of claim 9, wherein said guide member extends across an entire width of said expandable slit sheet paper.

11. The dispenser of claim 9 or 10, wherein said guide member is a guide rod.

12. The dispenser of claim 9 or 10, wherein said guide member has a curved outer peripheral surface.

13. The dispenser of claim 9 or 10, wherein said guide member is substantially straight across the entire width of said expandable slit sheet paper.

14. The dispenser of claim 10, wherein after contacting said guide member said expandable slit sheet paper contracts to fit through said outlet.

15. The dispenser of claim 1 or 6, wherein said end region of said expandable slit sheet paper contracts in a widthwise direction to fit through said outlet.

16. The dispenser of claim 1, wherein said end region of said expandable slit sheet paper passing through said outlet overlaps such that expanded cells of said expandable slit sheet paper that contact one another interlock.

17. The dispenser of claim 1, wherein said end region of said expandable slit sheet paper passing through said outlet is non-rotationally fed through said outlet.

18. The dispenser of claim 1, wherein said end region of said expandable slit sheet paper passing through said outlet is rotationally fed through said outlet.

19. The dispenser of claim 1, wherein the outlet is configured such that said expandable slit sheet paper passes through the outlet in a non-planar state across a width of the expandable slit sheet paper.

20. The dispenser of claim 1, wherein the outlet is configured such that said expandable slit sheet paper passes through the outlet in a non-planar irregular pattern across a width of the expandable slit sheet paper.

21. The dispenser of claim 1, wherein the dispenser is configured such that said expandable slit sheet paper passes through the outlet in a non-planar irregular pattern, which non-planar irregular pattern changes over time, across a width of the expandable slit sheet paper.

22. The dispenser of claim 1, wherein the dispenser is configured for automated operation and wherein said rotation mechanism includes a plurality of rollers configured to move the expandable slit sheet paper through said outlet.

23. The dispenser of claim 1, wherein said outlet is configured to frictionally engage and expand said expandable slit sheet paper.

24. The dispenser of claim 1, wherein the outlet causes the expandable slit sheet paper passing through the outlet to compress in a direction tangential to an axis of the outlet.

25. The dispenser of claim 1, wherein said outlet causes locations of said expandable slit sheet paper along a transverse direction to the direction of expansion of the expandable slit sheet paper to contact and press against one another.

26. The dispenser of claim 1, wherein said outlet is adjustable.

27. The dispenser of claim 1, wherein said outlet includes at least a portion that is movable such as to adjust the size or shape of the outlet.

28. The dispenser of claim 1, wherein said outlet has a maximum dimension across said outlet of less than 4 inches.

29. The dispenser of claim 1, wherein said expandable slit sheet paper is made of an extensible paper.

30. The dispenser of claim 1, wherein said expandable slit sheet paper is made of an extensible paper that is extensible in a machine direction in a range of between 4 to 15%.

31. The dispenser of claim 30, wherein said extensible paper is extensible in a cross direction in a range of between 4 to 15%.

32. The dispenser of claim 30, wherein said extensible paper is extensible in a machine direction in a range of between 5 to 15%.

33. The dispenser of claim 32, wherein said extensible paper is extensible in a cross direction in a range of between 5 to 15%.

34. The dispenser of claim 32, wherein said extensible paper is extensible in a machine direction in a range of between 6 to 15%.

35. A method, comprising:
   a) providing the dispenser of any of claim 1, 2, 6, 7, 9 or 17, and
   b) drawing the end region of the expandable slit sheet paper through the outlet with said roller mechanism.

36. The method of claim 35, further including said dispenser expanding the expandable slit sheet paper into expanded cells during operation of the dispenser.

37. The method of claim 35, further including said dispenser expanding the expandable slit sheet paper into expanded cells and then feeding the expanded slit sheet paper through the outlet.

38. A dispenser for void fill material, comprising:
   a) a supply of expandable slit sheet paper having a slit pattern with rows of slits that are expandable into open cells;
   b) a support for holding the supply of expandable slit sheet paper;
   c) an outlet arranged to receive an end region of said expandable slit sheet paper fed from said supply of expandable slit sheet paper and extending through said outlet, said outlet having a maximum cross dimension that is substantially smaller than a width of the expandable slit sheet paper;
   d) said expandable slit sheet paper being fed in a machine direction from said support to said outlet;
   e) a roller mechanism that draws the expandable slit sheet paper through the outlet; and f) wherein said outlet is configured to frictionally engage and expand said expandable slit sheet paper.

39. The dispenser of claim 38, wherein said outlet includes at least a portion that is movable.

* * * * *